(12) United States Patent
Yang et al.

(10) Patent No.: US 12,001,650 B2
(45) Date of Patent: *Jun. 4, 2024

(54) MUSIC USER INTERFACE

(71) Applicant: Apple Inc., Cupertino, CA (US)

(72) Inventors: Lawrence Y. Yang, Bellevue, WA (US); Anton M. Davydov, Gilroy, CA (US); Alan C. Dye, San Francisco, CA (US); Christopher Patrick Foss, San Francisco, CA (US); David Chance Graham, Columbus, OH (US); Jonathan P. Ive, San Jose, CA (US); Stephen O. Lemay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 17/506,197

(22) Filed: Oct. 20, 2021

(65) Prior Publication Data

US 2022/0137759 A1 May 5, 2022

Related U.S. Application Data

(63) Continuation of application No. 16/263,280, filed on Jan. 31, 2019, now Pat. No. 11,157,143, which is a
(Continued)

(51) Int. Cl.
*G06F 3/0482* (2013.01)
*G06F 3/01* (2006.01)
(Continued)

(52) U.S. Cl.
CPC ............ *G06F 3/0482* (2013.01); *G06F 3/016* (2013.01); *G06F 3/0421* (2013.01);
(Continued)

(58) Field of Classification Search
CPC .. G06F 3/0482; G06F 3/0481; G06F 3/04842; G06F 3/04847; G06F 3/0488; G06F 16/64; H04N 21/81
See application file for complete search history.

(56) References Cited

U.S. PATENT DOCUMENTS

| 3,357,173 A | 12/1967 | Wyssen |
| 4,358,837 A | 11/1982 | Yamazaki et al. |

(Continued)

FOREIGN PATENT DOCUMENTS

| AU | 2007100826 A4 | 9/2007 |
| AU | 2008100011 A4 | 2/2008 |

(Continued)

OTHER PUBLICATIONS

Advisory Action received for U.S. Appl. No. 17/747,804, mailed on Jun. 23, 2023, 6 pages.
(Continued)

*Primary Examiner* — Phenuel S Salomon
(74) *Attorney, Agent, or Firm* — DLA Piper LLP (US)

(57) ABSTRACT

The present disclosure relates to music user interfaces. A device, comprising a display and a rotatable input mechanism, one or more processors, memory, and one or more programs, is described. In response to receiving the first user input, the one or more programs may include instructions for ceasing display of an audio playback user interface and displaying a first user interface of a first set of user interfaces. While displaying the user interface of the first set of user interfaces, the one or more programs may include instructions for: receiving a second user input representing a directional swipe in a second direction and, in response to receiving the second user input, ceasing display of the first user interface of a first set of user interfaces and displaying the audio playback user interface.

18 Claims, 58 Drawing Sheets

Related U.S. Application Data continuation of application No. 14/830,629, filed on Aug. 19, 2015, now Pat. No. 10,235,014.

(60) Provisional application No. 62/129,940, filed on Mar. 8, 2015, provisional application No. 62/044,952, filed on Sep. 2, 2014.

(51) Int. Cl.

| | | |
|---|---|---|
| *G06F 3/042* | (2006.01) | |
| *G06F 3/0481* | (2022.01) | |
| *G06F 3/04842* | (2022.01) | |
| *G06F 3/04847* | (2022.01) | |
| *G06F 3/0488* | (2022.01) | |
| *G06F 3/04883* | (2022.01) | |
| *G06F 16/64* | (2019.01) | |
| *H04N 21/41* | (2011.01) | |
| *H04N 21/422* | (2011.01) | |
| *H04N 21/478* | (2011.01) | |
| *H04N 21/482* | (2011.01) | |
| *H04N 21/81* | (2011.01) | |

(52) U.S. Cl.
CPC ........ *G06F 3/0481* (2013.01); *G06F 3/04842* (2013.01); *G06F 3/04847* (2013.01); *G06F 3/0488* (2013.01); *G06F 3/04883* (2013.01); *G06F 16/64* (2019.01); *H04N 21/41265* (2020.08); *H04N 21/42204* (2013.01); *H04N 21/478* (2013.01); *H04N 21/4825* (2013.01); *H04N 21/8113* (2013.01); *G06F 2203/04105* (2013.01)

(56) References Cited

U.S. PATENT DOCUMENTS

| | | |
|---|---|---|
| 4,395,134 A | 7/1983 | Luce |
| 4,445,785 A | 5/1984 | Chambon et al. |
| 4,623,261 A | 11/1986 | Muto |
| 5,088,070 A | 2/1992 | Shiff et al. |
| 5,202,961 A | 4/1993 | Mills et al. |
| 5,204,600 A | 4/1993 | Kahkoska |
| 5,220,260 A | 6/1993 | Schuler |
| 5,305,435 A | 4/1994 | Bronson |
| 5,313,229 A | 5/1994 | Gilligan et al. |
| 5,323,363 A | 6/1994 | Hysek et al. |
| 5,329,501 A | 7/1994 | Meister et al. |
| 5,347,628 A | 9/1994 | Welch et al. |
| 5,404,316 A | 4/1995 | Klingler et al. |
| 5,463,725 A | 10/1995 | Henckel et al. |
| 5,477,508 A | 12/1995 | Will |
| 5,495,566 A | 2/1996 | Kwatinetz |
| 5,508,978 A | 4/1996 | Kalbermatter et al. |
| 5,513,342 A | 4/1996 | Leong et al. |
| 5,519,393 A | 5/1996 | Brandestini |
| 5,519,828 A | 5/1996 | Rayner |
| 5,521,841 A | 5/1996 | Arman et al. |
| 5,528,260 A | 6/1996 | Kent |
| 5,530,455 A | 6/1996 | Gillick et al. |
| 5,557,724 A | 9/1996 | Sampat et al. |
| 5,563,631 A | 10/1996 | Masunaga |
| 5,568,603 A | 10/1996 | Chen et al. |
| 5,592,195 A | 1/1997 | Misono et al. |
| 5,611,060 A | 3/1997 | Belfiore et al. |
| 5,614,940 A | 3/1997 | Cobbley et al. |
| 5,623,588 A | 4/1997 | Gould |
| 5,682,326 A | 10/1997 | Klingler et al. |
| 5,684,970 A | 11/1997 | Asuma et al. |
| 5,689,628 A | 11/1997 | Robertson |
| 5,691,747 A | 11/1997 | Amano |
| 5,692,213 A | 11/1997 | Harrison et al. |
| 5,726,687 A | 3/1998 | Belfiore et al. |
| 5,732,184 A | 3/1998 | Chao et al. |
| 5,739,775 A | 4/1998 | Brandestini |
| 5,745,096 A | 4/1998 | Ludolph et al. |
| 5,751,260 A | 5/1998 | Nappi et al. |
| 5,754,174 A | 5/1998 | Carpenter et al. |
| 5,758,180 A | 5/1998 | Duffy et al. |
| 5,760,767 A | 6/1998 | Shore et al. |
| 5,760,772 A | 6/1998 | Austin |
| 5,778,053 A | 7/1998 | Skarbo et al. |
| 5,793,366 A | 8/1998 | Mano et al. |
| 5,825,353 A | 10/1998 | Will |
| 5,841,971 A | 11/1998 | Longginou et al. |
| 5,852,413 A | 12/1998 | Bacchi et al. |
| 5,864,868 A | 1/1999 | Contois |
| 5,872,566 A | 2/1999 | Bates et al. |
| 5,872,922 A | 2/1999 | Hogan et al. |
| 5,874,958 A | 2/1999 | Ludolph |
| 5,874,961 A | 2/1999 | Bates et al. |
| 5,880,725 A | 3/1999 | Southgate |
| 5,880,733 A | 3/1999 | Horvitz et al. |
| 5,892,507 A | 4/1999 | Moorby |
| 5,903,229 A | 5/1999 | Kishi |
| 5,936,623 A | 8/1999 | Amro |
| 5,940,521 A | 8/1999 | East et al. |
| 5,960,366 A | 9/1999 | Duwaer |
| 5,973,670 A | 10/1999 | Barber et al. |
| 5,982,710 A | 11/1999 | Rawat et al. |
| 5,999,173 A | 12/1999 | Ubillos |
| 6,005,579 A | 12/1999 | Sugiyama et al. |
| 6,011,537 A | 1/2000 | Slotznick |
| 6,023,275 A | 2/2000 | Horvitz et al. |
| 6,026,389 A | 2/2000 | Nakajima et al. |
| 6,031,529 A | 2/2000 | Migos et al. |
| 6,061,062 A | 5/2000 | Venolia |
| 6,072,503 A | 6/2000 | Tani et al. |
| 6,081,256 A | 6/2000 | Martin et al. |
| 6,115,037 A | 9/2000 | Sumiyoshi et al. |
| 6,118,450 A | 9/2000 | Proehl et al. |
| 6,128,006 A | 10/2000 | Rosenberg et al. |
| 6,157,381 A | 12/2000 | Bates et al. |
| 6,161,957 A | 12/2000 | Guanter |
| 6,166,736 A | 12/2000 | Hugh |
| 6,192,258 B1 | 2/2001 | Kamada et al. |
| 6,203,190 B1 | 3/2001 | Stotz |
| 6,204,840 B1 | 3/2001 | Petelycky et al. |
| 6,208,342 B1 | 3/2001 | Mugura et al. |
| 6,236,400 B1 | 5/2001 | Guerrero |
| 6,249,689 B1 | 6/2001 | Aizawa |
| 6,262,724 B1 | 7/2001 | Crow et al. |
| 6,266,098 B1 | 7/2001 | Cove et al. |
| 6,275,173 B1 | 8/2001 | Wu |
| 6,297,795 B1 | 10/2001 | Kato et al. |
| 6,300,939 B1 | 10/2001 | Decker et al. |
| 6,305,234 B1 | 10/2001 | Thies et al. |
| 6,308,187 B1 | 10/2001 | Destefano |
| 6,310,613 B1 | 10/2001 | Tanaka et al. |
| 6,310,648 B1 | 10/2001 | Miller et al. |
| 6,317,784 B1 | 11/2001 | Mackintosh et al. |
| 6,332,147 B1 | 12/2001 | Moran et al. |
| 6,336,126 B1 | 1/2002 | Bjorklund et al. |
| 6,339,438 B1 | 1/2002 | Bates et al. |
| 6,351,657 B2 | 2/2002 | Yamada |
| 6,351,765 B1 | 2/2002 | Pietropaolo et al. |
| 6,362,837 B1 | 3/2002 | Ginn |
| 6,363,395 B1 | 3/2002 | Tanaka et al. |
| 6,366,296 B1 | 4/2002 | Boreczky et al. |
| 6,369,794 B1 | 4/2002 | Sakurai et al. |
| 6,369,835 B1 | 4/2002 | Lin |
| 6,380,927 B1 | 4/2002 | Ostrum et al. |
| 6,393,430 B1 | 5/2002 | Van Ryzin |
| 6,396,482 B1 | 5/2002 | Griffin et al. |
| 6,446,080 B1 | 9/2002 | Van Ryzin et al. |
| 6,452,609 B1 | 9/2002 | Katinsky et al. |
| 6,456,305 B1 | 9/2002 | Qureshi et al. |
| 6,477,117 B1 | 11/2002 | Narayanaswami et al. |
| 6,489,950 B1 | 12/2002 | Griffin et al. |
| 6,489,951 B1 | 12/2002 | Wong et al. |
| 6,504,934 B1 | 1/2003 | Kasai et al. |
| 6,515,681 B1 | 2/2003 | Knight |
| 6,522,347 B1 | 2/2003 | Sakai et al. |

(56) References Cited

U.S. PATENT DOCUMENTS

| | | |
|---|---|---|
| 6,525,997 B1 | 2/2003 | Narayanaswami et al. |
| 6,535,461 B1 | 3/2003 | Karhu et al. |
| 6,538,665 B2 | 3/2003 | Crow et al. |
| 6,544,295 B1 | 4/2003 | Bodnar et al. |
| 6,556,222 B1 | 4/2003 | Narayanaswami |
| 6,570,583 B1 | 5/2003 | Kung et al. |
| 6,577,330 B1 | 6/2003 | Tsuda et al. |
| 6,584,479 B2 | 6/2003 | Chang et al. |
| 6,587,127 B1 | 7/2003 | Stojakovic et al. |
| 6,597,374 B1 | 7/2003 | Baker et al. |
| 6,600,936 B1 | 7/2003 | Kärkkäinen et al. |
| 6,636,197 B1 | 10/2003 | Goldenberg et al. |
| 6,636,246 B1 | 10/2003 | Gallo et al. |
| 6,647,338 B1 | 11/2003 | Remlinger et al. |
| 6,661,438 B1 | 12/2003 | Shiraishi et al. |
| 6,677,965 B1 | 1/2004 | Ullmann et al. |
| 6,686,904 B1 | 2/2004 | Sherman et al. |
| 6,686,911 B1 | 2/2004 | Levin et al. |
| 6,700,564 B2 | 3/2004 | Mcloone et al. |
| 6,720,860 B1 | 4/2004 | Narayanaswami |
| 6,725,427 B2 | 4/2004 | Freeman et al. |
| 6,763,226 B1 | 7/2004 | Mczeal, Jr. |
| 6,788,220 B2 | 9/2004 | Netzer et al. |
| 6,809,275 B1 | 10/2004 | Cheng et al. |
| 6,809,724 B1 | 10/2004 | Shiraishi et al. |
| 6,833,848 B1 | 12/2004 | Wolff et al. |
| 6,834,371 B1 | 12/2004 | Jensen et al. |
| 6,842,169 B2 | 1/2005 | Griffin et al. |
| 6,850,256 B2 | 2/2005 | Crow et al. |
| 6,900,793 B2 | 5/2005 | Goh et al. |
| 6,937,228 B2 | 8/2005 | Yu |
| 6,967,642 B2 | 11/2005 | Sangiovanni et al. |
| 6,967,903 B2 | 11/2005 | Guanter et al. |
| 6,972,776 B2 | 12/2005 | Davis et al. |
| 6,975,306 B2 | 12/2005 | Hinckley et al. |
| 6,977,868 B2 | 12/2005 | Brewer et al. |
| 7,002,558 B2 | 2/2006 | Keely et al. |
| 7,024,625 B2 | 4/2006 | Shalit |
| 7,036,090 B1 | 4/2006 | Nguyen |
| 7,046,230 B2 | 5/2006 | Zadesky et al. |
| 7,058,904 B1 | 6/2006 | Khan et al. |
| 7,075,513 B2 | 7/2006 | Silfverberg et al. |
| 7,081,905 B1 | 7/2006 | Raghunath |
| 7,091,964 B2 | 8/2006 | Wong et al. |
| 7,111,240 B2 | 9/2006 | Crow et al. |
| 7,116,317 B2 | 10/2006 | Gregorio et al. |
| 7,143,355 B2 | 11/2006 | Yamaguchi et al. |
| 7,146,005 B1 | 12/2006 | Anft et al. |
| 7,168,047 B1 | 1/2007 | Huppi et al. |
| 7,191,411 B2 | 3/2007 | Moehrle |
| 7,227,963 B1 | 6/2007 | Yamada et al. |
| 7,240,297 B1 | 7/2007 | Anderson et al. |
| 7,256,770 B2 | 8/2007 | Hinckley et al. |
| 7,272,077 B2 | 9/2007 | Nobs et al. |
| 7,286,063 B2 | 10/2007 | Gauthey et al. |
| 7,286,119 B2 | 10/2007 | Miyashita et al. |
| 7,315,984 B2 | 1/2008 | Crow et al. |
| 7,317,449 B2 | 1/2008 | Robbins et al. |
| 7,318,196 B2 | 1/2008 | Crow et al. |
| 7,333,084 B2 | 2/2008 | Griffin et al. |
| 7,362,312 B2 | 4/2008 | Nurmi |
| 7,423,658 B1 | 9/2008 | Uomori et al. |
| 7,441,207 B2 | 10/2008 | Filner |
| 7,458,025 B2 | 11/2008 | Crow et al. |
| 7,463,239 B2 | 12/2008 | Ledbetter et al. |
| 7,469,381 B2 | 12/2008 | Ording |
| 7,469,386 B2 | 12/2008 | Bear et al. |
| 7,477,890 B1 | 1/2009 | Narayanaswami et al. |
| 7,479,949 B2 | 1/2009 | Jobs et al. |
| 7,489,303 B1 | 2/2009 | Pryor |
| 7,492,350 B2 | 2/2009 | Fabre et al. |
| 7,499,040 B2 | 3/2009 | Zadesky et al. |
| 7,506,269 B2 | 3/2009 | Lang et al. |
| 7,519,468 B2 | 4/2009 | Orr et al. |
| 7,545,367 B2 | 6/2009 | Sunda et al. |
| 7,552,397 B2 | 6/2009 | Holecek et al. |
| 7,571,014 B1 | 8/2009 | Lambourne et al. |
| 7,581,186 B2 | 8/2009 | Dowdy et al. |
| 7,596,761 B2 | 9/2009 | Lemay et al. |
| 7,600,192 B1 | 10/2009 | Hashimoto et al. |
| 7,656,393 B2 | 2/2010 | King et al. |
| 7,710,393 B2 | 5/2010 | Tsuk et al. |
| 7,710,409 B2 | 5/2010 | Robbin et al. |
| 7,720,552 B1 | 5/2010 | Lloyd |
| 7,738,911 B2 | 6/2010 | Kim |
| 7,750,893 B2 | 7/2010 | Hashimoto et al. |
| 7,794,138 B2 | 9/2010 | Hilfiker |
| 7,844,915 B2 | 11/2010 | Platzer et al. |
| 7,856,255 B2 | 12/2010 | Tsuchiya et al. |
| 7,876,288 B1 | 1/2011 | Huang |
| 7,903,115 B2 | 3/2011 | Platzer et al. |
| 7,916,157 B1 | 3/2011 | Kelley et al. |
| 7,956,847 B2 | 6/2011 | Christie |
| 7,965,276 B1 | 6/2011 | Martin et al. |
| 7,996,792 B2 | 8/2011 | Anzures et al. |
| 8,001,488 B1 | 8/2011 | Lam et al. |
| 8,009,144 B2 | 8/2011 | Yajima et al. |
| 8,028,323 B2 | 9/2011 | Weel |
| 8,040,331 B2 | 10/2011 | Hill et al. |
| 8,046,705 B2 | 10/2011 | Hunleth et al. |
| 8,130,205 B2 | 3/2012 | Forstall et al. |
| 8,140,996 B2 | 3/2012 | Tomkins et al. |
| 8,146,019 B2 | 3/2012 | Kim et al. |
| 8,191,011 B2 | 5/2012 | Abanami et al. |
| 8,194,036 B1 | 6/2012 | Geiss et al. |
| 8,196,043 B2 | 6/2012 | Crow et al. |
| 8,201,102 B2 | 6/2012 | Lee et al. |
| 8,217,906 B2 | 7/2012 | Sinclair |
| 8,264,465 B2 | 9/2012 | Grant et al. |
| 8,266,550 B1 | 9/2012 | Cleron et al. |
| 8,280,539 B2 | 10/2012 | Jehan et al. |
| 8,290,603 B1 | 10/2012 | Lambourne |
| 8,305,356 B1 | 11/2012 | Jang |
| 8,307,306 B2 | 11/2012 | Komatsu et al. |
| 8,311,727 B2 | 11/2012 | Eckstein et al. |
| 8,375,326 B2 | 2/2013 | Bucher et al. |
| 8,427,432 B2 | 4/2013 | Kim et al. |
| 8,448,083 B1 | 5/2013 | Migos et al. |
| 8,458,780 B1 | 6/2013 | Takkalapally et al. |
| 8,487,882 B2 | 7/2013 | Inaba et al. |
| 8,531,427 B2 | 9/2013 | Jang |
| 8,533,623 B2 | 9/2013 | St. Jacques |
| 8,549,429 B2 | 10/2013 | Tsuruta et al. |
| 8,564,543 B2 | 10/2013 | Chaudhri |
| 8,566,722 B2 | 10/2013 | Gordon et al. |
| 8,572,513 B2 | 10/2013 | Chaudhri et al. |
| 8,587,528 B2 | 11/2013 | Chaudhri |
| 8,589,823 B2 | 11/2013 | Lemay et al. |
| 8,607,156 B1 | 12/2013 | Jania et al. |
| 8,627,236 B2 | 1/2014 | Jung et al. |
| 8,656,311 B1 | 2/2014 | Harper et al. |
| 8,665,209 B2 | 3/2014 | Rimas-Ribikauskas et al. |
| 8,669,944 B2 | 3/2014 | Klinghult et al. |
| 8,669,945 B2 | 3/2014 | Coddington |
| 8,677,283 B2 | 3/2014 | Fong |
| 8,686,944 B1 | 4/2014 | Dayer et al. |
| 8,689,128 B2 | 4/2014 | Chaudhri et al. |
| 8,698,762 B2 | 4/2014 | Wagner et al. |
| 8,717,302 B1 | 5/2014 | Qin et al. |
| 8,736,557 B2 | 5/2014 | Chaudhri et al. |
| 8,739,040 B2 | 5/2014 | Graham |
| 8,743,151 B1 | 6/2014 | Fulcher et al. |
| 8,799,816 B2 | 8/2014 | Wells et al. |
| 8,824,245 B2 | 9/2014 | Lau et al. |
| 8,830,181 B1 | 9/2014 | Clark et al. |
| 8,854,318 B2 | 10/2014 | Borovsky et al. |
| 8,860,674 B2 | 10/2014 | Lee et al. |
| 8,868,338 B1 | 10/2014 | Chau et al. |
| 8,875,046 B2 | 10/2014 | Jitkoff |
| 8,943,410 B2 | 1/2015 | Ubillos |
| 8,952,886 B2 | 2/2015 | Tsuk et al. |
| 8,954,887 B1 | 2/2015 | Mendis et al. |
| 8,984,431 B2 | 3/2015 | Newman et al. |
| 9,001,625 B2 | 4/2015 | Essery et al. |

(56) References Cited

U.S. PATENT DOCUMENTS

| | | |
|---|---|---|
| 9,007,057 B2 | 4/2015 | Villaret |
| 9,007,302 B1 | 4/2015 | Bandt-Horn |
| 9,007,323 B2 | 4/2015 | Araki |
| 9,011,292 B2 | 4/2015 | Weast et al. |
| 9,042,556 B2 | 5/2015 | Kallai et al. |
| 9,084,003 B1 | 7/2015 | Sanio et al. |
| 9,104,705 B2 | 8/2015 | Fujinaga |
| 9,112,849 B1 | 8/2015 | Werkelin et al. |
| 9,134,902 B2 | 9/2015 | Kang et al. |
| 9,158,440 B1 | 10/2015 | Lider et al. |
| 9,176,652 B1 | 11/2015 | Patel et al. |
| 9,182,876 B2 | 11/2015 | Kim et al. |
| 9,189,089 B2 | 11/2015 | Sutton et al. |
| 9,195,219 B2 | 11/2015 | Hong et al. |
| 9,202,509 B2 | 12/2015 | Kallai et al. |
| 9,223,483 B2 | 12/2015 | Thorsander et al. |
| 9,229,624 B2 | 1/2016 | Wei et al. |
| 9,244,584 B2 | 1/2016 | Fino |
| 9,247,363 B2 | 1/2016 | Triplett et al. |
| 9,251,787 B1 | 2/2016 | Hart et al. |
| 9,268,400 B2 | 2/2016 | Gomez Sainz-Garcia |
| 9,294,853 B1 | 3/2016 | Dhaundiyal |
| 9,319,782 B1 | 4/2016 | Crump et al. |
| 9,374,607 B2 | 6/2016 | Bates et al. |
| 9,395,867 B2 | 7/2016 | Yach et al. |
| 9,395,905 B2 | 7/2016 | Wherry |
| D765,118 S | 8/2016 | Bachman et al. |
| 9,423,938 B1 | 8/2016 | Morris |
| 9,431,021 B1 | 8/2016 | Scalise et al. |
| 9,442,649 B2 | 9/2016 | Davis et al. |
| 9,448,691 B2 | 9/2016 | Suda |
| 9,450,812 B2 | 9/2016 | Lee et al. |
| 9,489,106 B2 | 11/2016 | Chaudhri et al. |
| 9,503,402 B2 | 11/2016 | Cue et al. |
| D773,510 S | 12/2016 | Foss et al. |
| 9,519,413 B2 | 12/2016 | Bates |
| D778,912 S | 2/2017 | Akana et al. |
| 9,582,187 B2 | 2/2017 | Gil et al. |
| 9,620,312 B2 | 4/2017 | Ely et al. |
| 9,628,414 B1 | 4/2017 | Umapathy et al. |
| 9,651,922 B2 | 5/2017 | Hysek et al. |
| 9,666,178 B2 | 5/2017 | Loubiere et al. |
| D789,381 S | 6/2017 | Okumura et al. |
| 9,678,571 B1 | 6/2017 | Robert et al. |
| 9,684,398 B1 | 6/2017 | Samuel et al. |
| 9,696,809 B2 | 7/2017 | Temple |
| 9,710,639 B1 | 7/2017 | Saini |
| 9,727,749 B2 | 8/2017 | Tzeng et al. |
| 9,729,695 B2 | 8/2017 | Seo et al. |
| 9,772,769 B2 | 9/2017 | Shimazu |
| 9,792,014 B2 | 10/2017 | Feiereisen et al. |
| 9,794,720 B1 | 10/2017 | Kadri |
| 9,798,443 B1 | 10/2017 | Gray |
| 9,820,323 B1 | 11/2017 | Young et al. |
| 9,823,828 B2 | 11/2017 | Zambetti et al. |
| 9,841,874 B2 | 12/2017 | Gu |
| 9,860,200 B1 | 1/2018 | Braun et al. |
| 9,870,114 B1 | 1/2018 | Jones et al. |
| 9,898,250 B1 | 2/2018 | Williams et al. |
| D813,239 S | 3/2018 | Akana et al. |
| 9,921,711 B2 | 3/2018 | Oh et al. |
| 9,954,989 B2 | 4/2018 | Zhou |
| 9,965,144 B2 | 5/2018 | Nakamura et al. |
| 9,971,495 B2 | 5/2018 | Shetty et al. |
| 9,984,539 B2 | 5/2018 | Moussette et al. |
| 10,019,097 B2 | 7/2018 | Ely et al. |
| 10,025,458 B2 | 7/2018 | Chaudhri et al. |
| 10,025,461 B2 | 7/2018 | Liu et al. |
| 10,048,802 B2 | 8/2018 | Shedletsky et al. |
| 10,057,470 B2 | 8/2018 | Kim et al. |
| 10,097,496 B2 | 10/2018 | Dye et al. |
| 10,104,089 B2 | 10/2018 | Kim et al. |
| 10,129,044 B2 | 11/2018 | Kangshang et al. |
| 10,133,439 B1 | 11/2018 | Brichter et al. |
| 10,152,196 B2 | 12/2018 | Jeong et al. |
| 10,175,652 B2 | 1/2019 | Ely et al. |
| 10,198,563 B2 | 2/2019 | Wang et al. |
| 10,200,468 B2 | 2/2019 | Leban et al. |
| 10,216,147 B2 | 2/2019 | Ely et al. |
| 10,216,352 B2 | 2/2019 | Liang et al. |
| 10,222,909 B2 | 3/2019 | Shedletsky et al. |
| 10,275,117 B2 | 4/2019 | Zambetti et al. |
| D849,749 S | 5/2019 | Akana et al. |
| 10,284,980 B1 | 5/2019 | Woo et al. |
| 10,289,218 B1 | 5/2019 | Young |
| 10,296,125 B2 | 5/2019 | Ely et al. |
| 10,324,620 B2 | 6/2019 | Balaram |
| 10,331,081 B2 | 6/2019 | Ely et al. |
| 10,331,082 B2 | 6/2019 | Ely et al. |
| 10,339,721 B1 | 7/2019 | Dascola et al. |
| 10,374,804 B2 | 8/2019 | Lee et al. |
| 10,389,675 B2 | 8/2019 | Grandhi |
| 10,417,879 B2 | 9/2019 | Moussette et al. |
| 10,504,340 B2 | 12/2019 | Moussette et al. |
| 10,642,467 B2 | 5/2020 | Merminod et al. |
| 10,664,074 B2 | 5/2020 | Moussette et al. |
| 10,664,120 B1 | 5/2020 | Jones et al. |
| 10,705,701 B2 | 7/2020 | Pisula et al. |
| 10,713,699 B1 | 7/2020 | Lien et al. |
| 10,732,819 B2 | 8/2020 | Wang et al. |
| 10,742,645 B2 | 8/2020 | Hevizi et al. |
| 10,742,648 B2 | 8/2020 | Magyar et al. |
| 10,824,299 B2 | 11/2020 | Bai |
| 10,833,887 B2 | 11/2020 | Wu |
| 10,852,700 B2 | 12/2020 | Abramov |
| 10,977,911 B2 | 4/2021 | Moussette et al. |
| 11,068,128 B2 | 7/2021 | Zambetti et al. |
| 11,140,255 B2 | 10/2021 | Seo et al. |
| 11,343,370 B1 | 5/2022 | Gordon et al. |
| 11,431,834 B1 | 8/2022 | Gordon et al. |
| 11,463,576 B1 | 10/2022 | Gordon et al. |
| 2001/0004337 A1 | 6/2001 | Paratte et al. |
| 2001/0011991 A1 | 8/2001 | Wang et al. |
| 2001/0041596 A1 | 11/2001 | Forlenzo et al. |
| 2001/0043514 A1 | 11/2001 | Kita et al. |
| 2001/0050687 A1 | 12/2001 | Iida et al. |
| 2002/0002039 A1 | 1/2002 | Qureshey et al. |
| 2002/0019296 A1 | 2/2002 | Freeman et al. |
| 2002/0027547 A1 | 3/2002 | Kamijo et al. |
| 2002/0030665 A1 | 3/2002 | Ano |
| 2002/0030668 A1 | 3/2002 | Hoshino et al. |
| 2002/0036623 A1 | 3/2002 | Kano et al. |
| 2002/0047860 A1 | 4/2002 | Ceulaer et al. |
| 2002/0054158 A1 | 5/2002 | Asami |
| 2002/0054164 A1 | 5/2002 | Uemura |
| 2002/0063684 A1 | 5/2002 | Tran |
| 2002/0069071 A1 | 6/2002 | Knockeart et al. |
| 2002/0080151 A1 | 6/2002 | Venolia |
| 2002/0101457 A1 | 8/2002 | Lang |
| 2002/0101458 A1 | 8/2002 | Sangiovanni |
| 2002/0118169 A1 | 8/2002 | Hinckley et al. |
| 2002/0122066 A1 | 9/2002 | Bates et al. |
| 2002/0126099 A1 | 9/2002 | Engholm |
| 2002/0137565 A1 | 9/2002 | Blanco |
| 2002/0140633 A1 | 10/2002 | Rafii et al. |
| 2002/0154150 A1 | 10/2002 | Ogaki et al. |
| 2002/0154173 A1 | 10/2002 | Etgen et al. |
| 2002/0154175 A1 | 10/2002 | Abello et al. |
| 2002/0168938 A1* | 11/2002 | Chang ................ H04L 67/306 455/420 |
| 2002/0171689 A1 | 11/2002 | Fox et al. |
| 2002/0186621 A1 | 12/2002 | Lai et al. |
| 2002/0191028 A1 | 12/2002 | Senechalle et al. |
| 2002/0198909 A1 | 12/2002 | Huynh et al. |
| 2003/0020671 A1 | 1/2003 | Santoro et al. |
| 2003/0025673 A1 | 2/2003 | Ledbetter et al. |
| 2003/0030673 A1 | 2/2003 | Ho |
| 2003/0052901 A1 | 3/2003 | Fukuchi |
| 2003/0067908 A1 | 4/2003 | Mattaway et al. |
| 2003/0076301 A1 | 4/2003 | Tsuk et al. |
| 2003/0098891 A1 | 5/2003 | Molander et al. |
| 2003/0103044 A1 | 6/2003 | Sunda et al. |
| 2003/0112279 A1 | 6/2003 | Irimajiri |
| 2003/0115384 A1 | 6/2003 | Sonehara et al. |

(56) References Cited

U.S. PATENT DOCUMENTS

| | | |
|---|---|---|
| 2003/0117440 A1 | 6/2003 | Hellyar et al. |
| 2003/0122787 A1 | 7/2003 | Zimmerman et al. |
| 2003/0123329 A1 | 7/2003 | Guanter et al. |
| 2003/0128192 A1 | 7/2003 | Van Os |
| 2003/0137540 A1 | 7/2003 | Klevenz et al. |
| 2003/0142081 A1 | 7/2003 | Tizuka et al. |
| 2003/0142288 A1 | 7/2003 | Kinrot et al. |
| 2003/0189598 A1 | 10/2003 | Lipstein et al. |
| 2003/0210259 A1 | 11/2003 | Liu et al. |
| 2003/0210286 A1 | 11/2003 | Gerpheide et al. |
| 2004/0013042 A1 | 1/2004 | Farine et al. |
| 2004/0027371 A1 | 2/2004 | Jaeger |
| 2004/0027793 A1 | 2/2004 | Haraguchi et al. |
| 2004/0032955 A1 | 2/2004 | Hashimoto et al. |
| 2004/0038667 A1 | 2/2004 | Vance |
| 2004/0047244 A1 | 3/2004 | Iino et al. |
| 2004/0055446 A1 | 3/2004 | Robbin et al. |
| 2004/0056837 A1 | 3/2004 | Koga et al. |
| 2004/0061678 A1 | 4/2004 | Goh et al. |
| 2004/0073935 A1 | 4/2004 | Kang |
| 2004/0085328 A1 | 5/2004 | Maruyama et al. |
| 2004/0100479 A1 | 5/2004 | Nakano et al. |
| 2004/0104896 A1 | 6/2004 | Suraqui |
| 2004/0113819 A1 | 6/2004 | Gauthey et al. |
| 2004/0122683 A1 | 6/2004 | Grossman et al. |
| 2004/0125088 A1 | 7/2004 | Zimmerman et al. |
| 2004/0130580 A1 | 7/2004 | Howard et al. |
| 2004/0130581 A1 | 7/2004 | Howard et al. |
| 2004/0139398 A1 | 7/2004 | Testa et al. |
| 2004/0140956 A1 | 7/2004 | Kushler et al. |
| 2004/0145595 A1 | 7/2004 | Bennett |
| 2004/0150621 A1 | 8/2004 | Bohn |
| 2004/0155907 A1 | 8/2004 | Yamaguchi et al. |
| 2004/0164973 A1 | 8/2004 | Nakano et al. |
| 2004/0168118 A1 | 8/2004 | Wong et al. |
| 2004/0170270 A1 | 9/2004 | Takashima et al. |
| 2004/0189714 A1 | 9/2004 | Fox et al. |
| 2004/0218472 A1 | 11/2004 | Narayanaswami et al. |
| 2004/0225613 A1 | 11/2004 | Narayanaswami et al. |
| 2004/0230599 A1 | 11/2004 | Moore et al. |
| 2004/0233162 A1 | 11/2004 | Kobayashi |
| 2004/0235520 A1 | 11/2004 | Cadiz et al. |
| 2004/0237048 A1 | 11/2004 | Tojo et al. |
| 2004/0239649 A1 | 12/2004 | Ludtke et al. |
| 2004/0239692 A1 | 12/2004 | Balle et al. |
| 2004/0250217 A1 | 12/2004 | Tojo et al. |
| 2004/0252119 A1 | 12/2004 | Hunleth et al. |
| 2004/0261010 A1 | 12/2004 | Matsuishi |
| 2004/0264301 A1 | 12/2004 | Howard et al. |
| 2004/0264916 A1 | 12/2004 | Van De Sluis et al. |
| 2004/0268400 A1 | 12/2004 | Barde et al. |
| 2005/0007884 A1 | 1/2005 | Lorenzato et al. |
| 2005/0012723 A1 | 1/2005 | Pallakoff |
| 2005/0021418 A1 | 1/2005 | Marcus et al. |
| 2005/0024341 A1 | 2/2005 | Gillespie et al. |
| 2005/0030279 A1 | 2/2005 | Fu |
| 2005/0081164 A1 | 4/2005 | Hama et al. |
| 2005/0097466 A1 | 5/2005 | Levi et al. |
| 2005/0116941 A1 | 6/2005 | Wallington et al. |
| 2005/0119031 A1 | 6/2005 | Spalink et al. |
| 2005/0136955 A1 | 6/2005 | Mumick et al. |
| 2005/0144568 A1 | 6/2005 | Gruen et al. |
| 2005/0146534 A1 | 7/2005 | Fong et al. |
| 2005/0160372 A1 | 7/2005 | Gruen et al. |
| 2005/0162402 A1 | 7/2005 | Watanachote |
| 2005/0164623 A1 | 7/2005 | Huynh |
| 2005/0168566 A1 | 8/2005 | Tada et al. |
| 2005/0177445 A1 | 8/2005 | Church |
| 2005/0181774 A1 | 8/2005 | Miyata |
| 2005/0183012 A1 | 8/2005 | Petro et al. |
| 2005/0191994 A1 | 9/2005 | May et al. |
| 2005/0192924 A1 | 9/2005 | Drucker et al. |
| 2005/0195216 A1 | 9/2005 | Kramer et al. |
| 2005/0209051 A1 | 9/2005 | Santomassimo et al. |
| 2005/0210412 A1 | 9/2005 | Matthews et al. |
| 2005/0215848 A1 | 9/2005 | Lorenzato et al. |
| 2005/0216839 A1 | 9/2005 | Salvucci |
| 2005/0229112 A1 | 10/2005 | Clay et al. |
| 2005/0231489 A1 | 10/2005 | Ladouceur et al. |
| 2005/0240756 A1 | 10/2005 | Mayer |
| 2005/0259077 A1 | 11/2005 | Adams et al. |
| 2005/0275628 A1 | 12/2005 | Balakrishnan et al. |
| 2006/0001645 A1 | 1/2006 | Drucker et al. |
| 2006/0007129 A1 | 1/2006 | Pletikosa et al. |
| 2006/0020904 A1 | 1/2006 | Aaltonen et al. |
| 2006/0022956 A1 | 2/2006 | Lengeling et al. |
| 2006/0025091 A1 | 2/2006 | Buford |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0028444 A1 | 2/2006 | Hinckley et al. |
| 2006/0028446 A1 | 2/2006 | Liberty et al. |
| 2006/0038796 A1 | 2/2006 | Hinckley et al. |
| 2006/0050054 A1 | 3/2006 | Liang et al. |
| 2006/0054427 A1 | 3/2006 | Jasso et al. |
| 2006/0064716 A1 | 3/2006 | Sull et al. |
| 2006/0069604 A1 | 3/2006 | Leukart et al. |
| 2006/0071918 A1 | 4/2006 | Mori et al. |
| 2006/0082554 A1 | 4/2006 | Caine et al. |
| 2006/0085751 A1 | 4/2006 | O'brien et al. |
| 2006/0085766 A1 | 4/2006 | Dominowska et al. |
| 2006/0090090 A1 | 4/2006 | Perng et al. |
| 2006/0092177 A1 | 5/2006 | Blasko et al. |
| 2006/0095846 A1 | 5/2006 | Nurmi |
| 2006/0112350 A1 | 5/2006 | Kato et al. |
| 2006/0125799 A1 | 6/2006 | Hillis et al. |
| 2006/0132460 A1 | 6/2006 | Kolmykov-Zotov et al. |
| 2006/0132469 A1 | 6/2006 | Lai et al. |
| 2006/0143574 A1 | 6/2006 | Ito et al. |
| 2006/0146074 A1 | 7/2006 | Harrison |
| 2006/0148455 A1 | 7/2006 | Kim |
| 2006/0152480 A1 | 7/2006 | Senn |
| 2006/0161621 A1 | 7/2006 | Rosenberg |
| 2006/0161861 A1 | 7/2006 | Holecek et al. |
| 2006/0161870 A1 | 7/2006 | Hotelling et al. |
| 2006/0161871 A1 | 7/2006 | Hotelling et al. |
| 2006/0174213 A1 | 8/2006 | Kato |
| 2006/0176278 A1 | 8/2006 | Mathews et al. |
| 2006/0178110 A1 | 8/2006 | Nurminen et al. |
| 2006/0181506 A1 | 8/2006 | Fyke et al. |
| 2006/0197753 A1 | 9/2006 | Hotelling |
| 2006/0212905 A1 | 9/2006 | Matsuda et al. |
| 2006/0224945 A1 | 10/2006 | Khan et al. |
| 2006/0227106 A1 | 10/2006 | Hashimoto et al. |
| 2006/0246874 A1 | 11/2006 | Sullivan |
| 2006/0255683 A1 | 11/2006 | Suzuki et al. |
| 2006/0256090 A1 | 11/2006 | Huppi |
| 2006/0258289 A1 | 11/2006 | Dua |
| 2006/0268019 A1 | 11/2006 | Wang et al. |
| 2006/0268020 A1 | 11/2006 | Han |
| 2006/0271864 A1 | 11/2006 | Satterfield et al. |
| 2006/0271867 A1 | 11/2006 | Wang et al. |
| 2006/0279541 A1 | 12/2006 | Kim et al. |
| 2006/0281449 A1 | 12/2006 | Kun et al. |
| 2006/0286971 A1 | 12/2006 | Maly et al. |
| 2006/0290671 A1 | 12/2006 | Bohn et al. |
| 2007/0002019 A1 | 1/2007 | Lane et al. |
| 2007/0011614 A1 | 1/2007 | Crow et al. |
| 2007/0013671 A1 | 1/2007 | Zadesky et al. |
| 2007/0027682 A1 | 2/2007 | Bennett |
| 2007/0030256 A1 | 2/2007 | Akaike et al. |
| 2007/0031119 A1 | 2/2007 | Iwanaga |
| 2007/0033295 A1 | 2/2007 | Marriott |
| 2007/0036346 A1 | 2/2007 | Kwon |
| 2007/0046635 A1 | 3/2007 | Nishiyama et al. |
| 2007/0053268 A1 | 3/2007 | Crandall et al. |
| 2007/0063995 A1 | 3/2007 | Bailey et al. |
| 2007/0070045 A1 | 3/2007 | Sung et al. |
| 2007/0070066 A1 | 3/2007 | Bakhash |
| 2007/0070090 A1 | 3/2007 | Debettencourt et al. |
| 2007/0073917 A1 | 3/2007 | Larson et al. |
| 2007/0085841 A1* | 4/2007 | Tsuk .......... G06F 3/04883 345/173 |
| 2007/0097090 A1 | 5/2007 | Battles |

(56) References Cited

U.S. PATENT DOCUMENTS

| | | |
|---|---|---|
| 2007/0097093 A1 | 5/2007 | Ohshita et al. |
| 2007/0097151 A1 | 5/2007 | Rosenberg |
| 2007/0098395 A1 | 5/2007 | Battles et al. |
| 2007/0106949 A1 | 5/2007 | Narita et al. |
| 2007/0113294 A1 | 5/2007 | Field et al. |
| 2007/0120819 A1 | 5/2007 | Young et al. |
| 2007/0124680 A1 | 5/2007 | Robbin et al. |
| 2007/0126715 A1 | 6/2007 | Funamoto |
| 2007/0132733 A1 | 6/2007 | Ram |
| 2007/0132789 A1 | 6/2007 | Ording et al. |
| 2007/0136679 A1 | 6/2007 | Yang |
| 2007/0146337 A1 | 6/2007 | Ording et al. |
| 2007/0150830 A1 | 6/2007 | Ording et al. |
| 2007/0152979 A1 | 7/2007 | Jobs et al. |
| 2007/0157094 A1 | 7/2007 | Lemay et al. |
| 2007/0168369 A1 | 7/2007 | Bruns |
| 2007/0168413 A1 | 7/2007 | Barletta et al. |
| 2007/0176910 A1 | 8/2007 | Simek et al. |
| 2007/0180379 A1 | 8/2007 | Osato et al. |
| 2007/0182595 A1 | 8/2007 | Ghasabian |
| 2007/0182999 A1 | 8/2007 | Anthony et al. |
| 2007/0188460 A1 | 8/2007 | Bells et al. |
| 2007/0192744 A1 | 8/2007 | Reponen |
| 2007/0198111 A1 | 8/2007 | Oetzel et al. |
| 2007/0209017 A1 | 9/2007 | Gupta et al. |
| 2007/0211042 A1 | 9/2007 | Kim et al. |
| 2007/0216661 A1 | 9/2007 | Chen et al. |
| 2007/0226645 A1 | 9/2007 | Kongqiao et al. |
| 2007/0226646 A1 | 9/2007 | Nagiyama et al. |
| 2007/0229458 A1 | 10/2007 | Moon |
| 2007/0236475 A1 | 10/2007 | Wherry |
| 2007/0236479 A1 | 10/2007 | Wang et al. |
| 2007/0237493 A1 | 10/2007 | Hall et al. |
| 2007/0239837 A1 | 10/2007 | Jablokov et al. |
| 2007/0242569 A1 | 10/2007 | Inoue et al. |
| 2007/0247435 A1 | 10/2007 | Benko et al. |
| 2007/0279401 A1 | 12/2007 | Ramstein et al. |
| 2007/0290045 A1 | 12/2007 | Cisar |
| 2007/0291018 A1 | 12/2007 | Park et al. |
| 2007/0296711 A1 | 12/2007 | Yee et al. |
| 2008/0001915 A1 | 1/2008 | Pihlaja et al. |
| 2008/0004084 A1 | 1/2008 | Park et al. |
| 2008/0016468 A1 | 1/2008 | Chambers et al. |
| 2008/0019494 A1 | 1/2008 | Toda |
| 2008/0020810 A1 | 1/2008 | Park |
| 2008/0033779 A1 | 2/2008 | Coffman et al. |
| 2008/0034289 A1 | 2/2008 | Doepke et al. |
| 2008/0036743 A1 | 2/2008 | Westerman et al. |
| 2008/0037951 A1 | 2/2008 | Cho et al. |
| 2008/0040692 A1 | 2/2008 | Sunday et al. |
| 2008/0043028 A1 | 2/2008 | Tanaka |
| 2008/0052643 A1 | 2/2008 | Ike et al. |
| 2008/0052945 A1 | 3/2008 | Matas et al. |
| 2008/0055241 A1 | 3/2008 | Goldenberg et al. |
| 2008/0055264 A1 | 3/2008 | Anzures et al. |
| 2008/0062127 A1 | 3/2008 | Brodersen et al. |
| 2008/0062141 A1 | 3/2008 | Chaudhri |
| 2008/0066016 A1 | 3/2008 | Dowdy et al. |
| 2008/0066135 A1 | 3/2008 | Brodersen et al. |
| 2008/0075368 A1 | 3/2008 | Kuzmin |
| 2008/0081558 A1 | 4/2008 | Dunko et al. |
| 2008/0082939 A1 | 4/2008 | Nash et al. |
| 2008/0084400 A1 | 4/2008 | Rosenberg |
| 2008/0091717 A1 | 4/2008 | Garbow et al. |
| 2008/0094367 A1 | 4/2008 | Van De Ven et al. |
| 2008/0096593 A1 | 4/2008 | Park |
| 2008/0098313 A1 | 4/2008 | Pollack |
| 2008/0109764 A1 | 5/2008 | Linnamaki |
| 2008/0122794 A1 | 5/2008 | Koiso et al. |
| 2008/0122796 A1 | 5/2008 | Jobs et al. |
| 2008/0123473 A1 | 5/2008 | Ozawa et al. |
| 2008/0125196 A1 | 5/2008 | Ryu |
| 2008/0126935 A1 | 5/2008 | Blomgren |
| 2008/0129520 A1 | 6/2008 | Lee |
| 2008/0148177 A1 | 6/2008 | Lang et al. |
| 2008/0150901 A1 | 6/2008 | Lowles et al. |
| 2008/0155413 A1 | 6/2008 | Ubillos et al. |
| 2008/0155417 A1 | 6/2008 | Vallone et al. |
| 2008/0155461 A1 | 6/2008 | Ozaki et al. |
| 2008/0155474 A1 | 6/2008 | Duhig et al. |
| 2008/0155475 A1 | 6/2008 | Duhig et al. |
| 2008/0158149 A1 | 7/2008 | Levin |
| 2008/0158170 A1 | 7/2008 | Herz et al. |
| 2008/0163116 A1 | 7/2008 | Lee et al. |
| 2008/0163119 A1 | 7/2008 | Kim et al. |
| 2008/0163121 A1 | 7/2008 | Lee et al. |
| 2008/0163127 A1 | 7/2008 | Newell et al. |
| 2008/0165124 A1 | 7/2008 | Kim |
| 2008/0165140 A1 | 7/2008 | Christie et al. |
| 2008/0165141 A1 | 7/2008 | Christie |
| 2008/0165152 A1 | 7/2008 | Forstall et al. |
| 2008/0165153 A1 | 7/2008 | Platzer et al. |
| 2008/0165161 A1 | 7/2008 | Platzer et al. |
| 2008/0165210 A1 | 7/2008 | Platzer et al. |
| 2008/0168185 A1 | 7/2008 | Robbin et al. |
| 2008/0168349 A1 | 7/2008 | Lamiraux et al. |
| 2008/0168364 A1 | 7/2008 | Miller et al. |
| 2008/0168382 A1 | 7/2008 | Louch et al. |
| 2008/0168384 A1 | 7/2008 | Platzer et al. |
| 2008/0168395 A1 | 7/2008 | Ording et al. |
| 2008/0168403 A1 | 7/2008 | Westerman et al. |
| 2008/0168404 A1 | 7/2008 | Ording |
| 2008/0168478 A1 | 7/2008 | Platzer et al. |
| 2008/0172634 A1 | 7/2008 | Choi et al. |
| 2008/0174570 A1 | 7/2008 | Jobs et al. |
| 2008/0184159 A1 | 7/2008 | Selig |
| 2008/0186808 A1 | 8/2008 | Lee |
| 2008/0190266 A1 | 8/2008 | Kim et al. |
| 2008/0201649 A1 | 8/2008 | Mattila et al. |
| 2008/0204478 A1 | 8/2008 | Hung |
| 2008/0207281 A1 | 8/2008 | Tsuchiya et al. |
| 2008/0216001 A1 | 9/2008 | Ording et al. |
| 2008/0222546 A1 | 9/2008 | Mudd et al. |
| 2008/0224995 A1 | 9/2008 | Perkunder |
| 2008/0225007 A1 | 9/2008 | Nakadaira et al. |
| 2008/0225013 A1 | 9/2008 | Muylkens et al. |
| 2008/0225014 A1 | 9/2008 | Kim |
| 2008/0250319 A1 | 10/2008 | Lee et al. |
| 2008/0257701 A1 | 10/2008 | Wlotzka et al. |
| 2008/0259025 A1 | 10/2008 | Eom |
| 2008/0273712 A1 | 11/2008 | Eichfeld et al. |
| 2008/0273713 A1 | 11/2008 | Hartung et al. |
| 2008/0279475 A1 | 11/2008 | Lee et al. |
| 2008/0285772 A1 | 11/2008 | Haulick et al. |
| 2008/0288880 A1 | 11/2008 | Reponen et al. |
| 2008/0318635 A1 | 12/2008 | Yoon et al. |
| 2008/0320391 A1 | 12/2008 | Lemay et al. |
| 2009/0002335 A1 | 1/2009 | Chaudhri |
| 2009/0002396 A1 | 1/2009 | Andrews et al. |
| 2009/0006958 A1 | 1/2009 | Pohjola et al. |
| 2009/0007019 A1 | 1/2009 | Kobayashi et al. |
| 2009/0007188 A1 | 1/2009 | Omernick |
| 2009/0015550 A1 | 1/2009 | Koski et al. |
| 2009/0030800 A1 | 1/2009 | Grois |
| 2009/0046110 A1 | 2/2009 | Sadler et al. |
| 2009/0050465 A1 | 2/2009 | Asada et al. |
| 2009/0051649 A1 | 2/2009 | Rondel |
| 2009/0055377 A1 | 2/2009 | Hedge et al. |
| 2009/0058822 A1 | 3/2009 | Chaudhri |
| 2009/0059730 A1 | 3/2009 | Lyons et al. |
| 2009/0061837 A1 | 3/2009 | Chaudhri et al. |
| 2009/0064031 A1 | 3/2009 | Bull et al. |
| 2009/0070675 A1 | 3/2009 | Li |
| 2009/0070705 A1 | 3/2009 | Ording |
| 2009/0070711 A1 | 3/2009 | Kwak et al. |
| 2009/0075694 A1 | 3/2009 | Kim et al. |
| 2009/0077491 A1 | 3/2009 | Kim |
| 2009/0079695 A1 | 3/2009 | Tatehata et al. |
| 2009/0079698 A1 | 3/2009 | Takashima et al. |
| 2009/0098912 A1 | 4/2009 | Kim et al. |
| 2009/0100373 A1 | 4/2009 | Pixley et al. |
| 2009/0102817 A1 | 4/2009 | Bathiche et al. |
| 2009/0109069 A1 | 4/2009 | Takasaki et al. |
| 2009/0119678 A1 | 5/2009 | Shih et al. |

(56) References Cited

U.S. PATENT DOCUMENTS

| | | |
|---|---|---|
| 2009/0125571 A1 | 5/2009 | Kiilerich et al. |
| 2009/0125811 A1 | 5/2009 | Bethurum |
| 2009/0128500 A1 | 5/2009 | Sinclair |
| 2009/0140991 A1 | 6/2009 | Takasaki et al. |
| 2009/0141046 A1 | 6/2009 | Rathnam et al. |
| 2009/0143117 A1 | 6/2009 | Shin et al. |
| 2009/0144623 A1 | 6/2009 | Jung |
| 2009/0144642 A1 | 6/2009 | Crystal |
| 2009/0144654 A1 | 6/2009 | Brouwer et al. |
| 2009/0152452 A1 | 6/2009 | Lee et al. |
| 2009/0153288 A1 | 6/2009 | Hope et al. |
| 2009/0156255 A1 | 6/2009 | Shin et al. |
| 2009/0164937 A1 | 6/2009 | Alviar et al. |
| 2009/0174677 A1 | 7/2009 | Gehani et al. |
| 2009/0174680 A1 | 7/2009 | Anzures et al. |
| 2009/0177538 A1 | 7/2009 | Brewer et al. |
| 2009/0177966 A1 | 7/2009 | Chaudhri |
| 2009/0189915 A1 | 7/2009 | Mercer et al. |
| 2009/0193359 A1 | 7/2009 | Anthony et al. |
| 2009/0196124 A1 | 8/2009 | Mooring et al. |
| 2009/0198359 A1 | 8/2009 | Chaudhri |
| 2009/0199119 A1 | 8/2009 | Park et al. |
| 2009/0199130 A1 | 8/2009 | Tsern et al. |
| 2009/0204920 A1 | 8/2009 | Beverley et al. |
| 2009/0204929 A1 | 8/2009 | Baurmann et al. |
| 2009/0228825 A1 | 9/2009 | Van Os et al. |
| 2009/0231271 A1 | 9/2009 | Heubel et al. |
| 2009/0237372 A1 | 9/2009 | Kim et al. |
| 2009/0241150 A1 | 9/2009 | White et al. |
| 2009/0280907 A1 | 11/2009 | Larsen et al. |
| 2009/0288035 A1 | 11/2009 | Tunning et al. |
| 2009/0288039 A1 | 11/2009 | Mail et al. |
| 2009/0289905 A1 | 11/2009 | Ahn |
| 2009/0304205 A1 | 12/2009 | Hardacker et al. |
| 2009/0307633 A1 | 12/2009 | Haughay et al. |
| 2009/0313299 A1 | 12/2009 | Bonev et al. |
| 2009/0315848 A1 | 12/2009 | Ku et al. |
| 2009/0315867 A1 | 12/2009 | Sakamoto et al. |
| 2009/0322695 A1 | 12/2009 | Cho et al. |
| 2009/0325563 A1 | 12/2009 | Horodezky et al. |
| 2010/0001967 A1 | 1/2010 | Yoo |
| 2010/0004031 A1 | 1/2010 | Kim |
| 2010/0004033 A1 | 1/2010 | Choe et al. |
| 2010/0005421 A1 | 1/2010 | Yoshioka |
| 2010/0017748 A1 | 1/2010 | Taylor et al. |
| 2010/0017872 A1 | 1/2010 | Goertz et al. |
| 2010/0026640 A1 | 2/2010 | Kim et al. |
| 2010/0029327 A1 | 2/2010 | Jee |
| 2010/0058223 A1 | 3/2010 | Price et al. |
| 2010/0058226 A1 | 3/2010 | Flake et al. |
| 2010/0058228 A1 | 3/2010 | Park |
| 2010/0058240 A1 | 3/2010 | Bull et al. |
| 2010/0058253 A1 | 3/2010 | Son |
| 2010/0070490 A1 | 3/2010 | Amidon et al. |
| 2010/0070926 A1 | 3/2010 | Abanami et al. |
| 2010/0073692 A1 | 3/2010 | Waltman et al. |
| 2010/0079500 A1 | 4/2010 | Osullivan et al. |
| 2010/0085379 A1 | 4/2010 | Hishikawa et al. |
| 2010/0088634 A1 | 4/2010 | Tsuruta et al. |
| 2010/0088639 A1 | 4/2010 | Yach et al. |
| 2010/0093400 A1 | 4/2010 | Ju et al. |
| 2010/0099462 A1 | 4/2010 | Baek et al. |
| 2010/0100137 A1 | 4/2010 | Justis et al. |
| 2010/0106647 A1 | 4/2010 | Raman |
| 2010/0110044 A1 | 5/2010 | Englund |
| 2010/0113101 A1 | 5/2010 | Tanada |
| 2010/0122195 A1 | 5/2010 | Hwang |
| 2010/0128570 A1 | 5/2010 | Smith et al. |
| 2010/0141609 A1 | 6/2010 | Frisbee |
| 2010/0146387 A1 | 6/2010 | Hoover |
| 2010/0148945 A1 | 6/2010 | Yun et al. |
| 2010/0164908 A1 | 7/2010 | Hill et al. |
| 2010/0169097 A1 | 7/2010 | Nachman et al. |
| 2010/0173678 A1 | 7/2010 | Kim et al. |
| 2010/0175006 A1 | 7/2010 | Li |
| 2010/0178873 A1 | 7/2010 | Lee et al. |
| 2010/0187074 A1 | 7/2010 | Manni |
| 2010/0188268 A1 | 7/2010 | Grignani et al. |
| 2010/0199232 A1 | 8/2010 | Mistry et al. |
| 2010/0205563 A1 | 8/2010 | Haapsaari et al. |
| 2010/0211498 A1 | 8/2010 | Aabye et al. |
| 2010/0211908 A1 | 8/2010 | Luk et al. |
| 2010/0211919 A1 | 8/2010 | Brown et al. |
| 2010/0214243 A1 | 8/2010 | Birnbaum et al. |
| 2010/0220562 A1 | 9/2010 | Hozumi et al. |
| 2010/0223055 A1 | 9/2010 | Mclean |
| 2010/0229094 A1 | 9/2010 | Nakajima et al. |
| 2010/0231534 A1 | 9/2010 | Chaudhri et al. |
| 2010/0231535 A1 | 9/2010 | Chaudhri et al. |
| 2010/0231536 A1 | 9/2010 | Chaudhri et al. |
| 2010/0231537 A1 | 9/2010 | Pisula et al. |
| 2010/0235729 A1 | 9/2010 | Kocienda et al. |
| 2010/0235742 A1 | 9/2010 | Hsu et al. |
| 2010/0248778 A1 | 9/2010 | Biswas |
| 2010/0251168 A1 | 9/2010 | Fujita et al. |
| 2010/0251304 A1 | 9/2010 | Donoghue et al. |
| 2010/0257484 A1 | 10/2010 | Nakamura et al. |
| 2010/0259481 A1 | 10/2010 | Oh et al. |
| 2010/0259482 A1 | 10/2010 | Ball |
| 2010/0262928 A1 | 10/2010 | Abbott |
| 2010/0267424 A1 | 10/2010 | Kim et al. |
| 2010/0269038 A1 | 10/2010 | Tsuda |
| 2010/0269108 A1 | 10/2010 | Boudreau et al. |
| 2010/0271312 A1 | 10/2010 | Alameh et al. |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0271401 A1 | 10/2010 | Fong |
| 2010/0277126 A1 | 11/2010 | Naeimi et al. |
| 2010/0283743 A1 | 11/2010 | Coddington |
| 2010/0284389 A1 | 11/2010 | Ramsay et al. |
| 2010/0293598 A1 | 11/2010 | Collart et al. |
| 2010/0296678 A1 | 11/2010 | Kuhn-Rahloff et al. |
| 2010/0299639 A1 | 11/2010 | Ramsay et al. |
| 2010/0302172 A1 | 12/2010 | Wilairat et al. |
| 2010/0306657 A1 | 12/2010 | Derbyshire et al. |
| 2010/0315417 A1 | 12/2010 | Cho et al. |
| 2010/0318908 A1 | 12/2010 | Neuman et al. |
| 2010/0321201 A1 | 12/2010 | Huang et al. |
| 2010/0325575 A1 | 12/2010 | Platzer et al. |
| 2010/0331145 A1 | 12/2010 | Lakovic et al. |
| 2011/0006980 A1 | 1/2011 | Taniguchi et al. |
| 2011/0014956 A1 | 1/2011 | Lee et al. |
| 2011/0022472 A1 | 1/2011 | Zon |
| 2011/0025311 A1 | 2/2011 | Chauvin et al. |
| 2011/0025624 A1 | 2/2011 | Goto |
| 2011/0047491 A1 | 2/2011 | Hwang et al. |
| 2011/0055752 A1 | 3/2011 | Rubinstein et al. |
| 2011/0057877 A1 | 3/2011 | Nagashima et al. |
| 2011/0057886 A1 | 3/2011 | Ng et al. |
| 2011/0072345 A1 | 3/2011 | Lim |
| 2011/0074699 A1 | 3/2011 | Marr et al. |
| 2011/0074719 A1 | 3/2011 | Yeh et al. |
| 2011/0074828 A1 | 3/2011 | Capela et al. |
| 2011/0078560 A1 | 3/2011 | Weeldreyer et al. |
| 2011/0078622 A1 | 3/2011 | Missig et al. |
| 2011/0086613 A1 | 4/2011 | Doudkine et al. |
| 2011/0087982 A1 | 4/2011 | Mccann et al. |
| 2011/0090255 A1 | 4/2011 | Wilson et al. |
| 2011/0093812 A1 | 4/2011 | Fong |
| 2011/0095993 A1 | 4/2011 | Zuverink |
| 2011/0099509 A1 | 4/2011 | Horagai et al. |
| 2011/0102455 A1 | 5/2011 | Temple |
| 2011/0107264 A1 | 5/2011 | Akella |
| 2011/0119578 A1 | 5/2011 | Schwartz |
| 2011/0126097 A1 | 5/2011 | Isono |
| 2011/0126139 A1 | 5/2011 | Jeong et al. |
| 2011/0126155 A1 | 5/2011 | Krishnaraj et al. |
| 2011/0128226 A1 | 6/2011 | Jensen |
| 2011/0131494 A1 | 6/2011 | Ono et al. |
| 2011/0131531 A1 | 6/2011 | Russell et al. |
| 2011/0131537 A1 | 6/2011 | Cho et al. |
| 2011/0145759 A1 | 6/2011 | Leffert et al. |
| 2011/0157046 A1 | 6/2011 | Lee et al. |

(56) References Cited

U.S. PATENT DOCUMENTS

| | | |
|---|---|---|
| 2011/0159469 A1 | 6/2011 | Hwang et al. |
| 2011/0159927 A1 | 6/2011 | Choi |
| 2011/0161853 A1 | 6/2011 | Park |
| 2011/0163971 A1 | 7/2011 | Wagner et al. |
| 2011/0164042 A1 | 7/2011 | Chaudhri |
| 2011/0167262 A1 | 7/2011 | Ross et al. |
| 2011/0167369 A1 | 7/2011 | Van |
| 2011/0167382 A1 | 7/2011 | Van Os |
| 2011/0187355 A1 | 8/2011 | Dixon et al. |
| 2011/0197160 A1 | 8/2011 | Kim et al. |
| 2011/0199342 A1 | 8/2011 | Vartanian et al. |
| 2011/0202834 A1 | 8/2011 | Mandryk et al. |
| 2011/0202859 A1 | 8/2011 | Fong |
| 2011/0202861 A1 | 8/2011 | Fritzley et al. |
| 2011/0202866 A1 | 8/2011 | Huang et al. |
| 2011/0202878 A1 | 8/2011 | Park et al. |
| 2011/0209099 A1 | 8/2011 | Hinckley et al. |
| 2011/0209104 A1 | 8/2011 | Hinckley et al. |
| 2011/0224967 A1 | 9/2011 | Van Schaik |
| 2011/0225543 A1 | 9/2011 | Arnold et al. |
| 2011/0234633 A1 | 9/2011 | Ogura et al. |
| 2011/0242002 A1 | 10/2011 | Kaplan et al. |
| 2011/0246942 A1 | 10/2011 | Misawa |
| 2011/0248948 A1 | 10/2011 | Griffin et al. |
| 2011/0252357 A1 | 10/2011 | Chaudhri |
| 2011/0252362 A1 | 10/2011 | Cho et al. |
| 2011/0252369 A1 | 10/2011 | Chaudhri |
| 2011/0271183 A1 | 11/2011 | Bose et al. |
| 2011/0271233 A1 | 11/2011 | Radakovitz et al. |
| 2011/0279384 A1 | 11/2011 | Miller et al. |
| 2011/0291945 A1 | 12/2011 | Ewing et al. |
| 2011/0291971 A1 | 12/2011 | Masaki et al. |
| 2011/0296312 A1 | 12/2011 | Boyer et al. |
| 2011/0298830 A1 | 12/2011 | Lam |
| 2011/0300910 A1 | 12/2011 | Choi |
| 2011/0302493 A1 | 12/2011 | Runstedler et al. |
| 2011/0307842 A1 | 12/2011 | Chiang et al. |
| 2011/0316888 A1 | 12/2011 | Sachs et al. |
| 2012/0004920 A1 | 1/2012 | Kelly et al. |
| 2012/0011437 A1 | 1/2012 | James et al. |
| 2012/0019513 A1 | 1/2012 | Fong et al. |
| 2012/0026198 A1 | 2/2012 | Maesaka |
| 2012/0030566 A1 | 2/2012 | Victor et al. |
| 2012/0030627 A1 | 2/2012 | Nurmi et al. |
| 2012/0032988 A1 | 2/2012 | Katayama et al. |
| 2012/0038582 A1 | 2/2012 | Grant |
| 2012/0044267 A1 | 2/2012 | Fino et al. |
| 2012/0050185 A1* | 3/2012 | Davydov ............ G06F 3/04883 345/173 |
| 2012/0052921 A1 | 3/2012 | Lim et al. |
| 2012/0054670 A1 | 3/2012 | Rainisto |
| 2012/0056848 A1 | 3/2012 | Yamano et al. |
| 2012/0059787 A1 | 3/2012 | Brown et al. |
| 2012/0062398 A1 | 3/2012 | Durand |
| 2012/0066621 A1 | 3/2012 | Matsubara |
| 2012/0066629 A1 | 3/2012 | Lee et al. |
| 2012/0066638 A1 | 3/2012 | Ohri et al. |
| 2012/0068925 A1 | 3/2012 | Wong et al. |
| 2012/0083260 A1 | 4/2012 | Arriola et al. |
| 2012/0084689 A1 | 4/2012 | Ledet et al. |
| 2012/0084697 A1 | 4/2012 | Reeves |
| 2012/0089951 A1 | 4/2012 | Cassidy |
| 2012/0092383 A1 | 4/2012 | Hysek et al. |
| 2012/0099406 A1 | 4/2012 | Lau et al. |
| 2012/0105484 A1 | 5/2012 | Cui |
| 2012/0112859 A1 | 5/2012 | Park et al. |
| 2012/0115608 A1 | 5/2012 | Pfeifer et al. |
| 2012/0127071 A1 | 5/2012 | Jitkoff et al. |
| 2012/0131459 A1 | 5/2012 | Ilama-Vaquero et al. |
| 2012/0131495 A1 | 5/2012 | Goossens et al. |
| 2012/0131504 A1 | 5/2012 | Fadell et al. |
| 2012/0133604 A1 | 5/2012 | Ishizuka et al. |
| 2012/0133677 A1 | 5/2012 | Suzuki et al. |
| 2012/0142414 A1 | 6/2012 | Murakami |
| 2012/0147052 A1 | 6/2012 | Homma et al. |
| 2012/0155223 A1 | 6/2012 | Hoover |
| 2012/0159380 A1 | 6/2012 | Kocienda et al. |
| 2012/0162261 A1 | 6/2012 | Kim et al. |
| 2012/0162350 A1 | 6/2012 | Lee et al. |
| 2012/0169776 A1 | 7/2012 | Rissa et al. |
| 2012/0174005 A1 | 7/2012 | Deutsch et al. |
| 2012/0174033 A1 | 7/2012 | Joo |
| 2012/0178431 A1 | 7/2012 | Gold |
| 2012/0179998 A1 | 7/2012 | Nesladek et al. |
| 2012/0185781 A1 | 7/2012 | Guzman et al. |
| 2012/0186951 A1 | 7/2012 | Wu et al. |
| 2012/0192110 A1 | 7/2012 | Wu et al. |
| 2012/0197419 A1 | 8/2012 | Dhruv et al. |
| 2012/0197743 A1 | 8/2012 | Grigg et al. |
| 2012/0204123 A1 | 8/2012 | Bauer et al. |
| 2012/0210226 A1 | 8/2012 | Mccoy et al. |
| 2012/0222092 A1 | 8/2012 | Rabii |
| 2012/0226977 A1 | 9/2012 | Lengeling et al. |
| 2012/0229521 A1 | 9/2012 | Hales et al. |
| 2012/0236037 A1 | 9/2012 | Lessing et al. |
| 2012/0256863 A1 | 10/2012 | Zhang et al. |
| 2012/0260169 A1 | 10/2012 | Schwartz et al. |
| 2012/0272145 A1 | 10/2012 | Ryan et al. |
| 2012/0272181 A1 | 10/2012 | Rogers et al. |
| 2012/0272230 A1 | 10/2012 | Lee |
| 2012/0278725 A1 | 11/2012 | Gordon et al. |
| 2012/0278755 A1 | 11/2012 | Lehmann et al. |
| 2012/0284674 A1 | 11/2012 | Geng et al. |
| 2012/0289290 A1 | 11/2012 | Chae et al. |
| 2012/0290472 A1 | 11/2012 | Mullen et al. |
| 2012/0294118 A1 | 11/2012 | Haulick et al. |
| 2012/0297324 A1 | 11/2012 | Dollar et al. |
| 2012/0297342 A1 | 11/2012 | Jang et al. |
| 2012/0304111 A1 | 11/2012 | Queru et al. |
| 2012/0304113 A1 | 11/2012 | Patten et al. |
| 2012/0306765 A1 | 12/2012 | Moore et al. |
| 2012/0306930 A1 | 12/2012 | Decker et al. |
| 2012/0311055 A1 | 12/2012 | Adams et al. |
| 2012/0311444 A1 | 12/2012 | Chaudhri |
| 2012/0324357 A1 | 12/2012 | Viegers et al. |
| 2012/0324390 A1 | 12/2012 | Tao et al. |
| 2012/0327006 A1 | 12/2012 | Israr et al. |
| 2012/0327009 A1 | 12/2012 | Fleizach |
| 2013/0002589 A1 | 1/2013 | Jang |
| 2013/0007617 A1 | 1/2013 | Mackenzie et al. |
| 2013/0019182 A1 | 1/2013 | Gil et al. |
| 2013/0021362 A1 | 1/2013 | Sakurada et al. |
| 2013/0022221 A1 | 1/2013 | Kallai et al. |
| 2013/0024780 A1 | 1/2013 | Sutedja et al. |
| 2013/0024808 A1 | 1/2013 | Rainisto |
| 2013/0024811 A1 | 1/2013 | Gleadall et al. |
| 2013/0027289 A1 | 1/2013 | Choi et al. |
| 2013/0027412 A1 | 1/2013 | Roddy |
| 2013/0031507 A1 | 1/2013 | George |
| 2013/0031514 A1 | 1/2013 | Gabbert |
| 2013/0036005 A1 | 2/2013 | Rappe |
| 2013/0038636 A1 | 2/2013 | Fujiwaka |
| 2013/0046397 A1 | 2/2013 | Fadell et al. |
| 2013/0047084 A1 | 2/2013 | Sanders et al. |
| 2013/0051755 A1 | 2/2013 | Brown et al. |
| 2013/0053107 A1 | 2/2013 | Kang et al. |
| 2013/0055082 A1 | 2/2013 | Fino et al. |
| 2013/0055150 A1 | 2/2013 | Galor |
| 2013/0055160 A1 | 2/2013 | Yamada et al. |
| 2013/0063383 A1 | 3/2013 | Anderssonreimer et al. |
| 2013/0067390 A1 | 3/2013 | Kwiatkowski et al. |
| 2013/0070573 A1 | 3/2013 | Oshio |
| 2013/0073584 A1 | 3/2013 | Kuper et al. |
| 2013/0073932 A1 | 3/2013 | Migos et al. |
| 2013/0080516 A1 | 3/2013 | Bologh |
| 2013/0080955 A1 | 3/2013 | Reimann et al. |
| 2013/0094666 A1 | 4/2013 | Haaff et al. |
| 2013/0094770 A1 | 4/2013 | Lee et al. |
| 2013/0097526 A1 | 4/2013 | Stovicek et al. |
| 2013/0097556 A1 | 4/2013 | Louch et al. |
| 2013/0097566 A1 | 4/2013 | Berglund |
| 2013/0104039 A1 | 4/2013 | Ormin et al. |
| 2013/0111342 A1 | 5/2013 | Alameh et al. |
| 2013/0111384 A1 | 5/2013 | Kim et al. |

(56) References Cited

U.S. PATENT DOCUMENTS

| | | |
|---|---|---|
| 2013/0111396 A1 | 5/2013 | Brid |
| 2013/0111407 A1 | 5/2013 | Mullen |
| 2013/0117689 A1 | 5/2013 | Lessing et al. |
| 2013/0117698 A1 | 5/2013 | Park et al. |
| 2013/0120295 A1 | 5/2013 | Kim et al. |
| 2013/0124207 A1 | 5/2013 | Sarin et al. |
| 2013/0132883 A1 | 5/2013 | Vayrynen |
| 2013/0135228 A1 | 5/2013 | Won et al. |
| 2013/0135234 A1 | 5/2013 | Hisano et al. |
| 2013/0135236 A1 | 5/2013 | Yano |
| 2013/0138272 A1 | 5/2013 | Louise-Babando et al. |
| 2013/0139102 A1 | 5/2013 | Miura et al. |
| 2013/0141342 A1 | 6/2013 | Bokma et al. |
| 2013/0142016 A1 | 6/2013 | Pozzo Di Borgo et al. |
| 2013/0145292 A1 | 6/2013 | Cohen et al. |
| 2013/0145316 A1 | 6/2013 | Heo |
| 2013/0147747 A1 | 6/2013 | Takagi |
| 2013/0152017 A1 | 6/2013 | Song et al. |
| 2013/0154933 A1 | 6/2013 | Sheik-Nainar |
| 2013/0159858 A1 | 6/2013 | Joffray et al. |
| 2013/0159941 A1 | 6/2013 | Langlois et al. |
| 2013/0162411 A1 | 6/2013 | Moses et al. |
| 2013/0169579 A1 | 7/2013 | Havnor |
| 2013/0173794 A1 | 7/2013 | Agerbak et al. |
| 2013/0174031 A1 | 7/2013 | Constantinou |
| 2013/0176020 A1 | 7/2013 | Chauvin et al. |
| 2013/0191220 A1 | 7/2013 | Dent et al. |
| 2013/0191454 A1 | 7/2013 | Oliver et al. |
| 2013/0194476 A1 | 8/2013 | Shimosato |
| 2013/0205210 A1 | 8/2013 | Jeon et al. |
| 2013/0205375 A1 | 8/2013 | Woxblom et al. |
| 2013/0205939 A1 | 8/2013 | Meerovitsch et al. |
| 2013/0208013 A1 | 8/2013 | Yuu et al. |
| 2013/0218517 A1 | 8/2013 | Ausserlechner et al. |
| 2013/0222301 A1 | 8/2013 | Lee et al. |
| 2013/0226444 A1 | 8/2013 | Johansson et al. |
| 2013/0227412 A1 | 8/2013 | Ornstein et al. |
| 2013/0227419 A1 | 8/2013 | Lee et al. |
| 2013/0227470 A1 | 8/2013 | Thorsander et al. |
| 2013/0227483 A1 | 8/2013 | Thorsander et al. |
| 2013/0227490 A1 | 8/2013 | Thorsander et al. |
| 2013/0246522 A1 | 9/2013 | Bilinski et al. |
| 2013/0246916 A1 | 9/2013 | Reimann et al. |
| 2013/0254708 A1 | 9/2013 | Dorcey |
| 2013/0258819 A1 | 10/2013 | Hoover |
| 2013/0262564 A1 | 10/2013 | Wall et al. |
| 2013/0275899 A1 | 10/2013 | Schubert et al. |
| 2013/0282360 A1 | 10/2013 | Shimota et al. |
| 2013/0282459 A1 | 10/2013 | Smets et al. |
| 2013/0283204 A1 | 10/2013 | Pasquero et al. |
| 2013/0290116 A1 | 10/2013 | Hepworth et al. |
| 2013/0303087 A1 | 11/2013 | Hauser et al. |
| 2013/0305184 A1 | 11/2013 | Kim et al. |
| 2013/0305187 A1 | 11/2013 | Phillips et al. |
| 2013/0305354 A1 | 11/2013 | King et al. |
| 2013/0318437 A1 | 11/2013 | Jung et al. |
| 2013/0322634 A1 | 12/2013 | Bennett et al. |
| 2013/0324081 A1 | 12/2013 | Gargi et al. |
| 2013/0324093 A1 | 12/2013 | Santamaria et al. |
| 2013/0328786 A1 | 12/2013 | Hinckley |
| 2013/0329924 A1 | 12/2013 | Fleizach et al. |
| 2013/0339343 A1 | 12/2013 | Hierons et al. |
| 2013/0339345 A1 | 12/2013 | Soto Matamala et al. |
| 2013/0342457 A1 | 12/2013 | Cox et al. |
| 2013/0346859 A1 | 12/2013 | Bates et al. |
| 2013/0347022 A1 | 12/2013 | Bates et al. |
| 2014/0002502 A1 | 1/2014 | Han |
| 2014/0028554 A1 | 1/2014 | De Los Reyes et al. |
| 2014/0028688 A1 | 1/2014 | Houjou et al. |
| 2014/0028735 A1 | 1/2014 | Williams et al. |
| 2014/0033035 A1 | 1/2014 | Crow et al. |
| 2014/0036639 A1 | 2/2014 | Boni et al. |
| 2014/0037107 A1 | 2/2014 | Marino et al. |
| 2014/0040742 A1 | 2/2014 | Park et al. |
| 2014/0047020 A1 | 2/2014 | Matus et al. |
| 2014/0049447 A1 | 2/2014 | Choi |
| 2014/0072282 A1 | 3/2014 | Cho |
| 2014/0075311 A1 | 3/2014 | Boettcher et al. |
| 2014/0075368 A1 | 3/2014 | Kim et al. |
| 2014/0080416 A1* | 3/2014 | Seo ............... H04W 76/14 |
| | | 455/41.2 |
| 2014/0092037 A1 | 4/2014 | Kim |
| 2014/0092143 A1 | 4/2014 | Vanblon et al. |
| 2014/0105278 A1 | 4/2014 | Bivolarsky |
| 2014/0106734 A1 | 4/2014 | Lee |
| 2014/0108936 A1 | 4/2014 | Khosropour et al. |
| 2014/0109002 A1 | 4/2014 | Kimball et al. |
| 2014/0114966 A1 | 4/2014 | Bilinski et al. |
| 2014/0132640 A1 | 5/2014 | Sharma et al. |
| 2014/0136443 A1 | 5/2014 | Kinsey et al. |
| 2014/0136981 A1 | 5/2014 | Xiang et al. |
| 2014/0137020 A1 | 5/2014 | Sharma et al. |
| 2014/0139422 A1* | 5/2014 | Mistry ............... G06F 3/014 |
| | | 345/156 |
| 2014/0139637 A1 | 5/2014 | Mistry et al. |
| 2014/0143678 A1 | 5/2014 | Mistry et al. |
| 2014/0143683 A1 | 5/2014 | Underwood et al. |
| 2014/0143737 A1* | 5/2014 | Mistry ............. G06F 3/0488 |
| | | 715/854 |
| 2014/0149921 A1 | 5/2014 | Hauser et al. |
| 2014/0152585 A1 | 6/2014 | Andersson |
| 2014/0157160 A1 | 6/2014 | Cudak et al. |
| 2014/0160078 A1 | 6/2014 | Seo et al. |
| 2014/0164945 A1 | 6/2014 | Junqua et al. |
| 2014/0164966 A1 | 6/2014 | Kim et al. |
| 2014/0176298 A1 | 6/2014 | Kumar et al. |
| 2014/0181202 A1 | 6/2014 | Gossain |
| 2014/0181654 A1 | 6/2014 | Kumar et al. |
| 2014/0189608 A1 | 7/2014 | Shuttleworth et al. |
| 2014/0204229 A1 | 7/2014 | Leung et al. |
| 2014/0207707 A1 | 7/2014 | Na et al. |
| 2014/0215340 A1 | 7/2014 | Shetty et al. |
| 2014/0215413 A1 | 7/2014 | Calkins et al. |
| 2014/0222916 A1 | 8/2014 | Foley et al. |
| 2014/0229835 A1 | 8/2014 | Ravine |
| 2014/0237361 A1 | 8/2014 | Martin et al. |
| 2014/0237382 A1 | 8/2014 | Grandhi |
| 2014/0245221 A1 | 8/2014 | Dougherty et al. |
| 2014/0253487 A1 | 9/2014 | Bezinge et al. |
| 2014/0258935 A1 | 9/2014 | Nishida et al. |
| 2014/0260776 A1 | 9/2014 | Burleson et al. |
| 2014/0267002 A1 | 9/2014 | Luna |
| 2014/0267441 A1 | 9/2014 | Matas et al. |
| 2014/0267911 A1 | 9/2014 | Grant et al. |
| 2014/0270183 A1 | 9/2014 | Luna |
| 2014/0282005 A1 | 9/2014 | Gutowitz |
| 2014/0282016 A1 | 9/2014 | Hosier, Jr. |
| 2014/0282142 A1 | 9/2014 | Lin |
| 2014/0282214 A1 | 9/2014 | Shirzadi et al. |
| 2014/0289659 A1 | 9/2014 | Harrison et al. |
| 2014/0292668 A1 | 10/2014 | Fricklas et al. |
| 2014/0298233 A1 | 10/2014 | Pettey et al. |
| 2014/0304389 A1 | 10/2014 | Reavis |
| 2014/0306989 A1 | 10/2014 | Doubleday et al. |
| 2014/0328147 A1 | 11/2014 | Yang et al. |
| 2014/0330435 A1 | 11/2014 | Stoner et al. |
| 2014/0333670 A1 | 11/2014 | Balivada et al. |
| 2014/0334644 A1 | 11/2014 | Selig et al. |
| 2014/0335789 A1 | 11/2014 | Cohen et al. |
| 2014/0337791 A1 | 11/2014 | Agnetta et al. |
| 2014/0347289 A1 | 11/2014 | Lee et al. |
| 2014/0362024 A1 | 12/2014 | Hicks |
| 2014/0362293 A1 | 12/2014 | Bakar et al. |
| 2014/0363024 A1 | 12/2014 | Apodaca |
| 2014/0364056 A1 | 12/2014 | Belk et al. |
| 2014/0365126 A1 | 12/2014 | Vulcano et al. |
| 2014/0365904 A1 | 12/2014 | Kim et al. |
| 2014/0372115 A1 | 12/2014 | Lebeau et al. |
| 2015/0007025 A1 | 1/2015 | Sassi et al. |
| 2015/0007048 A1 | 1/2015 | Dumans |
| 2015/0007052 A1 | 1/2015 | Dumans |
| 2015/0009784 A1 | 1/2015 | Cho et al. |
| 2015/0032812 A1 | 1/2015 | Dudley |
| 2015/0033361 A1 | 1/2015 | Choi et al. |

(56) References Cited

U.S. PATENT DOCUMENTS

| | | |
|---|---|---|
| 2015/0036555 A1 | 2/2015 | Shin et al. |
| 2015/0046871 A1 | 2/2015 | Lewis |
| 2015/0049591 A1 | 2/2015 | Adams et al. |
| 2015/0052222 A1 | 2/2015 | Farrell et al. |
| 2015/0058723 A1 | 2/2015 | Cieplinski et al. |
| 2015/0058744 A1 | 2/2015 | Dhingra et al. |
| 2015/0065821 A1 | 3/2015 | Conrad |
| 2015/0067495 A1 | 3/2015 | Bernstein et al. |
| 2015/0067497 A1 | 3/2015 | Cieplinski et al. |
| 2015/0067513 A1 | 3/2015 | Zambetti et al. |
| 2015/0067555 A1 | 3/2015 | Joo et al. |
| 2015/0067803 A1 | 3/2015 | Alduaiji |
| 2015/0074615 A1 | 3/2015 | Han et al. |
| 2015/0077398 A1 | 3/2015 | Stokes et al. |
| 2015/0085621 A1 | 3/2015 | Hong et al. |
| 2015/0089359 A1 | 3/2015 | Brisebois |
| 2015/0100623 A1 | 4/2015 | Gudell et al. |
| 2015/0113407 A1 | 4/2015 | Hoffert et al. |
| 2015/0121224 A1 | 4/2015 | Krasnahill, Jr. |
| 2015/0121311 A1 | 4/2015 | Lou et al. |
| 2015/0130737 A1 | 5/2015 | Im et al. |
| 2015/0135049 A1 | 5/2015 | Murphy |
| 2015/0138101 A1 | 5/2015 | Park et al. |
| 2015/0148927 A1 | 5/2015 | Georges et al. |
| 2015/0149599 A1 | 5/2015 | Caunter et al. |
| 2015/0149899 A1 | 5/2015 | Bernstein et al. |
| 2015/0149956 A1 | 5/2015 | Kempinski et al. |
| 2015/0160856 A1 | 6/2015 | Jang et al. |
| 2015/0178041 A1 | 6/2015 | Uskoreit |
| 2015/0185845 A1 | 7/2015 | Nagara et al. |
| 2015/0189426 A1 | 7/2015 | Pang |
| 2015/0193099 A1 | 7/2015 | Murphy |
| 2015/0193130 A1 | 7/2015 | Cho et al. |
| 2015/0193951 A1 | 7/2015 | Lee et al. |
| 2015/0199012 A1 | 7/2015 | Palmer |
| 2015/0199082 A1 | 7/2015 | Scholler et al. |
| 2015/0199110 A1 | 7/2015 | Nakazato |
| 2015/0200715 A1 | 7/2015 | Oiwa et al. |
| 2015/0205476 A1 | 7/2015 | Kuscher et al. |
| 2015/0205511 A1 | 7/2015 | Vinna et al. |
| 2015/0205971 A1 | 7/2015 | Sanio et al. |
| 2015/0215382 A1 | 7/2015 | Arora et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0229782 A1 | 8/2015 | Zuidema et al. |
| 2015/0234518 A1 | 8/2015 | Teller et al. |
| 2015/0234562 A1 | 8/2015 | Ording |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0242837 A1 | 8/2015 | Yarbrough et al. |
| 2015/0243163 A1 | 8/2015 | Shoemake |
| 2015/0248268 A1 | 9/2015 | Kumar et al. |
| 2015/0253960 A1 | 9/2015 | Lin et al. |
| 2015/0261310 A1 | 9/2015 | Walmsley et al. |
| 2015/0261493 A1 | 9/2015 | Lemmon et al. |
| 2015/0269944 A1 | 9/2015 | Wang |
| 2015/0277559 A1 | 10/2015 | Vescovi et al. |
| 2015/0277563 A1 | 10/2015 | Huang et al. |
| 2015/0286360 A1 | 10/2015 | Wachter |
| 2015/0286391 A1 | 10/2015 | Jacobs et al. |
| 2015/0302301 A1 | 10/2015 | Petersen |
| 2015/0302774 A1 | 10/2015 | Dagar |
| 2015/0309768 A1 | 10/2015 | Van Der Heide |
| 2015/0312299 A1 | 10/2015 | Chen |
| 2015/0324552 A1 | 11/2015 | Beckhardt |
| 2015/0331589 A1 | 11/2015 | Kawakita |
| 2015/0347738 A1 | 12/2015 | Ulrich et al. |
| 2015/0355816 A1 | 12/2015 | Shim |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358043 A1 | 12/2015 | Jeong et al. |
| 2015/0358304 A1 | 12/2015 | Beckhardt et al. |
| 2015/0363048 A1 | 12/2015 | Brown et al. |
| 2015/0370425 A1 | 12/2015 | Chen et al. |
| 2015/0370529 A1 | 12/2015 | Zambetti et al. |
| 2015/0378447 A1 | 12/2015 | Nagano et al. |
| 2015/0378522 A1 | 12/2015 | Butts |
| 2015/0378555 A1 | 12/2015 | Ramanathan et al. |
| 2015/0379476 A1 | 12/2015 | Chaudhri et al. |
| 2016/0004393 A1 | 1/2016 | Faaborg et al. |
| 2016/0004417 A1 | 1/2016 | Bates |
| 2016/0011758 A1 | 1/2016 | Meggs et al. |
| 2016/0011850 A1 | 1/2016 | Sheen et al. |
| 2016/0012018 A1 | 1/2016 | Do Ba |
| 2016/0018981 A1 | 1/2016 | Amerige et al. |
| 2016/0026429 A1 | 1/2016 | Triplett |
| 2016/0028875 A1 | 1/2016 | Brown et al. |
| 2016/0029146 A1 | 1/2016 | Tembey et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034153 A1 | 2/2016 | Lejeune et al. |
| 2016/0034166 A1 | 2/2016 | Wilson et al. |
| 2016/0034167 A1 | 2/2016 | Wilson et al. |
| 2016/0041702 A1 | 2/2016 | Wang |
| 2016/0048705 A1 | 2/2016 | Yang |
| 2016/0054710 A1 | 2/2016 | Jo et al. |
| 2016/0062466 A1 | 3/2016 | Verweij et al. |
| 2016/0062487 A1 | 3/2016 | Foss et al. |
| 2016/0062567 A1 | 3/2016 | Yang et al. |
| 2016/0062571 A1 | 3/2016 | Dascola et al. |
| 2016/0062573 A1 | 3/2016 | Dascola et al. |
| 2016/0062589 A1 | 3/2016 | Wan et al. |
| 2016/0062606 A1 | 3/2016 | Vega et al. |
| 2016/0062608 A1 | 3/2016 | Foss et al. |
| 2016/0063828 A1 | 3/2016 | Verweij et al. |
| 2016/0063850 A1 | 3/2016 | Yang et al. |
| 2016/0065509 A1 | 3/2016 | Butcher et al. |
| 2016/0065525 A1 | 3/2016 | Dye et al. |
| 2016/0071241 A1 | 3/2016 | Anzures et al. |
| 2016/0077734 A1 | 3/2016 | Buxton et al. |
| 2016/0088039 A1 | 3/2016 | Millington et al. |
| 2016/0091971 A1 | 3/2016 | Burr |
| 2016/0092072 A1 | 3/2016 | So et al. |
| 2016/0098016 A1 | 4/2016 | Shedletsky et al. |
| 2016/0117141 A1 | 4/2016 | Ro et al. |
| 2016/0127799 A1 | 5/2016 | Alsina et al. |
| 2016/0134942 A1 | 5/2016 | Lo |
| 2016/0150624 A1 | 5/2016 | Meerbeek et al. |
| 2016/0156687 A1 | 6/2016 | Leung |
| 2016/0156992 A1 | 6/2016 | Kuper |
| 2016/0162164 A1 | 6/2016 | Phillips et al. |
| 2016/0162252 A1 | 6/2016 | Di Censo et al. |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0170625 A1 | 6/2016 | Zambetti et al. |
| 2016/0180820 A1 | 6/2016 | Pascucci et al. |
| 2016/0183046 A1 | 6/2016 | Kwon |
| 2016/0196042 A1 | 7/2016 | Laute et al. |
| 2016/0196106 A1 | 7/2016 | Hammer et al. |
| 2016/0198319 A1 | 7/2016 | Huang et al. |
| 2016/0202866 A1 | 7/2016 | Zambetti |
| 2016/0209939 A1 | 7/2016 | Zambetti et al. |
| 2016/0210983 A1 | 7/2016 | Amada et al. |
| 2016/0231883 A1 | 8/2016 | Zambetti |
| 2016/0239167 A1 | 8/2016 | Reimann et al. |
| 2016/0241983 A1 | 8/2016 | Lambourne et al. |
| 2016/0246566 A1 | 8/2016 | Fullerton et al. |
| 2016/0253145 A1 | 9/2016 | Lee et al. |
| 2016/0259499 A1 | 9/2016 | Kocienda et al. |
| 2016/0259530 A1 | 9/2016 | Everitt et al. |
| 2016/0259535 A1 | 9/2016 | Seymour et al. |
| 2016/0267319 A1 | 9/2016 | Murillo et al. |
| 2016/0269540 A1 | 9/2016 | Butcher et al. |
| 2016/0291924 A1 | 10/2016 | Bierbower et al. |
| 2016/0295340 A1 | 10/2016 | Baker et al. |
| 2016/0299669 A1 | 10/2016 | Bates |
| 2016/0299736 A1 | 10/2016 | Bates et al. |

(56) References Cited

U.S. PATENT DOCUMENTS

| | | |
|---|---|---|
| 2016/0299912 A1 | 10/2016 | Acuna et al. |
| 2016/0327911 A1 | 11/2016 | Eim et al. |
| 2016/0336531 A1 | 11/2016 | Yokoyama |
| 2016/0342386 A1 | 11/2016 | Kallai et al. |
| 2016/0345039 A1 | 11/2016 | Billmeyer |
| 2016/0351191 A1 | 12/2016 | Vilermo et al. |
| 2016/0357368 A1 | 12/2016 | Federighi et al. |
| 2016/0360344 A1 | 12/2016 | Shim et al. |
| 2016/0364600 A1 | 12/2016 | Shah et al. |
| 2016/0366531 A1 | 12/2016 | Popova |
| 2016/0372113 A1 | 12/2016 | David et al. |
| 2016/0381476 A1 | 12/2016 | Gossain et al. |
| 2017/0003931 A1 | 1/2017 | Dvortsov et al. |
| 2017/0010678 A1 | 1/2017 | Tuli |
| 2017/0010751 A1 | 1/2017 | Shedletsky et al. |
| 2017/0010782 A1 | 1/2017 | Chaudhri et al. |
| 2017/0010794 A1 | 1/2017 | Cho et al. |
| 2017/0013562 A1 | 1/2017 | Lim et al. |
| 2017/0017369 A1 | 1/2017 | Kanter et al. |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0041727 A1 | 2/2017 | Reimann |
| 2017/0045958 A1 | 2/2017 | Battlogg |
| 2017/0053542 A1 | 2/2017 | Wilson et al. |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0078294 A1 | 3/2017 | Medvinsky |
| 2017/0083285 A1 | 3/2017 | Meyers et al. |
| 2017/0083494 A1 | 3/2017 | Kim et al. |
| 2017/0089735 A1 | 3/2017 | Ruh |
| 2017/0092085 A1 | 3/2017 | Agarwal |
| 2017/0092270 A1 | 3/2017 | Newendorp et al. |
| 2017/0099270 A1 | 4/2017 | Anson |
| 2017/0104902 A1 | 4/2017 | Kim et al. |
| 2017/0115940 A1 | 4/2017 | Byeon |
| 2017/0127145 A1 | 5/2017 | Rajapakse |
| 2017/0134567 A1 | 5/2017 | Jeon et al. |
| 2017/0142087 A1 | 5/2017 | Maninder et al. |
| 2017/0193813 A1 | 7/2017 | Carroll et al. |
| 2017/0195772 A1 | 7/2017 | Han et al. |
| 2017/0208466 A1 | 7/2017 | Seo et al. |
| 2017/0220215 A1 | 8/2017 | Wu et al. |
| 2017/0220226 A1 | 8/2017 | Wu et al. |
| 2017/0235545 A1 | 8/2017 | Millington et al. |
| 2017/0242653 A1 | 8/2017 | Lang et al. |
| 2017/0242933 A1 | 8/2017 | Liu |
| 2017/0269692 A1 | 9/2017 | Eck et al. |
| 2017/0315716 A1 | 11/2017 | Zambetti et al. |
| 2017/0357317 A1 | 12/2017 | Chaudhri et al. |
| 2017/0357318 A1 | 12/2017 | Chaudhri et al. |
| 2017/0357319 A1 | 12/2017 | Chaudhri et al. |
| 2017/0357320 A1 | 12/2017 | Chaudhri et al. |
| 2017/0357420 A1 | 12/2017 | Dye et al. |
| 2017/0357421 A1 | 12/2017 | Dye et al. |
| 2017/0357427 A1 | 12/2017 | Wilson et al. |
| 2017/0357439 A1 | 12/2017 | Lemay et al. |
| 2017/0357477 A1 | 12/2017 | Im et al. |
| 2017/0358181 A1 | 12/2017 | Moussette et al. |
| 2017/0363436 A1 | 12/2017 | Eronen et al. |
| 2018/0024683 A1 | 1/2018 | Ely et al. |
| 2018/0039916 A1 | 2/2018 | Ravindra |
| 2018/0040324 A1 | 2/2018 | Wilberding |
| 2018/0067557 A1 | 3/2018 | Robert et al. |
| 2018/0067712 A1 | 3/2018 | Behzadi et al. |
| 2018/0070187 A1 | 3/2018 | Drinkwater et al. |
| 2018/0074690 A1 | 3/2018 | Zambetti et al. |
| 2018/0074693 A1 | 3/2018 | Jones et al. |
| 2018/0081453 A1 | 3/2018 | Ely |
| 2018/0088532 A1 | 3/2018 | Ely et al. |
| 2018/0088797 A1 | 3/2018 | Mcatee et al. |
| 2018/0139292 A1 | 5/2018 | Koren et al. |
| 2018/0190279 A1 | 7/2018 | Anderson et al. |
| 2018/0204425 A1 | 7/2018 | Moussette et al. |
| 2018/0210516 A1 | 7/2018 | Zambetti et al. |
| 2018/0210641 A1 | 7/2018 | Thelleerathu et al. |
| 2018/0260555 A1 | 9/2018 | Hardee et al. |
| 2018/0307363 A1 | 10/2018 | Ely et al. |
| 2018/0329585 A1 | 11/2018 | Carrigan et al. |
| 2018/0329586 A1 | 11/2018 | Sundstrom et al. |
| 2018/0329587 A1 | 11/2018 | Ko et al. |
| 2018/0335891 A1 | 11/2018 | Shedletsky et al. |
| 2018/0335901 A1 | 11/2018 | Manzari et al. |
| 2018/0335903 A1 | 11/2018 | Coffman et al. |
| 2018/0336866 A1 | 11/2018 | Triverio et al. |
| 2018/0337924 A1 | 11/2018 | Graham et al. |
| 2018/0341344 A1 | 11/2018 | Foss et al. |
| 2018/0341448 A1 | 11/2018 | Behzadi et al. |
| 2018/0349583 A1 | 12/2018 | Turgeman et al. |
| 2018/0351762 A1 | 12/2018 | Iyengar et al. |
| 2018/0364815 A1 | 12/2018 | Moussette et al. |
| 2018/0367489 A1 | 12/2018 | Dye et al. |
| 2018/0369691 A1 | 12/2018 | Rihn et al. |
| 2019/0012069 A1 | 1/2019 | Bates |
| 2019/0012073 A1 | 1/2019 | Hwang |
| 2019/0012966 A1 | 1/2019 | Shi |
| 2019/0033862 A1 | 1/2019 | Groden et al. |
| 2019/0050055 A1 | 2/2019 | Chaudhri et al. |
| 2019/0056700 A1 | 2/2019 | Matsuno et al. |
| 2019/0056854 A1 | 2/2019 | Azzolin et al. |
| 2019/0072912 A1 | 3/2019 | Pandya et al. |
| 2019/0080066 A1 | 3/2019 | Van Os et al. |
| 2019/0080072 A1 | 3/2019 | Van Os et al. |
| 2019/0101870 A1 | 4/2019 | Pandya et al. |
| 2019/0102145 A1 | 4/2019 | Wilberding et al. |
| 2019/0163324 A1 | 5/2019 | Shedletsky et al. |
| 2019/0163329 A1 | 5/2019 | Yang et al. |
| 2019/0172016 A1 | 6/2019 | Chaudhri et al. |
| 2019/0212885 A1 | 7/2019 | Zambetti et al. |
| 2019/0243471 A1 | 8/2019 | Foss et al. |
| 2019/0272036 A1 | 9/2019 | Grant et al. |
| 2019/0274565 A1 | 9/2019 | Soli et al. |
| 2019/0279520 A1 | 9/2019 | Wilson et al. |
| 2019/0294406 A1 | 9/2019 | Bierbower et al. |
| 2019/0342622 A1 | 11/2019 | Carrigan et al. |
| 2019/0354268 A1 | 11/2019 | Everitt et al. |
| 2019/0369755 A1 | 12/2019 | Roper et al. |
| 2019/0369838 A1 | 12/2019 | Josephson et al. |
| 2020/0050332 A1 | 2/2020 | Yang et al. |
| 2020/0050426 A1 | 2/2020 | Jung et al. |
| 2020/0081538 A1 | 3/2020 | Moussette et al. |
| 2020/0081539 A1 | 3/2020 | Moussette et al. |
| 2020/0104018 A1 | 4/2020 | Coffman et al. |
| 2020/0110522 A1 | 4/2020 | Zambetti et al. |
| 2020/0145361 A1 | 5/2020 | Dye et al. |
| 2020/0154583 A1 | 5/2020 | Lee et al. |
| 2020/0167047 A1 | 5/2020 | Dascola et al. |
| 2020/0192473 A1 | 6/2020 | Wang et al. |
| 2020/0201491 A1 | 6/2020 | Coffman et al. |
| 2020/0201495 A1 | 6/2020 | Coffman et al. |
| 2020/0218486 A1 | 7/2020 | Behzadi et al. |
| 2020/0225817 A1 | 7/2020 | Coffman et al. |
| 2020/0272287 A1 | 8/2020 | Yang et al. |
| 2020/0272293 A1 | 8/2020 | Zambetti et al. |
| 2020/0333940 A1 | 10/2020 | Lee et al. |
| 2020/0341553 A1 | 10/2020 | Moussette et al. |
| 2020/0344439 A1 | 10/2020 | Choi et al. |
| 2020/0355463 A1 | 11/2020 | Piccioni |
| 2020/0356323 A1 | 11/2020 | Kawabata |
| 2020/0356341 A1 | 11/2020 | Satongar et al. |
| 2020/0356962 A1 | 11/2020 | Subramaniam et al. |
| 2020/0368616 A1 | 11/2020 | Delamont |
| 2020/0379711 A1 | 12/2020 | Graham et al. |
| 2020/0379714 A1 | 12/2020 | Graham et al. |
| 2020/0379716 A1 | 12/2020 | Carrigan et al. |
| 2020/0379729 A1 | 12/2020 | Graham et al. |
| 2020/0379730 A1 | 12/2020 | Graham et al. |
| 2020/0393957 A1 | 12/2020 | Wilson et al. |
| 2021/0011588 A1 | 1/2021 | Coffman et al. |
| 2021/0011613 A1 | 1/2021 | Pisula et al. |
| 2021/0055697 A1 | 2/2021 | Abramov |
| 2021/0073741 A1 | 3/2021 | Chaudhri et al. |
| 2021/0110014 A1 | 4/2021 | Turgeman et al. |

(56) References Cited

U.S. PATENT DOCUMENTS

| | | | |
|---|---|---|---|
| 2021/0181903 A1 | 6/2021 | Carrigan et al. |
| 2021/0208750 A1 | 7/2021 | Zambetti et al. |
| 2021/0255816 A1 | 8/2021 | Behzadi et al. |
| 2021/0255819 A1 | 8/2021 | Graham et al. |
| 2021/0263702 A1 | 8/2021 | Carrigan |
| 2021/0342017 A1 | 11/2021 | Foss et al. |
| 2021/0392223 A1 | 12/2021 | Coffman et al. |
| 2022/0100367 A1 | 3/2022 | Carrigan et al. |
| 2022/0129858 A1 | 4/2022 | Chaudhri et al. |
| 2022/0244782 A1 | 8/2022 | Robert et al. |
| 2022/0279063 A1 | 9/2022 | Coffman et al. |
| 2022/0286549 A1 | 9/2022 | Coffman et al. |
| 2022/0303383 A1 | 9/2022 | Coffman et al. |
| 2022/0326817 A1 | 10/2022 | Carrigan et al. |
| 2022/0350482 A1 | 11/2022 | Carrigan et al. |
| 2022/0413632 A1 | 12/2022 | Foss et al. |
| 2023/0004227 A1 | 1/2023 | Moussette et al. |
| 2023/0024225 A1 | 1/2023 | Zambetti et al. |
| 2023/0049771 A1 | 2/2023 | Dascola et al. |
| 2023/0073844 A1 | 3/2023 | Coffman et al. |
| 2023/0084551 A1 | 3/2023 | Coffman et al. |
| 2023/0104819 A1 | 4/2023 | Coffman et al. |
| 2023/0106600 A1 | 4/2023 | Coffman et al. |
| 2023/0106761 A1 | 4/2023 | Coffman et al. |
| 2023/0168797 A1 | 6/2023 | Chaudhri et al. |
| 2023/0273690 A1 | 8/2023 | Foss et al. |
| 2023/0334432 A1 | 10/2023 | Chaudhri et al. |
| 2023/0362123 A1 | 11/2023 | Dye et al. |
| 2023/0393809 A1 | 12/2023 | Carrigan et al. |
| 2023/0409191 A1 | 12/2023 | Carrigan et al. |

FOREIGN PATENT DOCUMENTS

| | | |
|---|---|---|
| AU | 2012200689 A1 | 3/2012 |
| AU | 2014100584 A4 | 7/2014 |
| AU | 2016231505 A1 | 10/2016 |
| AU | 2018100429 A4 | 5/2018 |
| AU | 2018100429 B4 | 8/2018 |
| CN | 1207517 A | 2/1999 |
| CN | 1263425 A | 8/2000 |
| CN | 1274439 A | 11/2000 |
| CN | 1330310 A | 1/2002 |
| CN | 1341889 A | 3/2002 |
| CN | 1398366 A | 2/2003 |
| CN | 1549998 A | 11/2004 |
| CN | 1650251 A | 8/2005 |
| CN | 1668992 A | 9/2005 |
| CN | 1757011 A | 4/2006 |
| CN | 1797295 A | 7/2006 |
| CN | 1811899 A | 8/2006 |
| CN | 1863281 A | 11/2006 |
| CN | 101042300 A | 9/2007 |
| CN | 101059730 A | 10/2007 |
| CN | 101101595 A | 1/2008 |
| CN | 101107668 A | 1/2008 |
| CN | 101203821 A | 6/2008 |
| CN | 101232528 A | 7/2008 |
| CN | 101359291 A | 2/2009 |
| CN | 101398741 A | 4/2009 |
| CN | 101431545 A | 5/2009 |
| CN | 101446802 A | 6/2009 |
| CN | 100530059 C | 8/2009 |
| CN | 101529368 A | 9/2009 |
| CN | 101606123 A | 12/2009 |
| CN | 101611374 A | 12/2009 |
| CN | 101625620 A | 1/2010 |
| CN | 101634659 A | 1/2010 |
| CN | 101776968 A | 7/2010 |
| CN | 101861562 A | 10/2010 |
| CN | 101872240 A | 10/2010 |
| CN | 101876877 A | 11/2010 |
| CN | 101893992 A | 11/2010 |
| CN | 101976171 A | 2/2011 |
| CN | 102033710 A | 4/2011 |
| CN | 101241407 B | 7/2011 |
| CN | 102144213 A | 8/2011 |
| CN | 102252126 A | 11/2011 |
| CN | 102281294 A | 12/2011 |
| CN | 102301323 A | 12/2011 |
| CN | 102402328 A | 4/2012 |
| CN | 102479053 A | 5/2012 |
| CN | 102508707 A | 6/2012 |
| CN | 102591579 A | 7/2012 |
| CN | 102612679 A | 7/2012 |
| CN | 102725724 A | 10/2012 |
| CN | 102740146 A | 10/2012 |
| CN | 102750066 A | 10/2012 |
| CN | 102763066 A | 10/2012 |
| CN | 102812426 A | 12/2012 |
| CN | 102859482 A | 1/2013 |
| CN | 102890612 A | 1/2013 |
| CN | 102902453 A | 1/2013 |
| CN | 102902454 A | 1/2013 |
| CN | 102905181 A | 1/2013 |
| CN | 101034328 B | 2/2013 |
| CN | 102981727 A | 3/2013 |
| CN | 102981770 A | 3/2013 |
| CN | 103019083 A | 4/2013 |
| CN | 103034399 A | 4/2013 |
| CN | 103069378 A | 4/2013 |
| CN | 103154878 A | 6/2013 |
| CN | 202982930 U | 6/2013 |
| CN | 103212197 A | 7/2013 |
| CN | 103260079 A | 8/2013 |
| CN | 103270486 A | 8/2013 |
| CN | 103460164 A | 12/2013 |
| CN | 103593154 A | 2/2014 |
| CN | 103703437 A | 4/2014 |
| CN | 103782252 A | 5/2014 |
| CN | 103793138 A | 5/2014 |
| CN | 103858088 A | 6/2014 |
| CN | 103870255 A | 6/2014 |
| CN | 103914261 A | 7/2014 |
| CN | 103970413 A | 8/2014 |
| CN | 104106036 A | 10/2014 |
| CN | 104166458 A | 11/2014 |
| CN | 104508618 A | 4/2015 |
| CN | 105549947 A | 5/2016 |
| CN | 105794231 A | 7/2016 |
| CN | 105940678 A | 9/2016 |
| CN | 105955591 A | 9/2016 |
| CN | 106030700 A | 10/2016 |
| CN | 106062810 A | 10/2016 |
| CN | 106383645 A | 2/2017 |
| CN | 107710135 A | 2/2018 |
| CN | 107797655 A | 3/2018 |
| CN | 107797657 A | 3/2018 |
| CN | 104012150 B | 5/2018 |
| CN | 108139863 A | 6/2018 |
| CN | 108304106 A | 7/2018 |
| CN | 108334190 A | 7/2018 |
| CN | 108369455 A | 8/2018 |
| CN | 109314795 A | 2/2019 |
| CN | 109688442 A | 4/2019 |
| EP | 0459174 A2 | 12/1991 |
| EP | 0564247 A1 | 10/1993 |
| EP | 0684543 A1 | 11/1995 |
| EP | 0844555 A2 | 5/1998 |
| EP | 0871177 A2 | 10/1998 |
| EP | 0880091 A2 | 11/1998 |
| EP | 0881563 A2 | 12/1998 |
| EP | 1052566 A1 | 11/2000 |
| EP | 1133119 A2 | 9/2001 |
| EP | 1168149 A2 | 1/2002 |
| EP | 1186987 A2 | 3/2002 |
| EP | 1406158 A2 | 4/2004 |
| EP | 1469374 A1 | 10/2004 |
| EP | 1486860 A1 | 12/2004 |
| EP | 1505484 A1 | 2/2005 |
| EP | 1571538 A1 | 9/2005 |
| EP | 1615109 A2 | 1/2006 |
| EP | 1679879 A2 | 7/2006 |
| EP | 1847920 A2 | 10/2007 |
| EP | 1850213 A2 | 10/2007 |

(56) References Cited

FOREIGN PATENT DOCUMENTS

| | | |
|---|---|---|
| EP | 1942401 A1 | 7/2008 |
| EP | 1944677 A2 | 7/2008 |
| EP | 1956433 A1 | 8/2008 |
| EP | 1956446 A2 | 8/2008 |
| EP | 1959337 A2 | 8/2008 |
| EP | 2018032 A1 | 1/2009 |
| EP | 2124131 A2 | 11/2009 |
| EP | 2207084 A2 | 7/2010 |
| EP | 2224317 A1 | 9/2010 |
| EP | 2237140 A2 | 10/2010 |
| EP | 2284646 A1 | 2/2011 |
| EP | 2302492 A2 | 3/2011 |
| EP | 2302493 A2 | 3/2011 |
| EP | 2385451 A1 | 11/2011 |
| EP | 2409214 A1 | 1/2012 |
| EP | 2420925 A2 | 2/2012 |
| EP | 2547117 A1 | 1/2013 |
| EP | 2551784 A1 | 1/2013 |
| EP | 2610738 A2 | 7/2013 |
| EP | 2629291 A1 | 8/2013 |
| EP | 2693382 A2 | 2/2014 |
| EP | 2733579 A2 | 5/2014 |
| EP | 2733598 A2 | 5/2014 |
| EP | 2741176 A2 | 6/2014 |
| EP | 2750062 A2 | 7/2014 |
| EP | 2770673 A1 | 8/2014 |
| EP | 2993909 A1 | 3/2016 |
| EP | 3138300 A1 | 3/2017 |
| EP | 3163495 A1 | 5/2017 |
| EP | 3401770 A1 | 11/2018 |
| EP | 3410263 A1 | 12/2018 |
| GB | 2392773 A | 3/2004 |
| GB | 2402105 A | 12/2004 |
| GB | 2489580 A | 10/2012 |
| JP | 55-80084 A | 6/1980 |
| JP | 5-88812 A | 4/1993 |
| JP | 6-348408 A | 12/1994 |
| JP | 7-152478 A | 6/1995 |
| JP | 8-76926 A | 3/1996 |
| JP | 8-147138 A | 6/1996 |
| JP | 8-166783 A | 6/1996 |
| JP | 9-97154 A | 4/1997 |
| JP | 9-258947 A | 10/1997 |
| JP | 10-198517 A | 7/1998 |
| JP | 10-232757 A | 9/1998 |
| JP | 11-110106 A | 4/1999 |
| JP | 11-272391 A | 10/1999 |
| JP | 2000-503153 A | 3/2000 |
| JP | 2000-101879 A | 4/2000 |
| JP | 2000-105772 A | 4/2000 |
| JP | 2000-163193 A | 6/2000 |
| JP | 2000-231371 A | 8/2000 |
| JP | 2000-284879 A | 10/2000 |
| JP | 2000-305760 A | 11/2000 |
| JP | 2001-5445 A | 1/2001 |
| JP | 2001-100905 A | 4/2001 |
| JP | 2001-202170 A | 7/2001 |
| JP | 2001-202176 A | 7/2001 |
| JP | 2001-202178 A | 7/2001 |
| JP | 2001-202181 A | 7/2001 |
| JP | 2001-209827 A | 8/2001 |
| JP | 2001-306375 A | 11/2001 |
| JP | 2002-82745 A | 3/2002 |
| JP | 2002-175139 A | 6/2002 |
| JP | 2002-288690 A | 10/2002 |
| JP | 2003-43978 A | 2/2003 |
| JP | 2003-52019 A | 2/2003 |
| JP | 2003-62975 A | 3/2003 |
| JP | 2003-248544 A | 9/2003 |
| JP | 2003-256095 A | 9/2003 |
| JP | 2003-264621 A | 9/2003 |
| JP | 2003-330586 A | 11/2003 |
| JP | 2003-330613 A | 11/2003 |
| JP | 2003-330856 A | 11/2003 |
| JP | 2004-21522 A | 1/2004 |
| JP | 2004-38895 A | 2/2004 |
| JP | 2004-178584 A | 6/2004 |
| JP | 2004-184396 A | 7/2004 |
| JP | 2004-192573 A | 7/2004 |
| JP | 2004-259063 A | 9/2004 |
| JP | 2004-348601 A | 12/2004 |
| JP | 2005-4891 A | 1/2005 |
| JP | 2005-44036 A | 2/2005 |
| JP | 2005-507112 A | 3/2005 |
| JP | 2005-190108 A | 7/2005 |
| JP | 2005-196077 A | 7/2005 |
| JP | 2006-11690 A | 1/2006 |
| JP | 2006-140990 A | 6/2006 |
| JP | 2006-166248 A | 6/2006 |
| JP | 2006-185273 A | 7/2006 |
| JP | 2006-295753 A | 10/2006 |
| JP | 2007-512635 A | 5/2007 |
| JP | 2007-170995 A | 7/2007 |
| JP | 2007-179544 A | 7/2007 |
| JP | 2008-26439 A | 2/2008 |
| JP | 2008-97057 A | 4/2008 |
| JP | 2008-518539 A | 5/2008 |
| JP | 2008-157974 A | 7/2008 |
| JP | 2008-539513 A | 11/2008 |
| JP | 2009-17486 A | 1/2009 |
| JP | 2009-59382 A | 3/2009 |
| JP | 2009-510404 A | 3/2009 |
| JP | 2009-128296 A | 6/2009 |
| JP | 2009-246553 A | 10/2009 |
| JP | 2009-265793 A | 11/2009 |
| JP | 2009-294526 A | 12/2009 |
| JP | 2010-515978 A | 5/2010 |
| JP | 2010-257051 A | 11/2010 |
| JP | 2011-8540 A | 1/2011 |
| JP | 2011-90640 A | 5/2011 |
| JP | 2011-96043 A | 5/2011 |
| JP | 2011-530738 A | 12/2011 |
| JP | 2012-27797 A | 2/2012 |
| JP | 2012-58979 A | 3/2012 |
| JP | 2012-115519 A | 6/2012 |
| JP | 2012-155698 A | 8/2012 |
| JP | 2012-168620 A | 9/2012 |
| JP | 2012-252384 A | 12/2012 |
| JP | 2012-531607 A | 12/2012 |
| JP | 2013-3718 A | 1/2013 |
| JP | 2013-98613 A | 5/2013 |
| JP | 2013-114844 A | 6/2013 |
| JP | 2013-122738 A | 6/2013 |
| JP | 2013-137750 A | 7/2013 |
| JP | 2013-164700 A | 8/2013 |
| JP | 2013-168086 A | 8/2013 |
| JP | 2014-42164 A | 3/2014 |
| JP | 2016-538653 A | 12/2016 |
| JP | 2017-500656 A | 1/2017 |
| JP | 2017-516163 A | 6/2017 |
| JP | 2018-508076 A | 3/2018 |
| JP | 2018-508900 A | 3/2018 |
| JP | 2019-512814 A | 5/2019 |
| KR | 10-2003-0030384 A | 4/2003 |
| KR | 10-2004-0107472 A | 12/2004 |
| KR | 10-2005-0072071 A | 7/2005 |
| KR | 10-0630154 B1 | 9/2006 |
| KR | 10-2007-0024702 A | 3/2007 |
| KR | 10-2007-0101893 A | 10/2007 |
| KR | 10-2008-0095085 A | 10/2008 |
| KR | 10-2009-0125377 A | 12/2009 |
| KR | 10-2010-0003589 A | 1/2010 |
| KR | 10-2010-0036351 A | 4/2010 |
| KR | 10-0971452 B1 | 7/2010 |
| KR | 10-2010-0109277 A | 10/2010 |
| KR | 10-2011-0093090 A | 8/2011 |
| KR | 10-2011-0114294 A | 10/2011 |
| KR | 10-2012-0071468 A | 7/2012 |
| KR | 10-2012-0079707 A | 7/2012 |
| KR | 10-2013-0027017 A | 3/2013 |
| KR | 10-2013-0052751 A | 5/2013 |
| KR | 10-2015-0031010 A | 3/2015 |
| KR | 10-2015-0121177 A | 10/2015 |
| KR | 10-2015-0122810 A | 11/2015 |

(56) References Cited

FOREIGN PATENT DOCUMENTS

| | | |
|---|---|---|
| KR | 10-2016-0012008 A | 2/2016 |
| KR | 10-2016-0141847 A | 12/2016 |
| KR | 10-2017-0027999 A | 3/2017 |
| KR | 10-2011177 B1 | 8/2019 |
| TW | I269202 B | 12/2006 |
| TW | D122820 S | 5/2008 |
| TW | 200843452 A | 11/2008 |
| TW | 201119339 A | 6/2011 |
| TW | I349212 B | 9/2011 |
| TW | I381305 B | 1/2013 |
| TW | I384394 B | 2/2013 |
| TW | I394410 B1 | 4/2013 |
| TW | I395498 B | 5/2013 |
| TW | I405106 B | 8/2013 |
| TW | 201403363 A | 1/2014 |
| TW | I426416 B | 2/2014 |
| TW | 201421340 A | 6/2014 |
| TW | I443547 B | 7/2014 |
| WO | 1993/08517 A1 | 4/1993 |
| WO | 1996/19872 A1 | 6/1996 |
| WO | 2001/69369 A1 | 9/2001 |
| WO | 2003/021568 A1 | 3/2003 |
| WO | 2003/036457 A2 | 5/2003 |
| WO | 2003/062975 A1 | 7/2003 |
| WO | 2003/062976 A1 | 7/2003 |
| WO | 2005/055034 A1 | 6/2005 |
| WO | 2005/103863 A2 | 11/2005 |
| WO | 2006/020304 A2 | 2/2006 |
| WO | 2006/020305 A2 | 2/2006 |
| WO | 2006/037545 A2 | 4/2006 |
| WO | 2006/042309 A1 | 4/2006 |
| WO | 2006/094308 A2 | 9/2006 |
| WO | 2006/094308 A3 | 12/2006 |
| WO | 2008/027924 A2 | 3/2008 |
| WO | 2008/030779 A2 | 3/2008 |
| WO | 2008/030880 A1 | 3/2008 |
| WO | 2008/030976 A2 | 3/2008 |
| WO | 2008/033853 A2 | 3/2008 |
| WO | 2008/085742 A2 | 7/2008 |
| WO | 2008/085855 A1 | 7/2008 |
| WO | 2008/086218 A2 | 7/2008 |
| WO | 2008/099251 A1 | 8/2008 |
| WO | 2008/106777 A1 | 9/2008 |
| WO | 2009/005563 A1 | 1/2009 |
| WO | 2009/026508 A1 | 2/2009 |
| WO | 2009/067670 A1 | 5/2009 |
| WO | 2009/084368 A1 | 7/2009 |
| WO | 2009/085378 A1 | 7/2009 |
| WO | 2009/086599 A1 | 7/2009 |
| WO | 2009/097592 A1 | 8/2009 |
| WO | 2009/104064 A1 | 8/2009 |
| WO | 2009/114239 A1 | 9/2009 |
| WO | 2010/024969 A1 | 3/2010 |
| WO | 2010/087988 A1 | 8/2010 |
| WO | 2010/107661 A1 | 9/2010 |
| WO | 2010/150768 A1 | 12/2010 |
| WO | 2011/084859 A1 | 7/2011 |
| WO | 2011/126502 A1 | 10/2011 |
| WO | 2012/004288 A1 | 1/2012 |
| WO | 2012/006494 A1 | 1/2012 |
| WO | 2012/080020 A1 | 6/2012 |
| WO | 2012/104288 A1 | 8/2012 |
| WO | 2012/129359 A1 | 9/2012 |
| WO | 2012/166352 A1 | 12/2012 |
| WO | 2013/049346 A1 | 4/2013 |
| WO | 2013/051048 A1 | 4/2013 |
| WO | 2013/085580 A1 | 6/2013 |
| WO | 2013/105664 A1 | 7/2013 |
| WO | 2013/114844 A1 | 8/2013 |
| WO | 2013/133901 A2 | 9/2013 |
| WO | 2013/153405 A2 | 10/2013 |
| WO | 2013/169842 A2 | 11/2013 |
| WO | 2013/169846 A1 | 11/2013 |
| WO | 2013/169853 A1 | 11/2013 |
| WO | 2013/169875 A2 | 11/2013 |
| WO | 2014/030320 A1 | 2/2014 |
| WO | 2014/107469 A2 | 7/2014 |
| WO | 2014/151089 A1 | 9/2014 |
| WO | 2015/034969 A2 | 3/2015 |
| WO | 2015/057320 A1 | 4/2015 |
| WO | 2015/076930 A1 | 5/2015 |
| WO | 2015/124831 A1 | 8/2015 |
| WO | 2015/134692 A1 | 9/2015 |
| WO | 2016/033400 A1 | 3/2016 |
| WO | 2016/057117 A1 | 4/2016 |
| WO | 2016/141057 A1 | 9/2016 |
| WO | 2016/144385 A1 | 9/2016 |
| WO | 2016/144563 A1 | 9/2016 |
| WO | 2016/144696 A2 | 9/2016 |
| WO | 2016/144975 A2 | 9/2016 |
| WO | 2017/027625 A2 | 2/2017 |
| WO | 2017058442 A1 | 4/2017 |
| WO | 2017/218199 A1 | 12/2017 |
| WO | 2018048518 A1 | 3/2018 |
| WO | 2018048632 A1 | 3/2018 |
| WO | 2018/213401 A1 | 11/2018 |
| WO | 2018/213415 A1 | 11/2018 |

OTHER PUBLICATIONS

Applicant Initiated Interview Summary received for U.S. Appl. No. 17/901,559, mailed on Jun. 30, 2023, 4 pages.
Applicant-Initiated Interview Summary received for U.S. Appl. No. 17/306,354, mailed on Jun. 28, 2023, 3 pages.
Final Office Action received for U.S. Appl. No. 16/871,995, mailed on Jul. 3, 2023, 18 pages.
Non-Final Office Action received for U.S. Appl. No. 17/878,792, mailed on Jun. 23, 2023, 19 pages.
Notice of Acceptance received for Australian Patent Application No. 2021212114, mailed on Jul. 7, 2023, 3 pages.
Notice of Allowance received for U.S. Appl. No. 17/867,317, mailed on Jul. 6, 2023, 11 pages.
Notice of Hearing received for Indian Patent Application No. 201617008291, mailed on Jul. 4, 2023, 3 pages.
Applicant Initiated Interview Summary received for U.S. Appl. No. 16/871,995, mailed on Oct. 18, 2022, 4 pages.
Applicant-Initiated Interview Summary received for U.S. Appl. No. 15/818,500, mailed on Oct. 21, 2022, 4 pages.
Applicant-Initiated Interview Summary received for U.S. Appl. No. 16/703,486, mailed on Oct. 28, 2022, 5 pages.
Applicant-Initiated Interview Summary received for U.S. Appl. No. 17/212,850, mailed on Nov. 2, 2022, 5 pages.
Applicant-Initiated Interview Summary received for U.S. Appl. No. 17/314,948, mailed on Oct. 21, 2022, 6 pages.
Notice of Allowance received for U.S. Appl. No. 15/655,253, mailed on Oct. 19, 2022, 9 pages.
Notice of Allowance received for U.S. Appl. No. 16/888,775, mailed on Oct. 19, 2022, 6 pages.
Office Action received for Australian Patent Application No. 2021212114, mailed on Oct. 28, 2022, 3 pages.
Office Action received for Australian Patent Application No. 2021277718, mailed on Oct. 17, 2022, 4 pages.
Office Action received for Danish Patent Application No. PA202270464, mailed on Oct. 25, 2022, 9 pages.
Corrected Notice of Allowance received for U.S. Appl. No. 17/848,845, mailed on Aug. 9, 2023, 4 pages.
Extended European Search Report received for European Patent Application No. 23168537.1, mailed on Jul. 25, 2023, 13 pages.
Office Action received for Chinese Patent Application No. 202211502699.2, mailed on Jul. 1, 2023, 21 pages (9 pages of English Translation and 12 pages of Official Copy).
Summons to Attend Oral Proceedings received for European Patent Application No. 18733381.0, mailed on Jul. 25, 2023, 7 pages.
Applicant-Initiated Interview Summary received for U.S. Appl. No. 17/752,582, mailed on Apr. 17, 2023, 3 pages.
Corrected Notice of Allowance received for U.S. Appl. No. 16/922,675, mailed on Apr. 14, 2023, 6 pages.
Corrected Notice of Allowance received for U.S. Appl. No. 18/077,905, mailed on Apr. 10, 2023, 2 pages.

(56) References Cited

OTHER PUBLICATIONS

Corrected Notice of Allowance received for U.S. Appl. No. 18/077,905, mailed on Apr. 19, 2023, 2 pages.
Intention to Grant received for European Patent Application No. 18728002.9, mailed on Apr. 12, 2023, 9 pages.
International Preliminary Report on Patentability received for PCT Patent Application No. PCT/US2021/048358, mailed on Apr. 6, 2023, 15 pages.
Notice of Allowance received for U.S. Appl. No. 16/734,173, mailed on Apr. 11, 2023, 17 pages.
Office Action received for Japanese Patent Application No. 2022-045923, mailed on Apr. 3, 2023, 8 pages (4 pages of English Translation and 4 pages of Official Copy).
Applicant-Initiated Interview Summary received for U.S. Appl. No. 17/212,850, mailed on Jul. 17, 2023, 5 pages.
Corrected Notice of Allowance received for U.S. Appl. No. 17/752,582, mailed on Jul. 17, 2023, 3 pages.
Notice of Allowance received for Chinese Patent Application No. 201911288715.0, mailed on Jul. 12, 2023, 5 pages (1 page of English Translation and 4 pages of Official Copy).
Notice of Allowance received for U.S. Appl. No. 16/922,675, mailed on Jul. 19, 2023, 13 pages.
Notice of Allowance received for U.S. Appl. No. 17/306,354, mailed on Jul. 24, 2023, 7 pages.
Office Action received for Australian Patent Application No. 2022235609, mailed on Jul. 12, 2023, 4 pages.
Applicant-Initiated Interview Summary received for U.S. Appl. No. 14/913,349, mailed on Oct. 12, 2022, 2 pages.
Corrected Notice of Allowance received for U.S. Appl. No. 14/913,349, mailed on Oct. 3, 2022, 3 pages.
Non-Final Office Action received for U.S. Appl. No. 17/572,117, mailed on Oct. 6, 2022, 15 pages.
Notice of Allowance received for Korean Patent Application No. 10-2021-7039120, mailed on Sep. 22, 2022, 7 pages (2 pages of English Translation and 5 pages of Official Copy).
Record of Oral Hearing received for U.S. Appl. No. 14/913,349 mailed on Sep. 23, 2022, 12 pages.
Record of Oral Hearing received for U.S. Appl. No. 15/655,253, mailed on Sep. 26, 2022, 14 pages.
Advisory Action received for U.S. Appl. No. 14/752,776, mailed on Aug. 31, 2018, 3 pages.
Advisory Action received for U.S. Appl. No. 16/734,173, mailed on Oct. 14, 2021, 3 pages.
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Android 2.3.4 User's Guide, Online available at: https://static.googleusercontent.com/media/www.google.com/en//help/hc/pdfs/mobile/AndroidUsersGuide-2.3.4.pdf, May 20, 2011, 384 pages.
Applicant Initiated Interview Summary received for U.S. Appl. No. 16/265,938, mailed on Mar. 11, 2020, 5 pages.
Applicant-Initiated Interview Summary received for U.S. Appl. No. 16/265,938, mailed on May 28, 2020, 5 pages.
Applicant-Initiated Interview Summary received for U.S. Appl. No. 16/734,173, mailed on Sep. 9, 2021, 2 pages.
Applicant-Initiated Interview Summary received for U.S. Appl. No. 16/734,173, mailed on Sep. 27, 2021, 2 pages.
Applicant-Initiated Interview Summary received for U.S. Appl. No. 16/775,528, mailed on Aug. 30, 2021, 4 pages.
Applicant-Initiated Interview Summary received for U.S. Appl. No. 16/803,849, mailed on Oct. 12, 2021, 6 pages.
Applicant-Initiated Interview Summary received for U.S. Appl. No. 16/922,675, mailed on Sep. 3, 2021, 2 pages.
Applicant-Initiated Interview Summary received for U.S. Appl. No. 17/103,436, mailed on Sep. 22, 2021, 2 pages.
Board Opinion received for Chinese Patent Application No. 201910164962.3, mailed on Sep. 16, 2021, 16 pages (6 pages of English Translation and 10 pages of Official Copy).
Notice of Allowance received for U.S. Appl. No. 16/807,604, mailed on Oct. 4, 2021, 5 pages.
Notice of Allowance received for U.S. Appl. No. 16/807,604, mailed on Oct. 14, 2021, 3 pages.
Notice of Allowance received for U.S. Appl. No. 16/807,604, mailed on Oct. 22, 2021, 3 pages.
Notice of Allowance received for U.S. Appl. No. 16/836,571, mailed on Nov. 4, 2021, 4 pages.
Notice of Allowance received for U.S. Appl. No. 16/836,571, mailed on Oct. 12, 2021, 4 pages.
Decision to Grant received for Danish Patent Application No. PA201970259, mailed on Sep. 17, 2021, 2 pages.
Decision to Grant received for Danish Patent Application No. PA202070560, mailed on Oct. 21, 2021, 2 pages.
Decision to Grant received for European Patent Application No. 15739110.3, mailed on Sep. 19, 2019, 2 pages.
Examiner-Initiated Interview Summary received for U.S. Appl. No. 14/913,349, mailed on Sep. 22, 2021, 2 pages.
Examiner's Answer to Appeal Brief received for U.S. Appl. No. 14/913,349, mailed on Sep. 30, 2021, 23 pages.
Extended European Search Report for European Application No. 19185318.3, mailed on Nov. 20, 2019, 8 pages.
Final Office Action received for U.S. Appl. No. 14/752,776, mailed on May 29, 2018, 36 pages.
Final Office Action received for U.S. Appl. No. 16/265,938, mailed on Apr. 7, 2020, 45 pages.
Final Office Action received for U.S. Appl. No. 16/803,849, mailed on Nov. 2, 2021, 37 pages.
Intention to Grant received for European Patent Application No. 15739110.3, mailed on Sep. 11, 2019, 6 pages.
Intention to Grant received for European Patent Application No. 19207753.5, mailed on Sep. 3, 2021, 8 pages.
Jepson Tom, "How to auto-forward specific emails in gmail?", Available online at: http://www.tomjepson.co.uk/how-to-auto-forward-specific-emails-in-gmail/, May 19, 2013, 7 pages.
Lyons et al., "Facet: A Multi-Segment Wrist Worn System", Online available at: http://fetlab.io/publications/2012-Facet-a%20multi-segment%20wrist%20worn%20system.pdf, Oct. 7-10, 2012, pp. 123-129.
Netsapiens, "Click to Call in MS Outlook", Available online at: https://netsapiens.com/click-to-call-in-ms-outlook-windows-apps/, May 4, 2012, 8 pages.
Non-Final Office Action received for U.S. Appl. No. 14/752,776, mailed on Nov. 5, 2018, 48 pages.
Non-Final Office Action received for U.S. Appl. No. 16/265,938, mailed on Nov. 4, 2019, 28 pages.
Non-Final Office Action received for U.S. Appl. No. 16/734,173, mailed on Nov. 2, 2021, 13 pages.
Non-Final Office Action received for U.S. Appl. No. 16/775,528, mailed on Sep. 13, 2021, 14 pages.
Non-Final Office Action received for U.S. Appl. No. 17/103,436, mailed on Aug. 18, 2021, 16 pages.
Non-Final Office Action received for U.S. Appl. No. 17/212,850, mailed on Oct. 8, 2021, 14 pages.
Notice of Acceptance received for Australian Patent Application No. 2018204286, mailed on Feb. 27, 2020, 3 pages.
Notice of Acceptance received for Australian Patent Application No. 2020203919, mailed on Sep. 3, 2021, 3 pages.
Notice of Allowance received for Chinese Patent Application No. 201580029054.3, mailed on Jul. 19, 2019, 2 pages (1 page of English Translation and 1 page of Official Copy).
Notice of Allowance received for Korear Patent Application No. 10-2021-7005523, mailed on Aug. 26, 2021, 4 pages (1 pages of English Translation and 3 pages of Official Copy).
Notice of Allowance received for Taiwanese Patent Application No. 104107318, mailed on Oct. 19, 2021, 5 pages (2 pages of English Translation and 3 pages of Official Copy).
Notice of Allowance received for U.S. Appl. No. 16/265,938, mailed on Oct. 15, 2020, 8 pages.
Notice of Allowance received for U.S. Appl. No. 16/836,571, mailed on Sep. 8, 2021, 25 pages.
Notice of Allowance received for U.S. Appl. No. 16/922,675, mailed on Sep. 27, 2021, 10 pages.

(56) References Cited

OTHER PUBLICATIONS

Notice of Allowance received for U.S. Appl. No. 17/031,833, mailed on Sep. 20, 2021, 6 pages.
Office Action received for Australian Patent Application No. 2018204286, mailed on Apr. 17, 2019, 5 pages.
Office Action received for Australian Patent Application No. 2018204286, mailed on Nov. 12, 2019, 5 pages.
Office Action received for Australian Patent Application No. 2018204286, mailed on Sep. 5, 2019, 5 pages.
Office Action received for Australian Patent Application No. 2019337519, mailed on Oct. 8, 2021, 7 pages.
Office Action received for Australian Patent Application No. 2020203919, mailed on Dec. 23, 2020, 5 pages.
Office Action received for Australian Patent Application No. 2020203919, mailed on Jul. 19, 2021, 7 pages.
Office Action received for Australian Patent Application No. 2020203919, mailed on Mar. 30, 2021, 5 pages.
Office Action received for Australian Patent Application No. 2020203919, mailed on Oct. 19, 2020, 5 pages.
Office Action received for Chinese Patent Application No. 201580029054.3, mailed on Dec. 5, 2018, 12 pages (6 pages of English Translation and 6 pages of Official Copy).
Office Action received for European Patent Application No. 18733381.0, mailed on Oct. 29, 2021, 9 pages.
Office Action received for Indian Patent Application No. 202018012249, mailed on Nov. 1, 2021, 6 pages.
Office Action received for Japanese Patent Application No. 2021-510409, mailed on Oct. 8, 2021, 9 pages (5 pages of English Translation and 4 pages of Official Copy).
Remote Phone Call, Available online at: https://web.archive.org/web/20140625104844/https://www.justremotephone.com/, Jun. 25, 2014, 22 pages.
Search Report and Opinion received for Danish Patent Application No. PA202170320, mailed on Oct. 6, 2021, 9 pages.
Summons to Attend Oral Proceedings received for European Patent Application No. 15739109.5, mailed on Aug. 23, 2018, 9 pages.
Summons to Attend Oral Proceedings received for European Patent Application No. 15739109.5, mailed on Oct. 4, 2018, 3 pages.
Summons to Attend Oral Proceedings received for European Patent Application No. 15739110.3, mailed on Aug. 23, 2018, 10 pages.
Summons to Attend Oral Proceedings received for European Patent Application No. 15739110.3, mailed on Oct. 2, 2018, 3 pages.
Summons to Attend Oral Proceedings received for European Patent Application No. 16190252.3, mailed on Jan. 8, 2019, 3 pages.
Summons to Attend Oral Proceedings received for European Patent Application No. 16190252.3, mailed on Oct. 30, 2018, 13 pages.
Office Action received for Australian Patent Application No. 2022218540, mailed on Aug. 3, 2023, 5 pages.
Office Action received for Australian Patent Application No. 2022241590, mailed on Aug. 15, 2023, 6 pages.
Applicant-Initiated Interview Summary received for U.S. Appl. No. 16/734,173, mailed on Nov. 22, 2022, 4 pages.
Decision to Grant received for Danish Patent Application No. PA202170320, mailed on Nov. 10, 2022, 2 pages.
Office Action received for Australian Patent Application No. 2022241590, mailed on Nov. 18, 2022, 8 pages.
Applicant-Initiated Interview Summary received for U.S. Appl. No. 16/871,995, mailed on May 2, 2023, 4 pages.
Corrected Notice of Allowance received for U.S. Appl. No. 18/077,905, mailed on Apr. 26, 2023, 3 pages.
Final Office Action received for U.S. Appl. No. 17/747,804, mailed on Apr. 28, 2023, 17 pages.
Office Action received for Chinese Patent Application No. 201911127810.2, mailed on Feb. 23, 2023, 12 pages (4 pages of English Translation and 8 pages of Official Copy).
Office Action received for Chinese Patent Application No. 201911129908.1, mailed on Mar. 1, 2023, 17 pages (7 pages of English Translation and 10 pages of Official Copy).
Office Action received for European Patent Application No. 19156614.0, mailed on Apr. 24, 2023, 10 pages.

Advisory Action received for U.S. Appl. No. 15/818,500, mailed on Feb. 18, 2022, 4 pages.
Advisory Action received for U.S. Appl. No. 16/734,173, mailed on Apr. 4, 2022, 5 pages.
Applicant Initiated Interview Summary received for U.S. Appl. No. 16/871,995, mailed on Dec. 6, 2021, 4 pages.
Applicant Initiated Interview Summary received for U.S. Appl. No. 16/917,659, mailed on Jan. 28, 2022, 2 pages.
Applicant-Initiated Interview Summary received for U.S. Appl. No. 15/818,500, mailed on Jan. 24, 2022, 4 pages.
Applicant-Initiated Interview Summary received for U.S. Appl. No. 16/734,173, mailed on Jan. 25, 2022, 4 pages.
Applicant-Initiated Interview Summary received for U.S. Appl. No. 16/734,173, mailed on Mar. 21, 2022, 3 pages.
Applicant-Initiated Interview Summary received for U.S. Appl. No. 16/775,528, mailed on Jan. 13, 2022, 4 pages.
Applicant-Initiated Interview Summary received for U.S. Appl. No. 16/803,849, mailed on Feb. 28, 2022, 9 pages.
Applicant-Initiated Interview Summary received for U.S. Appl. No. 16/871,995, mailed on Apr. 5, 2022, 5 pages.
Applicant-Initiated Interview Summary received for U.S. Appl. No. 16/926,512, mailed on Apr. 21, 2022, 4 pages.
Applicant-Initiated Interview Summary received for U.S. Appl. No. 17/168,069, mailed on Nov. 17, 2021, 2 pages.
Applicant-Initiated Interview Summary received for U.S. Appl. No. 17/212,850, mailed on Jan. 13, 2022, 5 pages.
Applicant-Initiated Interview Summary received for U.S. Appl. No. 17/461,103, mailed on Jan. 26, 2022, 6 pages.
Boxer David, "Change the permissions of the Google Drive file or folder or Share the file or folder", Blake School Website Online Available at: https://support.blakeschool.org/hc/en-us/articles/231790648-Change-the-permlsslons-of-the-Google-Drive-file-or-folder-or-Share-the-flle-or-folder, October 31, 2016, 2 pages.
Computer ADV.,"Sonos App Navigation & Menu on iPhone", Available online at: https://www.youtube.com/watch?v=Jh29XvWQ204, Aug. 4, 2015, 1 page.
Corrected Notice of Altowance received for U.S. Appl.n No. 16/775,528, mailed on Mar. 25, 2022, 2 pages.
Corrected Notice of Altowance received for U.S. Appl. No. 16/836,571, mailed on Dec. 6, 2021, 5 pages.
Corrected Notice of Altowance received for U.S. Appl. No. 16/836,571, mailed on Mar. 25, 2022, 2 pages.
Corrected Notice of Altowance received for U.S. Appl. No. 16/836,571, mailed on Nov. 18, 2021, 3 pages.
Corrected Notice of Altowance received for U.S. Appl. No. 16/922,675, mailed on Mar. 4, 2022, 6 pages.
Corrected Notice of Altowance received for U.S. Appl. No. 17/103,436, mailed on Dec. 22, 2021, 2 pages.
Corrected Notice of Altowance received for U.S. Appl. No. 17/168,069, mailed on Feb. 9, 2022, 2 pages.
Corrected Notice of Altowance received for U.S. Appl. No. 17/378,451, mailed on May 4, 2022, 2 pages.
Corrected Notice of Altowance received for U.S. Appl. No. 17/461,103, mailed on Apr. 14, 2022, 2 pages.
Decision on Appeal received for Korean Patent Application No. 10-2018-7003388, mailed on Oct. 27, 2021, 34 pages (4 pages of English Translation and 30 pages of Official Copy).
Decision on Appeal received for U.S. Appl. No. 14/913,349, mailed on Apr. 20, 2022, 13 pages
Decision to Grant received for European Patent Application No. 18197583.0, mailed on Feb. 3, 2022, 3 pages.
Decision to Grant received for European Patent Application No. 19185318.3, mailed on Mar. 31, 2022, 3 pages.
Examiner's Answer to Appeal Brief received for U.S. Appl. No. 15/655,253, mailed on Mar. 10, 2022, 16 pages.
Extended European Search Report received for European Patent Application No. 21197457.1, mailed on Nov. 15, 2021, 8 pages.
Final Office Action received for U.S. Appl. No. 15/818,500, mailed on Nov. 30, 2021, 14 pages.
Final Office Action received for U.S. Appl. No. 16/734,173, mailed on Feb. 22, 2022, 16 pages.

(56) References Cited

OTHER PUBLICATIONS

Howcast, "How to Create and Edit Playlists on iPhone", YouTube, Available online at: https://www.youtube.com/watch?v=YPOnKUvcso4, Mar. 13, 2014, 3 pages.
Intention to Grant received for European Patent Application No. 18197583.0, mailed on Jan. 17, 2022, 9 pages.
Intention to Grant received for European Patent Application No. 19185318.3, mailed on Dec. 10, 2021, 12 pages.
Intention to Grant received for European Patent Application No. 19207753.5, mailed on Jan. 28, 2022, 8 pages.
International Preliminary Report on Patentability received for PCT Patent Application No. PCT/US2020/035446, mailed on Dec. 9, 2021, 14 pages.
International Preliminary Report on Patentability received for PCT Patent Application No. PCT/US2020/035488, mailed on Dec. 9, 2021, 16 pages.
International Search Report and Written Opinion received for PCT Patent Application No. PCT/US2021/048358, mailed on Feb. 24, 2022, 21 pages.
Invitation to Pay Additional Fees received for PCT Patent Application No. PCT/US2021/048358, mailed on Dec. 23, 2021, 14 pages.
Non-Final Office Action received for U.S. Appl. No. 16/703,486, mailed on Jan. 27, 2022, 13 pages.
Non-Final Office Action received for U.S. Appl. No. 16/871,995, mailed on Feb. 1, 2022, 18 pages.
Non-Final Office Action received for U.S. Appl. No. 16/917,659, mailed on Jan. 14, 2022, 10 pages.
Non-Final Office Action received for U.S. Appl. No. 16/926,512, mailed on Jan. 21, 2022, 20 pages.
Non-Final Office Action received for U.S. Appl. No. 17/168,069, mailed on Jul. 21, 2021, 17 pages.
Non-Final Office Action received for U.S. Appl. No. 17/176,908, mailed on Feb. 24, 2022, 28 pages.
Non-Final Office Action received for U.S. Appl. No. 17/461,103, mailed on Nov. 22, 2021, 15 pages.
Noriega, Josh, "How to Store and Listen to Music Directly from Your Android Wear Smartwatch", Guiding Tech, Available online at: https://www.guidingtech.com/55254/listen-music-android-wear-smartwatch, Jan. 15, 2016, 16 pages.
Notice of Acceptance received for Australian Patent Application No. 2019337519, mailed on Dec. 15, 2021, 3 pages.
Notice of Acceptance received for Australian Patent Application No. 2020282362, mailed on Jan. 4, 2022, 3 pages.
Notice of Acceptance received for Australian Patent Application No. 2021204454, mailed on Feb. 25, 2022, 3 pages.
Notice of Allowance received for Chinese Patent Application No. 202010125114.4, mailed on Nov. 24, 2021, 2 pages (1 page of English Translation and 1 page of Official Copy).
Notice of Allowance received for Chinese Patent Application No. 202110396782.5, mailed on Mar. 30, 2022, 5 pages (1 page of English Translation and 4 pages of Official Copy).
Notice of Allowance received for Japanese Patent Application No. 2019-088503, mailed on Feb. 18, 2022, 4 pages (1 page of English Translation and 3 pages of Official Copy).
Notice of Allowance received for Japanese Patent Application No. 2021-563716, mailed on Mar. 14, 2022, 4 pages (1 page of English Translation and 3 pages of Official Copy).
Notice of Allowance received for Korean Patent Application No. 10-2021-7035472, mailed on Nov. 23, 2021, 4 pages (2 pages of English Translation and 2 pages of Official Copy).
Notice of Allowance received for U.S. Appl. No. 17/378,451, mailed on Apr. 4, 2022, 8 pages.
Notice of Allowance received for U.S. Appl. No. 16/775,528, mailed on Feb. 24, 2022, 18 pages.
Notice of Allowance received for U.S. Appl. No. 16/836,571, mailed on Feb. 14, 2022, 31 pages.
Notice of Allowance received for U.S. Appl. No. 16/888,775, mailed on Jan. 12, 2022, 5 pages.
Notice of Allowance received for U.S. Appl. No. 16/922,675, mailed on Feb. 10, 2022, 8 pages.
Notice of Allowance received for U.S. Appl. No. 17/103,436, mailed on Dec. 8, 2021, 12 pages.
Notice of Allowance received for U.S. Appl. No. 17/168,069, mailed on Jan. 19, 2022, 12 pages.
Notice of Allowance received for U.S. Appl. No. 17/168,069, mailed on Mar. 22, 2022, 5 pages.
Notice of Allowance received for U.S. Appl. No. 17/461,103, mailed on Mar. 17, 2022, 10 pages.
Office Action received for Australian Patent Application No. 2020282362, mailed on Nov. 25, 2021, 3 pages.
Office Action received for Australian Patent Application No. 2021201748, mailed on Mar. 18, 2022, 6 pages.
Office Action received for Australian Patent Application No. 2021201780, mailed on Mar. 22, 2022, 3 pages.
Office Action received for Australian Patent Application No. 2021203669, mailed on Apr. 5, 2022, 3 pages.
Office Action received for Australian Patent Application No. 2022202044, mailed on Apr. 6, 2022, 3 pages.
Office Action received for Chinese Patent Application No. 201910438645.6, mailed on Mar. 2, 2022, 11 pages (5 pages of English Translation and 6 pages of Official Copy).
Office Action received for Chinese Patent Application No. 201910446753.8, mailed on Mar. 2, 2022, 11 pages (5 pages of English Translation and 6 pages of Official Copy).
Office Action received for Chinese Patent Application No. 201910447678.7, mailed on Mar. 21, 2022, 14 pages (6 pages of English Translation and 8 pages of Official Copy).
Office Action received for Chinese Patent Application No. 201910447678.7, mailed on Nov. 29, 2021, 17 pages (7 pages of English Translation and 10 pages of Official Copy).
Office Action received for Chinese Patent Application No. 202110396782.5, mailed on Nov. 11, 2021, 10 pages (4 pages of English Translation and 6 pages of Official Copy).
Office Action received for European Patent Application No. 19217240.1, mailed on Dec. 17, 2021, 8 pages.
Office Action received for Indian Patent Application No. 202018011347, mailed on Mar. 2, 2022, 6 pages.
Office Action received for Indian Patent Application No. 202018014953, vMar. 7, 2022, 7 pages.
Office Action received for Indian Patent Application No. 202018015998, mailed on Nov. 17, 2021, 6 pages.
Office Action received for Indian Patent Application No. 202018016000, mailed on Nov. 16, 2021, 6 pages.
Office Action received for Japanese Patent Application No. 2019-116590, mailed on Feb. 4, 2022, 17 pages (8 pages of English Translation and 9 pages of Official Copy).
Office Action received for Japanese Patent Application No. 2021-510409, mailed on Apr. 8, 2022, 5 pages (2 pages of English Translation and 3 pages of Official Copy).
Office Action received for Korean Patent Application No. 10-2021-7001482, mailed on Jan. 24, 2022, 9 pages (4 pages of English Translation and 5 pages of Official Copy).
Office Action received for Korean Patent Application No. 10-2021-7001918, mailed on Nov. 16, 2021, 12 pages (5 pages of English Translation and 7 pages of Official Copy).
Office Action received for Korean Patent Application No. 10-2021-7017259, mailed on Jan. 10, 2022, 6 pages (3 pages of English Translation and 3 pages of Official Copy).
Office Action received for Korean Patent Application No. 10-2021-7017259, mailed on Mar. 3, 2022, 8 pages (4 pages of English Translation and 4 pages of Official Copy).
Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.
Sandrahoutz, "How Do I Delete a Playlist From a Synced Ipod but Not Remove it From the Library in itunes", Apple Communities Website, Available online at: https://discussions.apple.com/thread/7503609, Mar. 23, 2016, 2 pages.

(56) References Cited

OTHER PUBLICATIONS

Sharepoint at Rackspace, "Sharepoint 2013: How to Edit a List or Library Using Quick Edit", Available online at: https://www.youtube.com/watch?v=foZXcFC1k80, Oct. 10, 2014, 1 page.
Summons to Attend Oral Proceedings received for European Patent Application 20158824.1, mailed on Dec. 7, 2021, 6 pages.
Supertunetv,"Ipod Nano 6G—Sync Selected Playlist iTunes", YouTube, Available online at: https://www.youtube.com/watch?v=xU3rYRabt_I, Sep. 10, 2012, 3 pages.
Supplemental Notice of Allowance received for U.S. Appl. No. 17/168,069, mailed on Apr. 20, 2022, 2 pages.
Supplemental Notice of Allowance received for U.S. Appl. No. 17/168,069, mailed on Feb. 2, 2022, 2 pages.
Whitwam, Ryan, "How to Sync and Play Music on Your Android Wear Watch", Available online at: https://www.greenbot.com/article/2997520/how-to-sync-and-play-music-on-your-android-wear-watch.html, Nov. 2, 2015, 4 pages.
Applicant-Initiated Interview Summary received for U.S. Appl. No. 17/747,804, mailed on Mar. 17, 2023, 4 pages.
Non-Final Office Action received for U.S. Appl. No. 17/835,110, mailed on Apr. 3, 2023, 28 pages.
Non-Final Office Action received for U.S. Appl. No. 18/077,971, mailed on Apr. 3, 2023, 24 pages.
Notice of Allowance received for U.S. Appl. No. 16/922,675, mailed on Mar. 22, 2023, 8 pages.
Notice of Allowance received for U.S. Appl. No. 17/572,117, mailed on Apr. 4, 2023, 9 pages.
Notice of Allowance received for U.S. Appl. No. 18/077,905, mailed on Mar. 24, 2023, 18 pages.
Office Action received for Australian Patent Application No. 2022241590, mailed on Mar. 17, 2023, 5 pages.
Office Action received for Chinese Patent Application No. 201811539259.8, mailed on Mar. 13, 2023, 16 pages (8 pages of English Translation and 8 pages of Official Copy).
Supplemental Notice of Allowance received for U.S. Appl. No. 15/818,500, mailed on Mar. 24, 2023, 2 pages.
Corrected Notice of Allowance received for U.S. Appl. No. 17/378,451, mailed on Aug. 12, 2022, 2 pages.
Intention to Grant received for European Patent Application No. 20158824.1, mailed on Aug. 11, 2022, 10 pages.
Notice of Acceptance received for Australian Patent Application No. 2021201780, mailed on Aug. 2, 2022, 3 pages.
Notice of Acceptance received for Australian Patent Application No. 2022202044, mailed on Aug. 4, 2022, 3 pages.
Office Action received for Japanese Patent Application No. 2021-111630, mailed on Aug. 5, 2022, 8 pages (4 pages of English Translation and 4 pages of Official Copy).
Supplemental Notice of Allowance received for U.S. Appl. No. 16/926,512, mailed on Aug. 8, 2022, 3 pages.
Advisory Action received for U.S. Appl. No. 16/734,173, mailed on Mar. 13, 2023, 6 pages.
Applicant-Initiated Interview Summary received for U.S. Appl. No. 16/734,173, mailed on Mar. 3, 2023, 4 pages.
Final Office Action received for U.S. Appl. No. 17/314,948, mailed on Mar. 7, 2023, 31 pages.
Intention to Grant received for Danish Patent Application No. PA202270464, mailed on Feb. 20, 2023, 2 pages.
Non-Final Office Action received for U.S. Appl. No. 17/752,582, mailed on Mar. 6, 2023, 17 pages.
Notice of Acceptance received for Australian Patent Application No. 2021277718, mailed on Mar. 3, 2023, 3 pages.
Notice of Acceptance received for Australian Patent Application No. 2022200901, mailed on Mar. 9, 2023, 3 pages.
Office Action received for Chinese Patent Application No. 201911022448.2, mailed on Jan. 28, 2023, 16 pages (7 pages of English Translation and 9 pages of Official Copy).
Office Action received for European Patent Application No. 20760624.5, mailed on Mar. 7, 2023, 13 pages.
Office Action received for Indian Patent Application No. 202018015999, mailed on Feb. 21, 2023, 8 pages.
Philips Support Website, "How to switch to preferred audio language in Philips TV from a broadcast with multiple languages audio stream?", Available Online at: https://www.usa.philips.com/c-f/XC000010105/how-to-switch-to-preferred-audio-language-in-philips-tv-from-a-broadcast-with-multiple-languages-audio-stream, Dec. 29, 2016, 5 pages.
Notice of Acceptance received for Australian Patent Application No. 2021201748, mailed on Jun. 23, 2022, 3 pages.
Notice of Allowance received for Chinese Patent Application No. 201910447678.7, mailed on Jun. 20, 2022, 2 pages (1 page of English Translation and 1 page of Official Copy).
Notice of Allowance received for U.S. Appl. No. 17/461,103, mailed on Jun. 20, 2022, 6 pages.
Office Action received for European Patent Application No. 20158824.1, mailed on Jun. 13, 2022, 5 pages.
Applicant-Initiated Interview Summary received for U.S. Appl. No. 17/747,804, mailed on May 31, 2023, 4 pages.
Applicant-Initiated Interview Summary received for U.S. Appl. No. 17/867,317, mailed on May 30, 2023, 4 pages.
Mitroff, Sarah, "8 things you should know about Apple Music for Android", CNET website, downloaded from https://www.cnet.com/tech/services-and-software/apple-music-for-android-what-to-know/, Nov. 11, 2015, 4 pages.
Non-Final Office Action received for U.S. Appl. No. 17/306,354, mailed on Jun. 2, 2023, 21 pages.
Non-Final Office Action received for U.S. Appl. No. 17/901,559, mailed on May 22, 2023, 25 pages.
Notice of Allowance received for U.S. Appl. No. 17/848,845, mailed on May 24, 2023, 26 pages.
Ochs, Susie, "Getting Started with Apple Music: 12 Things to Do First", Macworld website, downloaded from https://www.macworld.com/article/225812/getting-started-with-apple-music-12-things-to-do-first.html, Jun. 30, 2015, 12 pages.
Office Action received for Chinese Patent Application No. 201811539259.8, mailed on May 24, 2023, 22 pages (2 pages of English Translation and 20 pages of Official Copy).
Office Action received for European Patent Application No. 21197457.1, mailed on May 30, 2023, 8 pages.
Applicant-Initiated Interview Summary received for U.S. Appl. No. 16/703,486, mailed on May 12, 2022, 4 pages.
Corrected Notice of Allowance received for U.S. Appl. No. 17/461,103, mailed on May 10, 2022, 2 pages.
Notice of Allowance received for U.S. Appl. No. 16/803,849, mailed on May 17, 2022, 12 pages.
Notice of Allowance received for U.S. Appl. No. 16/926,512, mailed on May 18, 2022, 9 pages.
Office Action received for Danish Patent Application No. PA202170320, mailed on May 3, 2022, 3 pages.
Office Action received for Korean Patent Application No. 10-2021-7001918, mailed on Apr. 28, 2022, 7 pages (3 pages of English Translation and 4 pages of Official Copy).
Decision to Grant received for European Patent Application No. 20158824.1, mailed on Dec. 15, 2022, 3 pages.
Final Office Action received for U.S. Appl. No. 17/572,117, mailed on Dec. 22, 2022, 16 pages.
Invitation to Pay Search Fees received for European Patent Application No. 20760624.5, mailed on Jan. 2, 2023, 3 pages.
Minutes of Oral Proceedings received for European Patent Application No. 18728002.9, mailed on Dec. 22, 2022, 7 pages.
Notice of Acceptance received for Australian Patent Application No. 2022200515, mailed on Dec. 21, 2022, 3 pages.
Notice of Allowance received for U.S. Appl. No. 17/902,191, mailed on Jan. 3, 2023, 8 pages.
Office Action received for Australian Patent Application No. 2022200901, mailed on Dec. 19, 2022, 4 pages.
Office Action received for Danish Patent Application No. PA202270464, mailed on Dec. 20, 2022, 3 pages.
Supplemental Notice of Allowance received for U.S. Appl. No. 16/917,659, mailed on Dec. 21, 2022, 3 pages.
Extended European Search Report received for European Patent Application No. 22157106.0, mailed on Jun. 27, 2022, 8 pages.
Final Office Action received for U.S. Appl. No. 16/871,995, mailed on Jul. 5, 2022, 17 pages.

(56) References Cited

OTHER PUBLICATIONS

Corrected Notice of Allowance received for U.S. Appl. No. 18/077,905, mailed on May 4, 2023, 2 pages.
Decision to Grant received for Danish Patent Application No. PA202270464, mailed on May 9, 2023, 1 page.
Final Office Action received for U.S. Appl. No. 17/212,850, mailed on May 9, 2023, 15 pages.
Office Action received for Korean Patent Application No. 10-2022-7045500, mailed on Apr. 24, 2023, 9 pages (4 pages of English Translation and 5 pages of Official copy).
Corrected Notice of Allowance received for U.S. Appl. No. 17/461,103, mailed on Aug. 3, 2022, 2 pages.
Decision on Appeal received for Korean Patent Application No. 10-2021-7001482, mailed on Jul. 20, 2022, 27 pages (1 page of English Translation and 26 pages of Official Copy).
Intention to Grant received for Danish Patent Application No. PA202170320, mailed on Jul. 27, 2022, 2 pages.
Non-Final Office Action received for U.S. Appl. No. 15/818,500, mailed on Jul. 27, 2022, 15 pages.
Non-Final Office Action received for U.S. Appl. No. 17/314,948, mailed on Aug. 1, 2022, 33 pages.
Notice of Allowance received for Japanese Patent Application No. 2019-116590, mailed on Jul. 25, 2022, 15 pages (1 page of English Translation and 14 pages of Official Copy).
Notice of Allowance received for Japanese Patent Application No. 2022-079682, mailed on Jul. 15, 2022, 4 pages (1 page of English Translation and 3 pages of Official Copy).
Office Action received for Australian Patent Application No. 2021212114, mailed on Jul. 29, 2022, 7 pages.
Farmboyreef, "Apple watch controlling your tv", Available online at: https://www.youtube.com/watch?v=xaJPG0Wm3Tg, Jun. 23, 2015, 3 pages.
Gil Lory, "How to control Apple TV with your Apple Watch", Available online at: https://www.imore.com/how-control-your-apple-tv-remote-app%ADapple-watch], Jun. 6, 2016, 24 pages.
Hobbyistsoftwareltd,"VLC Remote", Online available at: https://watchaware.com/watch-apps/297244048, 2016, 7 pages.
Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Nikolov Anton, "Design principle: Consistency", Available online at: https://uxdesign.cc/design-principle-consistency-6b0cf7e7339f, Apr. 8, 2017, 9 pages.
Ojeda-Zapata Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
Pairing Your Apple Watch With Your AppleTV, Available online at: https://www.youtube.com/watch?v=C4t8YFSJ-UY, Apr. 27, 2015, 3 pages.
Singh Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Whitney Lance, "How to Listen to Music on Your Apple Watch", Available Online at: https://medium.com/pcmag-access/how-to-listen-to-music-on-your-apple-watch-f48a6c20dd52# :~: text=On%20your%20iPhone%2C%20go%20to,.%E2%80%9D%20Tap%20on%20Add%20Music., Mar. 2, 2018, 13 pages.
Decision on Appeal received for U.S. Appl. No. 15/655,253, mailed on Sep. 22, 2022, 12 pages.
Non-Final Office Action received for U.S. Appl. No. 16/734,173, mailed on Sep. 23, 2022, 17 pages.
Non-Final Office Action received for U.S. Appl. No. 17/212,850, mailed on Sep. 21, 2022, 13 pages.
Notice of Allowance received for Japanese Patent Application No. 2021-510409, mailed on Sep. 12, 2022, 4 pages (1 page of English Translation and 3 pages of Official Copy).
Notice of Hearing received for Indian Patent Application No. 201617008296, mailed on Sep. 11, 2022, 3 pages.
Office Action received for European Patent Application No. 19173371.6, mailed on Sep. 13, 2022, 16 pages.
Office Action received for European Patent Application No. 19173886.3, mailed on Sep. 13, 2022, 13 pages.
Office Action received for European Patent Application No. 20190670.8, mailed on Sep. 14, 2022, 6 pages.
Accepted Outlook Meetings Move to Deleted Folder, Available online at: https://social.technet.microsoft.com/Forums/office/en-US/f3301c9a-a93f-49f7-be13-c642e285f150/accepted-outlook-meetings-move-to-deleted-folder?forum=outlook, Jan. 13, 2011, 4 pages.
Advisory Action received for U.S. Appl. No. 10/308,315, mailed on Jul. 10, 2006, 3 pages.
Advisory Action received for U.S. Appl. No. 12/395,537, mailed on Apr. 26, 2012, 4 pages.
Advisory Action received for U.S. Appl. No. 12/566,673, mailed on Jun. 12, 2013, 3 pages.
Advisory Action received for U.S. Appl. No. 14/641,308, mailed on Nov. 14, 2019, 4 pages.
Advisory Action received for U.S. Appl. No. 14/839,912, mailed on Nov. 14, 2019, 6 pages.
Advisory Action received for U.S. Appl. No. 14/841,646, mailed on Nov. 21, 2018, 5 pages.
Advisory Action received for U.S. Appl. No. 14/913,349, mailed on Oct. 29, 2019, 4 pages.
Advisory Action received for U.S. Appl. No. 15/049,052, mailed on Sep. 11, 2017, 2 pages.
Advisory Action received for U.S. Appl. No. 15/049,058, mailed on Oct. 18, 2017, 3 pages.
Advisory Action received for U.S. Appl. No. 15/049,064, mailed on May 10, 2017, 3 pages.
Advisory Action received for U.S. Appl. No. 15/655,253, mailed on May 11, 2021, 6 pages.
Advisory Action received for U.S. Appl. No. 15/730,610, mailed on Oct. 24, 2019, 5 pages.
Advisory Action received for U.S. Appl. No. 16/144,950, mailed on Feb. 20, 2020, 5 pages.
Advisory Action received for U.S. Appl. No. 16/147,413, mailed on Nov. 25, 2019, 2019, 6 pages.
Advisory Action received for U.S. Appl. No. 16/583,989, mailed on Sep. 22, 2020, 5 pages.
Agarwal Deepesh, "DexClock—Live Clock and Date Blended Into Beautiful Artwork As Your Desktop Wallpaper", available at: https://www.megaleecher.net/DexCiock_Wallpaper_Designs, Jul. 6, 2013, 4 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.
Android Central, "Gmail on iOS versus Android", Online Available at: https://www.youtube.com/watch?v=w2aVeZLxU5Q&t=80s, Nov. 2, 2011, 3 pages.
Appeal Brief received for U.S. Appl. No. 11/522,167 dated Nov. 23, 2010, 65 pages.
Apple, "iPhone User's Guide", Available at: http://mesnotices.20minutes.fr/manuel-notice-mode-emploi/APPLE/IPHONE%2D%5FE#, Jun. 2007, 137 pages.
Apple, "iPhone User's Guide", iPhone first generation, Available at: http://pocketpccentral.net/iphone/products/1 g_iphone.htm, Jun. 29, 2007, 124 pages.
Applicant-Initiated Interview Summary received for U.S. Appl. No. 14/641,308, mailed on Oct. 10, 2019, 5 pages.
Applicant-Initiated Interview Summary received for U.S. Appl. No. 14/913,345, mailed on Nov. 4, 2019, 5 pages.
Applicant-Initiated Interview Summary received for U.S. Appl. No. 14/913,349, mailed on Oct. 7, 2019, 4 pages.
Applicant-Initiated Interview Summary received for U.S. Appl. No. 15/655,253, mailed on Mar. 29, 2021, 4 pages.
Applicant-Initiated Interview Summary received for U.S. Appl. No. 15/655,253, mailed on Mar. 31, 2020, 5 pages.
Applicant-Initiated Interview Summary received for U.S. Appl. No. 15/655,253, mailed on Nov. 12, 2019, 3 pages.

(56) References Cited

OTHER PUBLICATIONS

Applicant-Initiated Interview Summary received for U.S. Appl. No. 15/655,253, mailed on Nov. 30, 2020, 5 pages.
Applicant-Initiated Interview Summary received for U.S. Appl. No. 15/730,610, mailed on Aug. 25, 2020, 6 pages.
Applicant-Initiated Interview Summary received for U.S. Appl. No. 15/818,500, mailed on Aug. 9, 2021, 6 pages.
Applicant-Initiated Interview Summary received for U.S. Appl. No. 15/818,500, mailed on Jan. 30, 2020, 5 pages.
Applicant-Initiated Interview Summary received for U.S. Appl. No. 15/818,500, mailed on Oct. 13, 2020, 4 pages.
Applicant-Initiated Interview Summary received for U.S. Appl. No. 15/910,263, mailed on Nov. 18, 2020, 6 pages.
Applicant-Initiated Interview Summary received for U.S. Appl. No. 15/930,300, mailed on Oct. 27, 2020, 3 pages.
Applicant-Initiated Interview Summary received for U.S. Appl. No. 16/144,950, mailed on Jan. 29, 2020, 5 pages.
Applicant-Initiated Interview Summary received for U.S. Appl. No. 16/147,413, mailed on Jun. 2, 2020, 4 pages.
Applicant-Initiated Interview Summary received for U.S. Appl. No. 16/147,413, mailed on Oct. 28, 2019, 5 pages.
Applicant-Initiated Interview Summary received for U.S. Appl. No. 16/263,280, mailed on Apr. 26, 2021, 2 pages.
Applicant-Initiated Interview Summary received for U.S. Appl. No. 16/263,280, mailed on Nov. 25, 2020, 3 pages.
Applicant-Initiated Interview Summary received for U.S. Appl. No. 16/358,483, mailed on Sep. 28, 2020, 6 pages.
Applicant-Initiated Interview Summary received for U.S. Appl. No. 16/384,726, mailed on Nov. 5, 2020, 3 pages.
Applicant-Initiated Interview Summary received for U.S. Appl. No. 16/525,082, mailed on Jul. 28, 2020, 4 pages.
Applicant-Initiated Interview Summary received for U.S. Appl. No. 16/583,989, mailed on Aug. 3, 2020, 6 pages.
Applicant-Initiated Interview Summary received for U.S. Appl. No. 16/583,989, mailed on Mar. 25, 2020, 4 pages.
Applicant-Initiated Interview Summary received for U.S. Appl. No. 16/584,490, mailed on Jan. 31, 2020, 4 pages.
Applicant-Initiated Interview Summary received for U.S. Appl. No. 16/584,490, mailed on Jul. 28, 2020, 4 pages.
Applicant-Initiated Interview Summary received for U.S. Appl. No. 16/702,968, mailed on Jul. 1, 2020, 5 pages.
Applicant-Initiated Interview Summary received for U.S. Appl. No. 16/702,968, mailed on Sep. 28, 2020, 6 pages.
Applicant-Initiated Interview Summary received for U.S. Appl. No. 16/723,583, mailed on Dec. 28, 2020, 6 pages.
Applicant-Initiated Interview Summary received for U.S. Appl. No. 16/734,173, mailed on Feb. 25, 2021, 3 pages.
Applicant-Initiated Interview Summary received for U.S. Appl. No. 16/775,528, mailed on Feb. 23, 2021, 4 pages.
Applicant-Initiated Interview Summary received for U.S. Appl. No. 16/803,849, mailed on Aug. 21, 2020, 5 pages.
Applicant-Initiated Interview Summary received for U.S. Appl. No. 16/803,849, mailed on Dec. 21, 2020, 5 pages.
Applicant-Initiated Interview Summary received for U.S. Appl. No. 16/807,604, mailed on Dec. 21, 2020, 7 pages.
Applicant-Initiated Interview Summary received for U.S. Appl. No. 16/807,604, mailed on Jul. 24, 2020, 5 pages.
Applicant-Initiated Interview Summary received for U.S. Appl. No. 16/836,571, mailed on Jul. 7, 2021, 6 pages.
Applicant-Initiated Interview Summary received for U.S. Appl. No. 16/871,995, mailed on Jul. 16, 2021, 4 pages.
Applicant-Initiated Interview Summary received for U.S. Appl. No. 16/922,675, mailed on Dec. 16, 2020, 3 pages.
Applicant-Initiated Interview Summary received for U.S. Appl. No. 16/922,675, mailed on Nov. 2, 2020, 3 pages.
Applicant-Initiated Interview Summary received for U.S. Appl. No. 17/031,833, mailed on Dec. 21, 2020, 5 pages.
Applicant-Initiated Interview Summary received for U.S. Appl. No. 17/031,833, mailed on May 24, 2021, 6 pages.
Applicant-Initiated Interview Summary received for U.S. Appl. No. 14/839,912, mailed on Nov. 5, 2019, 5 pages. ASKABOUTTECH, "How to Change Android Smartwatch Wallpaper", Online Available at: https://www.youtube.com/watch?v=SBYrsyuHqBA Year: 2014, Jul. 12, 2014, 5 pages.
Askabouttech, "How to Change Android Smartwatch Wallpaper", Online Available at: https://www.youtube.com/watch?v=SBYrsyuHqBA (Year: 2014), Jul. 12, 2014, 5 pages.
Board Decision received for Chinese Patent Application No. 201580046339.8, mailed on Jun. 22, 2021, 12 pages.
Board Opinion received for Chinese Patent Application No. 201580046339.8, mailed on Mar. 19, 2021, 11 pages.
Bove Tony, "iPod & iTunes For Dummies", Wiley Publishing, Inc, 6th Edition, 2008, pp. 143-182.
Brief Communication Regarding Oral Proceedings received for European Patent Application No. 18197583.0, mailed on Feb. 18, 2021, 2 pages.
Brinkmann Martin, "How To Zoom In Firefox", Ghacks, Available at: https://web.archive.org/web/20130804034728/https://www.ghacks.net/2009/02/23/how-to-zoom-in-firefox/, Feb. 23, 2009, 11 pages.
Butler Travis, "Portable MP3: The Nomad Jukebox", Available at: http://tidbits.com/article/6261, Jan. 8, 2001, 4 pages.
Call Me, "Samsung R3 speaker gives you a delicious 360-degree sound experience—with Wi-Fi and Bluetooth | Call me", 0:24 / 3:22, Available Online at: https://www.youtube.com/watch?v=4Uv_sOhrIro, Sep. 22, 2016, 3 pages.
Clock & Calendar for SmartWatch 2, available at: https://www.youtube.com/watch?v=Uj-K2vMnrj8, Nov. 20, 2013, 2 pages.
Colt Sam, "Here's One Way Apple's Smartwatch Could Be Better Than Anything Else", Business Insider, Aug. 21, 2014, pp. 1-4.
Corrected Notice of Allowance received for U.S. Appl. No. 14/641,308, mailed on Aug. 28, 2018, 2 pages.
Notice of Allowance received for U.S. Appl. No. 14/641,308, mailed on Jul. 9, 2018, 25 pages.
Notice of Allowance received for U.S. Appl. No. 14/641,308, mailed on May 10, 2018, 10 pages.
Notice of received for U.S. Appl. No. 14/641,308, mailed on Mar. 10, 2020, 4 pages.
Corrected Notice of Allowance received for U.S. Appl. No. 14/829,573, mailed on Aug. 9, 2018, 3 pages.
Corrected Notice of Allowance received for U.S. Appl. No. 14/829,573, mailed on Sep. 11, 2018, 3 pages.
Corrected Notice of Allowance received for U.S. Appl. No. 14/830,629, mailed on Feb. 13, 2019, 3 pages.
Corrected Notice of Allowance received for U.S. Appl. No. 14/841,656, mailed on Apr. 11, 2018, 2 pages.
Corrected Notice of Allowance received for U.S. Appl. No. 14/841,656, mailed on May 7, 2018, 14 pages.
Corrected Notice of Allowance received for U.S. Appl. No. 14/913,345, mailed on Apr. 13, 2020, 4 pages.
Corrected Notice of Allowance received for U.S. Appl. No. 15/730,610, mailed on Nov. 27, 2020, 3 pages.
Corrected Notice of Allowance received for U.S. Appl. No. 15/910,263, mailed on Feb. 10, 2021, 3 pages.
Corrected Notice of Allowance received for U.S. Appl. No. 15/910,263, mailed on Mar. 17, 2021, 3 pages.
Corrected Notice of Allowance received for U.S. Appl. No. 15/910,263, mailed on Mar. 18, 2021, 3 pages.
Corrected Notice of Allowance received for U.S. Appl. No. 15/927,768, mailed on Aug. 7, 2019, 2 pages.
Corrected Notice of Allowance received for U.S. Appl. No. 15/927,768, mailed on Jul. 9, 2019, 2 pages.
Corrected Notice of Allowance received for U.S. Appl. No. 15/930,300, mailed on Dec. 24, 2020, 3 pages.
Corrected Notice of Allowance received for U.S. Appl. No. 16/055,489, mailed on Feb. 26, 2019, 2 pages.
Corrected Notice of Allowance received for U.S. Appl. No. 16/109,120, mailed on Nov. 12, 2019, 2 pages.
Corrected Notice of Allowance received for U.S. Appl. No. 16/147,413, mailed on Jan. 8, 2021, 7 pages.
Corrected Notice of Allowance received for U.S. Appl. No. 16/147,413, mailed on Nov. 25, 2020, 7 pages.

(56) References Cited

OTHER PUBLICATIONS

Notice of Allowance received for U.S. Appl. No. 16/263,280, mailed on Aug. 5, 2021, 4 pages.
Notice of Allowance received for U.S. Appl. No. 16/358,483, mailed on Feb. 12, 2021, 4 pages.
Notice of Allowance received for U.S. Appl. No. 16/384,726, mailed on Apr. 2, 2021, 2 pages.
Notice of Allowance received for U.S. Appl. No. 16/702,968, mailed on Jun. 8, 2021, 3 pages.
Notice of Allowance received for U.S. Appl. No. 16/702,968, mailed on Jun. 16, 2021, 4 pages.
Notice of Allowance received for U.S. Appl. No. 16/702,968, mailed on Jun. 28, 2021, 4 pages.
Notice of Allowance received for U.S. Appl. No. 16/702,968, mailed on May 26, 2021, 4 pages.
Notice of Allowance received for U.S. Appl. No. 16/702,968, mailed on May 28, 2021, 4 pages.
Notice of Allowance received for U.S. Appl. No. 16/807,604, mailed on Jul. 26, 2021, 3 pages.
Notice of Allowance received for U.S. Appl. No. 16/807,604, mailed on Jun. 28, 2021, 3 pages.
Notice of Allowance received for U.S. Appl. No. 16/807,604, mailed on May 28, 2021, 3 pages.
Notice of Allowance received for U.S. Appl. No. 17/031,833, mailed on Aug. 2, 2021, 3 pages.
Crutnacker, "Amazon Echo Tips and Tricks: Playing Music Demonstration", Available Online at: https://www.youtube.com/watch?v=W_bqq2ynUII, Nov. 4, 2015, 1 page.
Notifications and Content on Your Galaxy Phone's Lock Screen, Online Available at: https://www.samsung.com/us/support/answer/ANS00062636, Oct. 4, 2017, 5 pages.
Decision of Appeal received for Korean Patent Application No. 10-2019-7028736, mailed on May 24, 2021, 16 pages.
Decision on Appeal received for Korean Patent Application No. 10-2016-7008449, mailed on Jul. 30, 2019, 29 pages.
Decision on Appeal received for Korean Patent Application No. 10-2016-7008474, mailed on Jan. 29, 2020, 21 pages.
Decision on Appeal received for Korean Patent Application No. 10-2016-7008488, mailed on Oct. 18, 2019, 33 pages.
Decision on Appeal received for Korean Patent Application No. 10-2018-7010872, mailed on Jan. 20, 2020, 20 pages.
Decision on Appeal received for U.S. Appl. No. 12/566,673, mailed on Dec. 18, 2019, 10 pages.
Decision to Grant received for Danish Patent Application No. PA201570781, mailed on Jul. 17, 2017, 2 pages.
Decision to Grant received for Danish Patent Application No. PA201670117, mailed on Nov. 20, 2017, 2 pages.
Decision to Grant received for Danish Patent Application No. PA201770181, mailed on Mar. 7, 2018, 2 pages.
Decision to Grant received for Danish Patent Application No. PA201770392, mailed on Oct. 24, 2018, 2 pages.
Decision to Grant received for Danish Patent Application No. PA201770401, mailed on Oct. 24, 2018, 2 pages.
Decision to Grant received for Danish Patent Application No. PA201770403, mailed on Oct. 24, 2018, 2 pages.
Decision to Grant received for Danish Patent Application No. PA201770404, mailed on Nov. 11, 2019, 3 pages.
Decision to Grant received for Danish Patent Application No. PA201770406, mailed on May 15, 2020, 2 pages.
Decision to Grant received for Danish Patent Application No. PA201770794, mailed on Nov. 11, 2019, 2 pages.
Decision to Grant received for Danish Patent Application No. PA201870631, mailed on May 15, 2019, 2 pages.
Decision to Grant received for Danish Patent Application No. PA201870632, mailed on May 14, 2019, 2 pages.
Decision to Grant received for European Patent Application No. 10712824.1, mailed on May 17, 2018, 3 pages.
Decision to Grant received for European Patent Application No. 12181537.7, mailed on Mar. 3, 2016, 2 pages.
Decision to Grant received for European Patent Application No. 14772001.5, mailed on Dec. 5, 2019, 2 pages.
Decision to Grant received for European Patent Application No. 14772002.3, mailed on Feb. 20, 2020, 2 pages.
Decision to Grant received for European Patent Application No. 14772494.2, mailed on Jul. 23, 2020, 2 pages.
Decision to Grant received for European Patent Application No. 15782209.9, mailed on Feb. 14, 2019, 2 pages.
Decision to Grant received for European Patent Application No. 18157131.6, mailed on May 16, 2019, 2 pages.
Decision to Grant received for European Patent Application No. 18197589.7, mailed on Jun. 10, 2021, 2 pages.
Decision to Grant received for European Patent Application No. 19199004.3, mailed on Jan. 21, 2021, 2 pages.
Decision to Grant received for Japanese Patent Application No. 2014-017726, mailed on Dec. 7, 2015, 6 pages.
Decision to Refuse received for European Patent Application No. 07842262.3, mailed on Dec. 21, 2018, 8 pages.
Decision to Refuse received for European Patent Application No. 10177096.4, mailed on Feb. 13, 2019, 4 pages.
Detroitborg, "Apple Music: Walkthrough", YouTube Video, online available at: "https://www.youtube.com/watch?v=NLgjodiAtbQ", Jun. 30, 2015, 1 page.
Dewsbery Victor, "Designing for Small Screens", AVA Publishing, 2005, 27 pages.
Digital Video Editor, IBM Technical Disclosure Bulletin, vol. 35, No. 2, ip.com Journal, IP.COM Inc., West Henrietta XP013097273, Jul. 1, 1992, 6 pages.
Ellis Benus, "Use a Phone No. in the Google Calendar Where Line for One Click Calling", Available online at: https://ellisbenus.com/ellis-benus/use-a-phone-number-in-the- google-calender-where-line-for-one-click-calling, Ellis Benus-Small Business Web Guru, Oct. 3, 2012, 2 pages.
Enright Andrewc, "Dissatisfaction Sows Innovation", Available at: http://web.archive.org/web/20051225123312/http://thetreehouseandthecave.blogspot.com/2004/12/dissatisfaction-sows-innovation.html, Dec. 29, 2004, 6 pages.
Enright Andrewc, "Meet Cover Flow", Available online at: http://web.archive.org/web/20060111073239/thetreehouseandthecave.blogspot.com/2005/08/meet-coverflow.html, Aug. 13, 2005, 2 pages.
Enright Andrewc, "Visual Browsing on an iBook Ds", Available online at: http://web.archive.org/web/20060111175609/thetreehouseandthecave.blogspot.com/2004/12/visual-browsing-on-i book-ds.html, Dec. 29, 2004, 2 page.
European Search Report received for European Patent Application No. 19173371.6, mailed on Oct. 30, 2019, 7 pages.
European Search Report received for European Patent Application No. 19173886.3, mailed on Oct. 30, 2019, 8 pages.
European Search Report received for European Patent Application No. 19199004.3, mailed on Nov. 12, 2019, 6 pages.
European Search Report received for European Patent Application No. 19206249.5, mailed on Dec. 19, 2019, 4 pages.
European Search Report received for European Patent Application No. 20217518.8, mailed on Apr. 16, 2021, 4 pages.
Examiner-Initiated Interview Summary received for U.S. Appl. No. 14/913,349, mailed on Oct. 27, 2020, 3 pages.
Examiner's Answer to Appeal Brief received for U.S. Appl. No. 11/522,167 mailed on Feb. 15, 2011, 13 pages.
Examiner's Answer to Appeal Brief received for U.S. Appl. No. 12/566,673, mailed on Nov. 17, 2017, 10 pages.
Extended European Search Report for European Application No. 10177099.8, mailed on Oct. 18, 2010, 7 pages.
Extended European Search Report includes Partial European Search Report and European Search Opinion) received for European Patent Application No. 12181537.7, mailed on Mar. 27, 2014, 7 pages.
Extended European Search Report includes Partial European Search Report and European Search Opinion) received for European Patent Application No. 13184872.3, mailed on Dec. 5, 2013, 9 pages.
Extended European Search Report includes Partial European Search Report and European Search Opinion) received for European Patent Application No. 16190252.3, mailed on Mar. 1, 2017, 10 pages.
Extended European Search Report received for European Patent Application No. 10177096.4, mailed on Oct. 18, 2010, 9 pages.

(56) References Cited

OTHER PUBLICATIONS

Extended European Search Report received for European Patent Application No. 18197583.0, mailed on Jun. 4, 2019, 20 pages.
Extended European Search Report received for European Patent Application No. 18197589.7, mailed on Jan. 7, 2019, 9 pages.
Extended European Search Report received for European Patent Application No. 19156614.0, mailed on May 28, 2019, 9 pages.
Extended European Search Report received for European Patent Application No. 19195247.2, mailed on Mar. 9, 2020, 7 pages.
Extended European Search Report received for European Patent Application No. 19207753.5, mailed on Dec. 18, 2019, 9 pages.
Extended European Search Report received for European Patent Application No. 19217240.1, mailed on May 25, 2020, 7 pages.
Extended European Search Report received for European Patent Application No. 20158824.1, mailed on Aug. 10, 2020, 13 pages.
Extended European Search Report received for European Patent Application No. 20190670.8, mailed on Nov. 2, 2020, 10 pages.
Feng Lipeng, "Bound for computer lovers", Dec. 31, 2009, 2 pages.
Final Office Action received for U.S. Appl. No. 13/038,276, mailed on Mar. 27, 2014, 24 pages.
Final Office Action received for U.S. Appl. No. 13/038,276, mailed on Mar. 11, 2016, 36 pages.
Final Office Action received for U.S. Appl. No. 09/293,507, mailed on Apr. 24, 2002, 12 pages.
Final Office Action received for U.S. Appl. No. 09/293,507, mailed on Feb. 14, 2001, 10 pages.
Final Office Action received for U.S. Appl. No. 10/308,315, mailed on Apr. 6, 2005, 10 pages.
Final Office Action received for U.S. Appl. No. 10/308,315, mailed on Mar. 9, 2006, 10 pages.
Final Office Action received for U.S. Appl. No. 10/308,315, mailed on Mar. 23, 2007, 12 pages.
Final Office Action received for U.S. Appl. No. 11/459,591, mailed on Jan. 13, 2009, 11 pages.
Final Office Action received for U.S. Appl. No. 11/522,167, mailed on Aug. 5, 2009, 9 pages.
Final Office Action received for U.S. Appl. No. 11/522,167, mailed on Jul. 23, 2010, 11 pages.
Final Office Action received for U.S. Appl. No. 11/522,167, mailed on Jun. 3, 2013, 18 pages.
Final Office Action received for U.S. Appl. No. 11/522,167, mailed on Oct. 15, 2008, 10 pages.
Final Office Action received for U.S. Appl. No. 11/767,409, mailed on Jul. 17, 2012, 24 pages.
Final Office Action received for U.S. Appl. No. 11/767,409, mailed on Mar. 16, 2011, 16 pages.
Final Office Action received for U.S. Appl. No. 11/983,059, mailed on Jun. 6, 2011, 11 pages.
Final Office Action received for U.S. Appl. No. 12/215,651, mailed on Jul. 6, 2012, 27 pages.
Final Office Action received for U.S. Appl. No. 12/395,537, mailed on Feb. 3, 2012, 15 pages.
Final Office Action received for U.S. Appl. No. 12/395,537, mailed on Jun. 29, 2015, 17 pages.
Final Office Action received for U.S. Appl. No. 12/395,537, mailed on Nov. 14, 2013, 22 pages.
Final Office Action received for U.S. Appl. No. 12/395,541, mailed on Dec. 28, 2011, 16 pages.
Final Office Action received for U.S. Appl. No. 12/566,669, mailed on Nov. 23, 2012, 29 pages.
Final Office Action received for U.S. Appl. No. 12/566,671, mailed on Dec. 20, 2012, 20 pages.
Final Office Action received for U.S. Appl. No. 12/566,673, mailed on Aug. 12, 2016, 28 pages.
Final Office Action received for U.S. Appl. No. 12/566,673, mailed on Jan. 17, 2013, 22 pages.
Final Office Action received for U.S. Appl. No. 12/566,673, mailed on Mar. 25, 2014, 19 pages.
Final Office Action received for U.S. Appl. No. 13/333,890, mailed on Feb. 13, 2014, 19 pages.
Final Office Action received for U.S. Appl. No. 13/333,890, mailed on Oct. 2, 2015, 21 pages.
Final Office Action received for U.S. Appl. No. 13/333,900, mailed on Dec. 19, 2014, 15 pages.
Final Office Action received for U.S. Appl. No. 13/333,900, mailed on Nov. 7, 2013, 14 pages.
Final Office Action received for U.S. Appl. No. 13/489,245, mailed on Mar. 28, 2014, 23 pages.
Final Office Action received for U.S. Appl. No. 13/489,245, mailed on Oct. 16, 2019, 25 pages.
Final Office Action received for U.S. Appl. No. 13/489,245, mailed on Sep. 27, 2018, 25 pages.
Final Office Action received for U.S. Appl. No. 14/045,544, mailed on May 6, 2016, 26 pages.
Final Office Action received for U.S. Appl. No. 14/641,308, mailed on Jul. 1, 2019, 46 pages.
Final Office Action received for U.S. Appl. No. 14/641,308, mailed on Mar. 14, 2018, 42 pages.
Final Office Action received for U.S. Appl. No. 14/830,629, mailed on Apr. 16, 2018, 27 pages.
Final Office Action received for U.S. Appl. No. 14/841,646, mailed on Aug. 2, 2018, 22 pages.
Final Office Action received for U.S. Appl. No. 14/913,345, mailed on Oct. 26, 2018, 20 pages.
Final Office Action received for U.S. Appl. No. 14/913,349, mailed on Jul. 22, 2019, 20 pages.
Final Office Action received for U.S. Appl. No. 14/913,349, mailed on Jul. 30, 2018, 18 pages.
Final Office Action received for U.S. Appl. No. 14/913,349, mailed on Oct. 30, 2020, 33 pages.
Final Office Action received for U.S. Appl. No. 15/049,049 mailed on Jul. 12, 2018, 24 pages.
Final Office Action received for U.S. Appl. No. 15/049,049, mailed on May 23, 2017, 23 pages.
Final Office Action received for U.S. Appl. No. 15/049,052, mailed on Mar. 1, 2018, 15 pages.
Final Office Action received for U.S. Appl. No. 15/049,052, mailed on May 17, 2017, 13 pages.
Final Office Action received for U.S. Appl. No. 15/049,052, mailed on Oct. 2, 2018, 16 pages.
Final Office Action received for U.S. Appl. No. 15/049,058, mailed on Aug. 8, 2018, 23 pages.
Final Office Action received for U.S. Appl. No. 15/049,058, mailed on May 8, 2017, 21 pages.
Final Office Action received for U.S. Appl. No. 15/049,064, mailed on Feb. 27, 2017, 13 pages.
Final Office Action received for U.S. Appl. No. 15/655,253, mailed on Feb. 4, 2020, 20 pages.
Final Office Action received for U.S. Appl. No. 15/655,253, mailed on Feb. 9, 2021, 16 pages.
Final Office Action received for U.S. Appl. No. 15/730,610, mailed on Aug. 6, 2019, 28 pages.
Final Office Action received for U.S. Appl. No. 15/818,500, mailed on Apr. 6, 2020, 15 pages.
Final Office Action received for U.S. Appl. No. 15/910,263, mailed on Aug. 28, 2019, 32 pages.
Final Office Action received for U.S. Appl. No. 16/144,950, mailed on Nov. 25, 2019, 24 pages.
Final Office Action received for U.S. Appl. No. 16/147,413, mailed on Sep. 3, 2019, 19 pages.
Final Office Action received for U.S. Appl. No. 16/263,280, mailed on Mar. 4, 2021, 13 pages.
Final Office Action received for U.S. Appl. No. 16/583,989, mailed on Jul. 10, 2020, 23 pages.
Final Office Action received for U.S. Appl. No. 16/584,490, mailed on May 1, 2020, 48 pages.
Final Office Action received for U.S. Appl. No. 16/702,968, mailed on Jul. 27, 2020, 21 pages.
Final Office Action received for U.S. Appl. No. 16/723,583, mailed on Feb. 5, 2021, 15 pages.
Final Office Action received for U.S. Appl. No. 16/734,173, mailed on Jul. 13, 2021, 12 pages.

(56) References Cited

OTHER PUBLICATIONS

Final Office Action received for U.S. Appl. No. 16/775,528, mailed on May 25, 2021, 15 pages.
Final Office Action received for U.S. Appl. No. 16/803,849, mailed on Sep. 24, 2020, 29 pages.
Final Office Action received for U.S. Appl. No. 16/807,604, mailed on Aug. 19, 2020, 35 pages.
Final Office Action received for U.S. Appl. No. 16/871,995, mailed on Aug. 20, 2021, 25 pages.
Final Office Action received for U.S. Appl. No. 16/922,675, mailed on Dec. 3, 2020, 21 pages.
Final Office Action received for U.S. Appl. No. 16/922,675, mailed on Nov. 30, 2020, 12 pages.
Final Office Action received for U.S. Appl. No. 17/031,833, mailed on Jan. 26, 2021, 17 pages.
Final Office Action received for U.S. Appl. No. 14/839,912, mailed on Jul. 30, 2019, 42 pages.
Final Office Action received for U.S. Appl. No. 14/839,912, mailed on Sep. 13, 2018, 31 pages.
Final Office Action received in U.S. Appl. No. 12/547,401, mailed on Jun. 28, 2010, 19 pages.
FTScroller v0.2.2, Online available at https://github.com/ftlabs/ftscroller/tree/v0.2.2, Mar. 18, 2013, 9 pages.
Google, "Google Home Help, Listen to music", Datasheet [online], Available Online at: https://web.archive.org/web/20170326051235/https:/support.google.com/googlehome/answer/7030379?hl=en&ref_topic=7030084, Mar. 26, 2017, 3 pages.
Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
Headset Button Controller v7.3 APK Full APP Download for Android, Blackberry, iPhone, Available online at: http://fullappdownload.com/headset-button-controller-v7-3-apk/, Jan. 27, 2014, 11 pages.
Hoffberger Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
Intention to Grant received for Danish Patent Application No. PA201570781, mailed on Dec. 8, 2016, 2 pages.
Intention to Grant received for Danish Patent Application No. PA201670117, mailed on Apr. 21, 2017, 2 pages.
Intention to Grant received for Danish Patent Application No. PA201770392, mailed on Aug. 31, 2018, 2 pages.
Intention to Grant received for Danish Patent Application No. PA201770392, mailed on Jul. 2, 2018, 2 pages.
Intention to Grant received for Danish Patent Application No. PA201770401, mailed on Jun. 14, 2018, 2 pages.
Intention to Grant received for Danish Patent Application No. PA201770401, mailed on Sep. 17, 2018, 2 pages.
Intention to Grant received for Danish Patent Application No. PA201770403, mailed on May 7, 2018, 2 pages.
Intention to Grant received for Danish Patent Application No. PA201770403, mailed on Oct. 3, 2018, 2 pages.
Intention to Grant received for Danish Patent Application No. PA201770404, mailed on Sep. 23, 2019, 3 pages.
Intention to Grant received for Danish Patent Application No. PA201770406, mailed on Feb. 6, 2020, 3 pages.
Intention to Grant received for Danish Patent Application No. PA201770408, mailed on Nov. 30, 2018, 3 pages.
Intention to Grant received for Danish Patent Application No. PA201770794, mailed on Aug. 15, 2019, 2 pages.
Intention to Grant received for Danish Patent Application No. PA201870631, mailed on Apr. 5, 2019, 2 pages.
Intention to Grant received for Danish Patent Application No. PA201870632, mailed on Apr. 5, 2019, 2 pages.
Intention to Grant received for Danish Patent Application No. PA201970259, mailed on Mar. 23, 2021, 2 pages.
Intention to Grant received for Danish Patent Application No. PA202070560, mailed on Apr. 26, 2021, 2 pages.
Intention to Grant received for European Patent Application No. 10712824.1, mailed on Jan. 5, 2018, 9 pages.
Intention to Grant Received for European Patent Application No. 12181537.7, mailed on Sep. 22, 2015, 7 pages.
Intention to Grant received for European Patent Application No. 13184872.3, mailed on Feb. 11, 2019, 7 pages.
Intention to Grant received for European Patent Application No. 14772001.5, mailed on Jul. 18, 2019, 16 pages.
Intention to Grant received for European Patent Application No. 14772001.5, mailed on Mar. 22, 2019, 17 pages.
Intention to Grant received for European Patent Application No. 14772002.3, mailed on Jun. 24, 2019, 9 pages.
Intention to Grant received for European Patent Application No. 14772002.3, mailed on Nov. 6, 2019, 9 pages.
Intention to Grant received for European Patent Application No. 14772494.2, mailed on Mar. 16, 2020, 10 pages.
Intention to Grant received for European Patent Application No. 15739110.3, mailed on Mar. 7, 2019, 8 pages.
Intention to Grant received for European Patent Application No. 15782209.9, mailed on Sep. 28, 2018, 8 pages.
Intention to Grant received for European Patent Application No. 18157131.6, mailed on Jan. 9, 2019, 9 pages.
Intention to Grant received for European Patent Application No. 18197583.0, mailed on Jul. 23, 2021, 9 pages.
Intention to Grant received for European Patent Application No. 18197589.7, mailed on Jan. 21, 2021, 8 pages.
Intention to Grant received for European Patent Application No. 19199004.3, mailed on Sep. 14, 2020, 9 pages.
Intention to Grant received for Indian Patent Application No. 201617009216, mailed on Aug. 27, 2020, 2 pages.
Preliminary Report on Patentability received for PCT Patent Application No. PCT/US00/010441, mailed on Feb. 14, 2001, 3 pages.
Preliminary Report on Patentability received for PCT Patent Application No. PCT/US2006/062714, mailed on Jul. 8, 2008, 6 pages.
Preliminary Report on Patentability received for PCT Patent Application No. PCT/US2007/078180, mailed on Mar. 17, 2009, 6 pages.
Preliminary Report on Patentability received for PCT Patent Application No. PCT/US2010/027088, mailed on Sep. 29, 2011, 7 pages.
Preliminary Report on Patentability received for PCT Patent Application No. PCT/US2012/025519, mailed on Sep. 12, 2013, 6 pages.
Preliminary Report on Patentability received for PCT Patent Application No. PCT/US2014/053951, mailed on Mar. 17, 2016, 9 pages.
Preliminary Report on Patentability received for PCT Patent Application No. PCT/US2014/053957, mailed on Mar. 17, 2016, 8 pages.
Preliminary Report on Patentability received for PCT Patent Application No. PCT/US2014/053958, mailed on Mar. 17, 2016, 8 pages.
Preliminary Report on Patentability received for PCT Patent Application No. PCT/US2014/053961, mailed on Jul. 21, 2016, 24 pages.
Preliminary Report on Patentability received for PCT Patent Application No. PCT/US2015/019322, mailed on Mar. 16, 2017, 11 pages.
Preliminary Report on Patentability received for PCT Patent Application No. PCT/US2015/038173, mailed on Jan. 5, 2017, 10 pages.
Preliminary Report on Patentability received for PCT Patent Application No. PCT/US2015/038174, mailed on Jan. 5, 2017, 27 pages.
International Preliminary Report on Patentability received for PCT Patent Application No. PCT/US2015/045936, mailed on Mar. 16, 2017, 9 pages.
International Preliminary Report on Patentability received for PCT Patent Application No. PCT/US2015/045965, mailed on Dec. 27, 2016, 10 pages.
International Preliminary Report on Patentability received for PCT Patent Application No. PCT/US2015/047704, mailed on Mar. 16, 2017, 19 pages.
International Preliminary Report on Patentability received for PCT Patent Application No. PCT/US2015/054310, mailed on Sep. 14, 2017, 7 pages.
International Preliminary Report on Patentability received for PCT Patent Application No. PCT/US2016/019637, mailed on Sep. 21, 2017, 12 pages.
International Preliminary Report on Patentability received for PCT Patent Application No. PCT/US2018/032158, mailed on Nov. 21, 2019, 12 pages.

(56) References Cited

OTHER PUBLICATIONS

International Preliminary Report on Patentability received for PCT Patent Application No. PCT/US2018/032904, mailed on Nov. 28, 2019, 14 pages.
International Preliminary Report on Patentability received for PCT Patent Application No. PCT/US2019/049237, mailed on Mar. 25, 2021, 15 pages.
International Preliminary Report on Patentability received for PCT Patent Application No. PCT/US2015/019320, mailed on Mar. 16, 2017, 10 pages.
International Preliminary Report on Patentability received for PCT Patent Application No. PCT/US2015/019321, mailed on Mar. 16, 2017, 8 pages.
International Search Report and Written Opinion received for PCT Patent Application No. PCT/US00/10441, mailed on Jul. 11, 2000, 2 pages.
International Search Report and Written Opinion received for PCT Patent Application No. PCT/US2007/078180, mailed on Mar. 3, 2008, 8 pages.
International Search Report and Written Opinion received for PCT Patent Application No. PCT/US2010/027088, mailed on Jun. 18, 2010, 8 pages.
International Search Report and Written Opinion received for PCT Patent Application No. PCT/US2012/025519, mailed on Jun. 11, 2012, 7 pages.
International Search Report and Written Opinion received for PCT Patent Application No. PCT/US2014/053951, mailed on Dec. 8, 2014, 11 pages.
International Search Report and Written Opinion received for PCT Patent Application No. PCT/US2014/053957, mailed on Feb. 19, 2015, 11 pages.
International Search Report and Written Opinion received for PCT Patent Application No. PCT/US2014/053958, mailed on Feb. 19, 2015, 10 pages.
International Search Report and Written Opinion received for PCT Patent Application No. PCT/US2015/019320, mailed on Jul. 2, 2015, 14 pages.
International Search Report and Written Opinion received for PCT Patent Application No. PCT/US2015/019321, mailed on Jun. 3, 2015, 11 pages.
International Search Report and Written Opinion received for PCT Patent Application No. PCT/US2015/019322, mailed on Jun. 18, 2015, 16 pages.
International Search Report and Written Opinion received for PCT Patent Application No. PCT/US2015/038173 mailed on Sep. 25, 2015, 13 pages.
International Search Report and Written Opinion received for PCT Patent Application No. PCT/US2015/038174, mailed on Jan. 18, 2016, 38 pages.
International Search Report and Written Opinion received for PCT Patent Application No. PCT/US2015/045936, mailed on Nov. 4, 2015, 12 pages.
International Search Report and Written Opinion received for PCT Patent Application No. PCT/US2015/045965, mailed on Feb. 1, 2016, 20 pages.
International Search Report and Written Opinion received for PCT Patent Application No. PCT/US2015/047704, mailed on Feb. 22, 2016, 25 pages.
International Search Report and Written Opinion received for PCT Patent Application No. PCT/US2015/054310, mailed on Jan. 20, 2016, 10 pages.
International Search Report and Written Opinion received for PCT Patent Application No. PCT/US2016/019637, mailed on Aug. 18, 2016, 18 pages.
International Search Report and Written Opinion received for PCT Patent Application No. PCT/US2018/032158, mailed on Nov. 2, 2018, 19 pages.
International Search Report and Written Opinion received for PCT Patent Application No. PCT/US2018/032904, mailed on Oct. 1, 2018, 21 pages.
International Search Report and Written Opinion received for PCT Patent Application No. PCT/US2019/049237, mailed on Jan. 8, 2020, 21 pages.
International Search Report and Written Opinion received for PCT Patent Application No. PCT/US2020/035446, mailed on Nov. 10, 2020, 20 pages.
International Search Report and Written Opinion received for PCT Patent Application No. PCT/US2020/035488, mailed on Nov. 17, 2020, 21 pages.
International Search Report received for PCT Patent Application No. PCT/US2014/053961, mailed on Jul. 11, 2016, 10 pages.
International Written Opinion received for PCT Patent Application No. PCT/US2014/053961, mailed on Jul. 11, 2016, 22 pages.
Invitation to Pay Addition Fees and Partial International Search Report received for PCT Patent Application No. PCT/US2018/032904, mailed on Jul. 31, 2018, 18 pages.
Invitation to Pay Additional Fees received for PCT Patent Application No. PCT/US2014/053961, mailed on Aug. 3, 2015, 6 pages.
Invitation to Pay Additional Fees received for PCT Patent Application No. PCT/US2015/038174, mailed on Oct. 5, 2015, 5 pages.
Invitation to Pay Additional Fees received for PCT Patent Application No. PCT/US2015/047704, mailed on Dec. 16, 2015, 10 pages.
Invitation to Pay Additional Fees received for PCT Patent Application No. PCT/US2016/019637, mailed on Jun. 1, 2016, 6 pages.
Invitation to Pay Additional Fees received for PCT Patent Application No. PCT/US2018/032158, mailed on Sep. 10, 2018, 16 pages.
Invitation to Pay Additional Fees received for PCT Patent Application No. PCT/US2019/049237, mailed on Oct. 31, 2019, 18 pages.
Invitation to Pay Additional Fees received for PCT Patent Application No. PCT/US2020/035446, mailed on Sep. 11, 2020, 12 pages.
Invitation to Pay Additional Fees received for PCT Patent Application No. PCT/US2020/035488, mailed on Sep. 23, 2020, 15 pages.
Invitation to Pay Search Fees received for European Patent Application No. 18728002.9, mailed on Sep. 2, 2020, 8 pages.
Invitation to Pay Search Fees received for European Patent Application No. 18733381.0, mailed on Jun. 30, 2021, 4 pages.
Jarvie, "Alexa plays me music", Available online at: https://www.youtube.com/watch?v=bR2ZC8Sy8YQ, Feb. 23, 2015, 1 page.
Kim et al., "An Energy Efficient Transmission Scheme for Real-Time Data in Wireless Sensor Networks", Sensors, vol. 15, in Sensors 2015, May 20, 2015, 25 pages.
Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
Microsoft Outlook 2010TM) A Beginners Guide, Available online at: http://www.reading.ac.uk/web/files/its/outlook2010.pdf, Apr. 1, 2012, 24 pages.
Minutes of the Oral Proceedings received for European Patent Application No. 00923491.5, mailed on May 11, 2011, 69 pages.
Minutes of the Oral Proceedings received for European Patent Application No. 18197583.0, mailed on Mar. 9, 2021, 6 pages.
Miser Brad, "Sams Teach Yourself iTunes® 10 in 10 Minutes", SAMS Publishing, Dec. 30, 2010, pp. 65 and 67-69.
Narayanaswami et al., "Challenges and considerations for the design and production of a purpose-optimized body-worn wrist-watch computer", Online available at https://www.spiedigitallibrary.org/conference-proceedings-of-spie/5443/0000/Challenges-and-considerations-for-the-design-and-production-of-a/10.1117/12.561263.short?SSO=1, Defense and Security, Florida, United States, Sep. 15, 2004, 13 pages.
NBC News, "NBC News—YouTube Democratic Debate full)", Online available at: https://www.youtube.com/watch?v=ti2Nokoq1J4, Jan. 17, 2016, 1 page.

(56) References Cited

OTHER PUBLICATIONS

Non-Final Office Action received for U. S. U.S. Appl. No. 12/395,537, mailed on Dec. 14, 2015, 18 pages.
Non-Final Office Action received for U.S. Appl. No. 09/293,507, mailed on Aug. 1, 2001, 13 pages.
Non-Final Office Action received for U.S. Appl. No. 09/293,507, mailed on Jun. 22, 2000, 11 pages.
Non-Final Office Action received for U.S. Appl. No. 09/293,508, mailed on Jun. 30, 2000, 10 pages.
Non-Final Office Action received for U.S. Appl. No. 10/308,315, mailed on Aug. 8, 2005, 12 pages.
Non-Final Office Action received for U.S. Appl. No. 10/374,013, mailed on Feb. 1, 2007, 8 pages.
Non-Final Office Action received for U.S. Appl. No. 11/459,591, mailed on Jul. 29, 2008, 15 pages.
Non-Final Office Action received for U.S. Appl. No. 11/521,740, mailed on Dec. 27, 2007, 8 pages.
Non-Final Office Action received for U.S. Appl. No. 11/522,167, mailed on Dec. 6, 2012, 15 pages.
Non-Final Office Action received for U.S. Appl. No. 11/522,167, mailed on Feb. 5, 2009, 9 pages.
Non-Final Office Action received for U.S. Appl. No. 11/522,167, mailed on Jan. 20, 2010, 10 pages.
Non-Final Office Action received for U.S. Appl. No. 11/522, 167, mailed on May 2, 2007, 8 pages.
Non-Final Office Action received for U.S. Appl. No. 11/522, 167, mailed on Oct. 19, 2007, 10 pages.
Non-Final Office Action received for U.S. Appl. No. 11/767,409, mailed on Aug. 29, 2011, 18 pages.
Non-Final Office Action received for U.S. Appl. No. 11/767,409, mailed on Feb. 9, 2012, 20 pages.
Non-Final Office Action received for U.S. Appl. No. 11/767,409, mailed on Nov. 23, 2010, 12 pages.
Non-Final Office Action received for U.S. Appl. No. 11/983,059, mailed on Dec. 30, 2010, 11 pages.
Non-Final Office Action received for U.S. Appl. No. 12/215,651, mailed on Aug. 15, 2013, 27 pages.
Non-Final Office Action received for U.S. Appl. No. 12/215,651, mailed on Feb. 2, 2012, 18 pages.
Non-Final Office Action received for U.S. Appl. No. 12/395,537, mailed on Aug. 15, 2011, 17 pages.
Non-Final Office Action received for U.S. Appl. No. 12/395,537, mailed on Jan. 5, 2015, 20 pages.
Non-Final Office Action received for U.S. Appl. No. 12/395,537, mailed on Jul. 8, 2013, 22 pages.
Non-Final Office Action received for U.S. Appl. No. 12/395,541, mailed on Jul. 26, 2011, 15 pages.
Non-Final Office Action received for U.S. Appl. No. 12/395,541, mailed on Mar. 14, 2013, 23 pages.
Non-Final Office Action received for U.S. Appl. No. 12/566,669, mailed on Apr. 17, 2014, 27 pages.
Non-Final Office Action received for U.S. Appl. No. 12/566,669, mailed on Jun. 19, 2012, 30 pages.
Non-Final Office Action received for U.S. Appl. No. 12/566,671, mailed on May 23, 2012, 21 pages.
Non-Final Office Action received for U.S. Appl. No. 12/566,672, mailed on Nov. 8, 2012 11 pages.
Non-Final Office Action received for U.S. Appl. No. 12/566,673, mailed on Jun. 7, 2012, 17 pages.
Non-Final Office Action received for U.S. Appl. No. 12/566,673, mailed on Mar. 26, 2015, 19 pages.
Non-Final Office Action received for U.S. Appl. No. 12/566,673, mailed on Sep. 13, 2013, 18 pages.
Non-Final Office Action received for U.S. Appl. No. 13/038,276, mailed on Jul. 29, 2015, 31 pages.
Non-Final Office Action received for U.S. Appl. No. 13/038,276, mailed on Sep. 12, 2013, 24 pages.
Non-Final Office Action received for U.S. Appl. No. 13/333,890, mailed on Aug. 30, 2013, 20 pages.
Non-Final Office Action received for U.S. Appl. No. 13/333,890, mailed on Jun. 5, 2015, 20 pages.
Non-Final Office Action received for U.S. Appl. No. 13/333,890, mailed on May 1, 2013, 26 pages.
Non-Final Office Action received for U.S. Appl. No. 13/333,900, mailed on Mar. 19, 2013, 17 pages.
Non-Final Office Action received for U.S. Appl. No. 13/333,900, mailed on May 23, 2014, 19 pages.
Non-Final Office Action received for U.S. Appl. No. 13/489,245, mailed on Apr. 8, 2019, 27 pages.
Non-Final Office Action received for U.S. Appl. No. 13/489,245, mailed on Dec. 27, 2017, 22 pages.
Non-Final Office Action received for U.S. Appl. No. 13/489,245, mailed on Nov. 20, 2013, 25 pages.
Non-Final Office Action received for U.S. Appl. No. 14/045,544, mailed on Oct. 6, 2015, 20 pages.
Non-Final Office Action received for U.S. Appl. No. 14/641,308, mailed on Dec. 20, 2018, 43 pages.
Non-Final Office Action received for U.S. Appl. No. 14/641,308, mailed on Jun. 23, 2017, 53 pages.
Non-Final Office Action received for U.S. Appl. No. 14/752,776, mailed on Jan. 2, 2018, 30 pages.
Non-Final Office Action received for U.S. Appl. No. 14/829,573, mailed on Jan. 22, 2018, 26 pages.
Non-Final Office Action received for U.S. Appl. No. 14/830,629, mailed on Dec. 1, 2016, 20 pages.
Non-Final Office Action received for U.S. Appl. No. 14/830,629, mailed on Jun. 15, 2017, 24 pages.
Non-Final Office Action received for U.S. Appl. No. 14/839,912, mailed on Feb. 26, 2019, 36 pages.
Non-Final Office Action received for U.S. Appl. No. 14/839,914, mailed on Oct. 19, 2017, 46 pages.
Non-Final Office Action received for U.S. Appl. No. 14/841,646, mailed on Dec. 1, 2017, 23 pages.
Non-Final Office Action received for U.S. Appl. No. 14/841,656, mailed on Jul. 26, 2017, 20 pages.
Non-Final Office Action received for U.S. Appl. No. 14/913,345, mailed on Apr. 5, 2018, 15 pages.
Non-Final Office Action received for U.S. Appl. No. 14/913,349, mailed on Apr. 2, 2019, 15 pages.
Non-Final Office Action received for U.S. Appl. No. 14/913,349, mailed on Apr. 22, 2020, 20 pages.
Non-Final Office Action received for U.S. Appl. No. 14/913,349, mailed on Jan. 2, 2020, 25 pages.
Non-Final Office Action received for U.S. Appl. No. 14/913,349, mailed on Jan. 11, 2018, 6 pages.
Non-Final Office Action received for U.S. Appl. No. 14/913,350, mailed on May 14, 2018, 30 pages.
Non-Final Office Action received for U.S. Appl. No. 15/049,049 mailed on Dec. 15, 2017, 23 pages.
Non-Final Office Action received for U.S. Appl. No. 15/049,049, mailed on Feb. 6, 2019, 21 pages.
Non-Final Office Action received for U.S. Appl. No. 15/049,049, mailed on Nov. 9, 2016, 21 pages.
Non-Final Office Action received for U.S. Appl. No. 15/049,052, mailed on May 31, 2018, 15 pages.
Non-Final Office Action received for U.S. Appl. No. 15/049,052, mailed on Nov. 29, 2016, 13 pages.
Non-Final Office Action received for U.S. Appl. No. 15/049,052, mailed on Sep. 21, 2017, 14 pages.
Non-Final Office Action received for U.S. Appl. No. 15/049,058, mailed on Feb. 20, 2018, 21 pages.
Non-Final Office Action received for U.S. Appl. No. 15/049,058, mailed on Jun. 5, 2019, 25 pages.
Non-Final Office Action received for U.S. Appl. No. 15/049,058, mailed on Nov. 16, 2016, 19 pages.
Non-Final Office Action received for U.S. Appl. No. 15/049,064, mailed on Oct. 27, 2016, 15 pages.
Non-Final Office Action received for U.S. Appl. No. 15/274,963, mailed on Mar. 13, 2018, 23 pages.
Non-Final Office Action received for U.S. Appl. No. 15/655,253, mailed on Jul. 10, 2019, 16 pages.

(56) References Cited

OTHER PUBLICATIONS

Non-Final Office Action received for U.S. Appl. No. 15/655,253, mailed on Sep. 10, 2020, 17 pages.
Non-Final Office Action received for U.S. Appl. No. 15/730,610, mailed on Apr. 15, 2020, 36 pages.
Non-Final Office Action received for U.S. Appl. No. 15/730,610, mailed on Feb. 1, 2019, 22 pages.
Non-Final Office Action received for U.S. Appl. No. 15/818,500, mailed on Aug. 30, 2019, 17 pages.
Non-Final Office Action received for U.S. Appl. No. 15/818,500, mailed on Jul. 12, 2021, 18 pages.
Non-Final Office Action received for U.S. Appl. No. 15/910,263, mailed on Jun. 15, 2020, 38 pages.
Non-Final Office Action received for U.S. Appl. No. 15/910,263, mailed on Mar. 4, 2019, 26 pages.
Non-Final Office Action received for U.S. Appl. No. 16/144,950, mailed on Mar. 6, 2019, 24 pages.
Non-Final Office Action received for U.S. Appl. No. 16/147,413, mailed on Mar. 11, 2020, 22 pages.
Non-Final Office Action received for U.S. Appl. No. 16/147,413, mailed on Feb. 7, 2019, 18 pages.
Non-Final Office Action received for U.S. Appl. No. 16/263,280, mailed on Jul. 27, 2020, 11 pages.
Non-Final Office Action received for U.S. Appl. No. 16/358,483, mailed on May 1, 2020, 37 pages.
Non-Final Office Action received for U.S. Appl. No. 16/384,726, mailed on May 14, 2020, 16 pages.
Non-Final Office Action received for U.S. Appl. No. 16/525,082, mailed on Jul. 9, 2020, 20 pages.
Non-Final Office Action received for U.S. Appl. No. 16/583,989, mailed on Jan. 24, 2020, 20 pages.
Non-Final Office Action received for U.S. Appl. No. 16/584,490, mailed on Dec. 10, 2019, 27 pages.
Non-Final Office Action received for U.S. Appl. No. 16/702,968, mailed on Apr. 8, 2020, 20 pages.
Non-Final Office Action received for U.S. Appl. No. 16/723,583, mailed on Aug. 13, 2020, 13 pages.
Non-Final Office Action received for U.S. Appl. No. 16/734,173, mailed on Jan. 6, 2021, 14 pages.
Non-Final Office Action received for U.S. Appl. No. 16/734, 173, mailed on Jul. 23, 2020, 16 pages.
Non-Final Office Action received for U.S. Appl. No. 16/775,528, mailed on Nov. 20, 2020, 15 pages.
Non-Final Office Action received for U.S. Appl. No. 16/803,849, mailed on Jul. 13, 2020, 23 pages.
Non-Final Office Action received for U.S. Appl. No. 16/803,849, mailed on May 14, 2021, 34 pages.
Non-Final Office Action received for U.S. Appl. No. 16/807,604, mailed on Jun. 2, 2020, 28 pages.
Non-Final Office Action received for U.S. Appl. No. 16/836,571, mailed on Mar. 25, 2021, 28 pages.
Non-Final Office Action received for U.S. Appl. No. 16/871,995, mailed on Apr. 26, 2021, 14 pages.
Non-Final Office Action received for U.S. Appl. No. 16/922,675, mailed on Aug. 13, 2020, 17 pages.
Non-Final Office Action received for U.S. Appl. No. 16/922,675, mailed on May 4, 2021, 23 pages.
Non-Final Office Action received for U.S. Appl. No. 17/031,833, mailed on Dec. 7, 2020, 13 pages.
Non-Final Office Action received for U.S. Appl. No. 10/308,315, mailed on Jul. 28, 2004, 10 pages.
Non-Final Office Action received for U.S. Appl. No. 14/839,912, mailed on Feb. 12, 2018, 30 pages.
Non-Final Office Action received for U.S. Appl. No. 14/913,345, mailed on Jun. 26, 2019, 23 pages.
Non-Final Office Action received for U.S. Appl. No. 12/566,673, mailed on Dec. 16, 2015, 23 pages.
Non-Final Office Action received for U.S. Appl. No. 14/839,912, mailed on Jun. 8, 2017, 26 pages.
Non-Final Office Action received in U.S. Appl. No. 12/547,401, mailed on Feb. 11, 2013, 13 pages.
Non-Final Office Action received in U.S. Appl. No. 12/547,401, mailed on Jan. 8, 2010, 12 pages.
Notice of Acceptance received for Australian Patent Application No. 2014315319, mailed on Oct. 12, 2017, 3 pages.
Notice of Acceptance received for Australian Patent Application No. 2014315324, mailed on Sep. 28, 2017, 3 pages.
Notice of Acceptance received for Australian Patent Application No. 2014315325, mailed on Apr. 19, 2017, 3 pages.
Notice of Acceptance received for Australian Patent Application No. 2015279544, mailed on Mar. 1, 2018, 3 pages.
Notice of Acceptance received for Australian Patent Application No. 2016231598, mailed on Mar. 1, 2018, 3 pages.
Notice of Acceptance received for Australian Patent Application No. 2017276285, mailed on Apr. 3, 2019, 3 pages.
Notice of Acceptance received for Australian Patent Application No. 2018200289, mailed on Jul. 23, 2019, 3 pages.
Notice of Acceptance received for Australian Patent Application No. 2018223051, mailed on Oct. 30, 2018, 3 pages.
Notice of Acceptance received for Australian Patent Application No. 2018236872, mailed on Jul. 9, 2019, 3 pages.
Notice of Acceptance received for Australian Patent Application No. 2019201628, mailed on Sep. 10, 2019, 3 pages.
Notice of Acceptance received for Australian Patent Application No. 2019206101, mailed on Dec. 11, 2020, 3 pages.
Notice of Acceptance received for Australian Patent Application No. 2019268111, mailed on Feb. 18, 2021, 3 pages.
Notice of Acceptance received for Australian Patent Application No. 2019272034, mailed on Dec. 14, 2020, 3 pages.
Notice of Acceptance received for Australian Patent Application No. 2015279545, mailed on Feb. 9, 2018, 3 pages.
Notice of Allowance and Search Report received for Taiwanese Patent Application No. 104128687, mailed on Jun. 7, 2016, 4 pages.
Notice of Allowance received for Canadian Patent Application No. 2,661,200, mailed on Aug. 20, 2014, 1 page.
Notice of Allowance received for Canadian Patent Application No. 2,882,403, mailed on Oct. 31, 2018, 1 page.
Notice of Allowance received for Chinese Patent Application No. 201210308569.5, mailed on May 31, 2016, 4 page.
Notice of Allowance received for Chinese Patent Application No. 201410449822.8, mailed on Mar. 5, 2019, 2 page.
Notice of Allowance received for Chinese Patent Application No. 201480059543.9, mailed on Sep. 4, 2019, 2 page.
Notice of Allowance received for Chinese Patent Application No. 201480060044.1, mailed on Mar. 29, 2019, 3 page.
Notice of Allowance received for Chinese Patent Application No. 201480060082.7, mailed on Mar. 12, 2019, 2 page.
Notice of Allowance received for Chinese Patent Application No. 201580077206.7, mailed on Feb. 3, 2021, 2 page.
Notice of Allowance received for Chinese Patent Application No. 201810074876.9, mailed on Jan. 12, 2021, 2 page.
Notice of Allowance received for Chinese Patent Application No. 201811539260.0, mailed on Mar. 15, 2021, 2 page.
Notice of Allowance received for Chinese Patent Application No. 201880001436.9, mailed on May 8, 2020, 3 page.
Notice of Allowance received for Chinese Patent Application No. 20190454069.4, mailed on Nov. 2, 2020, 7 page.
Notice of Allowance received for Chinese Patent Application No. 201910454076.4, mailed on Feb. 4, 2021, 2 page.
Notice of Allowance received for Chinese Patent Application No. 201911127193.6, mailed on May 8, 2021, 4 page.
Notice of Allowance received for Danish Patent Application No. PA201570776, mailed on Feb. 8, 2017, 2 page.
Notice of Allowance received for Danish Patent Application No. PA201670118, mailed on Mar. 30, 2017, 2 pages.
Notice of Allowance received for Danish Patent Application No. PA201770408, mailed on Feb. 8, 2019, 2 pages.
Notice of Allowance received for Japanese Patent Application No. 2012-500842, mailed on Jun. 20, 2014, 3 pages.
Notice of Allowance received for Japanese Patent Application No. 2014-148065, mailed on Jan. 12, 2016, 6 pages.

(56) References Cited

OTHER PUBLICATIONS

Notice of Allowance received for Japanese Patent Application No. 2016-001259, mailed on Jul. 27, 2018, 4 pages.
Notice of Allowance received for Japanese Patent Application No. 2016-017400, mailed on Dec. 16, 2016, 3 pages.
Notice of Allowance received for Japanese Patent Application No. 2016-537945, mailed on Aug. 3, 2018, 4 pages.
Notice of Allowance received for Japanese Patent Application No. 2016-537946, mailed on Mar. 26, 2018, 4 pages.
Notice of Allowance received for Japanese Patent Application No. 2016-537947, mailed on Jun. 5, 2017, 6 pages.
Notice of Allowance received for Japanese Patent Application No. 2016-537948, mailed on Nov. 11, 2019, 3 pages.
Notice of Allowance received for Japanese Patent Application No. 2017-545561, mailed on Jul. 12, 2019, 4 pages.
Notice of Allowance received for Japanese Patent Application No. 2018-083313, mailed on Jul. 1, 2019, 4 pages.
Notice of Allowance received for Japanese Patent Application No. 2018-090084, mailed on May 24, 2019, 4 pages.
Notice of Allowance received for Japanese Patent Application No. 2018-143982, mailed on Apr. 8, 2019, 4 pages.
Notice of Allowance received for Japanese Patent Application No. 2019-138053, mailed on Jul. 2, 2021, 4 pages.
Notice of allowance received for Korean Patent Application No. 10-2013-7028489, mailed on Jan. 25, 2016, 5 pages.
Notice of Allowance received for Korean Patent Application No. 10-2016-7008449, mailed on Aug. 9, 2019, 6 pages.
Notice of Allowance received for Korean Patent Application No. 10-2016-7008488, mailed on Oct. 25, 2019, 4 pages.
Notice of Allowance received for Korean Patent Application No. 1020167025395, mailed on Oct. 26, 2016, 5 pages.
Notice of Allowance received for Korean Patent Application No. 10-2018-7002695, mailed on Oct. 8, 2018, 5 pages.
Notice of Allowance received for Korean Patent Application No. 10-2018-7010872, mailed on Feb. 10, 2020, 6 pages.
Notice of Allowance received for Korean Patent Application No. 10-2018-7013265, mailed on Apr. 1, 2020, 4 pages.
Notice of Allowance received for Korean Patent Application No. 10-2018-7032106, mailed on Jun. 28, 2019, 5 pages.
Notice of Allowance received for Korean Patent Application No. 10-2019-7007748, mailed on May 6, 2020, 5 pages.
Notice of Allowance received for Korean Patent Application No. 10-2020-7019035, mailed on Jun. 18, 2021, 4 pages.
Notice of Allowance received for Korean Patent Application No. 10-2020-7022802, mailed on Mar. 4, 2021, 6 pages.
Notice of Allowance received for Taiwanese Patent Application No. 103130517, mailed on May 14, 2018, 5 pages.
Notice of Allowance received for Taiwanese Patent Application No. 103130518, mailed on May 19, 2016, 6 pages.
Notice of Allowance received for Taiwanese Patent Application No. 103130519, mailed on Oct. 27, 2016, 3 pages.
Notice of Allowance received for Taiwanese Patent Application No. 103130520, mailed on Apr. 25, 2018, 4 pages.
Notice of Allowance received for Taiwanese Patent Application No. 104107327, mailed on Jul. 19, 2019, 5 pages.
Notice of Allowance received for Taiwanese Patent Application No. 104107333, mailed on Nov. 8, 2016, 2 pages.
Notice of Allowance received for Taiwanese Patent Application No. 104107334, mailed on Jan. 26, 2017, 3 pages.
Notice of Allowance received for Taiwanese Patent Application No. 104133281, mailed on Mar. 29, 2018, 4 pages.
Notice of Allowance received for U.S. Appl. No. 16/702,968, mailed on Apr. 21, 2021, 20 pages.
Notice of Allowance received for U.S. Appl. No. 13/333,900, mailed on Sep. 15, 2015, 7 pages.
Notice of Allowance received for U.S. Appl. No. 09/293,507, mailed on Jul. 25, 2002, 6 pages.
Notice of Allowance received for U.S. Appl. No. 09/293,508, mailed on Feb. 13, 2001, 5 pages.
Notice of Allowance received for U.S. Appl. No. 10/308,315, mailed on Aug. 27, 2007, 6 pages.
Notice of Allowance received for U.S. Appl. No. 10/374,013, mailed on Aug. 27, 2007, 6 pages.
Notice of Allowance received for U.S. Appl. No. 10/374,445, mailed on May 5, 2006, 7 pages.
Notice of Allowance received for U.S. Appl. No. 10/374,831, mailed on Sep. 10, 2004, 8 pages.
Notice of Allowance received for U.S. Appl. No. 11/459,591, mailed on May 21, 2009, 9 pages.
Notice of Allowance received for U.S. Appl. No. 11/521,740, mailed on Jul. 24, 2008, 7 pages.
Notice of Allowance received for U.S. Appl. No. 11/767,409, mailed on Jun. 12, 2013, 14 pages.
Notice of Allowance received for U.S. Appl. No. 11/983,059, mailed on Feb. 10, 2012, 8 pages.
Notice of Allowance received for U.S. Appl. No. 12/215,651, mailed on Feb. 6, 2014, 5 pages.
Notice of Allowance received for U.S. Appl. No. 12/395,537 mailed on Jun. 29, 2016, 14 pages.
Notice of Allowance received for U.S. Appl. No. 12/395,541, mailed on Aug. 22, 2013, 8 pages.
Notice of Allowance received for U.S. Appl. No. 12/395,541, mailed on Sep. 12, 2013, 2 pages.
Notice of Allowance received for U.S. Appl. No. 12/547,401, mailed on Jul. 22, 2013, 8 pages.
Notice of Allowance received for U.S. Appl. No. 12/566,669, mailed on Nov. 6, 2014, 12 pages.
Notice of Allowance received for U.S. Appl. No. 12/566,671, mailed on Apr. 12, 2013, 11 pages.
Notice of Allowance received for U.S. Appl. No. 12/566,671, mailed on Dec. 18, 2013, 11 pages.
Notice of Allowance received for U.S. Appl. No. 12/566,672, mailed on Jun. 24, 2013, 8 pages.
Notice of Allowance received for U.S. Appl. No. 12/566,672, mailed on Mar. 1, 2013, 7 pages.
Notice of Allowance received for U.S. Appl. No. 12/566,673, mailed on Feb. 26, 2020, 7 pages.
Notice of Allowance received for U.S. Appl. No. 13/038,276, mailed on Nov. 3, 2016, 10 pages.
Notice of Allowance received for U.S. Appl. No. 13/038,276, mailed on Nov. 30, 2016, 2 pages.
Notice of Allowance received for U.S. Appl. No. 13/333,900, mailed on Apr. 13, 2015, 9 pages.
Notice of Allowance received for U.S. Appl. No. 13/333,900, mailed on Dec. 1, 2015, 2 pages.
Notice of Allowance received for U.S. Appl. No. 14/641,241, mailed on Apr. 13, 2017, 2 pages.
Notice of Allowance received for U.S. Appl. No. 14/641,241, mailed on Jan. 31, 2017, 13 pages.
Notice of Allowance received for U.S. Appl. No. 14/641,241, mailed on Mar. 24, 2017, 3 pages.
Notice of Allowance received for U.S. Appl. No. 14/641,252, mailed on Apr. 11, 2018, 14 pages.
Notice of Allowance received for U.S. Appl. No. 14/641,252, mailed on Jul. 18, 2018, 9 pages.
Notice of Allowance received for U.S. Appl. No. 14/641,308, mailed on Jan. 15, 2020, 7 pages.
Notice of Allowance received for U.S. Appl. No. 14/829,573, mailed on Apr. 25, 2018, 6 pages.
Notice of Allowance received for U.S. Appl. No. 14/830,629, mailed on Oct. 17, 2018, 8 pages.
Notice of Allowance received for U.S. Appl. No. 14/839,914, mailed on Jun. 22, 2018, 12 pages.
Notice of Allowance received for U.S. Appl. No. 14/841,646, mailed on Apr. 18, 2019, 7 pages.
Notice of Allowance received for U.S. Appl. No. 14/841,656, mailed on Feb. 12, 2018, 9 pages.
Notice of Allowance received for U.S. Appl. No. 14/841,656, mailed on Mar. 5, 2018, 3 pages.
Notice of Allowance received for U.S. Appl. No. 14/913,345, mailed on Feb. 10, 2020, 10 pages.

(56) References Cited

OTHER PUBLICATIONS

Notice of Allowance received for U.S. Appl. No. 14/913,350, mailed on Dec. 19, 2018, 27 pages.
Notice of Allowance received for U.S. Appl. No. 15/049,049, mailed on Jul. 25, 2019, 8 pages.
Notice of Allowance received for U.S. Appl. No. 15/049,052, mailed on Sep. 16, 2019, 5 pages.
Notice of Allowance received for U.S. Appl. No. 15/049,064, mailed on Jul. 18, 2017, 24 pages.
Notice of Allowance received for U.S. Appl. No. 15/274,963, mailed on Jul. 6, 2018, 10 pages.
Notice of Allowance received for U.S. Appl. No. 15/910,263, mailed on Oct. 21, 2020, 29 pages.
Notice of Allowance received for U.S. Appl. No. 15/910,263, mailed on Feb. 22, 2021, 11 pages.
Notice of Allowance received for U.S. Appl. No. 15/910,263, mailed on Feb. 18, 2021, 3 pages.
Notice of Allowance received for U.S. Appl. No. 15/910,263, mailed on Jan. 22, 2021, 33 pages.
Notice of Allowance received for U.S. Appl. No. 15/927,768, mailed on May 31, 2019, 13 pages.
Notice of Allowance received for U.S. Appl. No. 15/930,300, mailed on Aug. 5, 2020, 14 pages.
Notice of Allowance received for U.S. Appl. No. 16/055,489, mailed on Jan. 9, 2019, 24 pages.
Notice of Allowance received for U.S. Appl. No. 16/055,489, mailed on Jan. 25, 2019, 8 pages.
Notice of Allowance received for U.S. Appl. No. 16/055,489, mailed on Nov. 8, 2018, 28 pages.
Notice of Allowance received for U.S. Appl. No. 16/109,120, mailed on Sep. 11, 2019, 12 pages.
Notice of Allowance received for U.S. Appl. No. 16/144,950, mailed on Mar. 19, 2020, 14 pages.
Notice of Allowance received for U.S. Appl. No. 16/147,413, mailed on Jul. 20, 2020, 11 pages.
Notice of Allowance received for U.S. Appl. No. 16/147,413, mailed on Nov. 5, 2020, 10 pages.
Notice of Allowance received for U.S. Appl. No. 16/263,280, mailed on Jun. 8, 2021, 8 pages.
Notice of Allowance received for U.S. Appl. No. 16/263,280, mailed on Sep. 17, 2021, 8 pages.
Notice of Allowance received for U.S. Appl. No. 16/358,483, mailed on Jan. 19, 2021, 9 pages.
Notice of Allowance received for U.S. Appl. No. 17/031,833, mailed on May 17, 2021, 5 pages.
Notice of Allowance received for U.S. Appl. No. 17/031,833, mailed on Mar. 17, 2021, 9 pages.
Notice of Allowance received for U.S. Appl. No. 17/031,833, mailed on Aug. 20, 2020, 5 pages.
Notice of Allowance received for U.S. Appl. No. 17/031,833, mailed on Nov. 17, 2020, 7 pages.
Notice of Allowance received for U.S. Appl. No. 17/031,833, mailed on Apr. 1, 2021, 5 pages.
Notice of Allowance received for U.S. Appl. No. 17/031,833, mailed on Dec. 24, 2020, 7 pages.
Notice of Allowance received for U.S. Appl. No. 17/031,833, mailed on Aug. 27, 2020, 13 pages.
Notice of Allowance received for U.S. Appl. No. 17/031,833, mailed on Mar. 26, 2021, 13 pages.
Notice of Allowance received for U.S. Appl. No. 17/031,833, mailed on Apr. 30, 2021, 25 pages.
Notice of Allowance received for U.S. Appl. No. 17/031,833, mailed on Jul. 26, 2021, 5 pages.
Notice of Allowance received for U.S. Appl. No. 17/031,833, mailed on Jun. 3, 2021, 11 pages.
Notice of Allowance received for U.S. Appl. No. 17/031,833, mailed on Jan. 21, 2021, 7 pages.
Notice of Allowance received for U.S. Appl. No. 17/031,833, mailed on Jun. 25, 2021, 15 pages.
Notice of Grant received for Chinese Patent Application No. 200780033722.5, mailed on Jun. 19, 2014, 4 pages.
Notice of Non-Compliant Amendment received for U.S. Appl. No. 11/522,167 mailed on May 14, 2008, 4 pages.
Office Action and Search Report received for Danish Patent Application No. PA 201670118, mailed on Jul. 1, 2016, 7 pages.
Office Action received for Danish Patent Application No. PA201770794, mailed on Dec. 19, 2017, 8 pages.
Office Action received for Korean Patent Application No. 10-2018-7010872, mailed on Dec. 21, 2018, 7 pages.
Office Action received for Australian Patent Application No. 2014315234, mailed on Jul. 12, 2017, 4 pages.
Office Action received for Australian Patent Application No. 2014315234, mailed on Nov. 2, 2016, 3 pages.
Office Action received for Australian Patent Application No. 2014315319, mailed on Aug. 3, 2017, 3 pages.
Office Action received for Australian Patent Application No. 2014315319, mailed on Oct. 17, 2016, 3 pages.
Office Action received for Australian Patent Application No. 2014315324, mailed on Aug. 8, 2017, 3 pages.
Office Action received for Australian Patent Application No. 2014315324, mailed on Oct. 21, 2016, 3 pages.
Office Action received for Australian Patent Application No. 2014315325, mailed on Nov. 3, 2016, 3 pages.
Office Action received for Australian Patent Application No. 2015279544, mailed on Apr. 18, 2017, 4 pages.
Office Action received for Australian Patent Application No. 2015279544, mailed on Feb. 13, 2018, 5 pages.
Office Action received for Australian Patent Application No. 2016229407, mailed on Aug. 15, 2018, 4 pages.
Office Action received for Australian Patent Application No. 2016229407, mailed on May 27, 2019, 4 pages.
Office Action received for Australian Patent Application No. 2016231598, mailed on Apr. 7, 2017, 5 pages.
Office Action received for Australian Patent Application No. 2017254897, mailed on Aug. 29, 2018, 4 pages.
Office Action received for Australian Patent Application No. 2017254897, mailed on Jun. 28, 2019, 4 pages.
Office Action received for Australian Patent Application No. 2017276285, mailed on Nov. 26, 2018, 2 pages.
Office Action received for Australian Patent Application No. 2018200289, mailed on Apr. 9, 2019, 5 pages.
Office Action received for Australian Patent Application No. 2018200289, mailed on Dec. 4, 2018, 4 pages.
Office Action received for Australian Patent Application No. 2018200998, mailed on Jan. 30, 2019, 4 pages.
Office Action received for Australian Patent Application No. 2018200998, mailed on Mar. 9, 2018, 5 pages.
Office Action received for Australian Patent Application No. 2018236870, mailed on Jul. 29, 2019, 7 pages.
Office Action received for Australian Patent Application No. 2018236870, mailed on Nov. 21, 2018, 10 pages.
Office Action received for Australian Patent Application No. 2018236870, mailed on Oct. 31, 2019, 8 pages.
Office Action received for Australian Patent Application No. 2018236872, mailed on Nov. 23, 2018, 4 pages.
Office Action received for Australian Patent Application No. 2019201628, mailed on May 13, 2019, 2 pages.
Office Action received for Australian Patent Application No. 2019206101, mailed on Jul. 14, 2020, 4 pages.
Office Action received for Australian Patent Application No. 2019216614, mailed on Apr. 1, 2020, 4 pages.
Office Action received for Australian Patent Application No. 2019216614, mailed on Aug. 13, 2020, 4 pages.
Office Action received for Australian Patent Application No. 2019216614, mailed on Aug. 22, 2019, 3 pages.
Office Action received for Australian Patent Application No. 2019257521, mailed on Apr. 8, 2021, 6 pages.
Office Action received for Australian Patent Application No. 2019257521, mailed on Aug. 7, 2020, 5 pages.
Office Action received for Australian Patent Application No. 2019257521, mailed on Jul. 27, 2021, 6 pages.

(56) References Cited

OTHER PUBLICATIONS

Office Action received for Australian Patent Application No. 2019257521, mailed on Oct. 21, 2020, 6 pages.
Office Action received for Australian Patent Application No. 2019268111, mailed on Oct. 27, 2020, 7 pages.
Office Action received for Australian Patent Application No. 2019272034, mailed on Sep. 14, 2020, 4 pages.
Office Action received for Australian Patent Application No. 2019337519, mailed on Mar. 18, 2021, 5 pages.
Office Action received for Australian Patent Application No. 2021204454, mailed on Aug. 9, 2021, 7 pages.
Office Action received for Australian Patent Application No. 2014315234, mailed on Apr. 19, 2017, 4 pages.
Office Action received for Australian Patent Application No. 2015279545, mailed on Apr. 13, 2017, 3 pages.
Office Action received for Canadian Patent Application No. 2,661,200, mailed on Jan. 3, 2013, 5 pages.
Office Action received for Canadian Patent Application No. 2,661,200, mailed on Jun. 9, 2010, 3 pages.
Office Action received for Canadian Patent Application No. 2,661,200, mailed on Nov. 1, 2011, 4 pages.
Office Action received for Canadian Patent Application No. 2,661,200, mailed on Nov. 14, 2013, 2 pages.
Office Action received for Canadian Patent Application No. 2,882,403, mailed on Apr. 2, 2015, 5 pages.
Office Action received for Canadian Patent Application No. 2,882,403, mailed on Sep. 15, 2017, 5 pages.
Office Action received for Chinese Patent Application No. 201210308569.5, mailed on Feb. 5, 2016, 3 pages.
Office Action received for Chinese Patent Application No. 201210308569.5, mailed on Nov. 19, 2014, 24 pages.
Office Action received for Chinese Patent Application No. 201210308569.5, mailed on Sep. 1, 2015, 39 pages.
Office Action received for Chinese Patent Application No. 201410449822.8, mailed on Dec. 2, 2016, 9 pages.
Office Action received for Chinese Patent Application No. 201410449822.8, mailed on May 4, 2018, 12 pages.
Office Action received for Chinese Patent Application No. 201410449822.8, mailed on Nov. 20, 2018, 11 pages.
Office Action received for Chinese Patent Application No. 201410449822.8, mailed on Sep. 30, 2017, 20 pages.
Office Action received for Chinese Patent Application No. 201480059543.9, mailed on Feb. 28, 2019, 16 pages.
Office Action received for Chinese Patent Application No. 201480059543.9, mailed on Jan. 26, 2018, 17 pages.
Office Action received for Chinese Patent Application No. 201480059543.9, mailed on Sep. 19, 2018, 18 pages.
Office Action received for Chinese Patent Application No. 201480060044.1, mailed on Jan. 26, 2018, 15 pages.
Office Action received for Chinese Patent Application No. 201480060044.1, mailed on Sep. 25, 2018, 6 pages.
Office Action received for Chinese Patent Application No. 201480060082.7, mailed on Jan. 26, 2018, 15 pages.
Office Action received for Chinese Patent Application No. 201480060082.7, mailed on Sep. 25, 2018, 6 pages.
Office Action received for Chinese Patent Application No. 201480060083.1, mailed on Aug. 13, 2019, 6 pages.
Office Action received for Chinese Patent Application No. 201480060083.1, mailed on Dec. 5, 2018, 11 pages.
Office Action received for Chinese Patent Application No. 201580046339.8, mailed on Feb. 26, 2019, 18 pages.
Office Action received for Chinese Patent Application No. 201580046339.8, mailed on Jun. 3, 2020, 19 pages.
Office Action received for Chinese Patent Application No. 201580046339.8, mailed on Oct. 19, 2020, 12 pages.
Office Action received for Chinese Patent Application No. 201580046339.8, mailed on Oct. 31, 2019, 9 pages.
Office Action received for Chinese Patent Application No. 201580077206.7, mailed on Feb. 3, 2020, 29 pages.
Office Action received for Chinese Patent Application No. 201580077206.7, mailed on Nov. 11, 2020, 11 pages.
Office Action received for Chinese Patent Application No. 201680012759.9, mailed on Jun. 19, 2020, 18 pages.
Office Action received for Chinese Patent Application No. 201810074876.9, mailed on Jul. 31, 2020, 11 pages.
Office Action received for Chinese Patent Application No. 201811539259.8, mailed on Apr. 3, 2020, 10 pages.
Office Action received for Chinese Patent Application No. 201811539259.8, mailed on Sep. 3, 2020, 10 pages.
Office Action received for Chinese Patent Application No. 201811539259.8, mailed on Sep. 18, 2019, 12 pages.
Office Action received for Chinese Patent Application No. 201811539260.0, mailed on Jun. 3, 2020, 8 pages.
Office Action received for Chinese Patent Application No. 201811539260.0, mailed on Nov. 4, 2020, 9 pages.
Office Action received for Chinese Patent Application No. 201811539260.0, mailed on Oct. 8, 2019, 14 pages.
Office Action received for Chinese Patent Application No. 201880001436.9, mailed on Apr. 28, 2019, 19 pages.
Office Action received for Chinese Patent Application No. 201880001436.9, mailed on Nov. 6, 2019, 24 pages.
Office Action received for Chinese Patent Application No. 201910164962.3, mailed on Apr. 8, 2020, 25 pages.
Office Action received for Chinese Patent Application No. 201910164962.3, mailed on Jan. 12, 2021, 14 pages.
Office Action received for Chinese Patent Application No. 201910164962.3, mailed on Sep. 18, 2020, 19 pages.
Office Action received for Chinese Patent Application No. 201910454069.4, mailed on Dec. 20, 2019, 6 pages.
Office Action received for Chinese Patent Application No. 201910454069.4, mailed on Jul. 24, 2020, 8 pages.
Office Action received for Chinese Patent Application No. 201910454076.4, mailed on Dec. 18, 2019, 14 pages.
Office Action received for Chinese Patent Application No. 201910454076.4, mailed on Oct. 16, 2020, 14 pages.
Office Action received for Chinese Patent Application No. 201911127193.6, mailed on Dec. 17, 2020, 21 pages.
Office Action received for Chinese Patent Application No. 201911128105.4, mailed on Apr. 8, 2021, 10 pages.
Office Action received for Chinese Patent Application No. 201911128105.4, mailed on Jan. 4, 2021, 14 pages.
Office Action received for Chinese Patent Application No. 201911128105.4, mailed on Jul. 3, 2020, 18 pages.
Office Action received for Chinese Patent Application No. 202010125114.4, mailed on Aug. 21, 2020, 16 pages.
Office Action received for Chinese Patent Application No. 202010125114.4, mailed on Jun. 7, 2021, 7 pages.
Office Action received for Chinese Patent Application No. 202010125114.4, mailed on Mar. 1, 2021, 15 pages.
Office Action received for Danish Patent Application No. PA201570776, mailed on Aug. 19, 2016, 3 pages.
Office Action received for Danish Patent Application No. PA201570776, mailed on Jan. 26, 2016, 12 pages.
Office Action received for Danish Patent Application No. PA201570781, mailed on Aug. 19, 2016, 3 pages.
Office Action received for Danish Patent Application No. PA201670117, mailed on Jan. 12, 2017, 3 pages.
Office Action received for Danish Patent Application No. PA201670117, mailed on Jun. 13, 2016, 10 pages.
Office Action received for Danish Patent Application No. PA201670118, mailed on Feb. 2, 2017, 2 pages.
Office Action received for Danish Patent Application No. PA201670118, mailed on Oct. 25, 2016, 3 pages.
Office Action received for Danish Patent Application No. PA201770181, mailed on Jan. 3, 2018, 2 pages.
Office Action received for Danish Patent Application No. PA201770181, mailed on Jun. 13, 2017, 6 pages.
Office Action received for Danish Patent Application No. PA201770392, mailed on Apr. 17, 2018, 2 pages.
Office Action received for Danish Patent Application No. PA201770392, mailed on Dec. 8, 2017, 4 pages.

(56) References Cited

OTHER PUBLICATIONS

Office Action received for Danish Patent Application No. PA201770392, mailed on Jun. 20, 2017, 11 pages.
Office Action received for Danish Patent Application No. PA201770401, mailed on Jan. 31, 2018, 3 pages.
Office Action received for Danish Patent Application No. PA201770401, mailed on May 17, 2018, 3 pages.
Office Action received for Danish Patent Application No. PA201770402, mailed on Apr. 16, 2018, 5 pages.
Office Action received for Danish Patent Application No. PA201770402, mailed on Dec. 18, 2017, 6 pages.
Office Action received for Danish Patent Application No. PA201770402, mailed on Jun. 19, 2017, 11 pages.
Office Action received for Danish Patent Application No. PA201770403, mailed on Dec. 12, 2017, 3 pages.
Office Action received for Danish Patent Application No. PA201770403, mailed on Jun. 16, 2017, 8 pages.
Office Action received for Danish Patent Application No. PA201770404, mailed on Aug. 8, 2018, 4 pages.
Office Action received for Danish Patent Application No. PA201770404, mailed on Dec. 1, 2017, 5 pages.
Office Action received for Danish Patent Application No. PA201770404, mailed on Feb. 21, 2019, 2 pages.
Office Action received for Danish Patent Application No. PA201770404, mailed on May 1, 2019, 2 pages.
Office Action received for Danish Patent Application No. PA201770406, mailed on Feb. 27, 2018, 7 pages.
Office Action received for Danish Patent Application No. PA201770406, mailed on Jan. 25, 2019, 8 pages.
Office Action received for Danish Patent Application No. PA201770406, mailed on Jun. 22, 2017, 11 pages.
Office Action received for Danish Patent Application No. PA201770406, mailed on Mar. 26, 2019, 3 pages.
Office Action received for Danish Patent Application No. PA201770406, mailed on Nov. 11, 2019, 4 pages.
Office Action received for Danish Patent Application No. PA201770408, mailed on Dec. 21, 2017, 6 pages.
Office Action received for Danish Patent Application No. PA201770408, mailed on Jun. 20, 2017, 9 pages.
Office Action received for Danish Patent Application No. PA201770408, mailed on May 3, 2018, 7 pages.
Office Action received for Danish Patent Application No. PA201770410, mailed on Apr. 9, 2018, 5 pages.
Office Action received for Danish Patent Application No. PA201770410, mailed on Jun. 23, 2017, 9 pages.
Office Action received for Danish Patent Application No. PA201770410, mailed on Nov. 22, 2018, 5 pages.
Office Action received for Danish Patent Application No. PA201770794, mailed on Apr. 5, 2018, 4 pages.
Office Action received for Danish Patent Application No. PA201770794, mailed on Jun. 13, 2019, 2 pages.
Office Action received for Danish Patent Application No. PA201770794, mailed on Oct. 30, 2018, 3 pages.
Office Action received for Danish Patent Application No. PA201870060, mailed on Jan. 15, 2019, 4 pages.
Office Action received for Danish Patent Application No. PA201870060, mailed on Jul. 25, 2019, 2 pages.
Office Action received for Danish Patent Application No. PA201870419, mailed on Feb. 27, 2020, 8 pages.
Office Action received for Danish Patent Application No. PA201870419, mailed on Sep. 30, 2019, 4 pages.
Office Action received for Danish Patent Application No. PA201870598, mailed on May 1, 2019, 3 pages.
Office Action received for Danish Patent Application No. PA201870598, mailed on Nov. 8, 2019, 4 pages.
Office Action received for Danish Patent Application No. PA201970259, mailed on Jan. 15, 2020, 4 pages.
Office Action received for Danish Patent Application No. PA201970259, mailed on Nov. 23, 2020, 3 pages.
Office Action received for Danish Patent Application No. PA202070560, mailed on Dec. 11, 2020, 7 pages.
Office Action received for Danish Patent Application No. PA202070560, mailed on Mar. 10, 2021, 7 pages.
Office Action received for European Patent Application No. 00923491.5, mailed on Jan. 11, 2010, 6 pages.
Office Action received for European Patent Application No. 00923491.5, mailed on Mar. 12, 2007, 9 pages.
Office Action received for European Patent Application No. 00923491.5, mailed on Sep. 11, 2007, 5 pages.
Office Action received for European Patent Application No. 07842262.3, mailed on Feb. 16, 2017, 6 pages.
Office Action received for European Patent Application No. 07842262.3, mailed on Sep. 8, 2011, 5 pages.
Office Action received for European Patent Application No. 10177096.4, mailed on Feb. 20, 2012, 6 pages.
Office Action received for European Patent Application No. 10177096.4, mailed on Jul. 26, 2017, 8 pages.
Office Action received for European Patent Application No. 10177096.4, mailed on Jun. 7, 2018, 14 pages.
Office Action received for European Patent Application No. 10177096.4, mailed on Mar. 21, 2013, 9 pages.
Office Action received for European Patent Application No. 10177099.8, mailed on Feb. 20, 2012, 5 pages.
Office Action received for European Patent Application No. 10712824.1, mailed on Jun. 23, 2014, 7 pages.
Office Action received for European Patent Application No. 13184872.3, mailed on May 18, 2018, 8 pages.
Office Action received for European Patent Application No. 14771688.0, mailed on Jan. 21, 2019, 8 pages.
Office Action received for European Patent Application No. 14771688.0, mailed on May 31, 2018, 6 pages.
Office Action received for European Patent Application No. 14771688.0, mailed on Nov. 30, 2017, 15 pages.
Office Action received for European Patent Application No. 14771688.0, mailed on Sep. 16, 2019, 7 pages.
Office Action received for European Patent Application No. 14772001.5, mailed on Feb. 14, 2018, 5 pages.
Office Action received for European Patent Application No. 14772001.5, mailed on May 30, 2017, 10 pages.
Office Action received for European Patent Application No. 14772002.3, mailed on Jul. 4, 2017, 8 pages.
Office Action received for European Patent Application No. 14772494.2, mailed on Jun. 20, 2017, 7 pages.
Office Action received for European Patent Application No. 14772494.2, mailed on Oct. 2, 2018, 9 pages.
Office Action Received for European Patent Application No. 15739109.5, mailed on Jan. 31, 2018, 7 pages.
Office Action Received for European Patent Application No. 15739110.3, mailed on Jan. 31, 2018, 8 pages.
Office Action received for European Patent Application No. 16190252.3, mailed on Feb. 19, 2018, 7 pages.
Office Action received for European Patent Application No. 16710372.0, mailed on Feb. 22, 2019, 7 pages.
Office Action received for European Patent Application No. 18157131.6, mailed on May 8, 2018, 12 pages.
Office Action received for European Patent Application No. 18197583.0, mailed on Feb. 28, 2020, 8 pages.
Office Action received for European Patent Application No. 18197589.7, mailed on Oct. 1, 2019, 5 pages.
Office Action received for European Patent Application No. 18728002.9, mailed on Dec. 14, 2020, 15 pages.
Office Action received for European Patent Application No. 19156614.0, mailed on Jul. 16, 2021, 10 pages.
Office Action received for European Patent Application No. 19173371.6, mailed on Mar. 15, 2021, 6 pages.
Office Action received for European Patent Application No. 19173371.6, mailed on Nov. 12, 2019, 11 pages.
Office Action received for European Patent Application No. 19173886.3, mailed on Mar. 16, 2021, 6 pages.
Office Action received for European Patent Application No. 19173886.3, mailed on Nov. 12, 2019, 9 pages.

(56) References Cited

OTHER PUBLICATIONS

Office Action received for European Patent Application No. 19199004.3, mailed on Nov. 22, 2019, 10 pages.
Office Action received for European Patent Application No. 19206249.5, mailed on Jan. 11, 2021, 8 pages.
Office Action received for European Patent Application No. 19206249.5, mailed on Jan. 20, 2020, 8 pages.
Office Action received for European Patent Application No. 19207753.5, mailed on May 10, 2021, 4 pages.
Office Action received for European Patent Application No. 19207753.5, mailed on Nov. 12, 2020, 5 pages.
Office Action received for European Patent Application No. 20158824.1, mailed on May 18, 2021, 10 pages.
Office Action received for European Patent Application No. 20217518.8, mailed on Apr. 30, 2021, 8 pages.
Office Action received for European Patent Application No. 10712824.1, mailed on Mar. 1, 2016, 11 pages.
Office Action received for Indian Patent Application No. 201617008291, mailed on Jan. 14, 2020, 7 pages.
Office Action received for Indian Patent Application No. 201617008296, mailed on Jan. 14, 2020, 7 pages.
Office Action received for Indian Patent Application No. 201617009216, mailed on Jan. 24, 2020, 6 pages.
Office Action received for Indian Patent Application No. 201617009428, mailed on Feb. 26, 2020, 7 pages.
Office Action received for Indian Patent Application No. 201818001531, mailed on Mar. 12, 2021, 6 pages.
Office Action Received for Japanese Patent Application No. 2012500842, mailed on Jan. 31, 2014, 5 pages.
Office Action received for Japanese Patent Application No. 2014-148065, mailed on Sep. 7, 2015, 5 pages.
Office Action received for Japanese Patent Application No. 2014-17726, mailed on Feb. 9, 2015, 4 pages.
Office Action received for Japanese Patent Application No. 2016-001259, mailed on Feb. 23, 2018, 11 pages.
Office Action received for Japanese Patent Application No. 2016-001259, mailed on Jan. 6, 2017, 6 pages.
Office Action received for Japanese Patent Application No. 2016-001259, mailed on Nov. 13, 2017, 10 pages.
Office Action received for Japanese Patent Application No. 2016-537945, mailed on Apr. 7, 2017, 6 pages.
Office Action received for Japanese Patent Application No. 2016-537945, mailed on Jan. 9, 2018, 5 pages.
Office Action received for Japanese Patent Application No. 2016-537946, mailed on Aug. 7, 2017, 8 pages.
Office Action received for Japanese Patent Application No. 2016-537946, mailed on Jan. 30, 2017, 12 pages.
Office Action received for Japanese Patent Application No. 2016-537947, mailed on Feb. 24, 2017, 6 pages.
Office Action received for Japanese Patent Application No. 2016-537948, mailed on Apr. 6, 2018, 5 pages.
Office Action received for Japanese Patent Application No. 2016-537948, mailed on Jun. 9, 2017, 10 pages.
Office Action received for Japanese Patent Application No. 2016-537948, mailed on Sep. 3, 2018, 4 pages.
Office Action received for Japanese Patent Application No. 2017-545561, mailed on Aug. 6, 2018, 8 pages.
Office Action received for Japanese Patent Application No. 2018-083313, mailed on Feb. 12, 2019, 4 pages.
Office Action received for Japanese Patent Application No. 2018-090084, mailed on Feb. 15, 2019, 6 pages.
Office Action received for Japanese Patent Application No. 2018-119170, mailed on May 10, 2019, 8 pages.
Office Action received for Japanese Patent Application No. 2018-143982, mailed on Dec. 7, 2018, 10 pages.
Office Action received for Japanese Patent Application No. 2019-088503, mailed on Apr. 2, 2021, 6 pages.
Office Action received for Japanese Patent Application No. 2019-088503, mailed on Jul. 31, 2020, 7 pages.
Office Action received for Japanese Patent Application No. 2019-116590, mailed on Mar. 15, 2021, 6 pages.
Office Action received for Japanese Patent Application No. 2019-116590, mailed on Oct. 5, 2020, 6 pages.
Office Action received for Japanese Patent Application No. 2019-138053, mailed on Oct. 2, 2020, 6 pages.
Office Action received for Korean Patent Application No. 10-2013-7028487, mailed on Feb. 18, 2016, 8 pages.
Office Action Received for Korean Patent Application No. 10-2013-7028487, mailed on Jun. 5, 2015, 9 pages.
Office Action received for Korean Patent Application No. 10-2013-7028487, mailed on Jun. 13, 2016, 6 pages.
Office Action received for Korean Patent Application No. 10-2013-7028489, mailed on Jun. 4, 2015, 4 pages.
Office Action received for Korean Patent Application No. 10-2016-7008449, mailed on Jan. 12, 2017, 15 pages.
Office Action received for Korean Patent Application No. 10-2016-7008449, mailed on Jan. 16, 2018, 10 pages.
Office Action received for Korean Patent Application No. 10-2016-7008449, mailed on Nov. 27, 2017, 6 pages.
Office Action received for Korean Patent Application No. 10-2016-7008474, mailed on Aug. 6, 2018, 10 pages.
Office Action received for Korean Patent Application No. 10-2016-7008474, mailed on Dec. 30, 2016, 10 pages.
Office Action received for Korean Patent Application No. 10-2016-7008474, mailed on May 15, 2018, 7 pages.
Office Action received for Korean Patent Application No. 10-2016-7008474, mailed on Nov. 27, 2017, 6 pages.
Office Action received for Korean Patent Application No. 10-2016-7008488, mailed on Feb. 8, 2018, 8 pages.
Office Action received for Korean Patent Application No. 10-2016-7008488, mailed on Jan. 12, 2017, 14 pages.
Office Action received for Korean Patent Application No. 10-2016-7008488, mailed on Nov. 27, 2017, 6 pages.
Office Action received for Korean Patent Application No. 10-2016-7008682, mailed on Dec. 30, 2016, 11 pages.
Office Action received for Korean Patent Application No. 10-2016-7008682, mailed on Feb. 8, 2018, 7 pages.
Office Action received for Korean Patent Application No. 10-2016-7008682, mailed on Nov. 27, 2017, 7 pages.
Office Action received for Korean Patent Application No. 10-2017-7024506, mailed on Aug. 12, 2019, 6 pages.
Office Action received for Korean Patent Application No. 10-2017-7024506, mailed on Feb. 19, 2020, 12 pages.
Office Action received for Korean Patent Application No. 10-2017-7024506, mailed on Jul. 8, 2020, 6 pages.
Office Action received for Korean Patent Application No. 10-2017-7024506, mailed on Sep. 28, 2018, 11 pages.
Office Action received for Korean Patent Application No. 10-2018-7002695, mailed on Feb. 27, 2018, 12 pages.
Office Action received for Korean Patent Application No. 10-2018-7002695, mailed on Jun. 19, 2018, 8 pages.
Office Action received for Korean Patent Application No. 10-2018-7010872, mailed on May 21, 2018, 10 pages.
Office Action received for Korean Patent Application No. 10-2018-7013265, mailed on Aug. 10, 2018, 12 pages.
Office Action received for Korean Patent Application No. 10-2018-7013265, mailed on Jun. 14, 2019, 6 pages.
Office Action received for Korean Patent Application No. 10-2018-7032106, mailed on Dec. 26, 2018, 10 pages.
Office Action received for Korean Patent Application No. 10-2018-7033888, mailed on Jul. 7, 2020, 7 pages.
Office Action received for Korean Patent Application No. 10-2018-7033888, mailed on Nov. 28, 2019, 10 pages.
Office Action received for Korean Patent Application No. 10-2018-7033888, mailed on Oct. 19, 2020, 10 pages.
Office Action received for Korean Patent Application No. 10-2019-7007748, mailed on Nov. 15, 2019, 9 pages.
Office Action received for Korean Patent Application No. 10-2019-7028736, mailed on May 7, 2020, 8 pages.
Office Action received for Korean Patent Application No. 10-2019-7028736, mailed on Nov. 28, 2019, 8 pages.

(56) References Cited

OTHER PUBLICATIONS

Office Action received for Korean Patent Application No. 10-2019-7028736, mailed on Oct. 22, 2020, 6 pages.
Office Action received for Korean Patent Application No. 10-2020-7019035, mailed on Aug. 28, 2020, 6 pages.
Office Action received for Korean Patent Application No. 10-2020-7022802, mailed on Aug. 28, 2020, 7 pages.
Office Action received for Korean Patent Application No. 10-2021-7001482, mailed on Apr. 9, 2021, 10 pages.
Office Action received for Korean Patent Application No. 10-2021-7001918, mailed on May 7, 2021, 5 pages.
Office Action received for Korean Patent Application No. 10-2021-7005523, mailed on Mar. 31, 2021, 8 pages.
Office Action received for Korean Patent Application No. 10-2021-7017259, mailed on Jul. 19, 2021, 10 pages.
Office Action received for Korean Patent Application No. 10-2018-7010872, mailed on Feb. 13, 2019, 7 pages.
Office Action received for Taiwan Patent Application No. 103130519, mailed on Mar. 25, 2016, 14 pages.
Office Action received for Taiwanese Patent Application No. 103130517, mailed on Feb. 6, 2018, 5 pages.
Office Action received for Taiwanese Patent Application No. 103130517, mailed on Feb. 22, 2016, 7 pages.
Office Action received for Taiwanese Patent Application No. 103130517, mailed on Jul. 29, 2016, 7 pages.
Office Action received for Taiwanese Patent Application No. 103130518, mailed on Oct. 15, 2015, 7 pages.
Office Action received for Taiwanese Patent Application No. 103130520, mailed on Apr. 17, 2017, 8 pages.
Office Action received for Taiwanese Patent Application No. 103130520, mailed on Jan. 23, 2018, 5 pages.
Office Action received for Taiwanese Patent Application No. 103130520, mailed on May 23, 2016, 38 pages.
Office Action received for Taiwanese Patent Application No. 103130520, mailed on Oct. 1, 2015, 58 pages.
Office Action received for Taiwanese Patent Application No. 103130520, mailed on Sep. 29, 2016, 39 pages.
Office Action received for Taiwanese Patent Application No. 104107318, mailed on Dec. 26, 2018, 33 pages.
Office Action received for Taiwanese Patent Application No. 104107318, mailed on Feb. 18, 2020, 10 pages.
Office Action received for Taiwanese Patent Application No. 104107318, mailed on Jul. 9, 2021, 5 pages.
Office Action received for Taiwanese Patent Application No. 104107327, mailed on Sep. 28, 2018, 7 pages.
Office Action received for Taiwanese Patent Application No. 104107329, mailed on Jul. 24, 2020, 7 pages.
Office Action received for Taiwanese Patent Application No. 104107329, mailed on Mar. 5, 2020, 22 pages.
Office Action received for Taiwanese Patent Application No. 104107333, mailed on May 17, 2016, 6 pages.
Office Action received for Taiwanese Patent Application No. 104107334, mailed on Sep. 19, 2016, 15 pages.
Office Action received for Taiwanese Patent Application No. 104128701, mailed on Jul. 22, 2016, 25 pages.
Office Action received for Taiwanese Patent Application No. 104128701, mailed on Mar. 16, 2017, 8 pages.
Office Action received for Taiwanese Patent Application No. 104133281, mailed on Mar. 30, 2017, 10 pages.
Office Action received for Taiwanese Patent Application No. 104133281, mailed on Sep. 1, 2016, 10 pages.
Office Action received for Taiwanese Patent Application No. 104120843, mailed on Jan. 30, 2016, 5 pages.
On-Line Definition for "Playback", American Heritage Dictionary of the English Language, 4th Edition, 2000, 1 page.
Partial European Search Report received for European Patent Application No. 19173371.6, mailed on Jul. 18, 2019, 17 pages.
Partial European Search Report received for European Patent Application No. 19173886.3, mailed on Jul. 18, 2019, 15 pages.
Partial European Search Report received for European Patent Application No. 20158824.1, mailed on May 8, 2020, 14 pages.
Partial European Search Report received for European Patent Application No. 18197583.0, mailed on Jan. 14, 2019, 18 pages.
PartyShare—turn your Xperia into a jukebox, Available at: https://forum.xda-developers.com/crossdevice-dev/sony/app-partyshare-xperia-jukebox-t2877807, Sep. 15, 2014, 5 pages.
Pedersen Isabel, "Ready to Wear or Not) Examining the Rhetorical Impact of Proposed Wearable Devices", 2013 IEEE International Symposium on Technology and Society ISTAS) Social Implications of Wearable Computing and Augmediated Reality III Everyday Life, Dec. 31, 2013, pp. 201-202.
Quick Time Movie Player Ver. 2.1.2.59, Current Time Indicator Dragging Operation, Ver. 2.1.2.59, 1996, 1 page.
Raghunath et al., "User Interfaces for Applications on a Wrist Watch", Personal and Ubiquitous Computing, vol. 6, Springer Verlag, London, Ltd., 2002, pp. 17-30.
RealOne Player Version 2.0 Screen Dumps, 2002, 4 pages.
Responding to a meeting invitation, Available online at:—https://web.archive.org/web/20121128174157/https://www.zimbra.com/desktop7/help/en_US/Calendar/Responding_to_an_invitation.htm, Nov. 28, 2012, 1 page.
Restriction Requirement received for U.S. Appl. No. 10/374,013, mailed on Oct. 6, 2006, 4 pages.
Restriction Requirement received for U.S. Appl. No. 11/767,409, mailed on Sep. 21, 2010, 8 pages.
Restriction Requirement received for U.S. Appl. No. 12/215,651, mailed on Sep. 28, 2011, 11 pages.
Restriction Requirement received for U.S. Appl. No. 12/395,537, mailed on May 9, 2011, 6 pages.
Restriction Requirement received for U.S. Appl. No. 12/395,541, mailed on May 27, 2011, 6 pages.
Result of Consultation received for European Patent Application No. 18197583.0, mailed on Feb. 24, 2021, 3 pages.
Result of Consultation received for European Patent Application No. 18197589.7, mailed on Dec. 1, 2020, 9 pages.
Result of Consultation received for European Patent Application No. 18197589.7, mailed on Dec. 17, 2020, 6 pages.
Rev. Some Culture, "It's super easy for middle-aged and elderly people to learn compute", Jul. 31, 2013, 2 pages.
Review: Samsung Radiant R3 Wireless Speakers, Available Online at: https://www.youtube.com/watch?v=ZBICVE1WdKE, Jan. 19, 2016, 3 pages.
Samsung, "Samsung—User manual—Galaxy Watch", Online available at: https://content.abt.com/documents/90234/SM-R810NZDAXAR-use.pdf, Aug. 24, 2018, 102 pages.
Samsung, "Control an individual smart device on your watch", Online Available at: https://www.samsung.com/US/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung R3 Wireless 360° Smart Speaker Black)", User Manual ver. 1.0 ENGLISH), User manual [online], Available Online at: https://www.samsung.com/uk/support/model/WAM3500/XU/, Dec. 16, 2016, 3 pages.
Sawyer Brian, "Get with the Coverflow", Available online at: https://briansawyer.net/2005/12/08/get-with-the-coverflow/, Dec. 9, 2005, pp. 1-2.
Search Report received for European Patent Application No. 00923491.5, mailed on Jun. 2, 2006, 6 pages.
Search Report received for European Patent Application No. 00923491.5, mailed on Mar. 6, 2006, 4 pages.
Search Report and Opinion received for Danish Patent Application No. PA201770401, mailed on Jun. 19, 2017, 6 pages.
Search Report and Opinion received for Danish Patent Application No. PA201870060 mailed on Apr. 30, 2018, 7 pages.
Search Report and Opinion received for Danish Patent Application No. PA201870419, mailed on Aug. 27, 2018, 7 pages.
Search Report and Opinion received for Danish Patent Application No. PA201870419, mailed on Sep. 10, 2018, 9 pages.

(56) References Cited

OTHER PUBLICATIONS

Search Report and Opinion received for Danish Patent Application No. PA201870598, mailed on Dec. 5, 2018, 8 pages.
Search Report and opinion received for Danish Patent Application No. PA201870631, mailed on Dec. 6, 2018, 8 pages.
Search Report and Opinion received for Danish Patent Application No. PA201870632, mailed on Dec. 3, 2018, 8 pages.
Search Report and Opinion received for Danish Patent Application No. PA201970259, mailed on Jul. 19, 2019, 10 pages.
Search Report received for Danish Patent Application No. PA201570781, mailed on Mar. 8, 2016, 10 pages.
Search Report received for Danish Patent Application No. PA201770404, mailed on Jun. 20, 2017, 8 pages.
Search Report received for Danish Patent Application No. PA201770409, mailed on Jun. 20, 2017, 9 pages.
Search Report received for European Patent Application No. 18157131.6, mailed on Apr. 19, 2018, 4 pages.
Seifert Dan, "Google Home review: Home is where the smart is", The Verge, Available Online at: https://www.theverge.com/2016/11/3/13504658/google-home-review-speaker-assistant-amazon-echo-competitor, Nov. 3, 2016, 11 pages.
Smart Home App—What is the Widget, Online Available at: https://support.vivint.com/s/article/Vivint-Smart-Home-App-What-is-the-Widget, Jan. 26, 2019, 4 pages.
Smarttricks, "Top 3 Music Player for Android", Available online at: https://www.youtube.com/watch?v=He7RTn4CL34, Feb. 22, 2017, 4 pages.
Sonos, "Sonos Controller App for iPad Product Guide", Available online at: https://www.sonos.com/documents/productguides/en/iPadGuide_EN.pdf, Nov. 2014, 47 pages.
Stroud Forrest, "Screen Lock Meaning & Definition", Online Available at: https://www.webopedia.com/definitions/screen-lock, Jan. 30, 2014, 3 pages.
Summon to Attend Oral Proceeding received for European Patent Application No. 10177099.8 mailed on Mar. 20, 2013, 9 pages.
Summons to attend oral proceedings received for European Patent Application No. 00923491.5, mailed on Jan. 27, 2011, 10 pages.
Summons to Attend Oral Proceedings received for European Patent Application No. 07842262.3, mailed on Jun. 25, 2018, 9 pages.
Summons to Attend Oral Proceedings received for European Patent Application No. 14772001.5, mailed on Nov. 14, 2018, 5 pages.
Summons to Attend Oral Proceedings received for European Patent Application No. 14772001.5, mailed on Oct. 4, 2018, 15 pages.
Summons to Attend Oral Proceedings received for European Patent Application No. 18197583.0, mailed on Aug. 14, 2020, 12 pages.
Summons to attend Oral proceedings received for European Patent Application No. 18197589.7, mailed on Apr. 9, 2020, 7 pages.
Summons to Attend Oral Proceedings received for European Patent Application No. 10177096.4, mailed on Sep. 21, 2018, 12 pages.
Summons to Oral Proceedings received for German Patent Application No. 112007002143.8 mailed on Nov. 28, 2018, 13 pages.
Supplemental Notice of Allowance received for U.S. Appl. No. 15/818,500, mailed on Mar. 5, 2021, 2 pages.
Supplemental Notice of Allowance received for U.S. Appl. No. 16/584,490, mailed on Apr. 13, 2021, 2 pages.
Tablet Talk, "Tablet Talk App: Frequently Asked Questions -Tablet Talk.", available at: https://web.archive.org/web/20140625102903/http://1www.tablettal app.com/faq, Jun. 25, 2014, pp. 1-6.
The interview with a key person. IBM and CITIZEN met and applied Linux to a watch, Ascii Corporation, vol. 25, No. 12, Dec. 12, 2001, pp. 136-143.
The Window Club, "How to Set GIF as Background Windows 7", Online Available at: https://www.youtube.com/watch?v=tUec42Qd7ng, Dec. 24, 2012, pp. 1-5.
Tong et al., "Discussion About the Influence of Wearable Device on Mobile Operators'Service", Telecom science, Oct. 31, 2014, pp. 134-142.
WatchPad 1.5, Online Available at http://web.archive.org/web/20011205071448/http://www.trl.IBM.com:80/projects/ngm/index_e.htm, Dec. 5, 2001, 2 pages.
Watchpad 1.5.mpeg, YouTube.com, Online Available at: https://www.youtube.com/watch?v=7xjvVbeUn80, Uploaded on Jun. 20, 2010, 2 pages.
Whitehouse Ben, "Coverflow: Better Digital Music Navigation", Whitehouse&Company, Online Available at: http://wandco.com/2005/08/coverflow-better-digital-music-navigation/, Aug. 15, 2005, pp. 1-3.
Wikipedia, "Rotary encoder", Online Available at: https://en.wikipedia.org/wiki/Rotary_encoder, Retrieved on May 17, 2017, 17 pages.
Windows Media Player for Windows XP version 8.0, 2001, 2 pages.
Woolsey Amanda, "Apple Watch Tips—How to Add and Play Music", Available online at: https://www.youtube.com/watch?v=E0QEuqMaoi8, Apr. 26, 2015, 3 pages.
WZ Science Alliance, "Very simple geriatrics computer and Internet bestselling upgrade", Sep. 30, 2013, 3 pages.
Yamaguchi Yuu, "Useful Freeware and Shareware Information", Pick Up ONLINEWARE, 23th, MdN, vol. 146, MdN Corporation, Jun. 6, 2006, 4 pages.
Corrected Notice of Allowance received for U.S. Appl. No. 14/913,349, mailed on Sep. 1, 2022, 2 pages.
Decision of Appeal received for Korean Patent Application No. 10-2021-7001918, mailed on Aug. 23, 2022, 14 pages (2 pages of English Translation and 12 pages of Official Copy).
Final Office Action received for U.S. Appl. No. 16/703,486, mailed on Aug. 26, 2022, 14 pages.
Office Action received for European Patent Application No. 21197457.1, mailed on Sep. 2, 2022, 8 pages.
Office Action received for Japanese Patent Application No. 2021-126843, mailed on Aug. 29, 2022, 6 pages (3 pages of English Translation and 3 pages of Official Copy).
Final Office Action received for U.S. Appl. No. 17/212,850, mailed on Jun. 1, 2022, 14 pages.
Notice of Acceptance received for Australian Patent Application No. 2021203669, mailed on May 25, 2022, 3 pages.
Notice of Acceptance received for Australian Patent Application No. 2022202458, mailed on May 6, 2022, 3 pages.
Result of Consultation received for European Patent Application No. 20158824.1, mailed on May 17, 2022, 7 pages.
Advisory Action received for U.S. Appl. No. 16/703,486, mailed on Nov. 15, 2022, 5 pages.
Applicant-Initiated Interview Summary received for U.S. Appl. No. 16/922,675, mailed on Nov. 15, 2022, 2 pages.
Applicant-Initiated Interview Summary received for U.S. Appl. No. 17/572,117, mailed on Nov. 17, 2022, 4 pages.
Corrected Notice of Allowance received for U.S. Appl. No. 14/913,349, mailed on Nov. 3, 2022, 2 pages.
Office Action received for Australian Patent Application No. 2022200515, mailed on Nov. 2, 2022, 2 pages.
Examiner's Answer to Appeal Brief received for U.S. Appl. No. 16/703,486, mailed on Jun. 6, 2023, 20 pages.
Notice of Allowance received for U.S. Appl. No. 17/752,582, mailed on Jun. 13, 2023, 18 pages.
Office Action received for Australian Patent Application No. 2022241590, mailed on Jun. 7, 2023, 7 pages.
Office Action received for Chinese Patent Application No. 201911023176.8, mailed on Apr. 15, 2023, 6 pages (3 pages of English Translation and 3 pages of Official Copy).
Office Action received for Chinese Patent Application No. 201911127810.2, mailed on May 18, 2023, 12 pages (6 pages of English Translation and 6 pages of Official Copy).
Office Action received for European Patent Application No. 19206249.5, mailed on Jun. 16, 2023, 6 pages.
Applicant Initiated Interview Summary received for U.S. Appl. No. 17/176,908, mailed on Jun. 14, 2022, 6 pages.
Brief Communication Regarding Oral Proceedings received for European Patent Application No. 20158824.1, mailed on May 30, 2022, 1 page.
Corrected Notice of Allowance received for U.S. Appl. No. 16/803,849, mailed on Jun. 8, 2022, 3 pages.
Decision to Grant received for European Patent Application No. 19207753.5, mailed on Jun. 2, 2022, 3 pages.
Non-Final Office Action received for U.S. Appl. No. 16/922,675, mailed on Jun. 8, 2022, 21 pages.

(56) References Cited

OTHER PUBLICATIONS

Notice of Allowance received for U.S. Appl. No. 16/775,528, mailed on Jun. 15, 2022, 6 pages.
Office Action received for Korean Patent Application No. 10-2021-7039120, mailed on May 30, 2022, 7 pages (3 pages of English Translation and 4 pages of Official Copy).
Office Action received for Korean Patent Application No. 10-2022-7006175, mailed on May 27, 2022, 7 pages (3 pages of English Translation and 4 pages of Official Copy).
Summons to Attend Oral Proceedings received for European Patent Application No. 18728002.9, mailed on Jun. 3, 2022, 15 pages.
Brief Communication Regarding Oral Proceedings received for European Patent Application No. 18728002.9, mailed on Dec. 7, 2022, 1 page.
Brief Communication Regarding Oral Proceedings received for European Patent Application No. 18728002.9, mailed on Nov. 28, 2022, 7 pages.
Cohn Emily, "Sonos Just Fixed the Most Annoying Thing About Its iPhone App", online available at <https://www.businessinsider.com/sonos-mobile-app-works-on-lock-screen-2016-6>, Jun. 27, 2016, 2 pages.
Fingas Jon, "Sonos Puts Speaker Controls On Your iPhone's Lock Screen", online available at <https://www.engadget.com/2016-06-21-sonos-ios-lock-screen-controls.html>, Jun. 21, 2016, 3 pages.
Kazmucha Allyson, "Sonos Controller App for iPhone and i Pad Review", online available at <https://www.imore.com/sonos-controller-app-iphone-and-ipad-review>, Mar. 1, 2018, 4 pages.
Notice of Allowance received for U.S. Appl. No. 16/917,659, mailed on Dec. 1, 2022, 11 pages.
Notice of Allowance received for U.S. Appl. No. 16/922,675, mailed on Dec. 8, 2022, 9 pages.
Office Action received for Australian Patent Application No. 2021277718, mailed on Dec. 5, 2022, 3 pages.
Office Action received for Chinese Patent Application No. 201911023176.8, mailed on Oct. 25, 2022, 12 pages (6 pages of English Translation and 6 pages of Official Copy).
Non-Final Office Action received for U.S. Appl. No. 17/747,804, mailed on Mar. 1, 2023, 14 pages.
Non-Final Office Action received for U.S. Appl. No. 17/867,317, mailed on Feb. 28, 2023, 18 pages.
Notice of Allowance received for U.S. Appl. No. 16/888,775, mailed on Feb. 21, 2023, 5 pages.
Office Action received for Australian Patent Application No. 2021212114, mailed on Feb. 14, 2023, 4 pages.
Office Action received for Chinese Patent Application No. 201911288715.0, mailed on Jan. 20, 2023, 23 pages (11 pages of English Translation and 12 pages of Official Copy).
Office Action received for Japanese Patent Application No. 2021-111630, mailed on Feb. 10, 2023, 9 pages (4 pages of English Translation and 5 pages of Official Copy).
Supplemental Notice of Allowance received for U.S. Appl. No. 16/888,775, mailed on Mar. 1, 2023, 2 pages.
Corrected Notice of Allowance received for U.S. Appl. No. 16/922,675, mailed on Jan. 9, 2023, 3 pages.
Corrected Notice of Allowance received for U.S. Appl. No. 17/902,191, mailed on Jan. 10, 2023, 2 pages.
Extended European Search Report received for European Patent Application No. 22195584.2, mailed on Jan. 5, 2023, 13 pages.
Extended European Search Report received for European Patent Application No. 22201007.6, mailed on Jan. 12, 2023, 7 pages.
Final Office Action received for U.S. Appl. No. 16/734,173, mailed on Jan. 5, 2023, 15 pages.
Notice of Allowance received for Chinese Patent Application No. 201910438645.6, mailed on Dec. 28, 2022, 7 pages (3 pages of English Translation and 4 pages of Official Copy).
Notice of Allowance received for Japanese Patent Application No. 2021-126843, mailed on Jan. 6, 2023, 4 pages (1 page of English Translation and 3 pages of Official Copy).
Notice of Allowance received for U.S. Appl. No. 15/818,500, mailed on Jan. 17, 2023, 17 pages.
Craciunoiu Marius, "Hide header on scroll down, show on scroll up", https://medium.com/@mariusc23/hide-header-on-scroll-down-show-on-scroll-up-67bbaae9a78c, Nov. 27, 2013, 5 pages.
Applicant-Initiated Interview Summary received for U.S. Appl. No. 17/572,117, mailed on Feb. 1, 2023, 4 pages.
Corrected Notice of Allowance received for U.S. Appl. No. 16/922,675, mailed on Jan. 20, 2023, 3 pages.
Non-Final Office Action received for U.S. Appl. No. 16/871,995, mailed on Jan. 31, 2023, 19 pages.
Notice of Allowance received for Korean Patent Application No. 10-2022-7006175, mailed on Jan. 12, 2023, 7 pages (2 pages of English Translation and 5 pages of Official Copy).
Office Action received for Australian Patent Application No. 2021277718, mailed on Jan. 23, 2023, 4 pages.
Office Action received for Chinese Patent Application No. 201910875660.7, mailed on Dec. 26, 2022, 7 pages (3 pages of English Translation and 4 pages of Official Copy).
Applicant-Initiated Interview Summary received for U.S. Appl. No. 17/212,850, mailed on Jul. 20, 2022, 5 pages.
Corrected Notice of Allowance received for U.S. Appl. No. 16/803,849, mailed on Jul. 7, 2022, 3 pages.
Decision of Appeal received for Korean Patent Application No. 10-2021-7017259, mailed on Jun. 29, 2022, 28 pages (04 pages of English Translation and 24 pages of Official Copy).
Notice of Allowance received for Chinese Patent Application No. 201910446753.8, mailed on Jun. 29, 2022, 2 pages (1 page of English Translation and 1 page of Official Copy).
Notice of Allowance received for U.S. Appl. No. 14/913,349, mailed on Jul. 15, 2022, 6 pages.
Notice of Allowance received for U.S. Appl. No. 16/917,659, mailed on Jul. 8, 2022, 11 pages.
Notice of Allowance received for U.S. Appl. No. 17/378,451, mailed on Jul. 7, 2022, 8 pages.
Office Action received for European Patent Application No. 20217518.8, mailed on Jul. 6, 2022, 5 pages.
Corrected Notice of Allowance received for U.S. Appl. No. 18/102,025, mailed on Nov. 15, 2023, 6 pages.
Notice of Acceptance received for Australian Patent Application No. 2022235609, mailed on Nov. 14, 2023, 3 pages.
Notice of Acceptance received for Australian Patent Application No. 2023202432, mailed on Nov. 6, 2023, 3 pages.
Notice of Allowance received for U.S. Appl. No. 18/102,025, mailed on Nov. 3, 2023, 9 pages.
Notice of Allowance received for U.S. Appl. No. 18/144,108, mailed on Nov. 22, 2023, 8 pages.
Office Action received for Chinese Patent Application No. 201910875660.7, mailed on Oct. 18, 2023, 6 pages (3 pages of English Translation and 3 pages of Official Copy).
Office Action received for Japanese Patent Application No. 2022-129377, mailed on Nov. 10, 2023, 6 pages (3 pages of English Translation and 3 pages of Official Copy).
Supplemental Notice of Allowance received for U.S. Appl. No. 17/901,559, mailed on Nov. 3, 2023, 2 pages.
Non-Final Office Action received for U.S. Appl. No. 18/102,025, mailed on Oct. 10, 2023, 12 pages.
Notice of Allowance received for Chinese Patent Application No. 202111483033.2, mailed on Oct. 7, 2023, 4 pages (1 page of English Translation and 3 pages of Official Copy).
Notice of Allowance received for Japanese Patent Application No. 2022-126562, mailed on Sep. 29, 2023, 4 pages (1 page of English Translation and 3 pages of Official Copy).
Office Action received for European Patent Application No. 19173371.6, mailed on Oct. 9, 2023, 21 pages.
Office Action received for European Patent Application No. 22201007.6, mailed on Oct. 9, 2023, 5 pages.
Notice of Acceptance received for Australian Patent Application No. 2022218540, mailed on Oct. 16, 2023, 3 pages.
Notice of Allowance received for U.S. Appl. No. 17/901,559, mailed on Oct. 19, 2023, 9 pages.
Notice of Allowance received for U.S. Appl. No. 18/077,891, mailed on Oct. 19, 2023, 18 pages.
Summons to Attend Oral Proceedings received for European Patent Application No. 19173886.3, mailed on Oct. 20, 2023, 18 pages.

(56) References Cited

OTHER PUBLICATIONS

Extended European Search Report received for European Patent Application No. 23190753.6, mailed on Nov. 22, 2023, 13 pages.
Notice of Acceptance received for Australian Patent Application No. 2022241590, mailed on Nov. 14, 2023, 3 pages.
Notice of Allowance received for U.S. Appl. No. 17/901,559, mailed on Nov. 24, 2023, 3 pages.
Summons to Attend Oral Proceedings received for European Patent Application No. 21197457.1, mailed on Nov. 23, 2023, 12 pages.
Applicant-Initiated Interview Summary received for U.S. Appl. No. 17/878,792, mailed on Sep. 8, 2023, 4 pages.
Corrected Notice of Allowance received for U.S. Appl. No. 17/848,845, mailed on Aug. 28, 2023, 3 pages.
Decision to Grant received for European Patent Application No. 18728002.9, mailed on Aug. 31, 2023, 4 pages.
Notice of Allowance received for Chinese Patent Application No. 201911023176.8, mailed on Aug. 15, 2023, 2 pages (1 page of English Translation and 1 page of Official Copy).
Notice of Allowance received for U.S. Appl. No. 17/212,850, mailed on Sep. 5, 2023, 18 pages.
Notice of Allowance received for U.S. Appl. No. 17/867,317, mailed on Aug. 30, 2023, 6 pages.
Office Action received for Australian Patent Application No. 2022235585, mailed on Jul. 27, 2023, 4 pages.
Office Action received for Chinese Patent Application No. 201911022448.2, mailed on Jul. 14, 2023, 13 pages (5 pages of English Translation and 8 pages of Official Copy).
Office Action received for Chinese Patent Application No. 201911127810.2, mailed on Jul. 26, 2023, 11 pages (5 pages of English Translation and 6 pages of Official Copy).
Office Action received for Chinese Patent Application No. 202110902807.4, mailed on Jul. 4, 2023, 15 pages (6 pages of English Translation and 9 pages of Official Copy).
Corrected Notice of Allowance received for U.S. Appl. No. 18/144,108, mailed on Dec. 14, 2023, 2 pages.
Intention to Grant received for European Patent Application No. 19217240.1, mailed on Dec. 14, 2023, 10 pages.
Non-Final Office Action received for U.S. Appl. No. 17/950,823, mailed on Dec. 18, 2023, 13 pages.
Office Action received for Chinese Patent Application No. 201911022448.2, mailed on Nov. 13, 2023, 13 pages (5 pages of English Translation and 8 pages of Official Copy).
Office Action received for Chinese Patent Application No. 202211502699.2, mailed on Nov. 16, 2023, 17 pages (10 pages of English Translation and 7 pages of Official Copy).
Office Action received for Korean Patent Application No. 10-2023-7008877, mailed on Nov. 29, 2023, 7 pages (3 pages of English Translation and 4 pages of Official Copy).
Supplemental Notice of Allowance received for U.S. Appl. No. 17/901,559, mailed on Dec. 11, 2023, 7 pages.
Notice of Allowance received for Chinese Patent Application No. 201911129908.1, mailed on Dec. 8, 2023, 4 pages (1 page of English Translation and 3 pages of Official Copy).
Notice of Allowance received for U.S. Appl. No. 17/901,559, mailed on Dec. 26, 2023, 3 pages.
Office Action received for European Patent Application No. 20190670.8, mailed on Dec. 22, 2023, 7 pages.
Office Action received for European Patent Application No. 22157106.0, mailed on Dec. 21, 2023, 6 pages.
Extended European Search Report received for European patent Application No. 23191379.9, mailed on Sep. 18, 2023, 8 pages.
Office Action received for Australian Patent Application No. 2023202432, mailed on Sep. 18, 2023, 4 pages.
Office Action received for Chinese Patent Application No. 201910875660.7, mailed on Aug. 12, 2023, 15 pages (6 pages of English Translation and 9 pages of Official Copy).
Office Action received for European Patent Application No. 20746429.8, mailed on Sep. 20, 2023, 10 pages.
Office Action received for Japanese Patent Application No. 2022-045923, mailed on Sep. 8, 2023, 8 pages (4 pages of English Translation and 4 pages of Official Copy).
Final Office Action received for U.S. Appl. No. 17/878,792, mailed on Jan. 8, 2024, 23 pages.
Notice of Allowance received for Chinese Patent Application No. 201910875660.7, mailed on Jan. 4, 2024, 2 pages (1 page of English Translation and 1 page of Official Copy).
Notice of Hearing received for Indian Patent Application No. 202018015998, mailed on Dec. 15, 2023, 3 pages.
Notice of Hearing received for Indian Patent Application No. 202018016000, mailed on Dec. 15, 2023, 3 pages.
Office Action received for Chinese Patent Application No. 202110902807.4, mailed on Dec. 15, 2023, 12 pages (5 pages of English Translation and 7 pages of Official Copy).
Office Action received for Korean Patent Application No. 10-2022-7045500, mailed on Dec. 28, 2023, 5 pages (2 pages of English Translation and 3 pages of Official Copy).
Supplemental Notice of Allowance received for U.S. Appl. No. 17/901,559, mailed on Jan. 16, 2024, 3 pages.

* cited by examiner

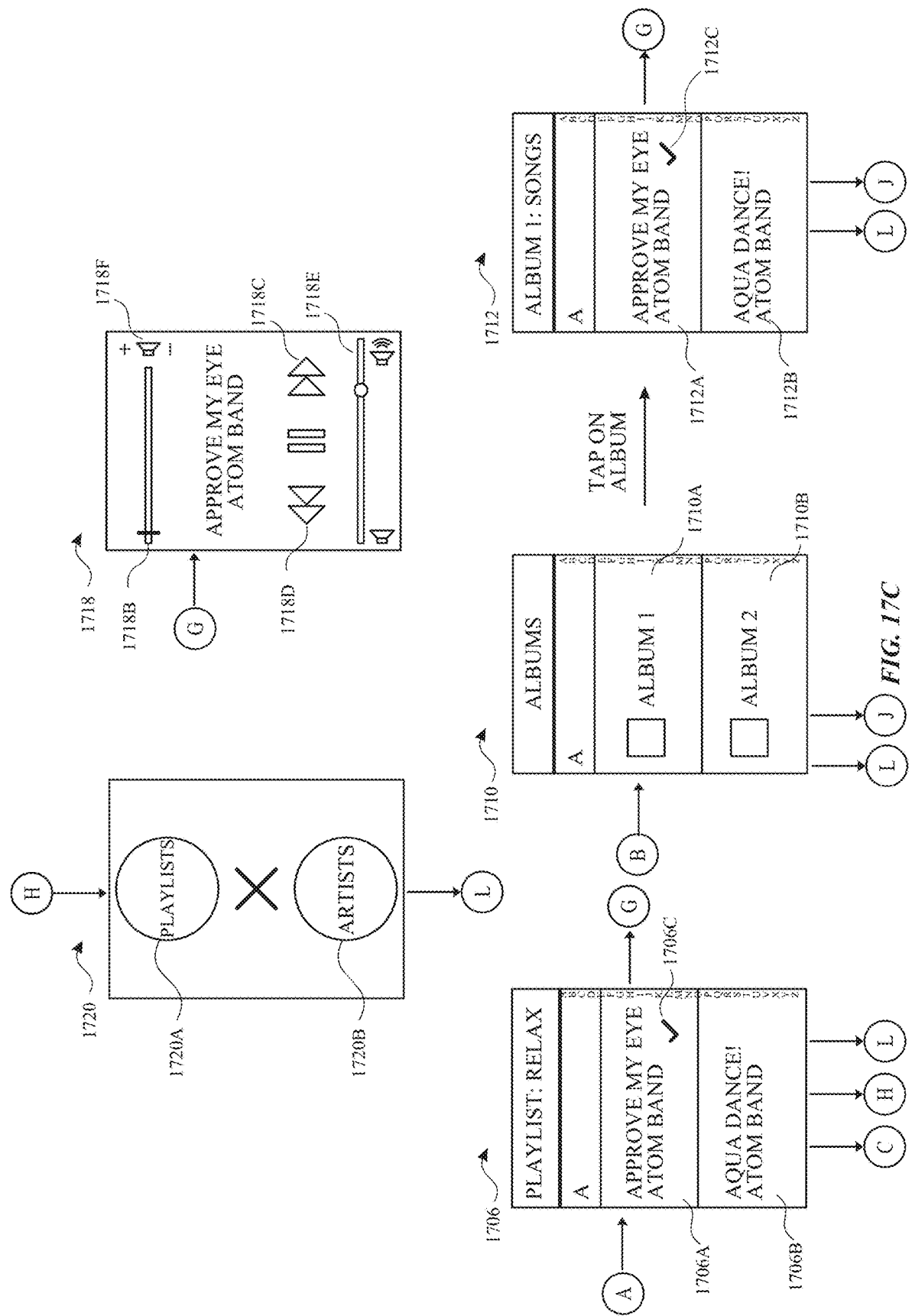

MUSIC USER INTERFACE

CROSS-REFERENCE TO RELATED APPLICATIONS

This application is a continuation of U.S. patent application Ser. No. 16/263,280, entitled "MUSIC USER INTERFACE," filed Jan. 31, 2019, which is a continuation of U.S. patent application Ser. No. 14/830,629, entitled "MUSIC USER INTERFACE," filed Aug. 19, 2015, which claims priority to U.S. Provisional Patent Application Ser. No. 62/129,940, entitled "MUSIC USER INTERFACE," filed Mar. 8, 2015, and U.S. Provisional Patent Application Ser. No. 62/044,952, entitled "MUSIC USER INTERFACE," filed Sep. 2, 2014, the content of each of which is hereby incorporated by reference in their entirety for all purposes.

This application also relates to the following applications: International Patent Application Serial No. PCT/US2013/040087, entitled "Device, Method, and Graphical User Interface for Moving a User Interface Object Based on an Intensity of a Press Input," filed May 8, 2013; International Patent Application Serial No. PCT/US2013/040072, entitled "Device, Method, and Graphical User Interface for Providing Feedback for Changing Activation States of a User Interface Object," filed May 8, 2013; International Patent Application Serial No. PCT/US2013/040070, entitled "Device, Method, and Graphical User Interface for Providing Tactile Feedback for Operations Performed in a User Interface," filed May 8, 2013; International Patent Application Serial No. PCT/US2013/040067, entitled "Device, Method, and Graphical User Interface for Facilitating User Interaction with Controls in a User Interface," filed May 8, 2013; International Patent Application Serial No. PCT/US2013/040061, entitled "Device, Method, and Graphical User Interface for Displaying User Interface Objects Corresponding to an Application," filed May 8, 2013; International Patent Application Serial No. PCT/US2013/040058, entitled "Device, Method, and Graphical User Interface for Displaying Additional Information in Response to a User Contact," filed May 8, 2013; International Patent Application Serial No. PCT/US2013/040056, entitled "Device, Method, and Graphical User Interface for Scrolling Nested Regions," filed May 8, 2013; International Patent Application Serial No. PCT/US2013/040054, entitled "Device, Method, and Graphical User Interface for Manipulating Framed Graphical Objects," filed May 8, 2013; International Patent Application Serial No. PCT/US2013/069489, entitled "Device, Method, and Graphical User Interface for Switching Between User Interfaces," filed Nov. 11, 2013; International Patent Application Serial No. PCT/US2013/069486, entitled "Device, Method, and Graphical User Interface for Determining Whether to Scroll or Select Content," filed Nov. 11, 2013; International Patent Application Serial No. PCT/US2013/069484, entitled "Device, Method, and Graphical User Interface for Moving a Cursor According to a Change in an Appearance of a Control Icon with Simulated Three-Dimensional Characteristics," filed Nov. 11, 2013; International Patent Application Serial No. PCT/US2013/069483, entitled "Device, Method, and Graphical User Interface for Transitioning Between Touch Input to Display Output Relationships," filed Nov. 11, 2013; International Patent Application Serial No. PCT/US2013/069479, entitled "Device, Method, and Graphical User Interface for Forgoing Generation of Tactile Output for a Multi-Contact Gesture," filed Nov. 11, 2013; International Patent Application Serial No. PCT/US2013/069472, entitled "Device, Method, and Graphical User Interface for Navigating User Interface Hierarchies," filed Nov. 11, 2013; International Patent Application Serial No. PCT/US2013/040108, entitled "Device, Method, and Graphical User Interface for Moving and Dropping a User Interface Object," filed May 8, 2013; International Patent Application Serial No. PCT/US2013/040101, entitled "Device, Method, and Graphical User Interface for Selecting User Interface Objects," filed May 8, 2013; International Patent Application Serial No. PCT/US2013/040098, entitled "Device, Method, and Graphical User Interface for Displaying Content Associated with a Corresponding Affordance," filed May 8, 2013; International Patent Application Serial No. PCT/US2013/040093, entitled "Device, Method, and Graphical User Interface for Transitioning Between Display States in Response to a Gesture," filed May 8, 2013; International Patent Application Serial No. PCT/US2013/040053, entitled "Device, Method, and Graphical User Interface for Selecting Object within a Group of Objects," filed May 8, 2013; U.S. Patent Application Ser. No. 61/778,211, entitled "Device, Method, and Graphical User Interface for Facilitating User Interaction with Controls in a User Interface," filed Mar. 12, 2013; U.S. Patent Application Ser. No. 61/778,191, entitled "Device, Method, and Graphical User Interface for Displaying User Interface Objects Corresponding to an Application," filed Mar. 12, 2013; U.S. Patent Application Ser. No. 61/778,171, entitled "Device, Method, and Graphical User Interface for Displaying Additional Information in Response to a User Contact," filed Mar. 12, 2013; U.S. Patent Application Ser. No. 61/778,179, entitled "Device, Method and Graphical User Interface for Scrolling Nested Regions," filed Mar. 12, 2013; U.S. Patent Application Ser. No. 61/778,156, entitled "Device, Method, and Graphical User Interface for Manipulating Framed Graphical Objects," filed Mar. 12, 2013; U.S. Patent Application Ser. No. 61/778,125, entitled "Device, Method, And Graphical User Interface for Navigating User Interface Hierarchies," filed Mar. 12, 2013; U.S. Patent Application Ser. No. 61/778,092, entitled "Device, Method, and Graphical User Interface for Selecting Object Within a Group of Objects," filed Mar. 12, 2013; U.S. Patent Application Ser. No. 61/778,418, entitled "Device, Method, and Graphical User Interface for Switching Between User Interfaces," filed Mar. 13, 2013; U.S. Patent Application Ser. No. 61/778,416, entitled "Device, Method, and Graphical User Interface for Determining Whether to Scroll or Select Content," filed Mar. 13, 2013; U.S. Patent Application Ser. No. 61/747,278, entitled "Device, Method, and Graphical User Interface for Manipulating User Interface Objects with Visual and/or Haptic Feedback," filed Dec. 29, 2012; U.S. Patent Application Ser. No. 61/778,414, entitled "Device, Method, and Graphical User Interface for Moving and Dropping a User Interface Object," filed Mar. 13, 2013; U.S. Patent Application Ser. No. 61/778,413, entitled "Device, Method, and Graphical User Interface for Selecting User Interface Objects," filed Mar. 13, 2013; U.S. Patent Application Ser. No. 61/778,412, entitled "Device, Method, and Graphical User Interface for Displaying Content Associated with a Corresponding Affordance," filed Mar. 13, 2013; U.S. Patent Application Ser. No. 61/778,373, entitled "Device, Method, and Graphical User Interface for Managing Activation of a Control Based on Contact Intensity," filed Mar. 12, 2013; U.S. Patent Application Ser. No. 61/778,265, entitled "Device, Method, and Graphical User Interface for Transitioning Between Display States in Response to a Gesture," filed Mar. 12, 2013; U.S. Patent Application Ser. No. 61/778,367, entitled "Device, Method, and Graphical User Interface for Moving a User Interface Object Based on an Intensity of a Press Input," filed Mar. 12, 2013; U.S.

Patent Application Ser. No. 61/778,363, entitled "Device, Method, and Graphical User Interface for Transitioning Between Touch Input to Display Output Relationships," filed Mar. 12, 2013; U.S. Patent Application Ser. No. 61/778,287, entitled "Device, Method, and Graphical User Interface for Providing Feedback for Changing Activation States of a User Interface Object," filed Mar. 12, 2013; U.S. Patent Application Ser. No. 61/778,284, entitled "Device, Method, and Graphical User Interface for Providing Tactile Feedback for Operations Performed in a User Interface," filed Mar. 12, 2013; U.S. Patent Application Ser. No. 61/778,239, entitled "Device, Method, and Graphical User Interface for Forgoing Generation of Tactile Output for a Multi-Contact Gesture," filed Mar. 12, 2013; U.S. Patent Application Ser. No. 61/688,227, entitled "Device, Method, and Graphical User Interface for Manipulating User Interface Objects with Visual and/or Haptic Feedback," filed May 9, 2012; U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices." The content of these applications is hereby incorporated by reference in their entirety.

FIELD

The present disclosure relates generally to computer user interfaces, and more specifically to techniques for accessing and playing music content.

BACKGROUND

The use of electronic devices for accessing and playing music content (e.g., audio files, MPEG3 files, and AAC files) has significantly increased in recent years. Music content typically includes metadata, which identifies the title, artist(s), genre, and album of the music. Users can organize music into playlists. Devices provide a user interface to the user for accessing the music, such as for playback selection.

BRIEF SUMMARY

Some techniques for accessing and playing music using electronic devices, however, are generally cumbersome and inefficient. For example, accessing music for playback may require navigating a complex and time-consuming user interface, which may include multiple key presses or keystrokes. Existing techniques require more time than necessary, wasting user time and device energy. This latter consideration is particularly important in battery-operated devices.

Accordingly, there is a need for electronic devices with faster, more efficient methods and interfaces for accessing and playing music. Such methods and interfaces optionally complement or replace conventional methods for accessing and playing music. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices for accessing and playing music are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device is user-wearable. In some embodiments, the device has a touch-sensitive display (also known as a "touch screen" or "touch screen display"). In some embodiments, the device has a display and a touch-sensitive surface. In some embodiments, the device has a short-range communication radio. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. Executable instructions for performing these functions may be included in a computer-readable storage medium or other computer program product configured for execution by one or more processors.

In some embodiments, a method is performed at an electronic device with a display and a rotatable input mechanism. The method comprises: displaying, on the display, an affordance representing a music application; receiving user input representing movement of the rotatable input mechanism; in response to receiving the user input representing the movement of the rotatable input mechanism, displaying a landing screen of the music application, wherein the landing screen includes display of a playlist affordance, an artist list affordance, and a song list affordance; receiving user input associated with the landing screen; determining whether the user input associated with the landing screen represents a touch associated with the playlist affordance, the artist list affordance, or the song list affordance; in response to receiving the user input associated with the landing screen and in accordance with a determination that the user input associated with the landing screen represents a touch associated with the playlist affordance, displaying, on the display, one or more playlist selection affordances; in response to receiving the user input associated with the landing screen and in accordance with a determination that the user input associated with the landing screen represents a touch associated with the artist list affordance, displaying, on the display, one or more artist selection affordances; and in response to receiving the user input associated with the landing screen and in accordance with a determination that the user input associated with the landing screen represents a touch associated with the song list affordance, displaying, on the display, one or more song selection affordances.

In some embodiments, a non-transitory computer-readable storage medium stores one or more programs, the one or more programs comprising instructions, which when executed by an electronic device with a display and a rotatable input mechanism cause the device to: display, on the display, an affordance representing a music application; receive user input representing movement of the rotatable input mechanism; in response to receiving the user input representing the movement of the rotatable input mechanism, display a landing screen of the music application, wherein the landing screen includes display of a playlist affordance, an artist list affordance, and a song list affordance; receive user input associated with the landing screen; determine whether the user input associated with the landing screen represents a touch associated with the playlist affordance, the artist list affordance, or the song list affordance; in response to receiving the user input associated with the landing screen and in accordance with a determination that the user input associated with the landing screen represents a touch associated with the playlist affordance, display, on the display, one or more playlist selection affordances; in response to receiving the user input associated with the landing screen and in accordance with a determination that the user input associated with the landing screen represents a touch associated with the artist list affordance, display, on the display, one or more artist selection affordances; and in response to receiving the user input associated with the landing screen and in accordance with a determination that the user input associated with the landing screen represents a touch associated with the song list affordance, display, on the display, one or more song selection affordances.

In some embodiments, an electronic device comprises: a display; a rotatable input mechanism; one or more processors; memory; and one or more programs, wherein the one or more programs are stored in the memory and configured to be executed by the one or more processors, the one or more programs including instructions for: displaying, on the display, an affordance representing a music application; receiving user input representing movement of the rotatable input mechanism; in response to receiving the user input representing the movement of the rotatable input mechanism, displaying a landing screen of the music application, wherein the landing screen includes display of a playlist affordance, an artist list affordance, and a song list affordance; receiving user input associated with the landing screen; determining whether the user input associated with the landing screen represents a touch associated with the playlist affordance, the artist list affordance, or the song list affordance; in response to receiving the user input associated with the landing screen and in accordance with a determination that the user input associated with the landing screen represents a touch associated with the playlist affordance, displaying, on the display, one or more playlist selection affordances; in response to receiving the user input associated with the landing screen and in accordance with a determination that the user input associated with the landing screen represents a touch associated with the artist list affordance, displaying, on the display, one or more artist selection affordances; and in response to receiving the user input associated with the landing screen and in accordance with a determination that the user input associated with the landing screen represents a touch associated with the song list affordance, displaying, on the display, one or more song selection affordances.

In some embodiments, an electronic device comprises: a display; a rotatable input mechanism; means for displaying an affordance representing a music application; means for receiving user input representing movement of the rotatable input mechanism; means, responsive to receiving the user input representing the movement of the rotatable input mechanism, for displaying a landing screen of the music application, wherein the landing screen includes display of a playlist affordance, an artist list affordance, and a song list affordance; means for receiving user input associated with the landing screen; means for determining whether the user input associated with the landing screen represents a touch associated with the playlist affordance, the artist list affordance, or the song list affordance; means, responsive to receiving the user input associated with the landing screen and in accordance with a determination that the user input associated with the landing screen represents a touch associated with the playlist affordance, for displaying one or more playlist selection affordances; means, responsive to receiving the user input associated with the landing screen and in accordance with a determination that the user input associated with the landing screen represents a touch associated with the artist list affordance, for displaying one or more artist selection affordances; and means, responsive to receiving the user input associated with the landing screen and in accordance with a determination that the user input associated with the landing screen represents a touch associated with the song list affordance, for displaying one or more song selection affordances.

In some embodiments, an electronic device comprises: a display unit configured to display a graphic user interface; a rotatable input mechanism unit configured to receive movements; and a processing unit coupled to the display unit and the rotatable input mechanism unit, the processing unit configured to: enable display of, on the display, an affordance representing a music application; receive user input representing movement of the rotatable input mechanism; in response to receiving the user input representing the movement of the rotatable input mechanism, enable display of a landing screen of the music application, wherein the landing screen includes display of a playlist affordance, an artist list affordance, and a song list affordance; receive user input associated with the landing screen; determine whether the user input associated with the landing screen represents a touch associated with the playlist affordance, the artist list affordance, or the song list affordance; in response to receiving the user input associated with the landing screen and in accordance with a determination that the user input associated with the landing screen represents a touch associated with the playlist affordance, enable display of, on the display, one or more playlist selection affordances; in response to receiving the user input associated with the landing screen and in accordance with a determination that the user input associated with the landing screen represents a touch associated with the artist list affordance, enable display of, on the display, one or more artist selection affordances; and in response to receiving the user input associated with the landing screen and in accordance with a determination that the user input associated with the landing screen represents a touch associated with the song list affordance, enable display of, on the display, one or more song selection affordances.

In some embodiments, a method is performed at an electronic device with a display, a touch-sensitive surface, and a rotatable input mechanism. The method comprises: displaying an audio playback user interface; receiving a first user input representing movement of the rotatable input mechanism in a rotation direction; in response to receiving the first user input representing the movement of the rotatable input mechanism in the rotation direction, ceasing display of the audio playback user interface and displaying a navigation screen of a music application, wherein the navigation screen includes a playlist affordance, an artist list affordance, and a song list affordance; receiving a second user input associated with the navigation screen; determining whether the second user input represents a contact on the touch-sensitive surface associated with the playlist affordance, the artist list affordance, or the song list affordance; in response to receiving the second user input and in accordance with a determination that the second user input represents a contact associated with the playlist affordance, ceasing display of the navigation screen and displaying a first playlist user interface of two or more playlist user interfaces; in response to receiving the second user input and in accordance with a determination that the second user input represents a contact associated with the artist list affordance, ceasing display of the navigation screen and displaying an artist user interface of two or more artist user interfaces; and in response to receiving the second user input and in accordance with a determination that the second user input represents a contact associated with the song list affordance, ceasing display of the navigation screen and displaying a song user interface of one or more song user interfaces.

In some embodiments, a non-transitory computer-readable storage medium stores one or more programs, the one or more programs comprising instructions, which when executed by an electronic device with a display, a rotatable input mechanism, and a touch-sensitive surface cause the device to: display an audio playback user interface; receive a first user input representing movement of the rotatable input mechanism in a rotation direction; in response to receiving the first user input representing the movement of the rotatable input mechanism in the rotation direction, cease display of the audio playback user interface and display a navigation screen of a music application, wherein the navigation screen includes a playlist affordance, an artist list affordance, and a song list affordance; receive a second user input associated with the navigation screen; determine whether the second user input represents a contact on the touch-sensitive surface associated with the playlist affordance, the artist list affordance, or the song list affordance; in response to receiving the second user input and in accordance with a determination that the second user input represents a contact associated with the playlist affordance, cease display of the navigation screen and display a first playlist user interface of two or more playlist user interfaces; in response to receiving the second user input and in accordance with a determination that the second user input represents a contact associated with the artist list affordance, cease display of the navigation screen and display an artist user interface of two or more artist user interfaces; and in response to receiving the second user input and in accordance with a determination that the second user input represents a contact associated with the song list affordance, cease display of the navigation screen and display a song user interface of one or more song user interfaces.

In some embodiments, an electronic comprises: a display; a rotatable input mechanism; a touch-sensitive surface; one or more processors; memory; and one or more programs, wherein the one or more programs are stored in the memory and configured to be executed by the one or more processors, the one or more programs including instructions for: displaying an audio playback user interface; receiving a first user input representing movement of the rotatable input mechanism in a rotation direction; in response to receiving the first user input representing the movement of the rotatable input mechanism in the rotation direction, ceasing display of the audio playback user interface and displaying a navigation screen of a music application, wherein the navigation screen includes a playlist affordance, an artist list affordance, and a song list affordance; receiving a second user input associated with the navigation screen; determining whether the second user input represents a contact on the touch-sensitive surface associated with the playlist affordance, the artist list affordance, or the song list affordance; in response to receiving the second user input and in accordance with a determination that the second user input represents a contact associated with the playlist affordance, ceasing display of the navigation screen and displaying a first playlist user interface of two or more playlist user interfaces; in response to receiving the second user input and in accordance with a determination that the second user input represents a contact associated with the artist list affordance, ceasing display of the navigation screen and displaying an artist user interface of two or more artist user interfaces; and in response to receiving the second user input and in accordance with a determination that the second user input represents a contact associated with the song list affordance, ceasing display of the navigation screen and displaying a song user interface of one or more song user interfaces.

In some embodiments, an electronic device comprises: a display; a rotatable input mechanism; a touch-sensitive surface configured to detect intensity of touches; means for displaying an audio playback user interface; means for receiving a first user input representing movement of the rotatable input mechanism in a rotation direction; means, responsive to receiving the first user input representing the movement of the rotatable input mechanism in the rotation direction, for ceasing display of the audio playback user interface and displaying a navigation screen of a music application, wherein the navigation screen includes a playlist affordance, an artist list affordance, and a song list affordance; means for receiving a second user input associated with the navigation screen; means for determining whether the second user input represents a contact on the touch-sensitive surface associated with the playlist affordance, the artist list affordance, or the song list affordance; means, responsive to receiving the second user input and in accordance with a determination that the second user input represents a contact associated with the playlist affordance, for ceasing display of the navigation screen and displaying a first playlist user interface of two or more playlist user interfaces; means, responsive to receiving the second user input and in accordance with a determination that the second user input represents a contact associated with the artist list affordance, for ceasing display of the navigation screen and displaying an artist user interface of two or more artist user interfaces; and means, responsive to receiving the second user input and in accordance with a determination that the second user input represents a contact associated with the song list affordance, for ceasing display of the navigation screen and displaying a song user interface of one or more song user interfaces.

In some embodiments, an electronic device comprises: a display unit configured to display a graphic user interface; a rotatable input mechanism unit configured to receive movements; a touch-sensitive surface unit configured to receive contacts; and a processing unit coupled to the display unit, the rotatable input mechanism unit, and the touch-sensitive surface unit, the processing unit configured to: enable display of an audio playback user interface; receive a first user input representing movement of the rotatable input mechanism in a rotation direction; in response to receiving the first user input representing the movement of the rotatable input mechanism in the rotation direction, cease display of the audio playback user interface and enable display of a navigation screen of a music application, wherein the navigation screen includes a playlist affordance, an artist list affordance, and a song list affordance; receive a second user input associated with the navigation screen; determine whether the second user input represents a contact on the touch-sensitive surface associated with the playlist affordance, the artist list affordance, or the song list affordance; in response to receiving the second user input and in accordance with a determination that the second user input represents a contact associated with the playlist affordance, cease display of the navigation screen and enable display of a first playlist user interface of two or more playlist user interfaces; in response to receiving the second user input and in accordance with a determination that the second user input represents a contact associated with the artist list affordance, cease display of the navigation screen and enable display of an artist user interface of two or more artist user interfaces; and in response to receiving the second user input and in accordance with a determination that the second user input represents a contact associated with the song list affordance, cease display of the navigation screen and enable display of a song user interface of one or more song user interfaces.

In some embodiments, a method is performed at an electronic device with a display, a touch-sensitive surface, and a rotatable input mechanism. The method comprises: displaying a first audio playback user interface; receiving user input representing movement of the rotatable input mechanism; in response to receiving the user input representing the movement of the rotatable input mechanism, ceasing display of the first audio playback user interface and displaying a first user interface of a first set of user interfaces; receiving a first user input representing a directional swipe on the touch-sensitive surface; determining whether the first user input represents a swipe in a first direction or a second direction; in response to receiving the first user input and in accordance with a determination that the first user input represents a swipe in the first direction, ceasing display of the first user interface of the first set of user interfaces and displaying a first user interface of a second set of user interfaces; and in response to receiving the first user input and in accordance with a determination that the first user input represents a swipe in the second direction, ceasing display of the first user interface of the first set of user interfaces and displaying a first user interface of a third set of user interfaces.

In some embodiments, a non-transitory computer-readable storage medium stores one or more programs, the one or more programs comprising instructions, which when executed by an electronic device with a display, a rotatable input mechanism, and a touch-sensitive surface cause the device to: display a first audio playback user interface; receive user input representing movement of the rotatable input mechanism; in response to receiving the user input representing the movement of the rotatable input mechanism, cease display of the first audio playback user interface and display a first user interface of a first set of user interfaces; receive a first user input representing a directional swipe on the touch-sensitive surface; determine whether the first user input represents a swipe in a first direction or a second direction; in response to receiving the first user input and in accordance with a determination that the first user input represents a swipe in the first direction, cease display of the first user interface of the first set of user interfaces and display a first user interface of a second set of user interfaces; and in response to receiving the first user input and in accordance with a determination that the first user input represents a swipe in the second direction, cease display of the first user interface of the first set of user interfaces and display a first user interface of a third set of user interfaces.

In some embodiments, an electronic device comprises: a display; a rotatable input mechanism; a touch-sensitive surface; one or more processors; memory; and one or more programs, wherein the one or more programs are stored in the memory and configured to be executed by the one or more processors, the one or more programs including instructions for: displaying a first audio playback user interface; receiving user input representing movement of the rotatable input mechanism; in response to receiving the user input representing the movement of the rotatable input mechanism, ceasing display of the first audio playback user interface and displaying a first user interface of a first set of user interfaces; receiving a first user input representing a directional swipe on the touch-sensitive surface; determining whether the first user input represents a swipe in a first direction or a second direction; in response to receiving the first user input and in accordance with a determination that the first user input represents a swipe in the first direction, ceasing display of the first user interface of the first set of user interfaces and displaying a first user interface of a second set of user interfaces; and in response to receiving the first user input and in accordance with a determination that the first user input represents a swipe in the second direction, ceasing display of the first user interface of the first set of user interfaces and displaying a first user interface of a third set of user interfaces.

In some embodiments, an electronic device comprises: a display; a rotatable input mechanism; a touch-sensitive surface configured to detect intensity of touches; means for displaying a first audio playback user interface; means for receiving user input representing movement of the rotatable input mechanism; means, responsive to receiving the user input representing the movement of the rotatable input mechanism, for ceasing display of the first audio playback user interface and displaying a first user interface of a first set of user interfaces; means for receiving a first user input representing a directional swipe on the touch-sensitive surface; means for determining whether the first user input represents a swipe in a first direction or a second direction; means, responsive to receiving the first user input and in accordance with a determination that the first user input represents a swipe in the first direction, for ceasing display of the first user interface of the first set of user interfaces and displaying a first user interface of a second set of user interfaces; and means, responsive to receiving the first user input and in accordance with a determination that the first user input represents a swipe in the second direction, for ceasing display of the first user interface of the first set of user interfaces and displaying a first user interface of a third set of user interfaces.

In some embodiments, an electronic device comprises: a display unit configured to display a graphic user interface; a touch-sensitive surface unit configured to receive contacts; a rotatable input mechanism unit configured to receive movements; and a processing unit coupled to the display unit, the touch-sensitive surface unit, and the rotatable input mechanism unit, the processing unit configured to: enable display of a first audio playback user interface; receive user input representing movement of the rotatable input mechanism; in response to receiving the user input representing the movement of the rotatable input mechanism, cease display of the first audio playback user interface and enable display of a first user interface of a first set of user interfaces; receive a first user input representing a directional swipe on the touch-sensitive surface; determine whether the first user input represents a swipe in a first direction or a second direction; in response to receiving the first user input and in accordance with a determination that the first user input represents a swipe in the first direction, cease display of the first user interface of the first set of user interfaces and enable display of a first user interface of a second set of user interfaces; and in response to receiving the first user input and in accordance with a determination that the first user input represents a swipe in the second direction, cease display of the first user interface of the first set of user interfaces and enable display of a first user interface of a third set of user interfaces.

In some embodiments, a method is performed at an electronic device with a display and a rotatable input mechanism. The method comprises: displaying an audio playback user interface; receiving a first user input representing a directional swipe in a first direction; in response to receiving the first user input, ceasing display of the audio playback user interface and displaying a first user interface of a first set of user interfaces, the first user interface of the first set of user interfaces comprising a selection affordance; while displaying a user interface of the first set of user interfaces, receiving a second user input representing a directional swipe in a second direction; and in response to receiving the second user input, ceasing display of the first user interface of a first set of user interfaces and displaying the audio playback user interface.

In some embodiments, a non-transitory computer-readable storage medium stores one or more programs, the one or more programs comprising instructions, which when executed by an electronic device with a display and a rotatable input mechanism cause the device to: display an audio playback user interface; receive a first user input representing a directional swipe in a first direction; in response to receiving the first user input, cease display of the audio playback user interface and display a first user interface of a first set of user interfaces, the first user interface of the first set of user interfaces comprising a selection affordance; while displaying a user interface of the first set of user interfaces, receive a second user input representing a directional swipe in a second direction; and in response to receiving the second user input, cease display of the first user interface of a first set of user interfaces and display the audio playback user interface.

In some embodiments, an electronic device comprises: a display; a rotatable input mechanism; a touch-sensitive surface configured to detect intensity of touches; one or more processors; memory; and one or more programs, wherein the one or more programs are stored in the memory and configured to be executed by the one or more processors, the one or more programs including instructions for: displaying an audio playback user interface; receiving a first user input representing a directional swipe in a first direction; in response to receiving the first user input, ceasing display of the audio playback user interface and displaying a first user interface of a first set of user interfaces, the first user interface of the first set of user interfaces comprising a selection affordance; while displaying a user interface of the first set of user interfaces, receiving a second user input representing a directional swipe in a second direction; and in response to receiving the second user input, ceasing display of the first user interface of a first set of user interfaces and displaying the audio playback user interface.

In some embodiments, an electronic device comprises: a display; a rotatable input mechanism; a touch-sensitive surface configured to detect intensity of touches; means for displaying an audio playback user interface; means for receiving a first user input representing a directional swipe in a first direction; means, responsive to receiving the first user input, for ceasing display of the audio playback user interface and displaying a first user interface of a first set of user interfaces, the first user interface of the first set of user interfaces comprising a selection affordance; means, while displaying a user interface of the first set of user interfaces, for receiving a second user input representing a directional swipe in a second direction; and means, responsive to receiving the second user input, for ceasing display of the first user interface of the first set of user interfaces and displaying the audio playback user interface.

In some embodiments, an electronic device comprises: a display unit configured to display a graphic user interface; a rotatable input mechanism unit configured to receive movements; and a processing unit coupled to the display unit and the rotatable input mechanism unit, the processing unit configured to: enable display of an audio playback user interface; receive a first user input representing a directional swipe in a first direction; in response to receiving the first user input, cease display of the audio playback user interface and enable display of a first user interface of a first set of user interfaces, the first user interface of the first set of user interfaces comprising a selection affordance; while displaying a user interface of the first set of user interfaces, receive a second user input representing a directional swipe in a second direction; and in response to receiving the second user input, cease display of the first user interface of a first set of user interfaces and enable display of the audio playback user interface.

In some embodiments, a method is performed at an electronic device with a display and a touch-sensitive surface configured to detect intensity of touches. The method comprises: displaying an audio playback user interface; while displaying the audio playback user interface, receiving user input representing a first contact on the touch-sensitive surface; determining whether a characteristic intensity of the first contact exceeds an intensity threshold; in accordance with a determination that the characteristic intensity of the first contact exceeds the intensity threshold, ceasing display of the audio playback user interface and displaying a first set of affordances; receiving user input representing a second contact associated with an affordance of the first set of affordances; in response to receiving the second contact, ceasing display of the first set of affordances and displaying a first user interface of a first set of user interfaces; and in accordance with a determination that the characteristic intensity of the first contact does not exceed the intensity threshold, forgoing display of the first set of affordances.

In some embodiments, a non-transitory computer-readable storage medium stores one or more programs, the one or more programs comprising instructions, which when executed by an electronic device with a display and a touch-sensitive surface configured to detect intensity of touches cause the device to: display an audio playback user interface; while displaying the audio playback user interface, receive user input representing a first contact on the touch-sensitive surface; determine whether a characteristic intensity of the first contact exceeds an intensity threshold; in accordance with a determination that the characteristic intensity of the first contact exceeds the intensity threshold, cease display of the audio playback user interface and display a first set of affordances; receive user input representing a second contact associated with an affordance of the first set of affordances; in response to receiving the second contact, cease display of the first set of affordances and display a first user interface of a first set of user interfaces; and in accordance with a determination that the characteristic intensity of the first contact does not exceed the intensity threshold, forgo display of the first set of affordances.

In some embodiments, an electronic device comprises: a display; a touch-sensitive surface configured to detect intensity of touches; one or more processors; memory; and one or more programs, wherein the one or more programs are stored in the memory and configured to be executed by the one or more processors, the one or more programs including instructions for: displaying an audio playback user interface; while displaying the audio playback user interface, receiving user input representing a first contact on the touch-sensitive surface; determining whether a characteristic intensity of the first contact exceeds an intensity threshold; in accordance with a determination that the characteristic intensity of the first contact exceeds the intensity threshold, ceasing display of the audio playback user interface and displaying a first set of affordances; receiving user input representing a second contact associated with an affordance of the first set of affordances; in response to receiving the second contact, ceasing display of the first set of affordances and displaying a first user interface of a first set of user interfaces; and in accordance with a determination that the characteristic intensity of the first contact does not exceed the intensity threshold, forgoing display of the first set of affordances.

In some embodiments, an electronic device comprises: a display; a touch-sensitive surface configured to detect intensity of touches; means for displaying an audio playback user interface; means, while displaying the audio playback user interface, for receiving user input representing a first contact on the touch-sensitive surface; means for determining whether a characteristic intensity of the first contact exceeds an intensity threshold; means, in accordance with a determination that the characteristic intensity of the first contact exceeds the intensity threshold, for ceasing display of the audio playback user interface and displaying a first set of affordances; means for receiving user input representing a second contact associated with an affordance of the first set of affordances; means, responsive to receiving the second contact, for ceasing display of the first set of affordances and displaying a first user interface of a first set of user interfaces; and means, in accordance with a determination that the characteristic intensity of the first contact does not exceed the intensity threshold, for forgoing display of the first set of affordances.

In some embodiments, an electronic device comprises: a display unit configured to display a graphic user interface; a touch-sensitive surface unit configured to detect intensity of touches; and a processing unit coupled to the display unit, the rotatable input mechanism unit, and the touch-sensitive surface unit, the processing unit configured to: enable display of an audio playback user interface; while displaying the audio playback user interface, receive user input representing a first contact on the touch-sensitive surface; determine whether a characteristic intensity of the first contact exceeds an intensity threshold; in accordance with a determination that the characteristic intensity of the first contact exceeds the intensity threshold, cease display of the audio playback user interface and enable display of a first set of affordances; receive user input representing a second contact associated with an affordance of the first set of affordances; in response to receiving the second contact, cease display of the first set of affordances and enable display of a first user interface of a first set of user interfaces; and in accordance with a determination that the characteristic intensity of the first contact does not exceed the intensity threshold, forgo display of the first set of affordances.

In some embodiments, a method is performed at an electronic device with a display, a rotatable input mechanism, and a touch-sensitive surface configured to detect intensity of touches. The method comprises: displaying a first audio playback user interface; receiving user input representing a first movement of the rotatable input mechanism; in response to receiving the user input representing the first movement of the rotatable input mechanism, ceasing display of the first audio playback user interface and displaying a first user interface of a first set of user interfaces; while displaying a user interface of the first set of user interfaces, receiving user input representing a first contact on the touch-sensitive surface; determining whether a characteristic intensity of the first contact exceeds an intensity threshold; in accordance with a determination that the characteristic intensity of the first contact exceeds the intensity threshold, ceasing display of first set of user interfaces and displaying a first set of affordances; receiving user input associated with a first affordance of the first set of affordances; in response to receiving the user input associated with the first affordance of the first set of affordances, ceasing display of the first set of affordances and displaying a first user interface of a second set of user interfaces; and in accordance with a determination that the characteristic intensity of the first contact does not exceed the intensity threshold, forgoing display of the first set of affordances.

In some embodiments, a non-transitory computer-readable storage medium stores one or more programs, the one or more programs comprising instructions, which when executed by an electronic device with a display, a rotatable input mechanism, and a touch-sensitive surface configured to detect intensity of touches cause the device to: display a first audio playback user interface; receive user input representing a first movement of the rotatable input mechanism; in response to receiving the user input representing the first movement of the rotatable input mechanism, cease display of the first audio playback user interface and display a first user interface of a first set of user interfaces; while displaying a user interface of the first set of user interfaces, receive user input representing a first contact on the touch-sensitive surface; determine whether a characteristic intensity of the first contact exceeds an intensity threshold; in accordance with a determination that the characteristic intensity of the first contact exceeds the intensity threshold, cease display of first set of user interfaces and display a first set of affordances; receive user input associated with a first affordance of the first set of affordances; in response to receiving the user input associated with the first affordance of the first set of affordances, cease display of the first set of affordances and display a first user interface of a second set of user interfaces; and in accordance with a determination that the characteristic intensity of the first contact does not exceed the intensity threshold, forgo display of the first set of affordances.

In some embodiments, an electronic device comprises: a display; a rotatable input mechanism; a touch-sensitive surface configured to detect intensity of touches; one or more processors; memory; and one or more programs, wherein the one or more programs are stored in the memory and configured to be executed by the one or more processors, the one or more programs including instructions for: displaying a first audio playback user interface; receiving user input representing a first movement of the rotatable input mechanism; in response to receiving the user input representing the first movement of the rotatable input mechanism, ceasing display of the first audio playback user interface and displaying a first user interface of a first set of user interfaces; while displaying a user interface of the first set of user interfaces, receiving user input representing a first contact on the touch-sensitive surface; determining whether a characteristic intensity of the first contact exceeds an intensity threshold; in accordance with a determination that the characteristic intensity of the first contact exceeds the intensity threshold, ceasing display of first set of user interfaces and displaying a first set of affordances; receiving user input associated with a first affordance of the first set of affordances; in response to receiving the user input associated with the first affordance of the first set of affordances, ceasing display of the first set of affordances and displaying a first user interface of a second set of user interfaces; and in accordance with a determination that the characteristic intensity of the first contact does not exceed the intensity threshold, forgoing display of the first set of affordances.

In some embodiments, an electronic device comprises: a display; a rotatable input mechanism; a touch-sensitive surface configured to detect intensity of touches; means for displaying a first audio playback user interface; means for receiving user input representing a first movement of the rotatable input mechanism; means, responsive to receiving the user input representing the first movement of the rotatable input mechanism, for ceasing display of the first audio playback user interface and displaying a first user interface of a first set of user interfaces; means, while displaying a user interface of the first set of user interfaces, for receiving user input representing a first contact on the touch-sensitive surface; means for determining whether a characteristic intensity of the first contact exceeds an intensity threshold; means, in accordance with a determination that the characteristic intensity of the first contact exceeds the intensity threshold, for ceasing display of first set of user interfaces and displaying a first set of affordances; means for receiving user input associated with a first affordance of the first set of affordances; means, responsive to receiving the user input associated with the first affordance of the first set of affordances, for ceasing display of the first set of affordances and displaying a first user interface of a second set of user interfaces; and means, in accordance with a determination that the characteristic intensity of the first contact does not exceed the intensity threshold, for forgoing display of the first set of affordances.

In some embodiments, an electronic device comprises: a display unit configured to display a graphic user interface; a rotatable input mechanism unit configured to receive movements; a touch-sensitive surface unit configured to detect intensity of touches; and a processing unit coupled to the display unit, the rotatable input mechanism unit, and the touch-sensitive surface unit, the processing unit configured to: enable display of a first audio playback user interface; receive user input representing a first movement of the rotatable input mechanism; in response to receiving the user input representing the first movement of the rotatable input mechanism, cease display of the first audio playback user interface and enable display of a first user interface of a first set of user interfaces; while displaying a user interface of the first set of user interfaces, receive user input representing a first contact on the touch-sensitive surface; determine whether a characteristic intensity of the first contact exceeds an intensity threshold; in accordance with a determination that the characteristic intensity of the first contact exceeds the intensity threshold, cease display of first set of user interfaces and enable display of a first set of affordances; receive user input associated with a first affordance of the first set of affordances; in response to receiving the user input associated with the first affordance of the first set of affordances, cease display of the first set of affordances and enable display of a first user interface of a second set of user interfaces; and in accordance with a determination that the characteristic intensity of the first contact does not exceed the intensity threshold, forgo display of the first set of affordances.

In some embodiments, a method is performed at an electronic device with a display and a rotatable input mechanism. The method comprises: displaying a first audio application user interface; while displaying the first audio application user interface, receiving a first user input representing movement of the rotatable input mechanism in a rotation direction; in response to receiving the first user input, ceasing display of the first audio application user interface and displaying a second audio application user interface; while displaying the second audio application user interface, receiving a second user input representing movement of the rotatable input mechanism in the rotation direction; and in response to receiving the second user input, ceasing display of the second audio application user interface and displaying a third audio application user interface.

In some embodiments, a non-transitory computer-readable storage medium stores one or more programs, the one or more programs comprising instructions, which when executed by an electronic device with a display and a rotatable input mechanism cause the device to: display a first audio application user interface; while displaying the first audio application user interface, receive a first user input representing movement of the rotatable input mechanism in a rotation direction; in response to receiving the first user input, cease display of the first audio application user interface and display a second audio application user interface; while displaying the second audio application user interface, receive a second user input representing movement of the rotatable input mechanism in the rotation direction; and in response to receiving the second user input, cease display of the second audio application user interface and display a third audio application user interface.

In some embodiments, an electronic device comprises: a display; a rotatable input mechanism; one or more processors; memory; and one or more programs, wherein the one or more programs are stored in the memory and configured to be executed by the one or more processors, the one or more programs including instructions for: displaying a first audio application user interface; while displaying the first audio application user interface, receiving a first user input representing movement of the rotatable input mechanism in a rotation direction; in response to receiving the first user input, ceasing display of the first audio application user interface and displaying a second audio application user interface; while displaying the second audio application user interface, receiving a second user input representing movement of the rotatable input mechanism in the rotation direction; and in response to receiving the second user input, ceasing display of the second audio application user interface and displaying a third audio application user interface.

In some embodiments, an electronic device comprises: a display; a rotatable input mechanism; means for displaying a first audio application user interface; while displaying the first audio application user interface, means for receiving a first user input representing movement of the rotatable input mechanism in a rotation direction; means, responsive to receiving the first user input, for ceasing display of the first audio application user interface and displaying a second audio application user interface; while displaying the second audio application user interface, means for receiving a second user input representing movement of the rotatable input mechanism in the rotation direction; and means, responsive to receiving the second user input, for ceasing display of the second audio application user interface and displaying a third audio application user interface.

In some embodiments, an electronic device comprises: a display unit configured to display a graphic user interface; a rotatable input mechanism unit configured to receive movements; and a processing unit coupled to the display unit and the rotatable input mechanism unit, the processing unit configured to: enable display of a first audio application user interface; while displaying the first audio application user interface, receive a first user input representing movement of the rotatable input mechanism in a rotation direction; in response to receiving the first user input, cease display of the first audio application user interface and enable display of a second audio application user interface; while displaying the second audio application user interface, receive a second user input representing movement of the rotatable input mechanism in the rotation direction; and in response to receiving the second user input, cease display of the second audio application user interface and enable display of a third audio application user interface.

In some embodiments, a method is performed at an electronic device with a display, a touch-sensitive surface, and a rotatable input mechanism. The method comprises: displaying a first audio playback user interface; while displaying the first audio playback user interface, receiving a first user input representing movement of the rotatable input mechanism; in response to receiving the first user input, ceasing display of the first audio playback user interface and displaying a first user interface of a first set of user interfaces; while displaying a user interface of the first set of user interfaces, receiving a second user input representing a swipe in a first direction; in response to receiving the second user input, replacing display of a portion of the user interface of the first set of user interfaces with display of a navigation interface, wherein the navigation interface comprises a first navigation affordance associated with the first set of user interfaces and a second navigation affordance associated with a second set of user interfaces; receiving a third user input associated with the second navigation affordance of the navigation interface; and in response to receiving the third user input, ceasing display of the first set of user interfaces and the navigation interface and displaying a first user interface of the second set of user interfaces.

In some embodiments, a non-transitory computer-readable storage medium stores one or more programs, the one or more programs comprising instructions, which when executed by an electronic device with a display, a rotatable input mechanism, and a touch-sensitive surface cause the device to: display a first audio playback user interface; while displaying the first audio playback user interface, receive a first user input representing movement of the rotatable input mechanism; in response to receiving the first user input, cease display of the first audio playback user interface and display a first user interface of a first set of user interfaces; while displaying a user interface of the first set of user interfaces, receive a second user input representing a swipe in a first direction; in response to receiving the second user input, replace display of a portion of the user interface of the first set of user interfaces with display of a navigation interface, wherein the navigation interface comprises a first navigation affordance associated with the first set of user interfaces and a second navigation affordance associated with a second set of user interfaces, receive a third user input associated with the second navigation affordance of the navigation interface; and in response to receiving the third user input, cease display of the first set of user interfaces and the navigation interface and display a first user interface of the second set of user interfaces.

In some embodiments, an electronic device comprises: a display; a rotatable input mechanism; a touch-sensitive surface; one or more processors; memory; and one or more programs, wherein the one or more programs are stored in the memory and configured to be executed by the one or more processors, the one or more programs including instructions for: displaying a first audio playback user interface; while displaying the first audio playback user interface, receiving a first user input representing movement of the rotatable input mechanism; in response to receiving the first user input, ceasing display of the first audio playback user interface and displaying a first user interface of a first set of user interfaces; while displaying a user interface of the first set of user interfaces, receiving a second user input representing a swipe in a first direction; in response to receiving the second user input, replacing display of a portion of the user interface of the first set of user interfaces with display of a navigation interface, wherein the navigation interface comprises a first navigation affordance associated with the first set of user interfaces and a second navigation affordance associated with a second set of user interfaces, receiving a third user input associated with the second navigation affordance of the navigation interface; and in response to receiving the third user input, ceasing display of the first set of user interfaces and the navigation interface and displaying a first user interface of the second set of user interfaces.

In some embodiments, an electronic device comprises: a display; a rotatable input mechanism; a touch-sensitive surface; means for displaying a first audio playback user interface; means, while displaying the first audio playback user interface, for receiving a first user input representing movement of the rotatable input mechanism; means, responsive to receiving the first user input, for ceasing display of the first audio playback user interface and displaying a first user interface of a first set of user interfaces; means, while displaying a user interface of the first set of user interfaces, for receiving a second user input representing a swipe in a first direction; means, responsive to receiving the second user input, for replacing display of a portion of the user interface of the first set of user interfaces with display of a navigation interface, wherein the navigation interface comprises a first navigation affordance associated with the first set of user interfaces and a second navigation affordance associated with a second set of user interfaces, means for receiving a third user input associated with the second navigation affordance of the navigation interface; and means, responsive to receiving the third user input, for ceasing display of the first set of user interfaces and the navigation interface and displaying a first user interface of the second set of user interfaces.

In some embodiments, an electronic device comprises: a display unit configured to display a graphic user interface; a rotatable input mechanism unit configured to receive movements; a touch-sensitive surface unit configured to receive contacts; and a processing unit coupled to the display unit, the rotatable input mechanism unit, and the touch-sensitive surface unit, the processing unit configured to: enable display of a first audio playback user interface; while displaying the first audio playback user interface, receive a first user input representing movement of the rotatable input mechanism; in response to receiving the first user input, cease display of the first audio playback user interface and enable display of a first user interface of a first set of user interfaces; while displaying a user interface of the first set of user interfaces, receive a second user input representing a swipe in a first direction; in response to receiving the second user input, replace display of a portion of the user interface of the first set of user interfaces with display of a navigation interface, wherein the navigation interface comprises a first navigation affordance associated with the first set of user interfaces and a second navigation affordance associated with a second set of user interfaces; receive a third user input associated with the second navigation affordance of the navigation interface; and in response to receiving the third user input, cease display of the first set of user interfaces and the navigation interface and enable display of a first user interface of the second set of user interfaces.

Thus, devices are provided with faster, more efficient methods and interfaces for accessing and playing music, thereby increasing the effectiveness, efficiency, and user satisfaction with such devices. Such methods and interfaces may complement or replace conventional methods for accessing and playing music.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 17A-17C illustrate exemplary user interfaces in accordance with some embodiments.

DESCRIPTION OF EMBODIMENTS

Figure 1A:
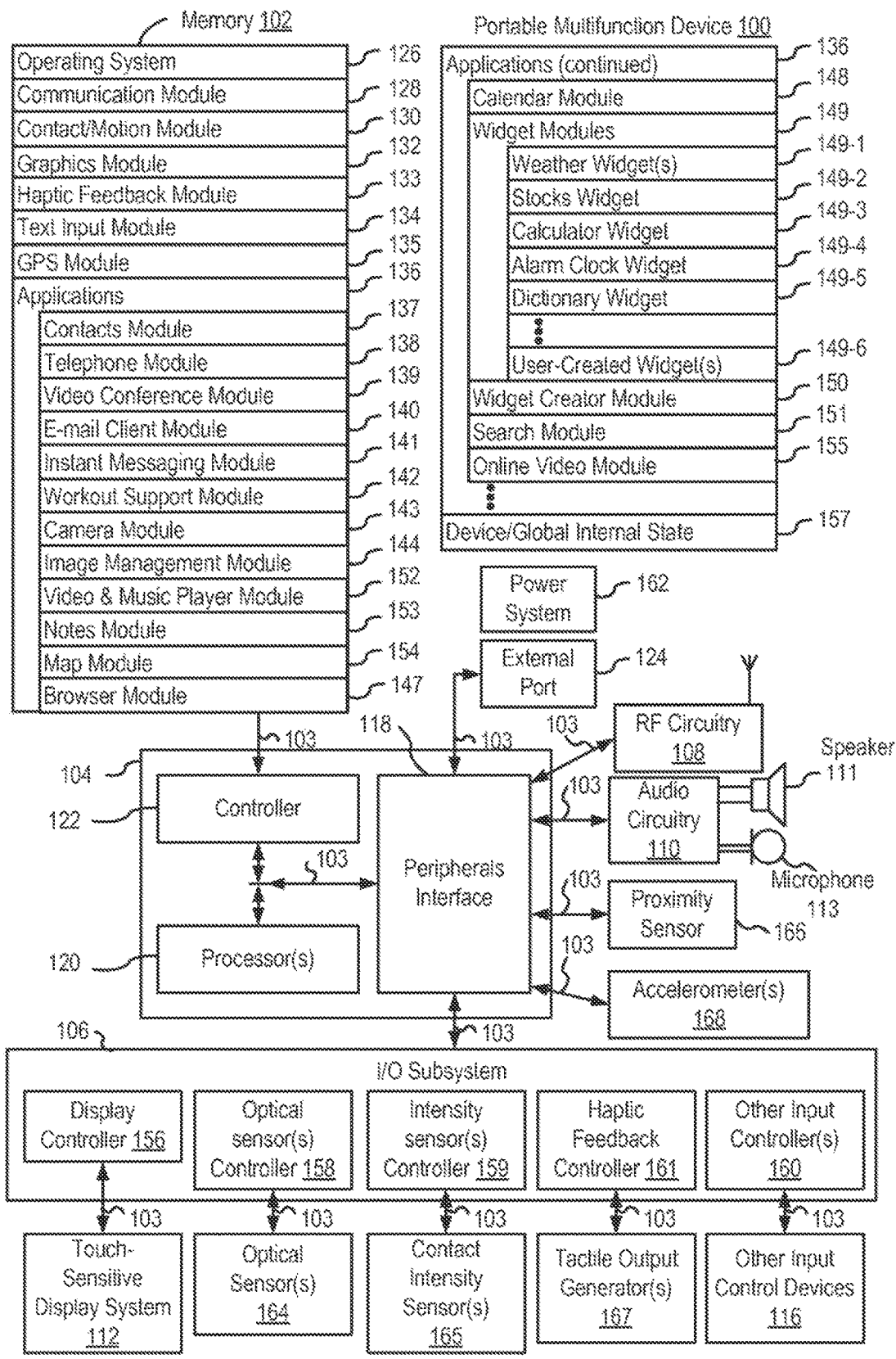
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

There is a need for electronic devices that provide efficient music access to a user for playback. For example, ease of use for viewing music, playing music, shuffling music, and repeating music contribute to the efficiency of music access. Such techniques can reduce the cognitive burden on a user who accesses and plays music, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for accessing and playing music. FIGS. 6A-6D, 9A-9C, 11A-11C, 13A-13C, 15A-15C, 17A-17C, 19A-19C, 21A-21C, and 23 illustrate exemplary user interfaces for accessing and playing music. The user interfaces in the figures are also used to illustrate the processes described below, including the process in FIGS. 7, 10, 12, 14, 16, 18, 20, and 22.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes one or more computer-readable storage mediums. The computer-readable storage mediums are optionally tangible and non-transitory. The computer-readable storage mediums are optionally transitory. Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
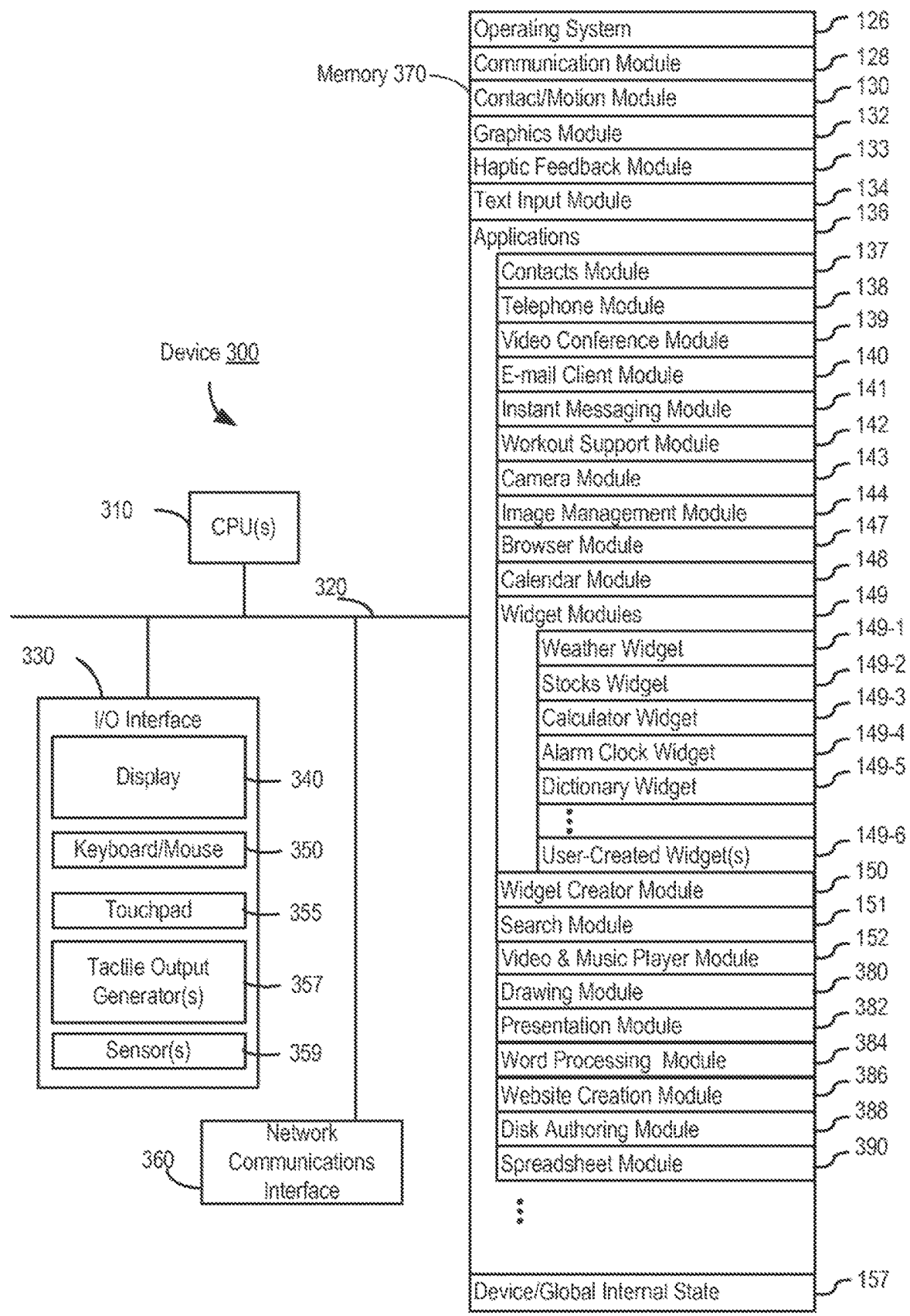
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are, optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
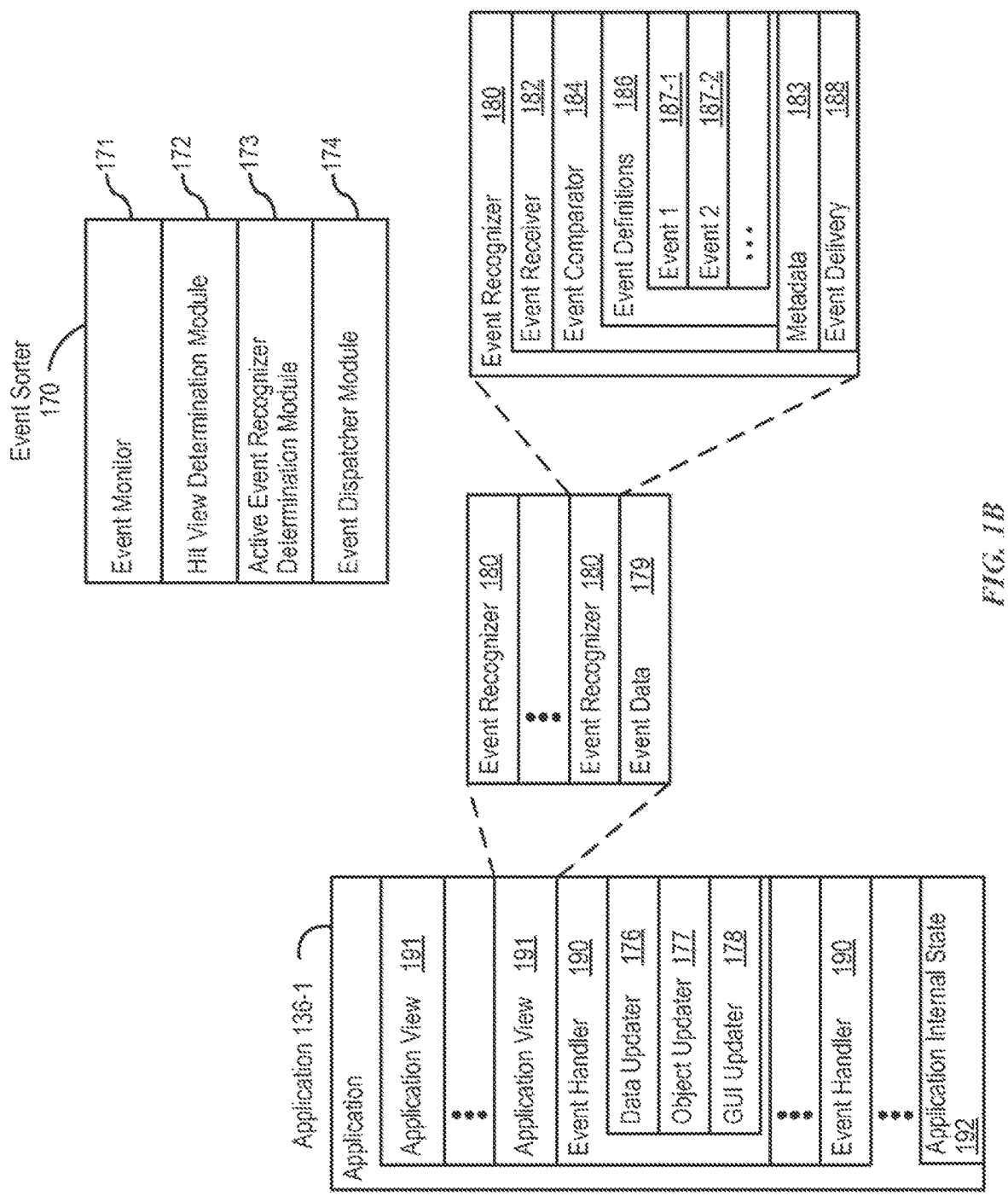
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
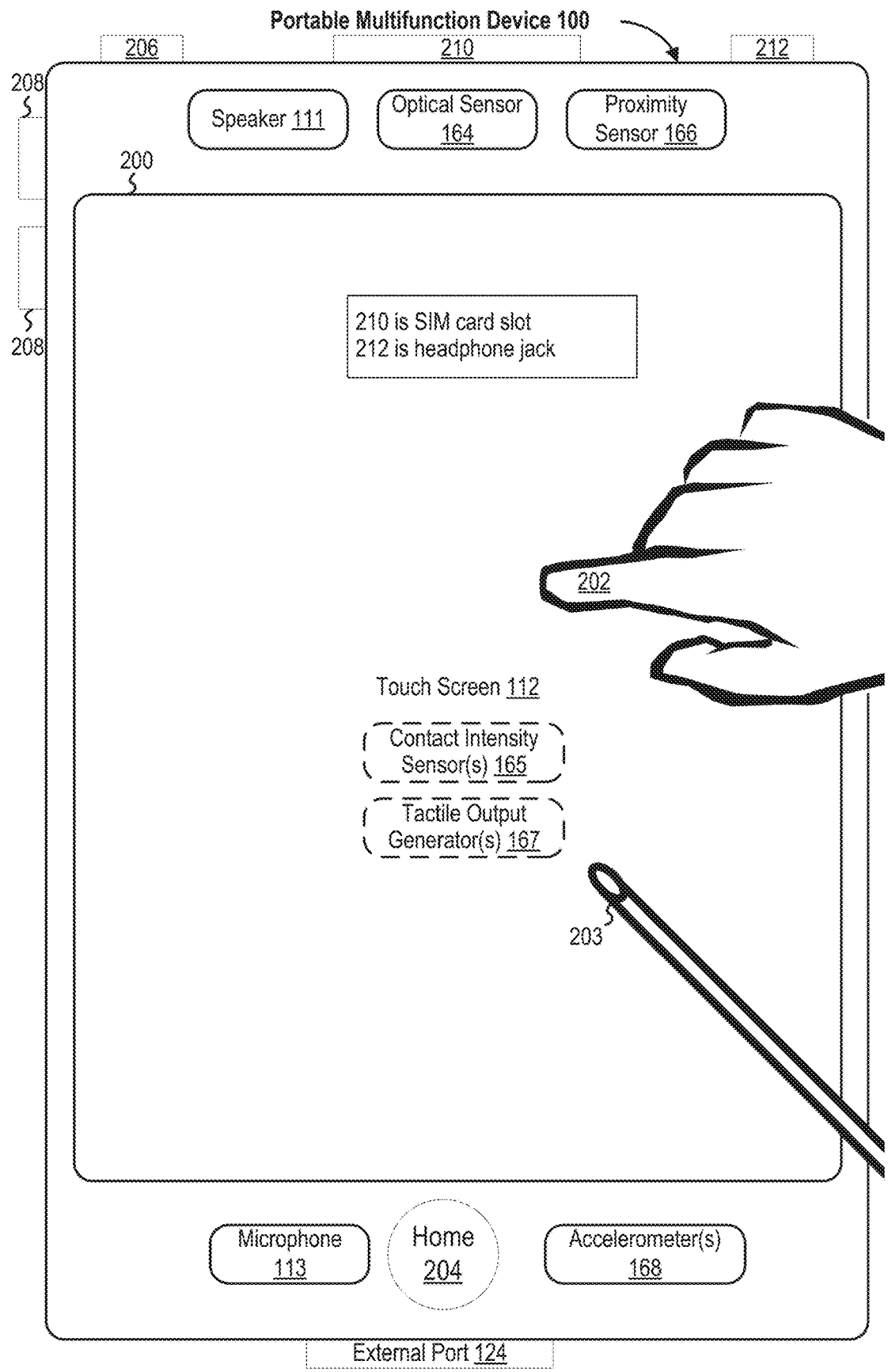
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 are, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that is, optionally, implemented on, for example, portable multifunction device 100.

Figure 4A:
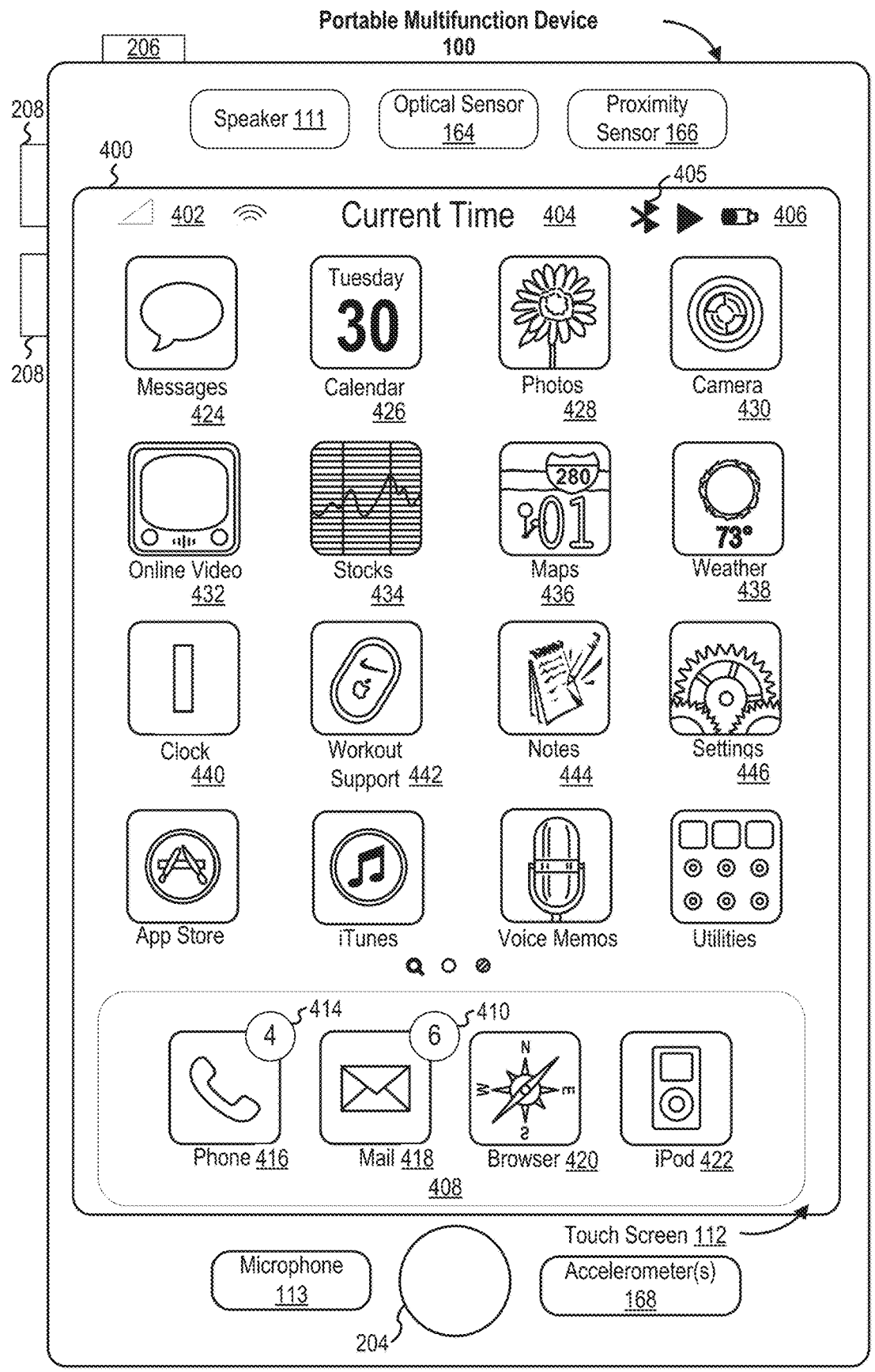
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
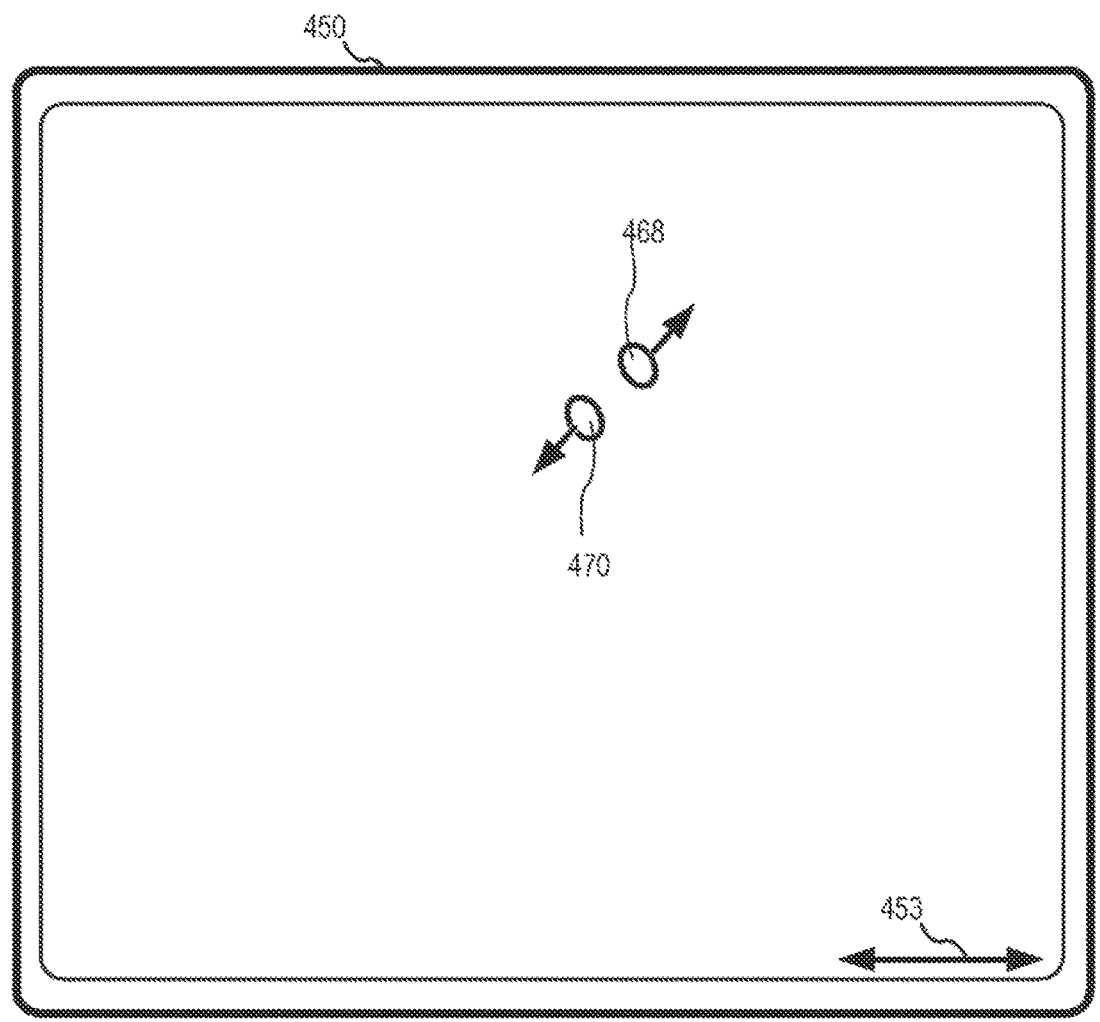
FIG. 4B illustrates an exemplary user interface for a multifunction device with a touch-sensitive surface that is separate from the display in accordance with some embodiments.
Figure 4B:
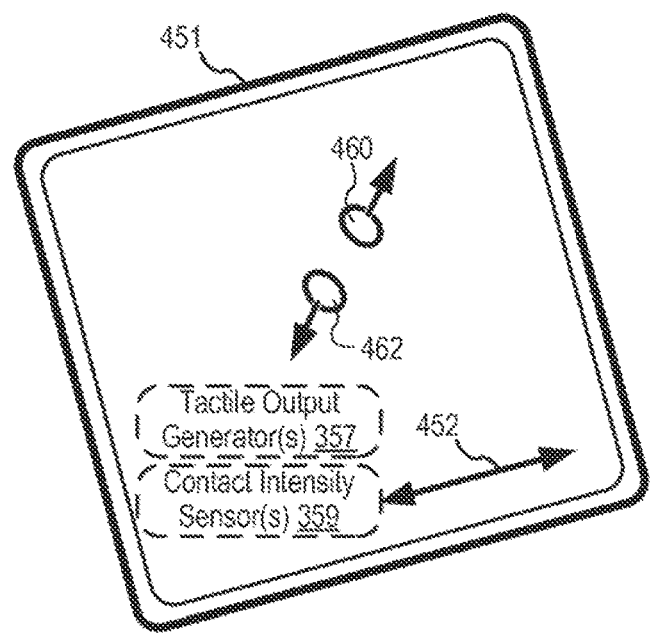

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
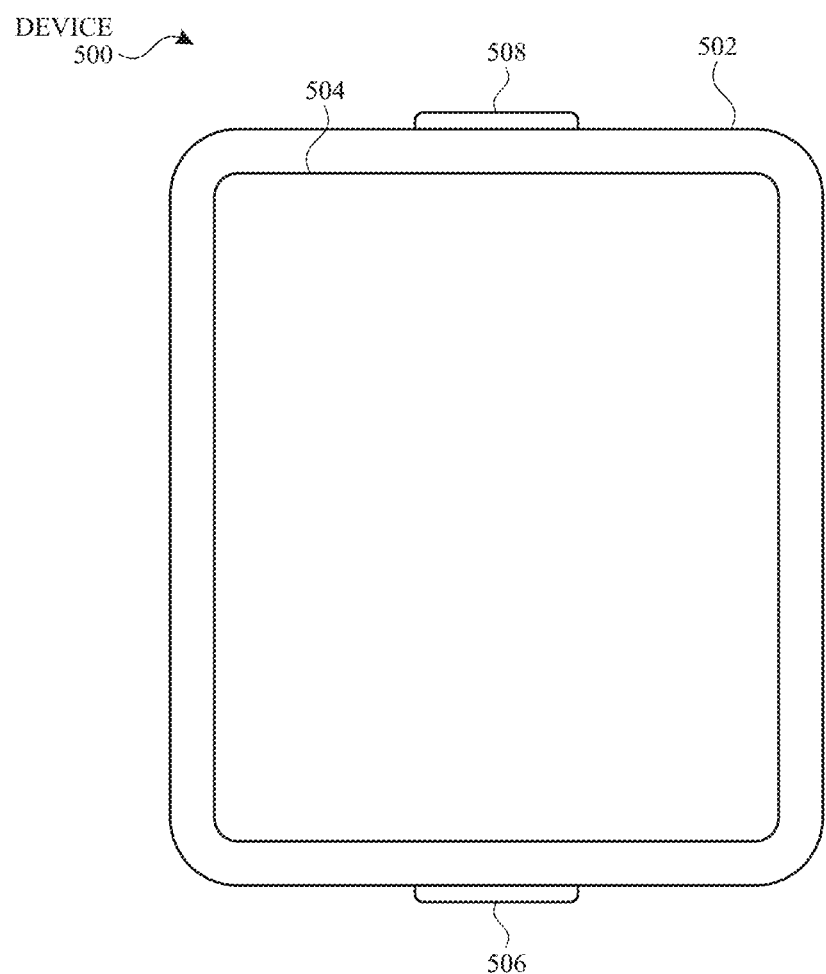
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
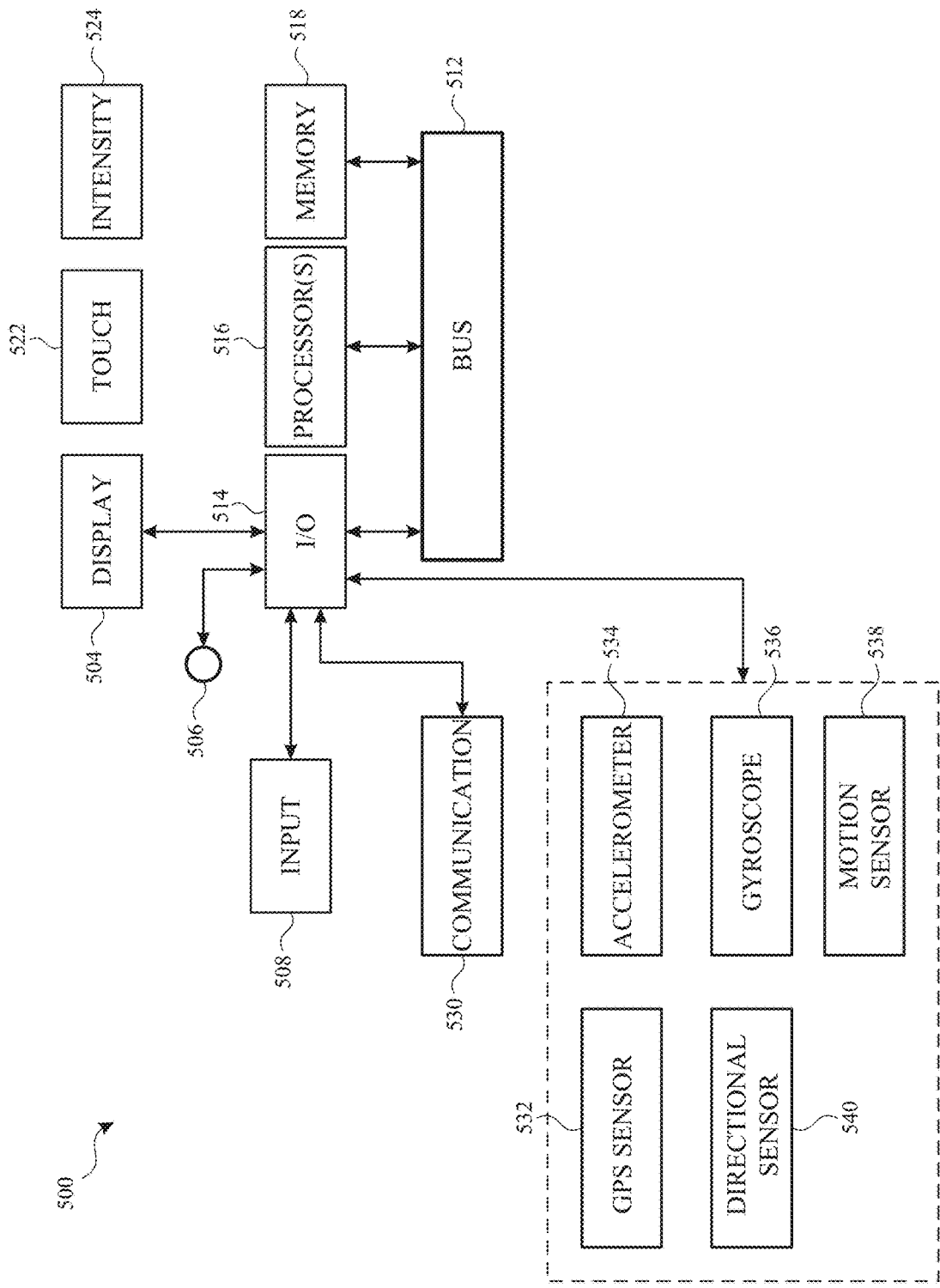
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and a rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 22:
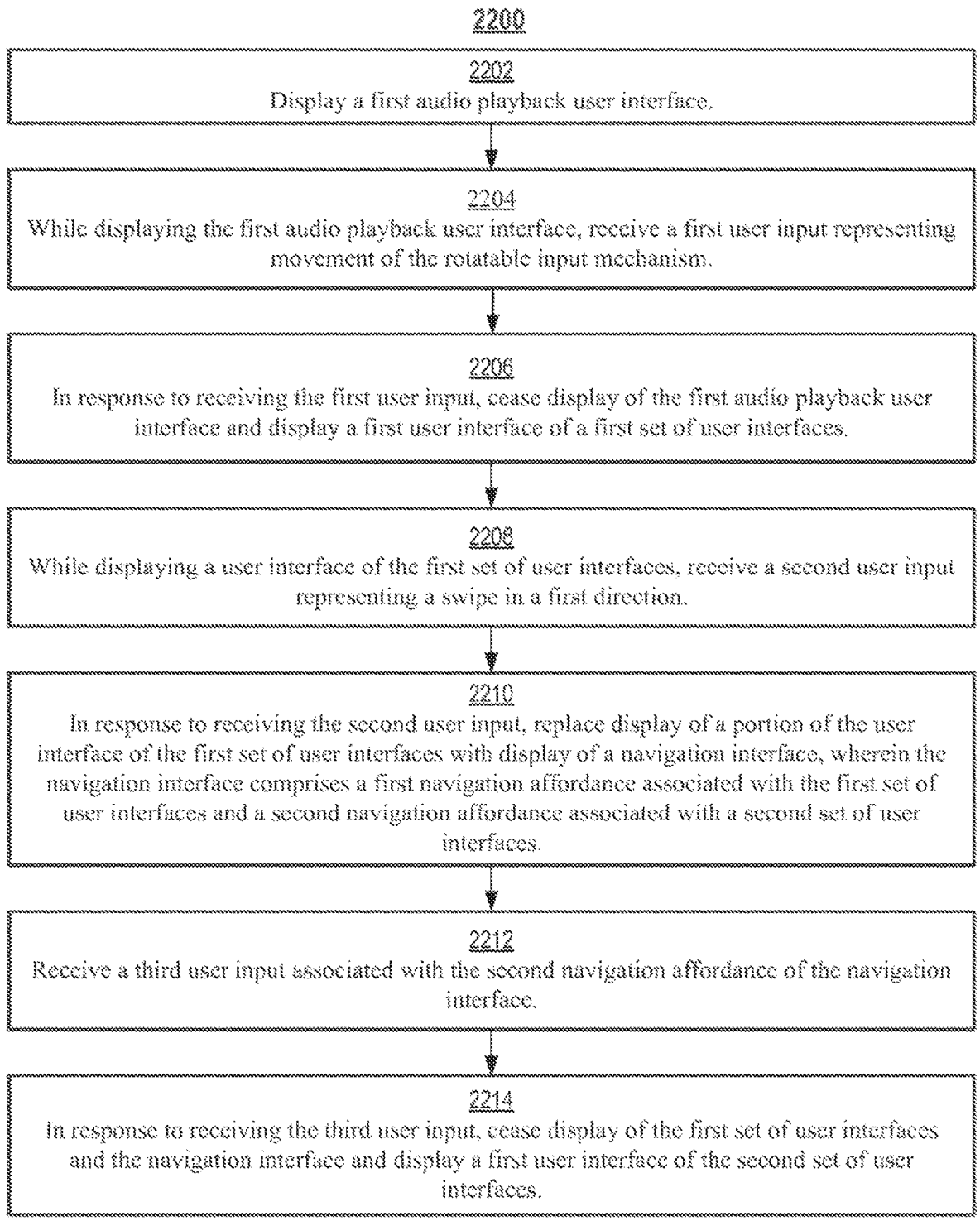
FIG. 22 is a flow diagram illustrating an exemplary process for accessing and playing music.

Memory 518 of personal electronic device 500 can be a non-transitory computer-readable storage medium, for storing computer-executable instructions, which, when executed by one or more computer processors 516, for example, can cause the computer processors to perform the techniques described above, including processes 700 (FIG. 7), 1000 (FIG. 10), 1200 (FIG. 12), 1400 (FIG. 14), 1600 (FIG. 16), 1800 (FIG. 18), 2000 (FIG. 20), and 2200 (FIG. 22). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5C:
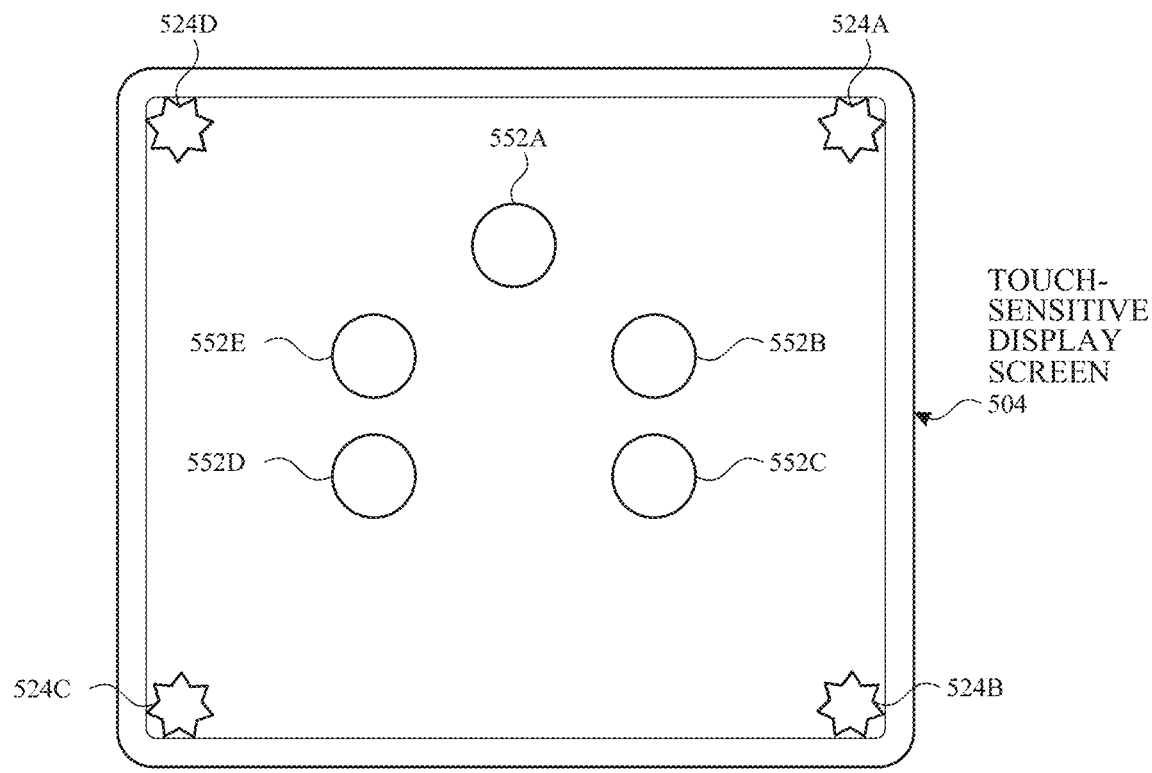
FIGS. 5C-5D illustrate exemplary components of a personal electronic device having a touch-sensitive display and intensity sensors in accordance with some embodiments.
Figure 5C:
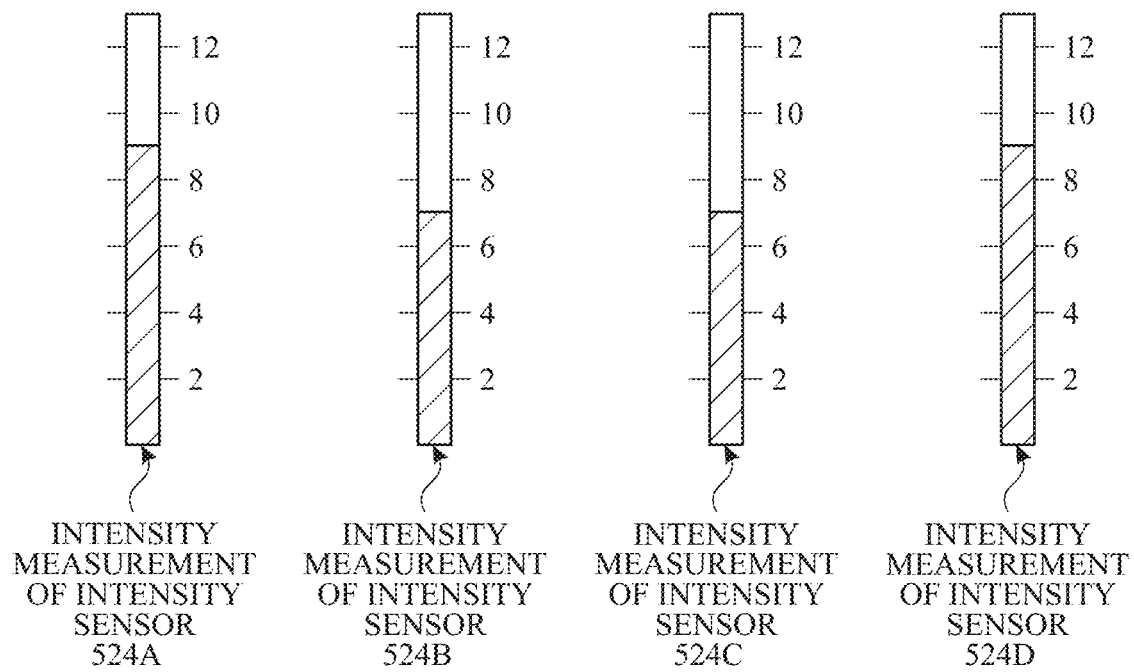
Figure 5D:
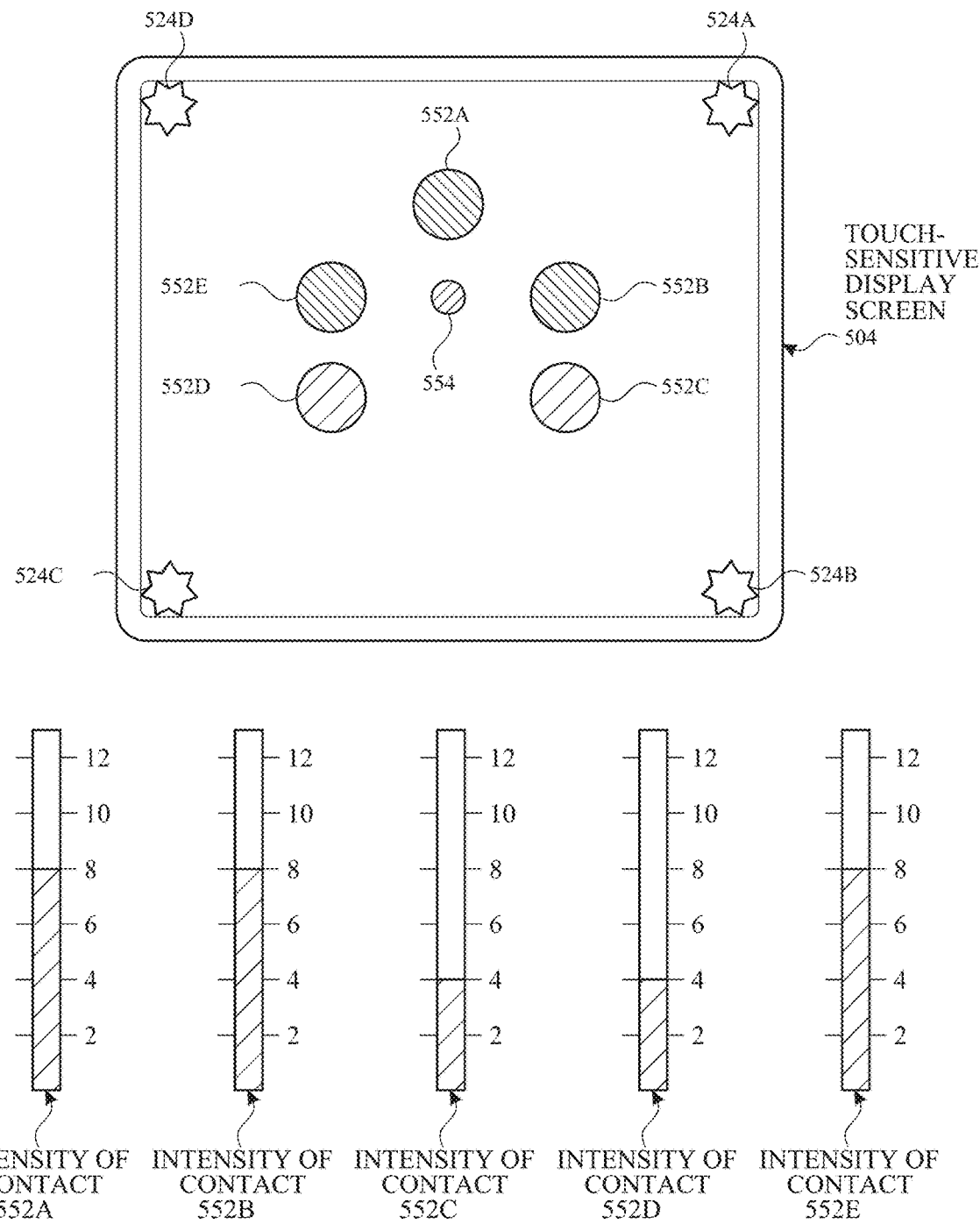

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij = A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
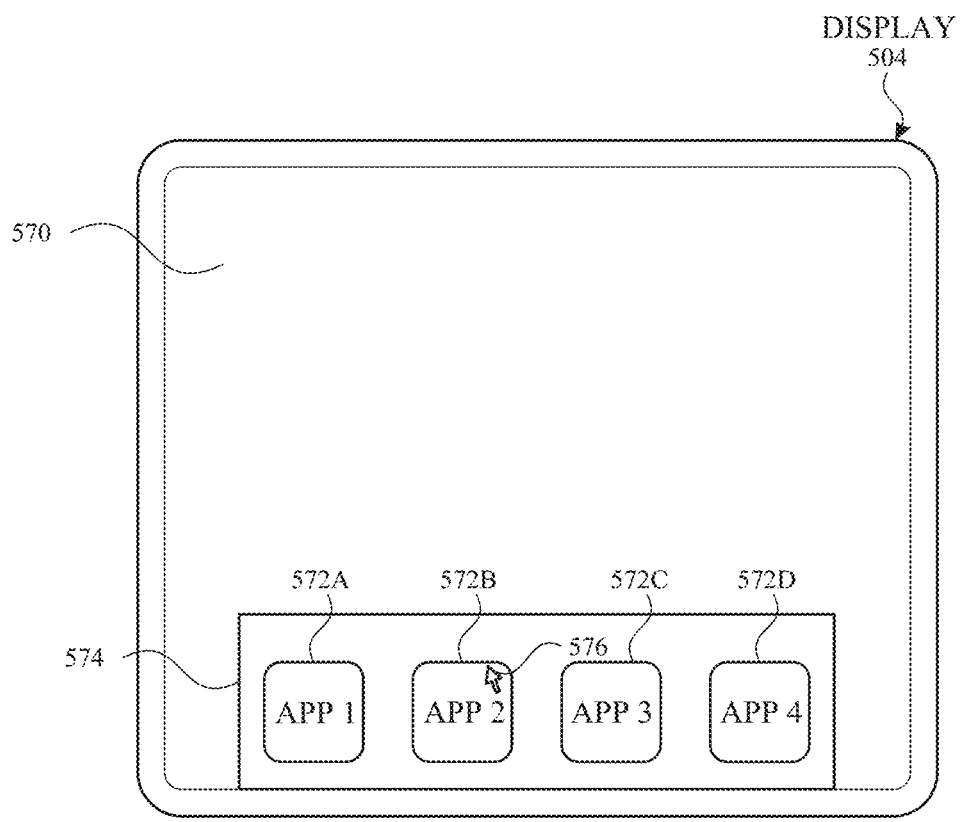
FIGS. 5E-5H illustrate exemplary components and user interfaces of a personal electronic device in accordance with some embodiments.
Figure 5E:
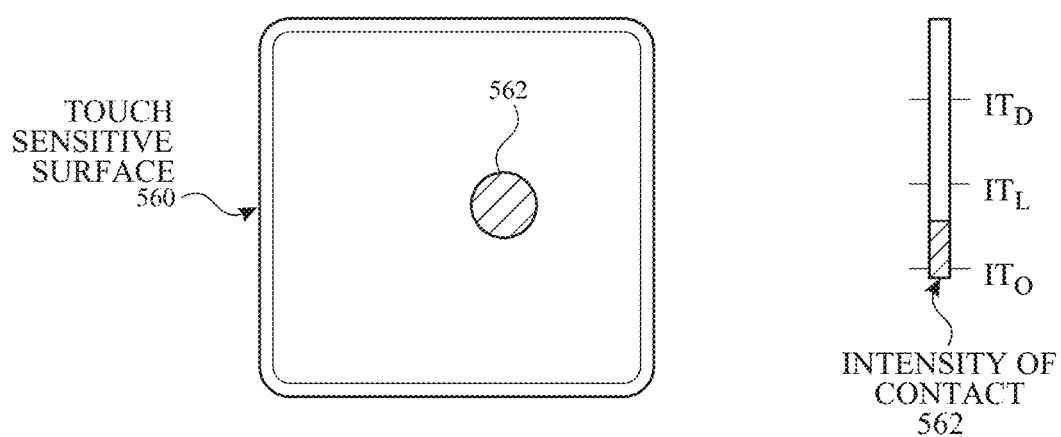
Figure 5F:
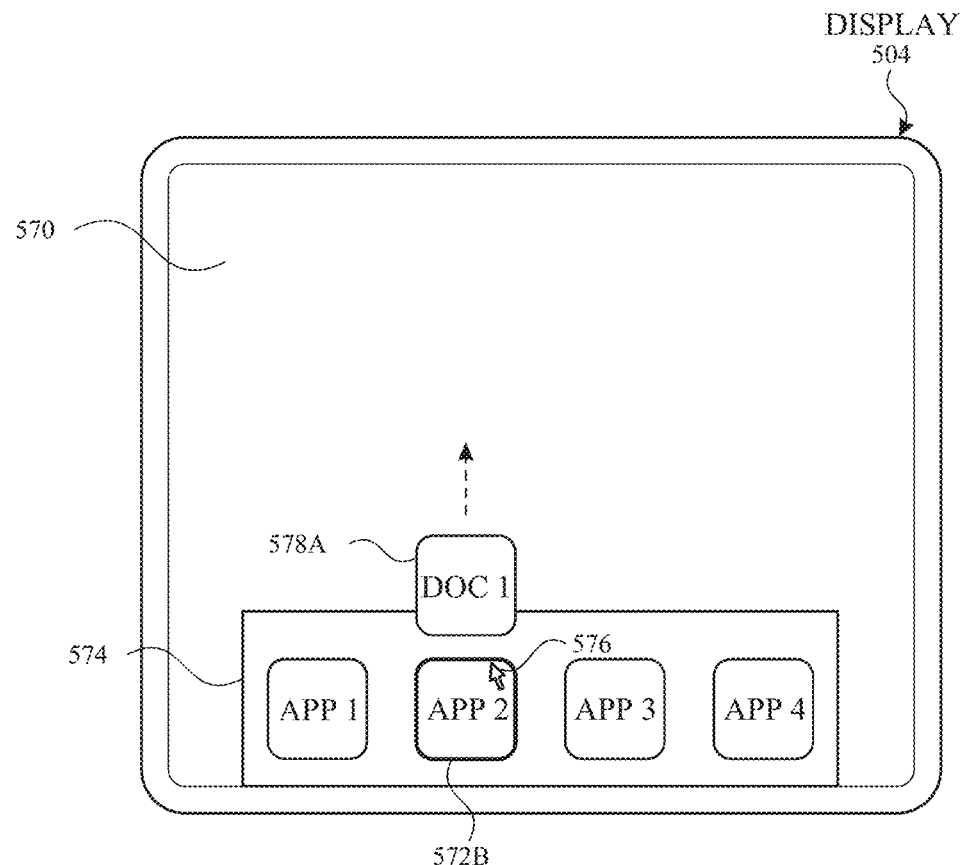
Figure 5F:
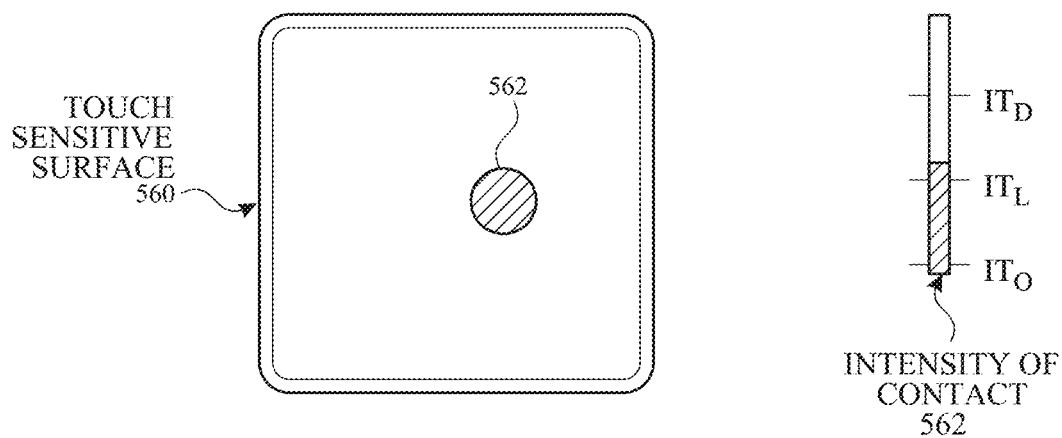
Figure 5G:
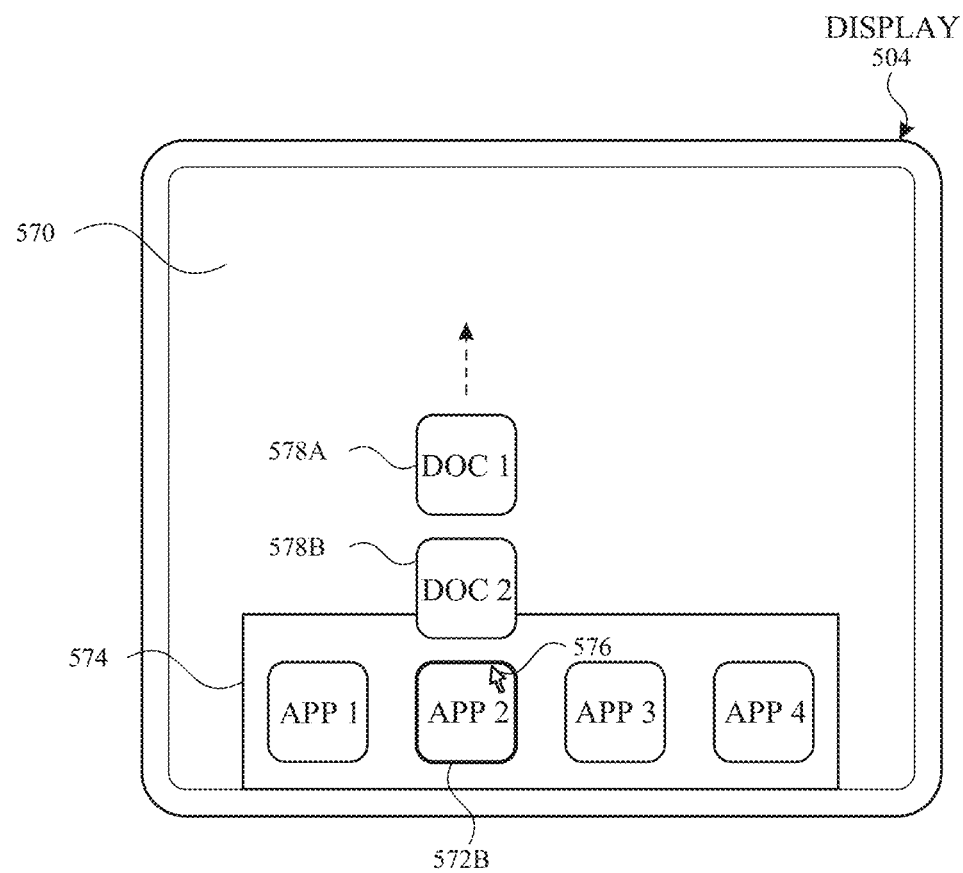
Figure 5G:
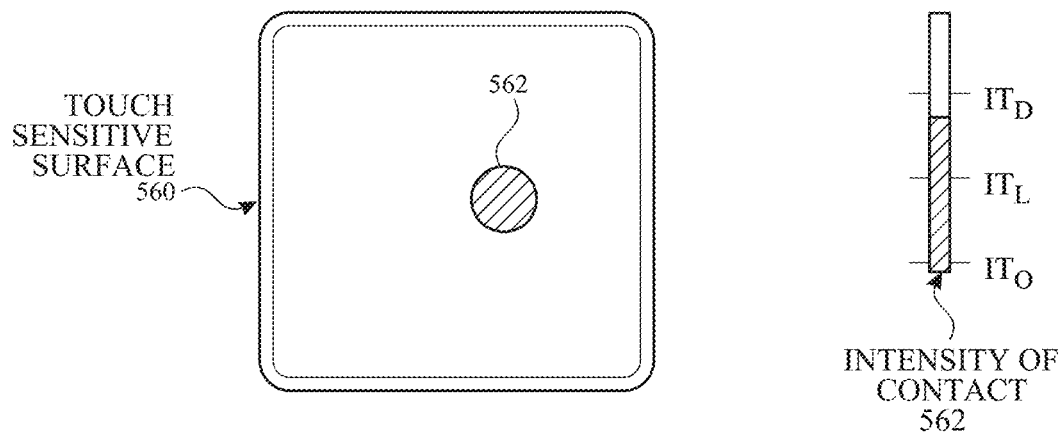
Figure 5H:
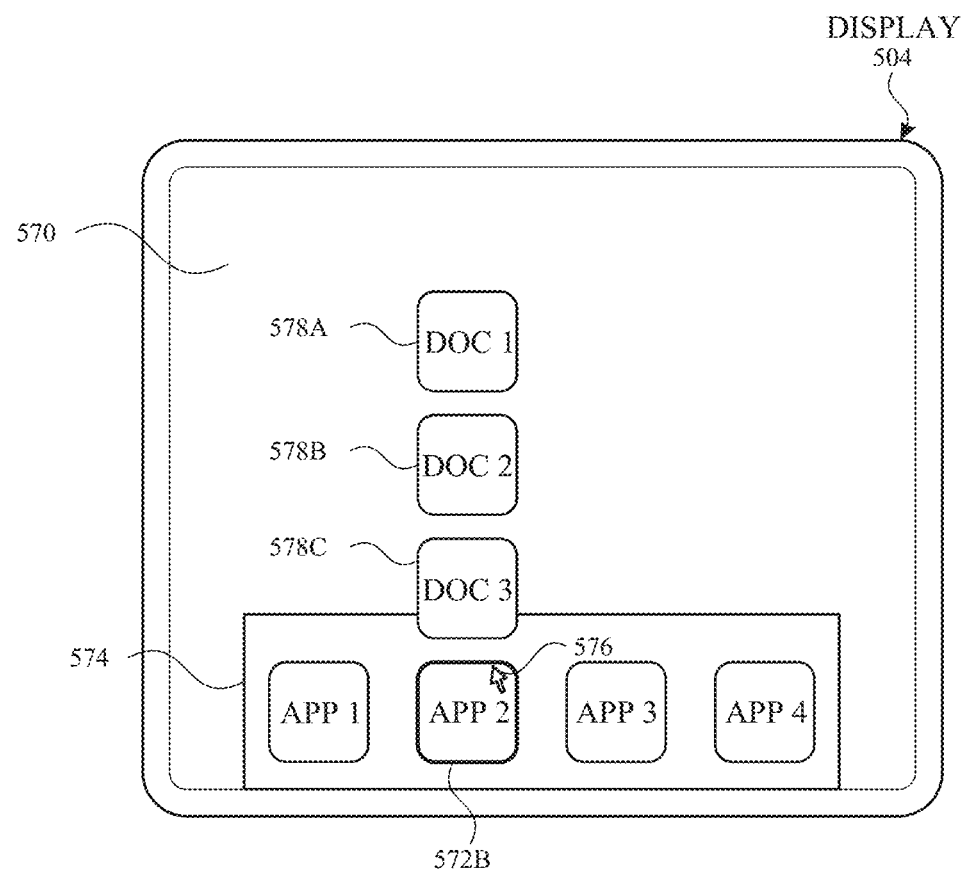
Figure 5H:
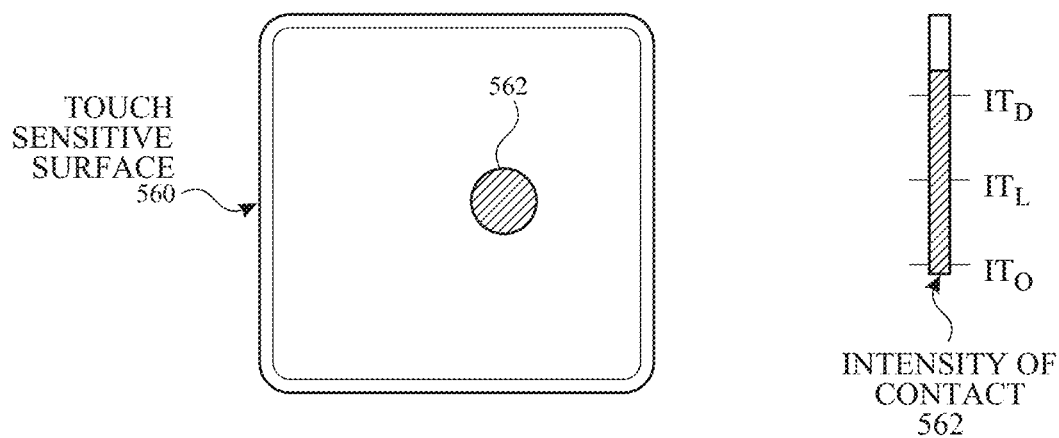

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that may be implemented on a multifunction device with a display and a touch-sensitive surface, such as devices 100, 300, and/or 500, to improve a user's experience in accessing and playing music.

FIGS. 6A-6D illustrate exemplary user interfaces for accessing music using an electronic device, in accordance with some embodiments. In some embodiments, the electronic device is device 500. The electronic device has a display (e.g., 112, 340, 504), a touch-sensitive surface (e.g., 112, 355, 504), and a rotatable input mechanism (e.g., 506).

Figure 6A:
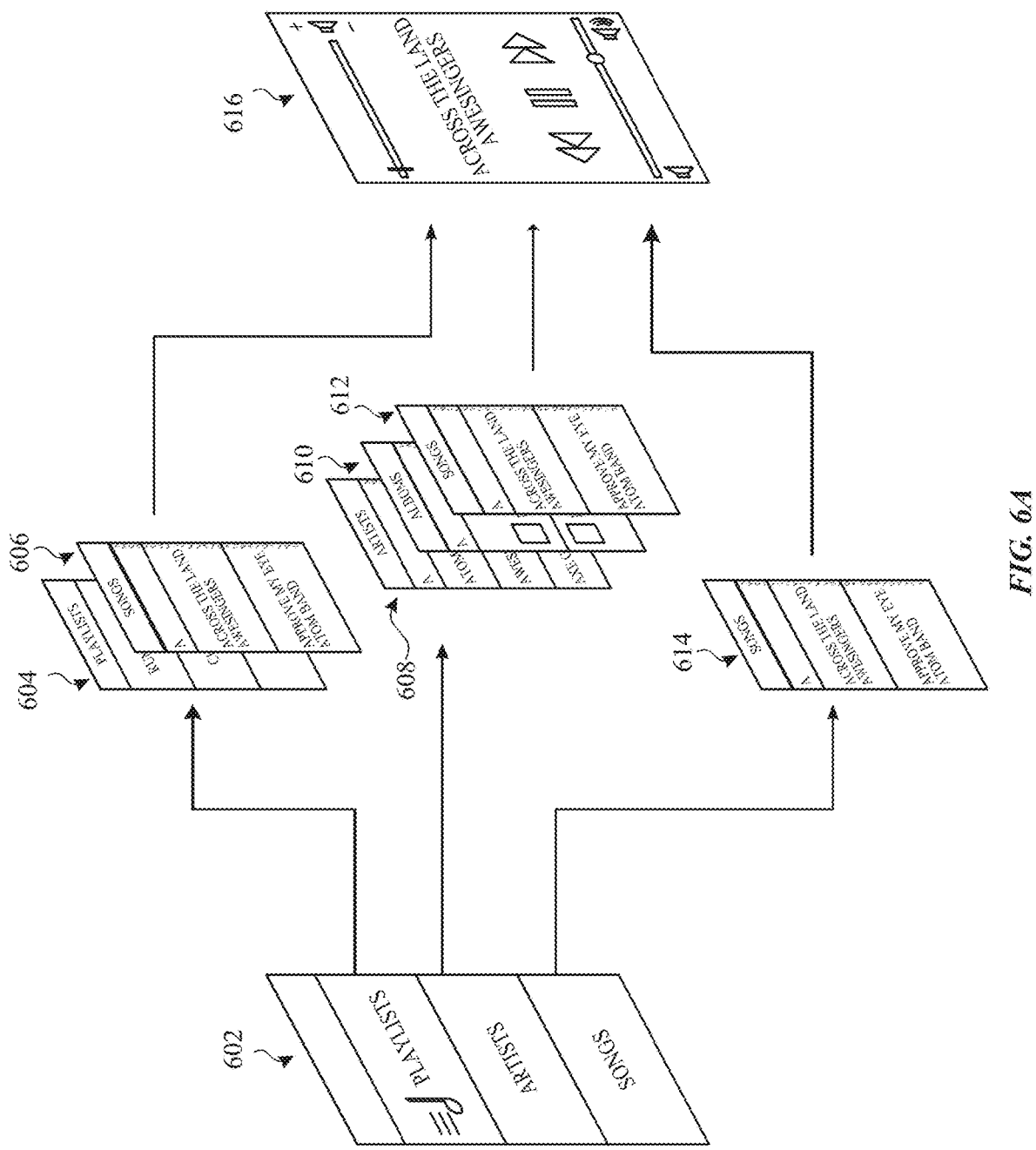
FIGS. 6A-6D illustrate exemplary user interfaces for accessing and playing music.

FIG. 6A illustrates a high-level view of the organization of various user interface screens. These and additional user interface screens will be described in further detail with respect to FIGS. 6B-6D. User interface screen 602 illustrates a landing screen (e.g., the screen displayed when the application starts or the screen displayed after the application initializes) of a music application (e.g., a digital music player application). From user interface screen 602, a user can access user interface screen 604, user interface screen 608, and user interface screen 614.

User interface screen 604 illustrates playlist selection affordances for accessing various music playlists. Activating a playlist selection affordance causes the device to display user interface screen 606. User interface screen 606 illustrates song selection affordances of the activated playlist. Activating a song selection affordance causes the device to display user interface screen 616, which includes an audio playback user interface, and to begin audio playback of the song corresponding to the activated song selection affordance.

User interface screen 608 illustrates artist selection affordances for accessing music of various artists. Activating an artist selection affordance causes the device to display user interface screen 610. User interface screen 610 illustrates album selection affordances of the activated artist. Activating an album selection affordance causes the device to display user interface screen 612, which includes song selection affordances of the selected album of the selected artist. Activating a song selection affordance causes the device to display user interface screen 616, which includes an audio playback user interface, and to begin audio playback of the song corresponding to the activated song selection affordance.

User interface screen 606 illustrates song selection affordances. Activating a song selection affordance causes the device to display user interface screen 616, which includes an audio playback user interface, and to begin audio playback of the song corresponding to the activated song selection affordance.

The audio playback user interface of user interface screen 616 displays song information (e.g., the title and artist) of an activated (e.g., playing, paused) song. The audio playback user interface also provides enables a user to play/pause, skip forward/backward, scrub to within a time in the song, and adjust the volume, among others.

Figure 6B:
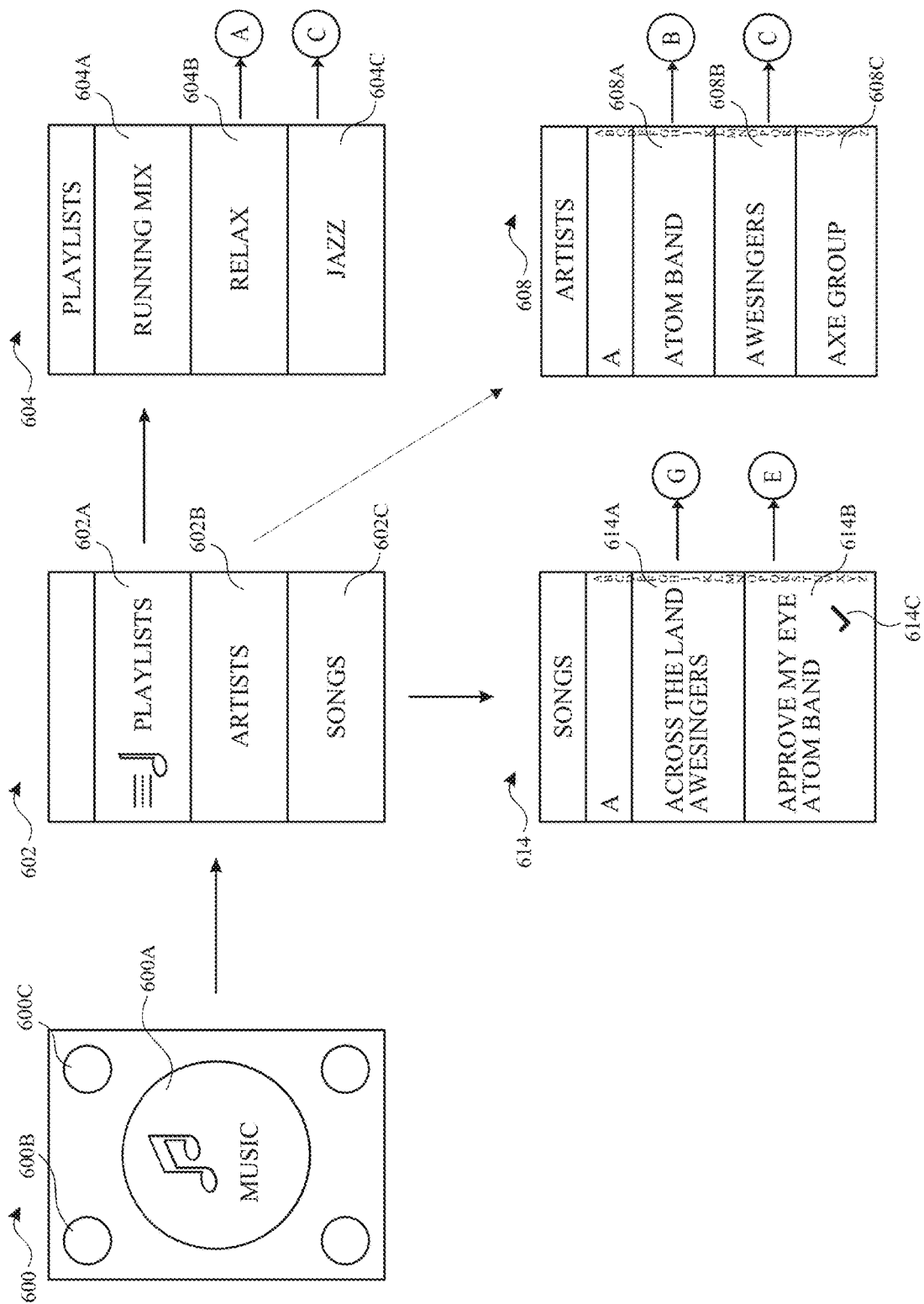

In one embodiment shown in FIG. 6B, the device displays an affordance 600A representing a music application (e.g., an icon among a plurality of icons), as illustrated in user interface screen 600. User interface screen 600 may also include one or more affordances 600B and 600C corresponding to other applications, such as a photos application, a phone application, or an electronic mail application. The affordance 600A, when activated, causes the music application to be displayed. Affordances 600B and 600C, when activated, cause the device to start and/or display a corresponding application.

The device receives user input representing movement of the rotatable input mechanism (e.g., the user rotates the rotatable input mechanism to activate affordance 600A, which is substantially in the center of the display). In response to receiving the user input representing the movement of the rotatable input mechanism, the device displays a landing screen (e.g., the screen displayed when the application starts or the screen the application reaches after initialization) of the music application, as illustrated in user interface screen 602.

In another example, rather than received user input representing movement of the rotatable input mechanism, the device detects a touch on the touch-sensitive surface corresponding to affordance 600A representing the music application. In response to detecting the touch corresponding to the affordance representing the music application, the device displays a landing screen (e.g., the screen displayed when the application starts or the screen the application reaches after initialization) of the music application, as illustrated in user interface screen 602.

User interface screen 602 illustrates a landing screen. The landing screen includes display of a playlist affordance 602A, an artist list affordance 602B, and a song list affordance 602C. In this example, the playlist affordance 602A, the artist affordance 602B, and the song affordance 602C are displayed concurrently.

While displaying user interface screen 602, the device receives user input associated with the landing screen. For example, the user may activate the playlist affordance 602A, the artist affordance 602B, or the song affordance 602C. Generally, displayed items are associated with user inputs in a contextual manner, such as the user input being received at a location on the touch-sensitive surface that corresponds to the location of the displayed item on the display to activate the displayed item.

The device determines whether the user input associated with the landing screen represents a touch associated with the playlist affordance 602A, the artist affordance 602B, or the song affordance 602C.

In response to receiving the user input associated with the landing screen and in accordance with a determination that the user input associated with the landing screen represents a touch associated with the playlist affordance 602A, the device displays one or more playlist selection affordances 604A-604C, as illustrated in user interface screen 604. Thus, the playlist affordance 602A, when activated, causes display of one or more playlist selection affordances, such as a list of the names of playlists are accessible by the device, for selecting a playlist.

In response to receiving the user input associated with the landing screen and in accordance with a determination that the user input associated with the landing screen represents a touch associated with the artist list affordance, the device displays one or more artist selection affordances 608A-608C, such as illustrated in user interface screen 608. Thus, the artist list affordance 602B, when activated, causes display of one or more artist selection affordances, such as a list of the names of the artists for which songs are accessible by the device, for selecting an artist.

In response to receiving the user input associated with the landing screen and in accordance with a determination that the user input associated with the landing screen represents a touch associated with the song list affordance, the device displays one or more song selection affordances 614A-614B, such as illustrated in user interface screen 614. Thus, the song list affordance, when activated, causes display of one or more song affordances, such as a list of the names of the artists for which songs are accessible by the device, for selecting an artist.

In accordance with some embodiments, the electronic device includes a touch-sensitive surface configured to detect intensity of touches. While displaying the one or more playlist selection affordances 604A-604C, as illustrated in user interface screen 604, the device receives user input representing a touch on a playlist selection affordance 604B (e.g., titled "Relax") of the one or more playlist selection affordances 604A-604C. The device determines whether a characteristic intensity of the touch on the playlist selection affordance exceeds an intensity threshold For example, the intensity may be measured based on pressure or determined based on the size of a touch. In accordance with a determination that the characteristic intensity of the touch on the playlist selection affordance exceeds the intensity threshold (e.g., a deep press), the device displays a first set of affordances, as illustrated in user interface screen 620 of FIG. 6D.

In accordance with some embodiments, the first set of affordances includes a source affordance 620A, as illustrated in user interface screen 620. The source affordance 620A, when activated, causes display of affordances for selecting a source for music, such as music stored locally on the device, music stored remotely on an external electronic device, or the combination. The device may be linked to the external electronic device using short-range wireless communications, such as WiFi or Bluetooth technology.

In accordance with some embodiments, in response to receiving the user input representing the touch on the playlist selection affordance and in accordance with a determination that the characteristic intensity of the touch on the playlist selection affordance does not exceed the intensity threshold (e.g., a light press; intensity may be measured based on pressure or determined based on the size of a touch), displaying, on the display, one or more song selection affordances of a playlist associated with the playlist selection affordance. That is, the playlist selection affordance, when activated with a light touch, causes display of a list of songs of a playlist. The list of songs may be a subset of the songs accessible by the device.

Figure 6C:
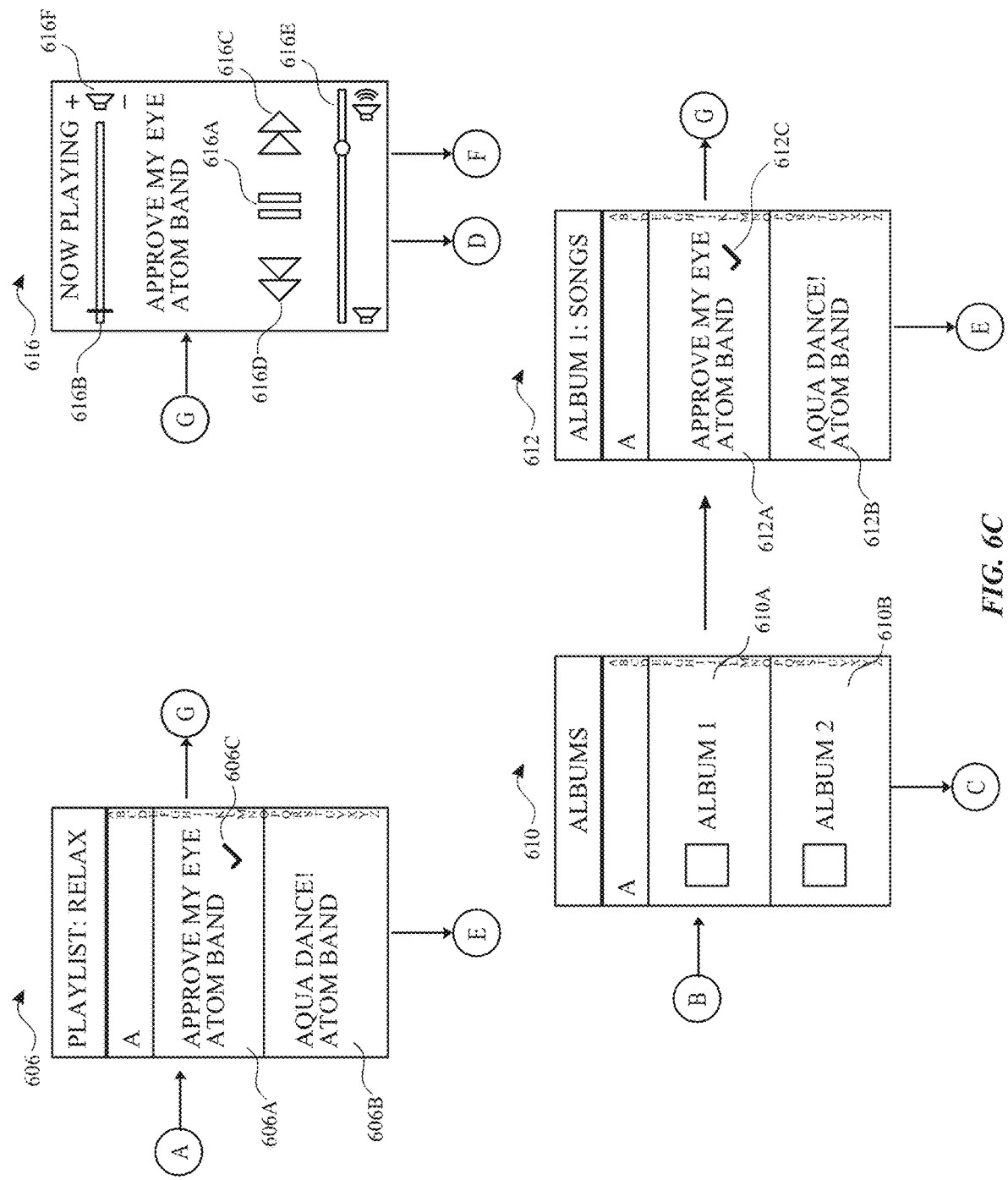
Figure 6D:
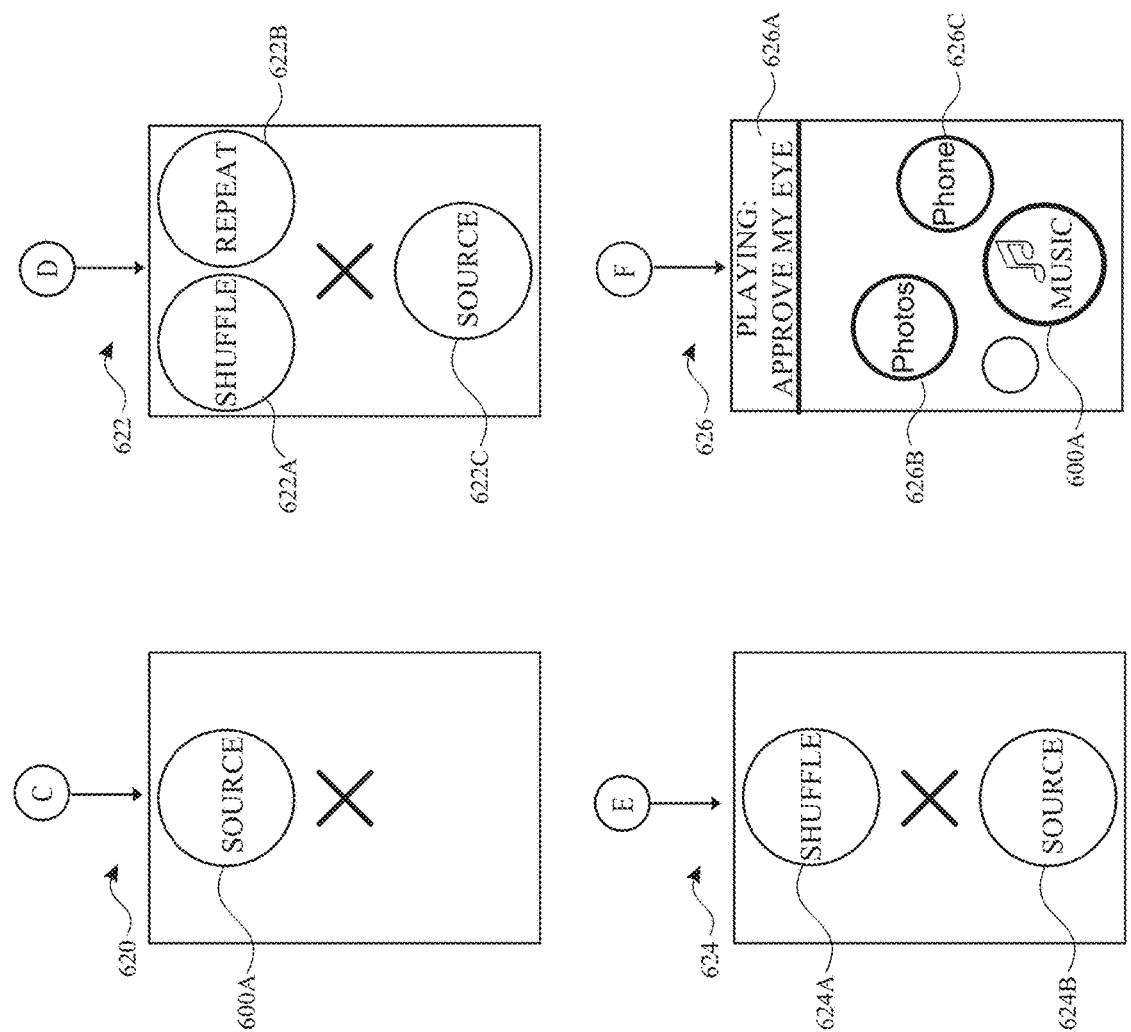

In accordance with some embodiments, while displaying the one or more song selection affordances 606A-606B of the playlist, as illustrated in user interface screen 606 of FIG. 6C, the device receives user input representing a touch on a song selection affordance 606A of the one or more song selection affordances 606A-606B of the playlist. The device determines whether a characteristic intensity of the touch on the song selection affordance 606A exceeds an intensity threshold. In accordance with a determination that the characteristic intensity of the touch on the song selection affordance 606A exceeds the intensity threshold (e.g., a deep press), the device displays a second set of affordances 624A-624B, as illustrated in user interface screen 624 of FIG. 6D.

In accordance with some embodiments, the second set of affordances 624A-624B includes one or more of a shuffle affordance 624A and a source affordance 624B, as illustrated in user interface screen 624. The shuffle affordance 624A, when activated, causes the device to play back the songs in the playlist in a shuffled order (e.g., a random or pseudo-random order). The source affordance 624B, when activated, causes display of affordances for selecting a source for music, such as music stored locally on the device, music stored remotely on an external electronic device, or the combination. The device may be linked to the external electronic device using short-range wireless communications, such as WiFi or Bluetooth technology.

In accordance with some embodiments, in response to receiving the user input representing the touch on the song selection affordance 606A and in accordance with a determination that the characteristic intensity of the touch on the song selection affordance 606A does not exceed the intensity threshold (e.g., a light press), the device displays an audio playback user interface (e.g., a "now playing" screen), such as illustrated in user interface screen 616, and the device starts audio playback of an audio file associated with the song selection affordance 606A (e.g., start audio playback of music).

In accordance with some embodiments, the electronic device includes a touch-sensitive surface configured to detect intensity of touches. While displaying the one or more artist selection affordances 608A-608B, the device receives user input representing a touch on an artist selection affordance 608A of the one or more artist selection affordances 608A-608B. The device determines whether a characteristic intensity of the touch on the artist selection affordance 608A exceeds an intensity threshold. In accordance with a determination that the characteristic intensity of the touch on the artist selection affordance 608A exceeds the intensity threshold (e.g., a deep press; intensity may be measured based on pressure or determined based on the size of a touch), the device displays a third set of affordances, as illustrated in user interface screen 620 of FIG. 6D.

In accordance with some embodiments, the third set of affordances includes a source affordance. The source affordance, when activated, causes display of affordances for selecting a source for music, such as music stored locally on the device, music stored remotely on an external electronic device, or the combination. The device may be linked to the external electronic device using short-range wireless communications, such as WiFi or Bluetooth technology.

In accordance with some embodiments, in response to receiving the user input representing the touch on the artist selection affordance 608A and in accordance with a determination that the characteristic intensity of the touch on the artist selection affordance 608A does not exceed the intensity threshold (e.g., a light press), the device displays one or more album selection affordances 610A-610B of an artist associated with the artist selection affordance 608A, as illustrated in user interface screen 610 of FIG. 6C. Thus, the artist selection affordance 608A, when activated with a light press, causes display of a list of albums of the artist. The list of albums may be a subset of the albums accessible by the device, and may be limited to albums that include the selected artist.

In accordance with some embodiments, while displaying the one or more album selection affordances 610A-610B of the artist, the device receives user input representing a touch on an album selection affordance 610A of the one or more album selection affordances 610A-610B of the artist. The device determines whether a characteristic intensity of the touch on the album selection affordance 610A exceeds an intensity threshold. In accordance with a determination that the characteristic intensity of the touch on the album selection affordance 610A exceeds the intensity threshold (e.g., a deep press), the device displays a fourth set of affordances, as illustrated in user interface screen 620 of FIG. 6D.

In accordance with some embodiments, the fourth set of affordances includes a source affordance 620A, as illustrated in user interface screen 620. The source affordance 620A, when activated, causes display of affordances for selecting a source for music, such as music stored locally on the device, music stored remotely on an external electronic device, or the combination. The device may be linked to the external electronic device using short-range wireless communications, such as WiFi or Bluetooth technology.

In accordance with some embodiments, in response to receiving the user input representing the touch on the album selection affordance 610A and in accordance with a determination that the characteristic intensity of the touch on the album selection affordance 610A does not exceed the intensity threshold (e.g., a light press), the device displays one or more song selection affordances 612A-612B of an album associated with the album selection affordance 610A, as illustrated in user interface screen 612. Thus, the album selection affordance 610A, when activated with a light press, causes display of a list of songs of the album 612A-612B, where the songs are also limited to the selected artist.

In accordance with some embodiments, while displaying the one or more song selection affordances 612A-612B of the album associated with the album selection affordance 610A, as illustrated in user interface screen 612, the device receives user input representing a touch on a song selection affordance 612A of the one or more song selection affordances 612A-612B of the album associated with the album selection affordance 610A. The device determines whether a characteristic intensity of the touch on the song selection affordance 612A exceeds an intensity threshold. In accordance with a determination that the characteristic intensity of the touch on the song selection affordance 612A exceeds the intensity threshold (e.g., a deep press), the device displays a fifth set of affordances, as illustrated in user interface screen 624.

In accordance with some embodiments, the fifth set of affordances includes one or more of a shuffle affordance 624A and a source affordance 624B, as illustrated in user interface screen 624. The shuffle affordance 624A, when activated, causes the device to play back the songs of the album of the arts in a shuffled order (e.g., a random or pseudo-random order). The source affordance 624B, when activated, causes display of affordances for selecting a source for music, such as music stored locally on the device, music stored remotely on an external electronic device, or the combination. The device may be linked to the external electronic device using short-range wireless communications, such as WiFi or Bluetooth technology.

In accordance with some embodiments, in response to receiving the user input representing the touch on the song selection affordance 612A and in accordance with a determination that the characteristic intensity of the touch does not exceed the intensity threshold (e.g., a light press), the device displays an audio playback user interface (e.g., display a "now playing" screen), such as illustrated in user interface screen 616, and the device starts audio playback of an audio file associated with the song selection affordance 612A.

In accordance with some embodiments, the electronic device includes a touch-sensitive surface configured to detect intensity of touches. While displaying the one or more song selection affordances of user interface screen 614, the device receives user input representing a touch on a song selection affordance 614A of the one or more song selection affordances 614A-614B. The device determines whether a characteristic intensity of the touch on the song selection affordance 614A exceeds an intensity threshold. In accordance with a determination that the characteristic intensity of the touch on the song selection affordance 614A exceeds the intensity threshold (e.g., a deep press), the device displays a sixth set of affordances, as illustrated in user interface screen 624 of FIG. 6D.

In accordance with some embodiments, the sixth set of affordances includes one or more of a shuffle affordance 624A and a source affordance 624B. The shuffle affordance 624A, when activated, causes the device to play back the songs of the current source in a shuffled order (e.g., a random or pseudo-random order). The source affordance 624B, when activated, causes display of affordances for selecting a source for music, such as music stored locally on the device, music stored remotely on an external electronic device, or the combination. The device may be linked to the external electronic device using short-range wireless communications, such as WiFi or Bluetooth technology.

In accordance with some embodiments, in response to receiving the user input representing the touch on the song selection affordance 614A and in accordance with a determination that the characteristic intensity of the touch on the song selection affordance 614A does not exceed the intensity threshold (e.g., a light press), the device displays an audio playback user interface (e.g., a "now playing" screen), as illustrated in user interface screen 616, and the device starts audio playback of an audio file associated with the song selection affordance 614A.

In accordance with some embodiments, while displaying the audio playback user interface of user interface screen 616, the device receives user input representing a touch on the audio playback user interface. The device determines whether a characteristic intensity of the touch on the audio playback user interface exceeds an intensity threshold. In accordance with a determination that the characteristic intensity of the touch on the audio playback user interface exceeds the intensity threshold (e.g., a deep press), the device displays a seventh set of affordances, as illustrated in user interface screen 622 of FIG. 6D. In accordance with a determination that the characteristic intensity of the touch on the audio playback user interface does not exceed the intensity threshold (e.g., a light press), the device foregoes displaying the seventh set of affordances.

In accordance with some embodiments, the seventh set of affordances includes one or more of a shuffle affordance 622A, a repeat affordance 622B, and a source affordance 622C, as illustrated in user interface screen 622. The shuffle affordance 622A, when activated, causes the device to play back an identified list of songs in a shuffled order (e.g., a random or pseudo-random order). The repeat affordance 622B, when activated, causes the device to repeatedly play the currently playing (or selected) song, rather than playing a different song after the currently playing (or selected) song ends. The source affordance 622C, when activated, causes display of affordances for selecting a source for music, such as music stored locally on the device, music stored remotely on an external electronic device, or the combination. The device may be linked to the external electronic device using short-range wireless communications, such as WiFi or Bluetooth technology.

In accordance with some embodiments, the device receives user input. For example, the user presses a home button to return to user interface screen 600 that includes the affordance representing the music application 600A. In response to receiving the user input, the device displays the affordance representing the music application 600A. In some examples, the device also concurrently displays affordances representing other applications, such as photos affordance 626B and phone affordance 626C (e.g., an icon among a plurality of icons). The device determines whether the music application is currently playing an audio file. In accordance with a determination that the music application is currently playing an audio file, the device displays an affordance 626A representing the audio playback user interface (e.g., the device displays a persistent bar at the top of the display). In some examples, the affordance representing the music application 600A and the affordance representing the audio playback user interface 626A are displayed concurrently, as illustrated in user interface screen 626.

The device receives user input representing a touch on the affordance 626A representing the audio playback user interface (e.g., the user taps on the persistent bar that the top of the display). In response to receiving the user input representing the touch on the affordance 626A representing the audio playback user interface, the device displays the audio playback user interface, such as illustrated in user interface screen 616. Thus, the affordance 626A representing the audio playback user interface, when activated, causes display of the "now playing" screen. The "now playing" screen provides an indication of the currently playing audio file and provides affordances for pausing the audio file 616A, scrubbing forward/backward within the audio file 616B, skipping to the next audio file 616C, skipping back to the previous audio file 616D, adjusting volume 616E, and the like. In some embodiments, while displaying the "now playing" list, as illustrated in user interface screen 616, the rotatable input mechanism is used for adjusting the volume of audio playing. In accordance with detecting rotation of the rotatable input mechanism in a first direction, the volume of audio is increased, as illustrated by image 616F. In accordance with detecting rotation of the rotatable input mechanism in a second direction, the volume of audio is decreased, as illustrated by image 616F. The first direction and the second direction are different.

In accordance with some embodiments, the device receives user input. In response to receiving the user input, the device displays a user interface for an application, wherein the application and the music application are different applications (e.g., a mail application). For example, the user presses a button or performs another action to activate another application, which is not the music application. The device determines whether the music application is currently playing an audio file. In accordance with a determination that the music application is currently playing an audio file, the device displays an affordance representing the audio playback user interface (e.g., a persistent bar at the top of the display of the user interface for the application). The affordance representing the audio playback user interface and the user interface for the application are displayed concurrently.

In accordance with some embodiments, the device receives user input representing a touch on the affordance representing the audio playback user interface (e.g., user taps on the persistent bar that the top of the display). In response to receiving the user input representing the touch on the affordance representing the audio playback user interface, the device replaces display of the user interface for the application with display of a user interface for the music application. Thus, when an audio file is playing, the user can switch to (e.g., start) a different application (e.g., a non-music application). An affordance will appear on the display which, when activated, causes the "now playing" screen to be displayed. This allows the user efficient access to the "now playing" screen for pausing, forwarding, etc., even when the user is using an application other than the music application. In accordance with some embodiments, the user interface for the music application comprises the audio playback user interface.

In accordance with some embodiments, the device determines whether the music application is currently playing an audio file. In accordance with a determination that the music application is currently playing an audio file, the device displays an affordance representing the audio playback user interface (e.g., a persistent bar at the top of the display). The device receives user input representing a touch on the affordance representing the audio playback user interface (e.g., user taps on the persistent bar that the top of the display). In response to receiving the user input representing the touch on the affordance representing the audio playback user interface, the device displays the audio playback user interface. Thus, the affordance representing the audio playback user interface, when activated, causes display of the "now playing" screen.

In accordance with some embodiments, the device determines whether a phone call is currently active, the currently active phone call associated with a phone application. In accordance with a determination that a phone call is currently active, the device displays an affordance representing the phone application, wherein the affordance representing the phone application and the affordance representing the audio playback user interface are displayed concurrently (e.g., they persistent at the top of the display). The device receives user input representing a touch on the affordance representing the phone application. In response to receiving the user input representing the touch on the affordance representing the phone application, the device displays a user interface of the phone application.

In accordance with some embodiments, the song selection affordance of the one or more song selection affordances (e.g., 606A of 606A-606B, 612A of 612A-612B, 614B of 614A-614B) includes an indication (e.g., 606C, 612C, 614C) of being stored locally on the electronic device (e.g., the song is available for playback from local memory). In this example, the selected song (606A, 612A, 614B) is stored locally.

In accordance with some embodiments, the song selection affordance of the one or more song selection affordances (e.g., 606A of 606A-606B, 612A of 612A-612B, 614B of 614A-614B) includes an indication (e.g., 606C, 612C, 614C) of not being stored locally on the electronic device (e.g., the song is not stored locally, but is available for playback through download or stream from an external electronic device, such as a phone or server). In this example, the selected song (606A, 612A, 614B) is not stored locally.

In accordance with some embodiments, the song selection affordance of the one or more song selection affordances (e.g., 606A of 606A-606B, 612A of 612A-612B, 614B of 614A-614B) includes an indication (e.g., 606C, 612C, 614C) of being stored on an external electronic device (e.g., the song is available for playback through download or stream from an external electronic device, such as a phone or server). In this example, the selected song (606A, 612A, 614B) is available stored on an external electronic device.

Figure 7:
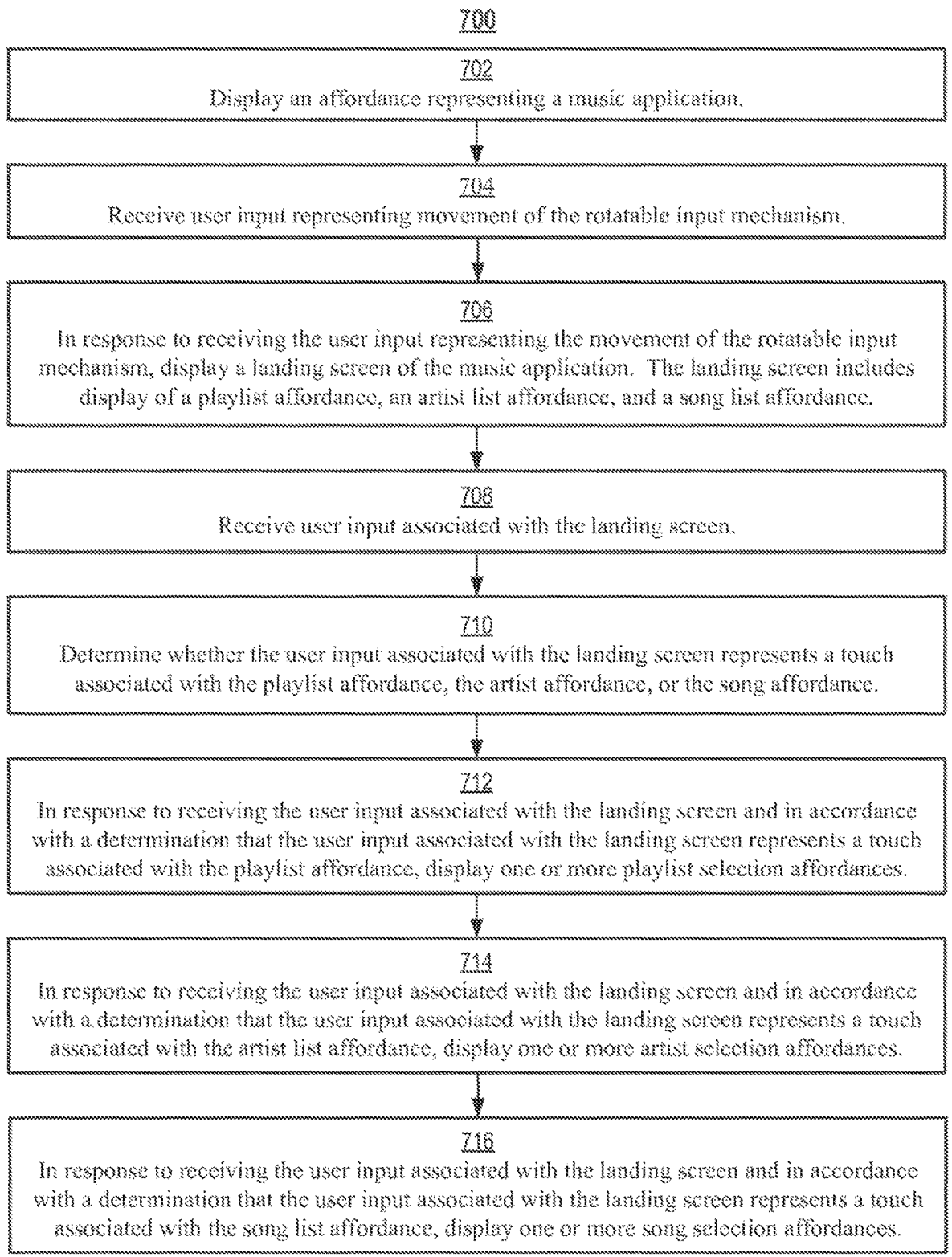
FIG. 7 is a flow diagram illustrating an exemplary process for accessing and playing music.

FIG. 7 is a flow diagram illustrating an exemplary process for accessing and playing music in accordance with some embodiments. In some embodiments, method 700 may be performed at an electronic device with a display (e.g., 112, 340, 504) and a rotatable input mechanism (e.g., 506). In some embodiments, the electronic device also includes a touch-sensitive surface (e.g., 112, 355, 504). Some operations in method 700 may be combined, the order of some operations in method 700 may be changed, and some operations in method 700 may be omitted.

In some embodiments, the touch-sensitive surface (e.g., 112, 355, 504) is capable of detecting intensity of touch contacts. Exemplary devices that may perform method 700 include devices 100, 300, and 500 (FIGS. 1A, 3, and 5A).

Method 700 provides an intuitive way to access and play music. The method reduces the cognitive burden on a user when using a device to access and play music, thereby creating a more efficient human-machine interface. For battery-operated computing devices, enabling a user to access and play music more quickly and more efficiently conserves power and increases the time between battery charges.

At block 702, an affordance (e.g., 600A) representing a music application is displayed.

At block 704, user input representing movement of the rotatable input mechanism is received. In some embodiments, a touch on the touch-sensitive surface corresponding to the affordance (e.g., 600A) representing the music application is received, instead.

At block 706, in response to receiving the user input representing the movement of the rotatable input mechanism, a landing screen of the music application is displayed. In some embodiments, in response to detecting the touch corresponding to the affordance (e.g., 600A), a landing screen of the music application is displayed. The landing screen includes display of a playlist affordance (e.g., 602A), an artist list affordance (e.g., 602B), and a song list affordance (e.g., 602C).

At block 708, user input associated with the landing screen is received.

At block 710, it is determined whether the user input associated with the landing screen represents a touch associated with the playlist affordance (e.g., 602A), the artist affordance (e.g., 602B), or the song affordance (e.g., 602C).

At block 712, in response to receiving the user input associated with the landing screen and in accordance with a determination that the user input associated with the landing screen represents a touch associated with the playlist affordance (e.g., 602A), one or more playlist selection affordances (e.g., 604A-604C) are displayed.

At block 714, in response to receiving the user input associated with the landing screen and in accordance with a determination that the user input associated with the landing screen represents a touch associated with the artist list affordance (e.g., 602B), one or more artist selection affordances (e.g., 608A-608C) are displayed.

At block 716, in response to receiving the user input associated with the landing screen and in accordance with a determination that the user input associated with the landing screen represents a touch associated with the song list affordance (e.g., 602C), one or more song selection affordances (e.g., 614A-614B) are displayed.

In accordance with some embodiments, the electronic device includes a touch-sensitive surface configured to detect intensity of touches. While displaying the one or more playlist selection affordances (e.g., 604A-604C), user input representing a touch on a playlist selection affordance (e.g., 604B) of the one or more playlist selection affordances (e.g., 604A-604C) is received. It is determined whether a characteristic intensity of the touch on the playlist selection affordance (e.g., 604B) exceeds an intensity threshold. In accordance with a determination that the characteristic intensity of the touch on the playlist selection affordance (e.g., 604B) exceeds the intensity threshold (e.g., a deep press), a first set of affordances are displayed. In accordance with some embodiments, the first set of affordances includes a source affordance (e.g., 620A).

In accordance with some embodiments, in response to receiving the user input representing the touch on the playlist selection affordance (e.g., 604B) and in accordance with a determination that the characteristic intensity of the touch on the playlist selection affordance (e.g., 604B) does not exceed the intensity threshold (e.g., a light press), one or more song selection affordances (e.g., 606A-606B) of a playlist associated with the playlist selection affordance (e.g., 604B) are displayed.

In accordance with some embodiments, while displaying the one or more song selection affordances (e.g., 606A-606B) of the playlist, user input representing a touch on a song selection affordance (e.g., 606A) of the one or more song selection affordances (e.g., 606A-606B) of the playlist is received. It is determined whether a characteristic intensity of the touch on the song selection affordance (e.g., 606A) exceeds an intensity threshold. In accordance with a determination that the characteristic intensity of the touch on the song selection affordance (e.g., 606A) exceeds the intensity threshold (e.g., a deep press), a second set of affordances are displayed. In accordance with some embodiments, the second set of affordances includes one or more of a shuffle affordance (e.g., 624A) and a source affordance (e.g., 624B).

In accordance with some embodiments, in response to receiving the user input representing the touch on the song selection affordance (e.g., 606A) and in accordance with a determination that the characteristic intensity of the touch on the song selection affordance (e.g., 606A) does not exceed the intensity threshold (e.g., a light press), an audio playback user interface is displayed and audio playback of an audio file associated with the song selection affordance (e.g., 606A) is started.

In accordance with some embodiments, the electronic device includes a touch-sensitive surface configured to detect intensity of touches. While displaying the one or more artist selection affordances (e.g., 608A-608C), user input representing a touch on an artist selection affordance (e.g., 608A) of the one or more artist selection affordances (e.g., 608A-608C) is received. It is determined whether a characteristic intensity of the touch on the artist selection affordance (e.g., 608A) exceeds an intensity threshold. In accordance with a determination that the characteristic intensity of the touch on the artist selection affordance (e.g., 608A) exceeds the intensity threshold (e.g., a deep press), a third set of affordances is displayed. In accordance with some embodiments, the third set of affordances includes a source affordance (e.g., 620A).

In accordance with some embodiments, in response to receiving the user input representing the touch on the artist selection affordance (e.g., 608A) and in accordance with a determination that the characteristic intensity of the touch on the artist selection affordance (e.g., 608A) does not exceed the intensity threshold (e.g., a light press), one or more album selection affordances (e.g., 610A-610B) of an artist associated with the artist selection affordance (e.g., 608A) are displayed.

In accordance with some embodiments, while displaying the one or more album selection affordances (e.g., 610A-610B) of the artist, receiving user input representing a touch on an album selection affordance (e.g., 610A) of the one or more album selection affordances (e.g., 610A-610B) of the artist. It is determined whether a characteristic intensity of the touch on the album selection affordance (e.g., 610A) exceeds an intensity threshold. In accordance with a determination that the characteristic intensity of the touch on the album selection affordance (e.g., 610A) exceeds the intensity threshold (e.g., a deep press), a fourth set of affordances is displayed. In accordance with some embodiments, the fourth set of affordances includes a source affordance (e.g., 620A).

In accordance with some embodiments, in response to receiving the user input representing the touch on the album selection affordance (e.g., 610A) and in accordance with a determination that the characteristic intensity of the touch on the album selection affordance (e.g., 610A) does not exceed the intensity threshold (e.g., a light press), one or more song selection affordances (e.g., 612A-612B) of an album associated with the album selection affordance (e.g., 610A) are displayed.

In accordance with some embodiments, while displaying the one or more song selection affordances (e.g., 612A-612B) of the album associated with the album selection affordance (e.g., 610A), user input representing a touch on a song selection affordance (e.g., 612A) of the one or more song selection affordances (e.g., 612A-612B) of the album associated with the album selection affordance (e.g., 610A) is received. It is determined whether a characteristic intensity of the touch on the song selection affordance (e.g., 612A) exceeds an intensity threshold. In accordance with a determination that the characteristic intensity of the touch on the song selection affordance (e.g., 612A) exceeds the intensity threshold (e.g., a deep press), a fifth set of affordances are displayed. In accordance with some embodiments, the fifth set of affordances includes one or more of a shuffle affordance (e.g., 624A) and a source affordance (624B).

In accordance with some embodiments, in response to receiving the user input representing the touch on the song selection affordance (e.g., 612A) and in accordance with a determination that the characteristic intensity of the touch on the song selection affordance (e.g., 612A) does not exceed the intensity threshold (e.g., a light press), an audio playback user interface is displayed (e.g., 616) and audio playback of an audio file associated with the song selection affordance (e.g., 612A) is started.

In accordance with some embodiments, the electronic device includes a touch-sensitive surface configured to detect intensity of touches. While displaying the one or more song selection affordances (e.g., 614A-614B), user input representing a touch on a song selection affordance (e.g., 614B) of the one or more song selection affordances (e.g., 614A-614B) is received. It is determined whether a characteristic intensity of the touch on the song selection affordance (e.g., 614B) exceeds an intensity threshold. In accordance with a determination that the characteristic intensity of the touch on the song selection affordance (e.g., 614B) exceeds the intensity threshold (e.g., a deep press), a sixth set of affordances is displayed. In accordance with some embodiments, the sixth set of affordances includes one or more of a shuffle affordance (e.g., 624A) and a source affordance (e.g., 624B).

In accordance with some embodiments, in response to receiving the user input representing the touch on the song selection affordance (e.g., 614B) and in accordance with a determination that the characteristic intensity of the touch on the song selection affordance (e.g., 614B) does not exceed the intensity threshold (e.g., a light press), an audio playback user interface (e.g., 616) is displayed and audio playback of an audio file associated with the song selection affordance (e.g., 614B) is started.

In accordance with some embodiments, while displaying the audio playback user interface (e.g., 616), user input representing a touch on the audio playback user interface is received. It is determined whether a characteristic intensity of the touch on the audio playback user interface (e.g., 616) exceeds an intensity threshold. In accordance with a determination that the characteristic intensity of the touch on the audio playback user interface (e.g., 616) exceeds the intensity threshold (e.g., a deep press), a seventh set of affordances is displayed. In accordance with some embodiments, the seventh set of affordances includes one or more of a shuffle affordance (e.g., 622A), a repeat affordance (e.g., 622B), and a source affordance (e.g., 622C).

In accordance with some embodiments, user input is received. In response to receiving the user input, the affordance representing the music application (e.g., 600A) is displayed. It is determined whether the music application is currently playing an audio file. In accordance with a determination that the music application is currently playing an audio file, an affordance representing the audio playback user interface (e.g., 626A) is displayed. User input representing a touch on the affordance representing the audio playback user interface (e.g., 626A) is received. In response to receiving the user input representing the touch on the affordance representing the audio playback user interface (e.g., 626A), the audio playback user interface (e.g., 616) is displayed.

In accordance with some embodiments, user input is received. In response to receiving the user input, a user interface for an application is displayed, wherein the application and the music application are different applications. It is determined whether the music application is currently playing an audio file. In accordance with a determination that the music application is currently playing an audio file, an affordance representing the audio playback user interface is displayed, wherein the affordance representing the audio playback user interface and the user interface for the application are displayed concurrently.

In accordance with some embodiments, user input representing a touch on the affordance representing the audio playback user interface is received. In response to receiving the user input representing the touch on the affordance representing the audio playback user interface, display of the user interface for the application is replaced with display of a user interface for the music application. In accordance with some embodiments, the user interface for the music application comprises the audio playback user interface (e.g., 616).

In accordance with some embodiments, it is determined whether the music application is currently playing an audio file. In accordance with a determination that the music application is currently playing an audio file, an affordance representing the audio playback user interface is displayed. User input representing a touch on the affordance representing the audio playback user interface is received. In response to receiving the user input representing the touch on the affordance representing the audio playback user interface, the audio playback user interface (e.g., 616) is displayed In accordance with some embodiments, it is determined whether a phone call is currently active, the currently active phone call associated with a phone application. In accordance with a determination that a phone call is currently active, an affordance representing the phone application is displayed, wherein the affordance representing the phone application and the affordance representing the audio playback user interface are displayed concurrently. User input representing a touch on the affordance representing the phone application is received. In response to receiving the user input representing the touch on the affordance representing the phone application, a user interface of the phone application is displayed.

In accordance with some embodiments, the song selection affordance of the one or more song selection affordances (e.g., 606A of 606A-606B, 612A of 612A-612B, 614B of 614A-614B) includes an indication (e.g., 606C, 612C, 614C) of being stored locally on the electronic device.

In accordance with some embodiments, the song selection affordance of the one or more song selection affordances (e.g., 606A of 606A-606B, 612A of 612A-612B, 614B of 614A-614B) includes an indication (e.g., 606C, 612C, 614C) of not being stored locally on the electronic device.

In accordance with some embodiments, the song selection affordance of the one or more song selection affordances (e.g., 606A of 606A-606B, 612A of 612A-612B, 614B of 614A-614B) includes an indication (e.g., 606C, 612C, 614C) of being stored on an external electronic device.

It should be understood that the particular order in which the operations in FIG. 7 have been described is exemplary and not intended to indicate that the described order is the only order in which the operations could be performed. One of ordinary skill in the art would recognize various ways to reorder the operations described herein, as well as excluding certain operations. For brevity, these details are not repeated here.

Figure 8:
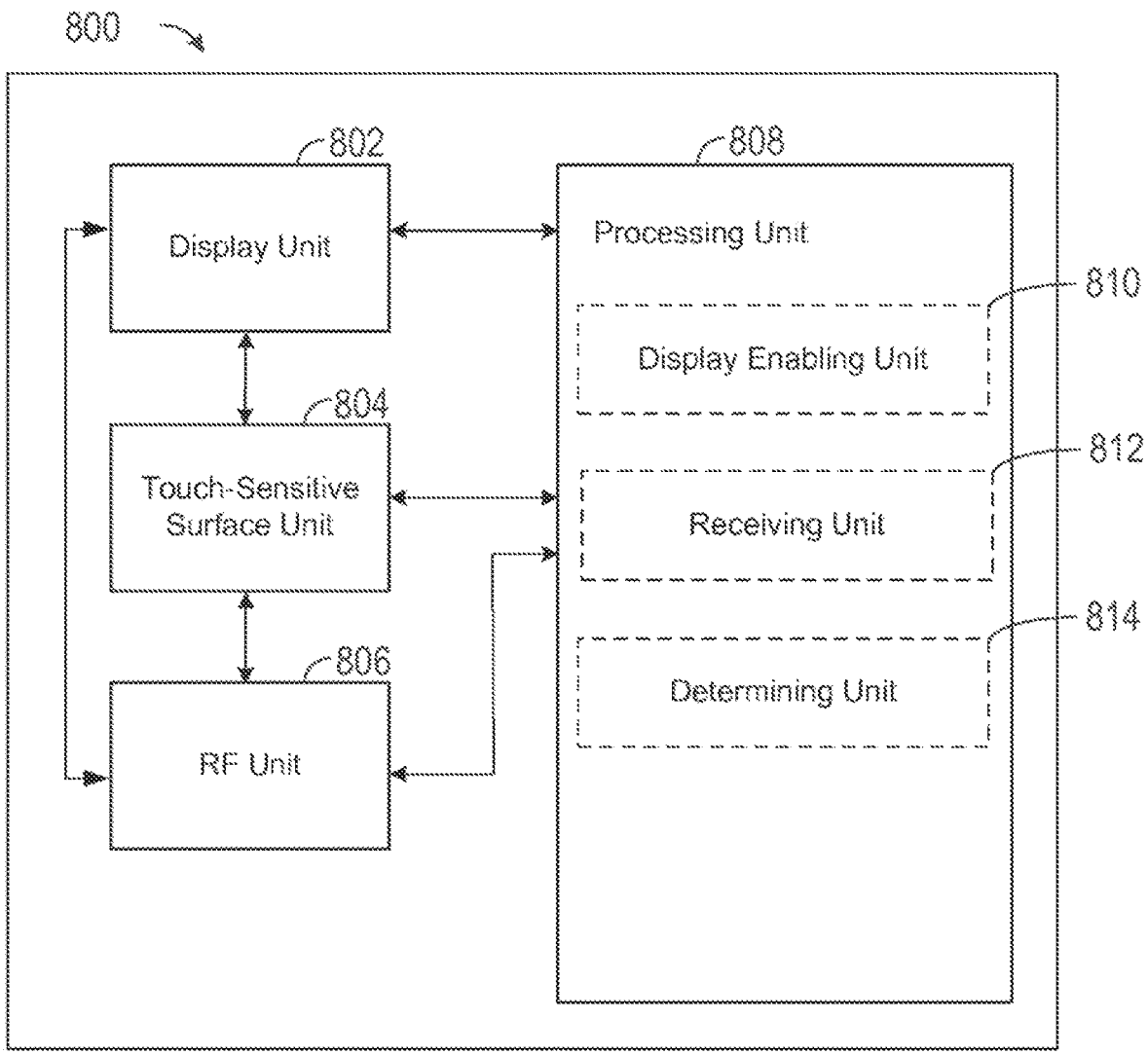
FIG. 8 illustrates a functional block diagram of an electronic device in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a display unit 802 configured to display graphical objects; a touch-sensitive surface unit 804 configured to receive user gestures (e.g., touches); one or more RF units 806 configured to detect and communicate with external electronic devices; and a processing unit 808 coupled to display unit 802, touch-sensitive surface unit 804, and RF units 806. In some embodiments, the processing unit 808 includes a display enabling unit 810, a receiving unit 812, and a determining unit 814. The units of FIG. 8 may be used to implement the various techniques and methods described above with respect to FIGS. 6-7.

For example, the display enabling unit 810 can be used for: displaying, on the display, an affordance representing a music application; displaying a landing screen of the music application; displaying, on the display, one or more playlist selection affordances; displaying, on the display, one or more artist selection affordances; and displaying, on the display, one or more song selection affordances.

For example, the receiving unit 812 can be used for: receiving user input representing movement of the rotatable input mechanism; receiving user input associated with the landing screen.

For example, the determining unit 814 can be used for: determining whether the user input associated with the landing screen represents a touch associated with the playlist affordance, the artist affordance, or the song affordance.

The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

The operations described above with reference to FIG. 7 are, optionally, implemented by components depicted in FIGS. 1A-1B, 5A-5B, and 8. For example, displaying operation 702; receiving operation 704; and determining operation 710 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 9A:
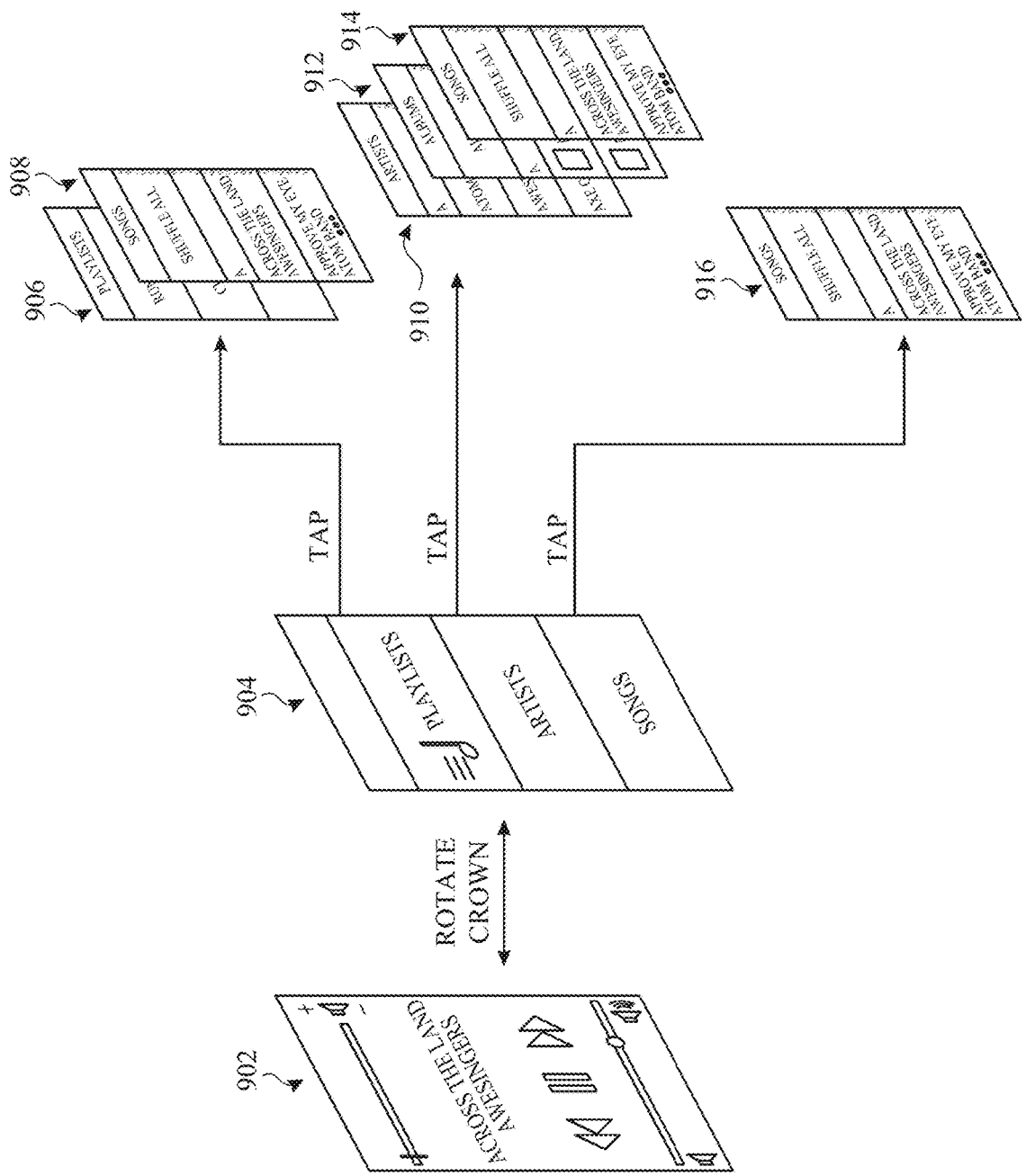
FIGS. 9A-9C illustrate exemplary user interfaces in accordance with some embodiments.
Figure 9B:
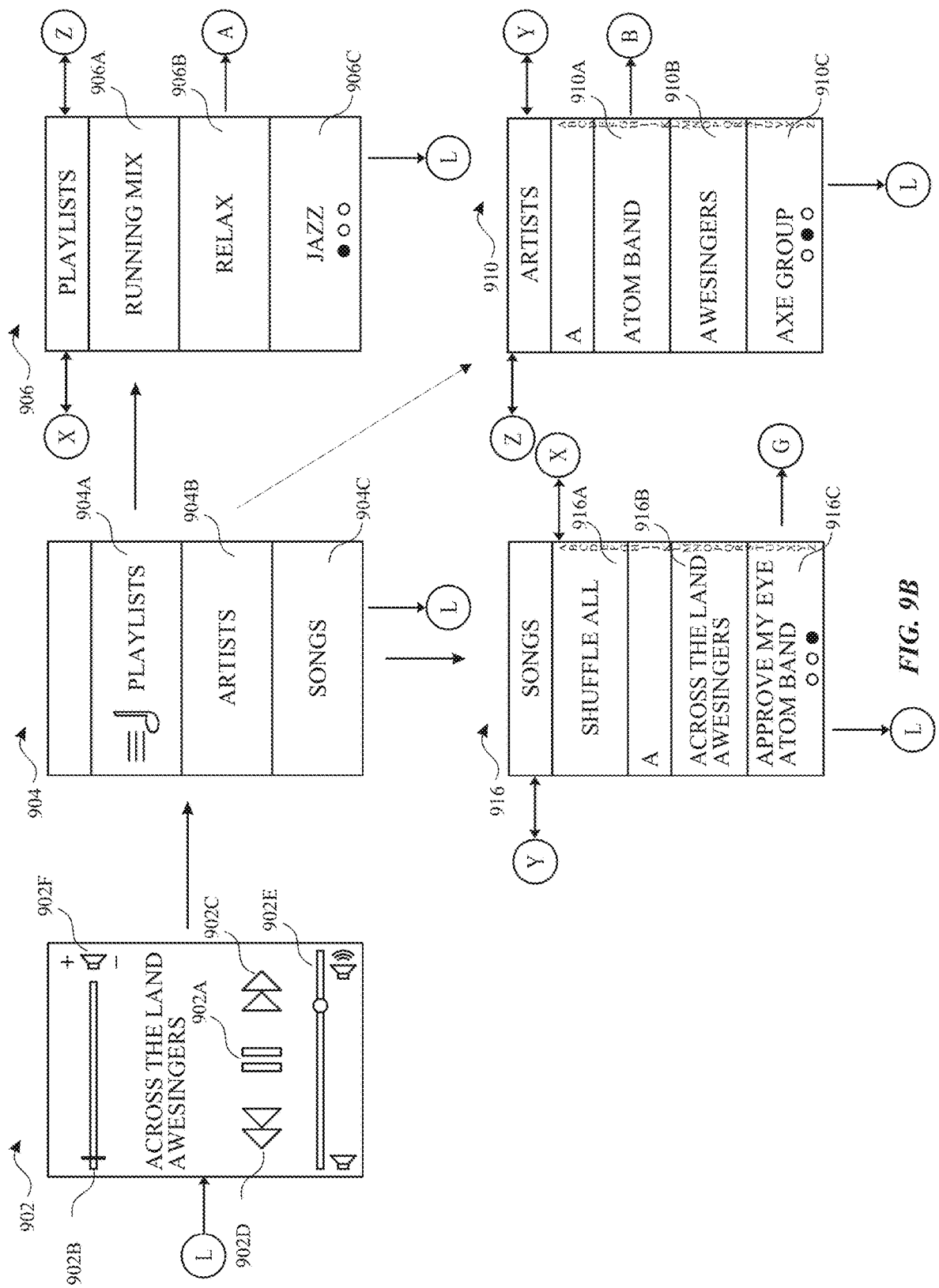
Figure 9C:
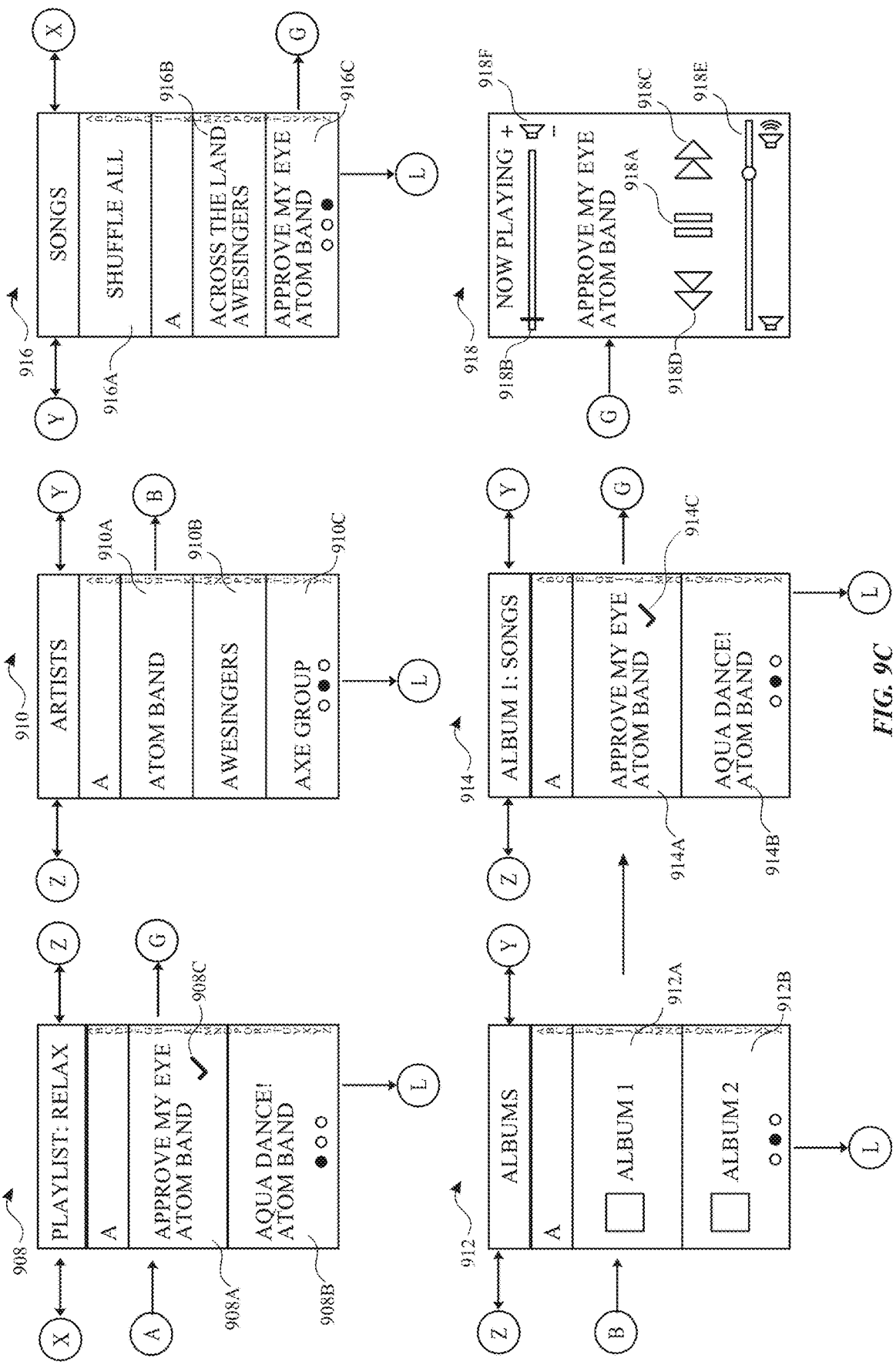

FIGS. 9A-9C illustrate exemplary user interfaces for accessing music using an electronic device, in accordance with some embodiments. In some embodiments, the electronic device is device 500. The electronic device has a display (e.g., 112, 340, 504), a touch-sensitive surface (e.g., 112, 355, 504), and a rotatable input mechanism (e.g., 506).

FIG. 9A illustrates a high-level view of the organization of various user interface screens. These and additional user interface screens will be described in further detail with respect to FIGS. 9B-9C. User interface screen 904 illustrates a navigation screen (e.g., the screen displayed after receiving a movement of the rotatable input mechanism at a now playing screen 902) of a music application (e.g., a digital music player application). From user interface screen 904, a user can access user interface screen 906, user interface screen 910, and user interface screen 916. User interface screen 902 includes an audio playback user interface of a music application (e.g., a digital music player application). In some embodiments, user interface screen 902 functions as described with respect to user interface screen 616, user interface screen 904 functions as described with respect to user interface screen 602, user interface screen 906 functions as described with respect to user interface screen 604, user interface screen 910 functions as described with respect to user interface screen 608, and user interface screen 916 functions as described with respect to user interface screen 614.

User interface screen 906 illustrates playlist selection affordances 906A-906C for accessing various music playlists. Activating a playlist selection affordance causes the device to display user interface screen 908. User interface screen 908 illustrates song selection affordances 908A-908B of an activated playlist. Activating a song selection affordance causes the device to display user interface screen 902, which includes an audio playback user interface, and to begin audio playback of the song corresponding to the activated song selection affordance. In some embodiments, a song selection affordance of user interface 908 (or other user interfaces with one or more song selection affordances) includes (or is display adjacent to) an indicator 908C, which provides an indication of the associated song being stored locally on the electronic device (e.g., the song is available for playback from local memory). In accordance with some embodiments, indicator 908C provides an indication of the associated song being available but not being stored locally on the electronic device (e.g., the song is not stored locally, but is available for playback through download or stream from an external electronic device, such as a phone or server). In accordance with some embodiments an indicator 908C may provide an indication of the associated song not being available for playback (e.g., not stored locally on the electronic and not stored on an external electronic and available for playback through download or stream). In some embodiments, user interface screen 908 functions as described with respect to user interface screen 606.

User interface screen 910 illustrates artist selection affordances 910A-910C for accessing music of various artists. Activating an artist selection affordance causes the device to display user interface screen 912. User interface screen 912 includes album selection affordances 912A-912B of the activated artist. Activating an album selection affordance causes the device to display user interface screen 914, which includes song selection affordances 914A-914B of the selected album of the selected artist. Activating a song selection affordance causes the device to display user interface screen 902, which includes an audio playback user interface, and to begin audio playback of the song corresponding to the activated song selection affordance. A song selection affordance 914A of user interface 914 may also contain an indicator 914C, similar to indicator 908C. Thus, a user can select an artist to view albums that include songs by that artist, and select an album to view songs in the albums. Activating a song selection affordance plays a song associated with the affordance, and causes display of the audio playback user interface of user interface screen 902. In some embodiments, user interface screen 912 functions as described with respect to user interface screen 610 and user interface screen 914 functions as described with respect to user interface screen 612.

User interface screen 916 illustrates song selection affordances (916A-916C). Activating a song selection affordance causes the device to display user interface screen 902, which includes an audio playback user interface, and to begin audio playback of the song corresponding to the activated song selection affordance.

The audio playback user interface of user interface screen 902 displays song information (e.g., the title and artist) of an activated (e.g., playing, paused) song. The audio playback user interface of user interface 902 may contain affordances (e.g., 902A-902F) that, when activated, cause the device to play/pause, skip forward/backward, scrub to within a time in the song, and adjust the volume, among other functionalities for audio playback control. Similarly, user interface screen 918 illustrates an audio playback user interface with affordances 918A-918F wherein the interface has been updated, for example, to reflect a newly selected or different song.

In some embodiments, as illustrated in FIG. 9B, the device displays an audio playback user interface 902. The device receives a first user input representing movement (e.g., a rotation) of the rotatable input mechanism in a rotation direction.

In response to receiving the first user input representing the movement (e.g., a rotation) of the rotatable input mechanism in the rotation direction, the device ceases display of the audio playback user interface (e.g., 902) and displays a navigation screen (e.g., 904), wherein the navigation screen (e.g., 904) includes a playlist affordance (e.g., 904A), an artist list affordance (e.g., 904B), and a song list affordance (e.g., 904C). For example, upon receiving movement of the rotatable input mechanism at a now playing screen 902, the device displays a navigation screen, illustrated by user interface 904, which contains affordances 904A-904C. The navigation screen provides a screen for accepting user input, and allows intuitive browsing of music organized by categories such as by playlist, artist, song, and/or the like. Affordances 904A, 904B, and 904C may represent a playlist affordance, an artist list affordance, and a song list affordance of a music application, respectively.

The device receives a second user input (e.g., a touch) associated with the navigation screen (e.g., 904). In response to receiving the second user input, the device determines whether the second user input represents a contact on the touch-sensitive surface (e.g., a touch) and is associated with the playlist affordance (e.g., 904A), the artist list affordance (e.g., 904B), or the song list affordance (e.g., 904C). For example, upon receiving user input representing a touch, the device determines whether the touch is associated with a playlist, artist or song category (e.g., set of user interfaces), represented by affordances 904A, 904B, and 904C, respectively.

In response to receiving the second user input and in accordance with a determination that the second user input represents a contact associated with the playlist affordance (e.g., 904A), the device ceases display of the navigation screen (e.g., 904) and displays a first playlist user interface (e.g., 906) of two or more playlist user interfaces (e.g., 906, 908). For example, the device receives a touch associated with playlist affordance 904A, and in response displays a list of playlists, illustrated by user interface 906. The list of playlists is part of a playlist set of user interfaces, which may include two or more playlist user interfaces, such as 906 and 908.

In response to receiving the second user input and in accordance with a determination that the second user input represents a contact associated with the artist list affordance (e.g., 904B), the device ceases display of the navigation screen (e.g., 904) and displays an artist user interface (e.g., 910) of two or more artist user interfaces (e.g., 910, 912, 914). For example, the device receives a touch associated with artist list affordance 904B, and in response displays a list of artists, illustrated by user interface 910. The list of artists is part of an artist set of user interfaces, which may include two or more artist user interfaces, such as 910, 912, and 914.

In response to receiving the second user input and in accordance with a determination that the second user input represents a contact associated with the song list affordance (e.g., 904C), the device ceases display of the navigation screen (e.g., 904) and displays a song user interface (e.g., 916) of one or more song user interfaces (e.g., 916). For example, the device receives a touch associated with song list affordance 904C, and in response displays a list of songs, illustrated by user interface 916. The list of songs is part of a songs set of user interfaces, which may include one or more song user interfaces, such as 914.

In accordance with some embodiments, while displaying one (e.g., 906) of the two or more playlist user interfaces (e.g., 906, 908), the device receives one or more playlist navigation inputs (e.g., activation of a playlist at 906, activation of a back functionality at 908 to return to 906). In response to receiving the one or more playlist navigation inputs, the device transitions one or more times among each of the two or more playlist user interfaces (e.g., 906 and 908) to display a last-displayed playlist user interface (e.g., 908) of the two or more playlist user interfaces (e.g., 906, 908). While displaying the last-displayed playlist user interface (e.g., 908), the device receives a first directional swipe. In response to receiving the first directional swipe and in accordance with a determination that the first directional swipe represents a swipe in a first direction, the device ceases display of the last-displayed playlist user interface (e.g., 908) and displays the artist user interface (e.g., 910) of the two or more artist user interfaces (e.g., 910, 912, 914). While displaying the artist user interface (e.g., 910) of the two or more artist user interfaces (e.g., 910, 912, 914), the device receives a second directional swipe. In response to receiving the second directional swipe (e.g., in the opposite direction of the first directional swipe), the device ceases display of the artist user interface (e.g., 910) of the two or more artist user interfaces (e.g., 910, 912, 914) and displays the last-displayed playlist user interface (e.g., 908) of the two or more playlist user interfaces (e.g., 906, 908). As an example, the device allows swipe navigation from the playlist user interfaces to the artist user interfaces, and then allows return to the playlist user interfaces with memory of last-displayed playlist user interface. By displaying the last-displayed playlist user interface, navigation is user-friendly and intuitive. For example, the device receives user input at a list of playlists, illustrated by user interface 906, associated with a playlist "Relax", represented by affordance 906B. As a result, the device displays user interface 908, which illustrates a list of songs associated with the playlist "Relax". At user interface 908, the last-displayed playlist user interface, the device receives a directional swipe and displays a list of artists, illustrated by user interface 910. At the display of any artist user interface (e.g., 910, 912, or 914), if the device receives a subsequent directional swipe that navigates back to the playlist user interfaces (e.g., 906, 908), the device then displays the last-displayed playlist user interface, user interface 908 in this example. In some examples, the device may receive any number of navigations between playlist user interfaces (e.g., 906, 908). Likewise, the device may receive any number of navigations between artist user interfaces (e.g., 910, 912, 914). Any playlist user interface (e.g., 906 or 908) may be the last-displayed playlist user interface.

In accordance with some embodiments, while displaying one (e.g., 906) of the two or more playlist user interfaces (e.g., 906, 908), the device receives one or more playlist navigation inputs. In response to receiving the one or more playlist navigation inputs, the device transitions one or more times among each of the two or more playlist user interfaces (e.g., 906, 908) to display a last-displayed playlist user interface (e.g., 906) of the two or more playlist user interfaces (e.g., 906, 908). While displaying the last-displayed playlist user interface (e.g., 906), the device receives a third directional swipe. In response to receiving the third directional swipe and in accordance with a determination that the third directional swipe represents a swipe in a second direction (e.g., different from the first direction), the device ceases display of the last-displayed playlist user interface (e.g., 906) and displays the song user interface (e.g., 916) of the one or more song user interfaces (e.g., 916). While displaying the song user interface (e.g., 916) of the one or more song user interfaces (e.g., 916), the device receives a fourth directional swipe. In response to receiving the fourth directional swipe, the device ceases display of the song user interface (e.g., 916) of the one or more song user interfaces (e.g., 916) and displays the last-displayed playlist user interface (e.g., 906) of the two or more playlist user interfaces (e.g., 906, 908). Thus, the device allows swiping from playlist user interfaces (e.g., 906, 908) to song user interfaces (e.g., 916), and back again, with memory of the last-displayed playlist user interface.

In accordance with some embodiments, the device receives a third user input representing movement of the rotatable input mechanism in a second rotation direction (e.g., different than the first). In response to receiving the third user input, the device displays the audio playback user interface (e.g., 902).

In accordance with some embodiments, the audio playback user interface (e.g., 902) comprises an affordance (e.g., 902A) for initiating audio playback. For example, a "now playing" screen contains a play/pause affordance, represented by affordance 902A.

In accordance with some embodiments, one playlist user interface (e.g., 908) of the two or more playlist user interfaces (e.g., 906, 908) comprises an affordance (e.g., 908A) which, when selected, causes the audio playback user interface (e.g., 918) to be displayed. One artist user interface (e.g., 914) of the two or more artist user interfaces (e.g., 910, 912, 914) comprises an affordance (e.g., 914A) which, when selected, causes the audio playback user interface (e.g., 918) to be displayed. At least one song user interface (e.g., 916) of the one or more song user interfaces (e.g., 916) comprises an affordance (e.g., 916C) which, when selected, causes the audio playback user interface to be displayed (e.g., 918). For example, a song user interface, illustrated by user interface 916, contains affordance 916C corresponding to the song "Approve My Eye" by Atom Band. Upon receiving selection of affordance 916C, the device displays the "now playing" screen illustrated by user interface 918, which reflects the song selection "Approve My Eye" by Atom Band.

Figure 10:
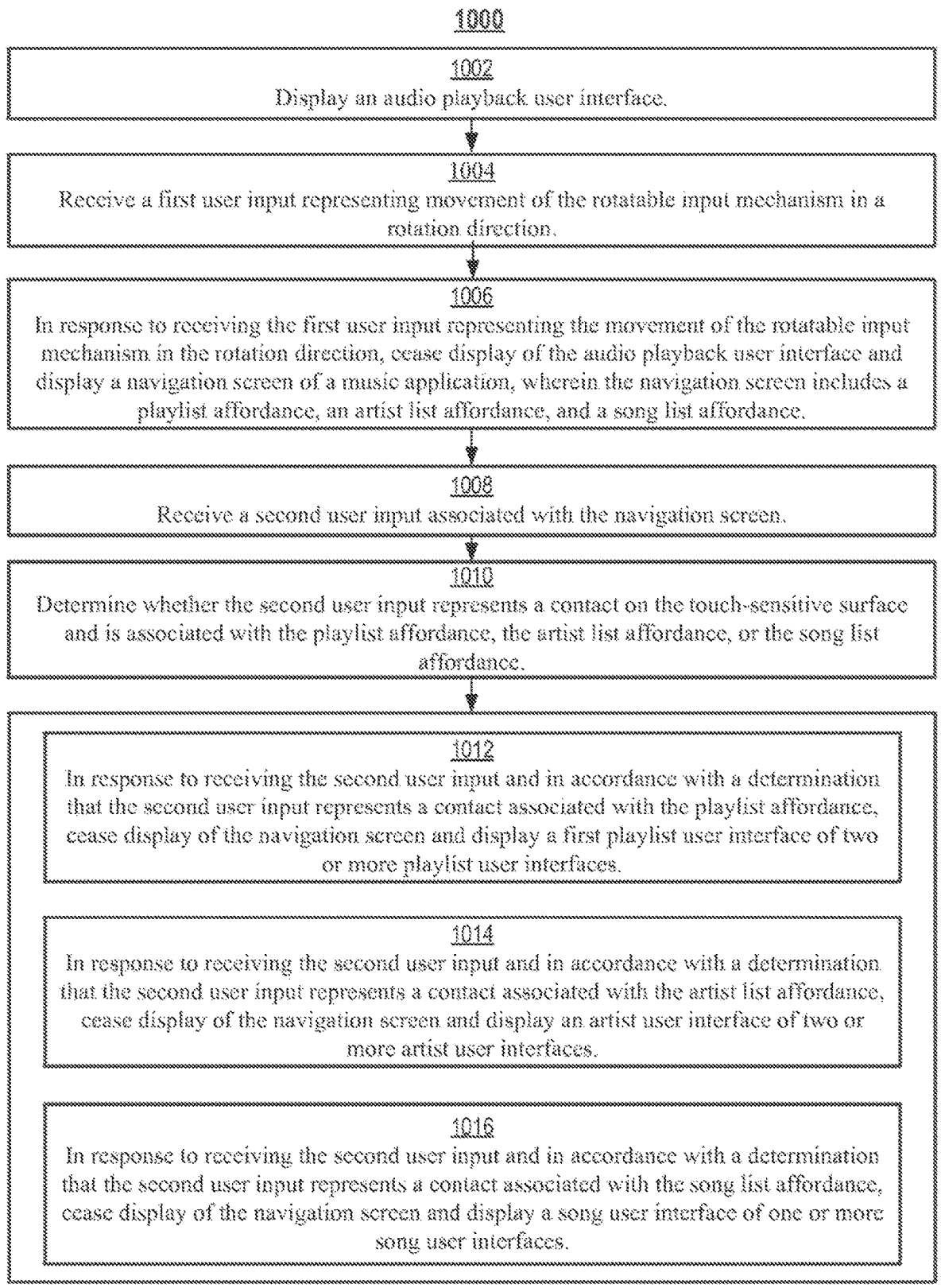
FIG. 10 is a flow diagram illustrating an exemplary process for accessing and playing music.

FIG. 10 is a flow diagram illustrating an exemplary process for accessing and playing music in accordance with some embodiments. In some embodiments, method 1000 may be performed at an electronic device with a display (e.g., 112, 340, 504) and a rotatable input mechanism (e.g., 506). In some embodiments, the electronic device also includes a touch-sensitive surface (e.g., 112, 355, 504). Some operations in method 1000 may be combined, the order of some operations may be changed, and some operations may be omitted.

In some embodiments, the touch-sensitive surface (e.g., 112, 355, 504) is capable of detecting intensity of touch contacts. Exemplary devices that may perform method 1000 include devices 100, 300, and 500 (FIGS. 1A, 3, and 5A).

Method 1000 provides an intuitive way to access and play music. The method reduces the cognitive burden on a user when using a device to access and play music, thereby creating a more efficient human-machine interface. For battery-operated computing devices, enabling a user to access and play music more quickly and more efficiently conserves power and increases the time between battery charges.

At block 1002, an audio playback user interface (e.g., 902) is displayed.

At block 1004, a first user input representing movement of the rotatable input mechanism in a rotation direction is received.

At block 1006, in response to receiving the first user input representing the movement of the rotatable input mechanism in the rotation direction, display of the audio playback user interface (e.g., 902) is ceased and a navigation screen (e.g., 904) is displayed, wherein the navigation screen (e.g., 904) includes a playlist affordance (e.g., 904A), an artist list affordance (e.g., 904B), and a song list affordance (e.g., 904C).

At block 1008, a second user input (e.g., a touch) associated with the navigation screen (e.g., 904) is received.

At block 1010, it is determined whether the second user input represents a contact on the touch-sensitive surface (e.g., a touch) and is associated with the playlist affordance (e.g., 904A), the artist list affordance (e.g., 904B), or the song list affordance (e.g., 904C).

At block 1012, in response to receiving the second user input and in accordance with a determination that the second user input represents a contact associated with the playlist affordance (e.g., 904A), display of the navigation screen (e.g., 904) is ceased and a first playlist user interface (e.g., 906) of two or more playlist user interfaces (e.g., 906, 908) is displayed.

At block 1014, in response to receiving the second user input and in accordance with a determination that the second user input represents a contact associated with the artist list affordance (e.g., 904B), display of the navigation screen (e.g., 904) is ceased and an artist user interface (e.g., 910) of two or more artist user interfaces (e.g., 910, 912, 914) is displayed.

At block 1016, in response to receiving the second user input and in accordance with a determination that the second user input represents a contact associated with the song list affordance (e.g., 904C), display of the navigation screen (e.g., 904) is ceased and a song user interface (e.g., 916) of one or more song user interfaces (e.g., 916) is displayed.

In accordance with some embodiments, while displaying one (e.g., 906) of the two or more playlist user interfaces (e.g., 906, 908), one or more playlist navigation inputs is received. In response to receiving the one or more playlist navigation inputs, transitions are made one or more times among each of the two or more playlist user interfaces (e.g., 906 and 908) to display a last-displayed playlist (e.g., 908) user interface of the two or more playlist user interfaces (e.g., 906, 908). While displaying the last-displayed playlist user interface (e.g., 908), a first directional swipe is received. In response to receiving the first directional swipe and in accordance with a determination that the first directional swipe represents a swipe in a first direction, display of the last-displayed playlist user interface (e.g., 908) is ceased and the artist user interface (e.g., 910) of the two or more artist user interfaces (e.g., 910, 912, 914) is displayed. While displaying the artist user interface (e.g., 910) of the two or more artist user interfaces (e.g., 910, 912, 914), a second directional swipe is received. In response to receiving the second directional swipe, display of the artist user interface (e.g., 910) of the two or more artist user interfaces (e.g., 910, 912, 914) is ceased and the last-displayed playlist user interface (e.g., 908) of the two or more playlist user interfaces (e.g., 906, 908) is displayed.

In accordance with some embodiments, while displaying one (e.g., 906) of the two or more playlist user interfaces (e.g., 906, 908), one or more playlist navigation inputs is received. In response to receiving the one or more playlist navigation inputs, transitions are made one or more times among each of the two or more playlist user interfaces (e.g., 906, 908) to display a last-displayed playlist user interface (e.g., 906) of the two or more playlist user interfaces (e.g., 906, 908). While displaying the last-displayed playlist user interface (e.g., 906), a third directional swipe is received. In response to receiving the third directional swipe and in accordance with a determination that the third directional swipe represents a swipe in a second direction (e.g., different than the first direction), display of the last-displayed playlist user interface (e.g., 906) is ceased and the song user interface (e.g., 916) of the one or more song user interfaces (e.g., 916) is displayed. While displaying the song user interface (e.g., 916) of the one or more song user interfaces (e.g., 916), a fourth directional swipe is received. In response to receiving the fourth directional swipe, display of the song user interface (e.g., 916) of the one or more song user interfaces (e.g., 916) is ceased and the last-displayed playlist user interface (e.g., 906) of the two or more playlist user interfaces (e.g., 906, 908) is displayed.

In accordance with some embodiments, a third user input representing movement of the rotatable input mechanism in a second rotation direction (e.g., different from the first) is received. In response to receiving the third user input, the audio playback user interface (e.g., 902) is displayed.

In accordance with some embodiments, the audio playback user interface (e.g., 902) comprises an affordance (e.g., 902A) for initiating audio playback.

In accordance with some embodiments, one playlist user interface (e.g., 908) of the two or more playlist user interfaces (e.g., 906, 908) comprises an affordance (e.g., 908A) which, when selected, causes the audio playback user interface (e.g., 918) to be displayed. One artist user interface (e.g., 914) of the two or more artist user interfaces (e.g., 910, 912, 914) comprises an affordance (e.g., 914A) which, when selected, causes the audio playback user interface (e.g., 918) to be displayed. One song user interface (e.g., 916) of the one or more song user interfaces (e.g., 916) comprises an affordance (e.g., 916C) which, when selected, causes the audio playback user interface to be displayed (e.g., 918).

Figure 11A:
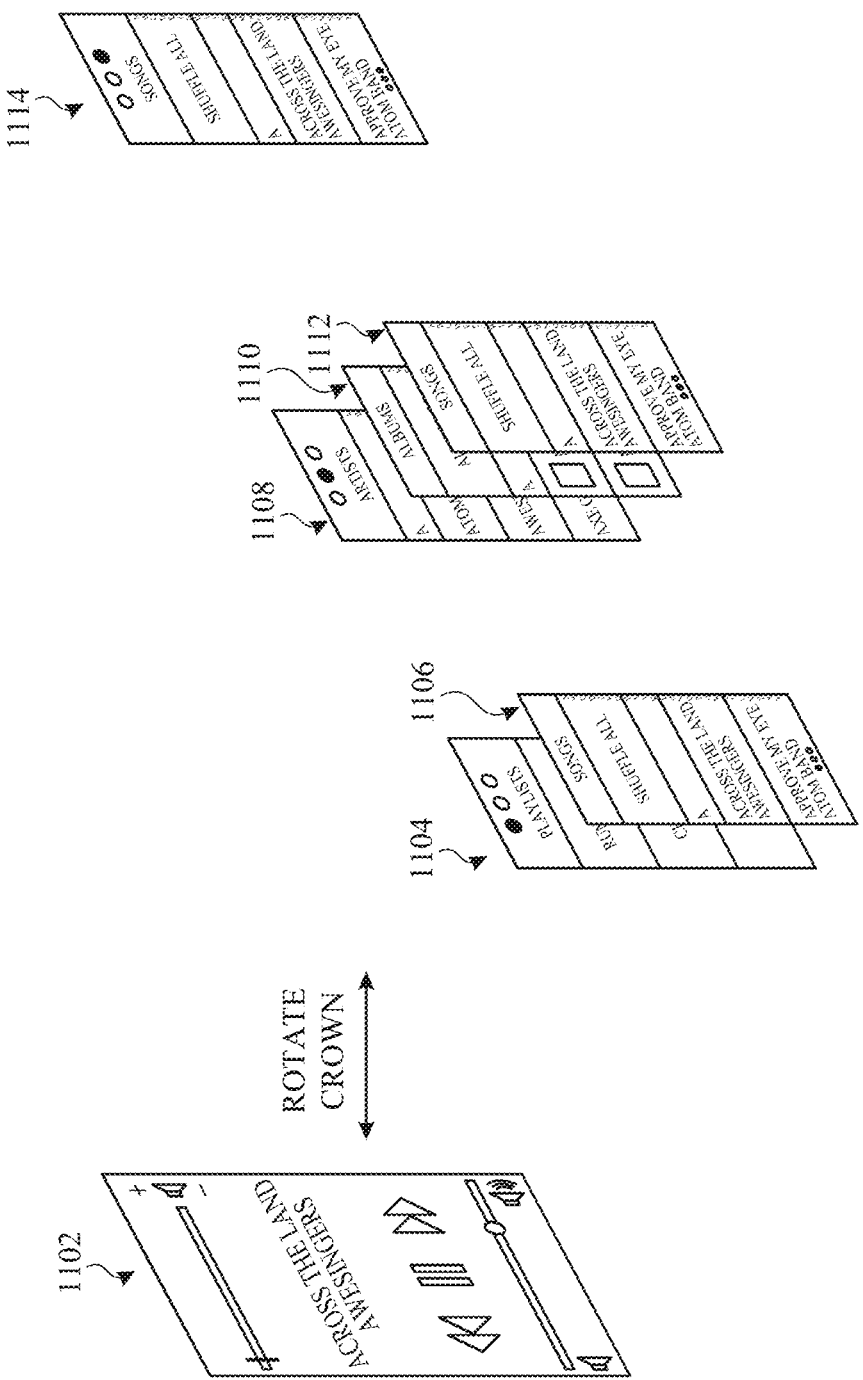
FIGS. 11A-11C illustrate exemplary user interfaces in accordance with some embodiments.
Figure 11B:
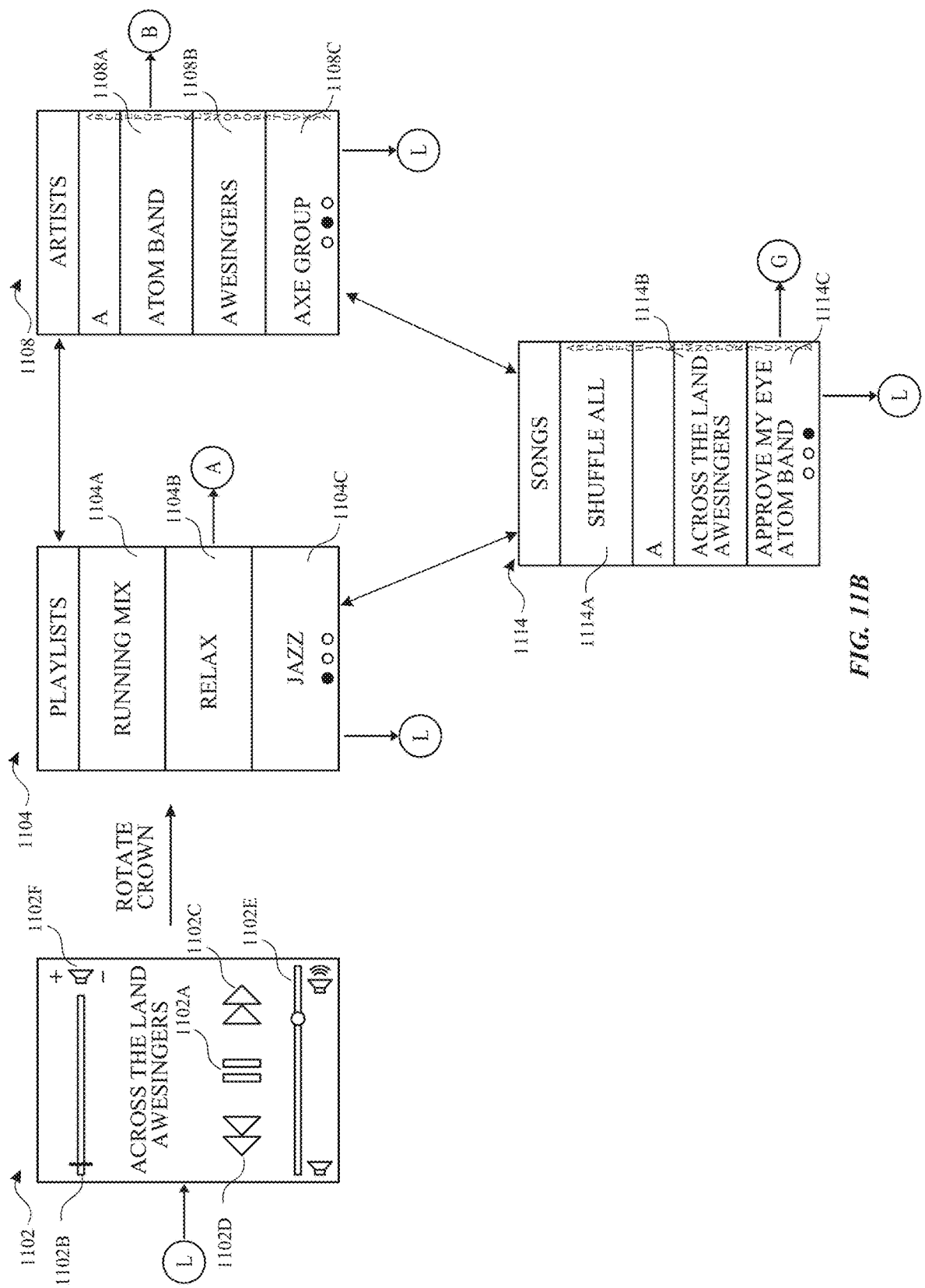
Figure 11C:
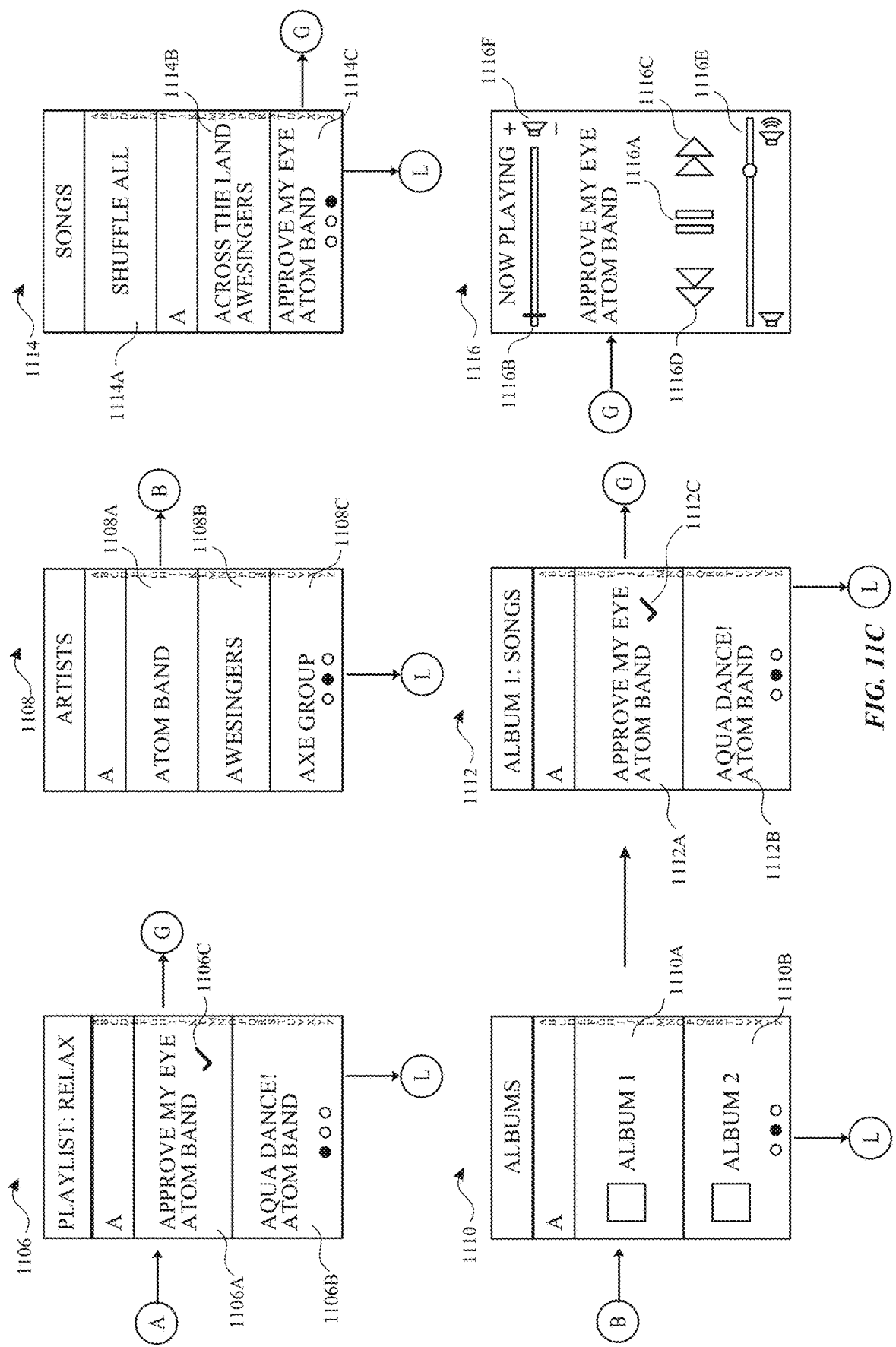

FIGS. 11A-11C illustrate exemplary user interfaces for accessing music using an electronic device, in accordance with some embodiments. In some embodiments, the electronic device is device 500. The electronic device has a display (e.g., 112, 340, 504), a touch-sensitive surface (e.g., 112, 355, 504), and a rotatable input mechanism (e.g., 506).

FIG. 11A illustrates a high-level view of the organization of various user interface screens. These and additional user interface screens will be described in further detail with respect to FIGS. 11B-11C. User interface screen 1102 includes an audio playback user interface of a music application (e.g., a digital music player application). Upon receiving one or more user inputs, the device may provide access from user interface 1102 to user interface 1104, user interface 1108, and user interface 1114. In some embodiments, user interface screen 1102 functions as described with respect to user interface screen 616, user interface screen 1104 functions as described with respect to user interface screen 604, user interface screen 1108 functions as described with respect to user interface screen 608, and user interface screen 1114 functions as described with respect to user interface screen 614.

User interface screen 1104 illustrates playlist selection affordances for accessing various music playlists. Activating a playlist selection affordance causes the device to display user interface screen 1106. User interface screen 1106 illustrates song selection affordances of the activated playlist. Activating a song selection affordance causes the device to display user interface screen 1102, which includes an audio playback user interface, and to begin audio playback of the song corresponding to the activated song selection affordance. A song selection affordance of user interface 1106 (or other user interfaces with one or more song selection affordances) may also contain an indicator (1106C), which may provide an indication of being stored locally on the electronic device (e.g., the song is available for playback from local memory). In accordance with some embodiments, an indicator (1106C) provides an indication of not being stored locally on the electronic device (e.g., the song is not stored locally, but is available for playback through download or stream from an external electronic device, such as a phone or server). In accordance with some embodiments an indicator (1106C) may provide an indication of not being available for playback (e.g., not stored locally on the electronic and not stored on an external electronic and available for playback through download or stream). In some embodiments, user interface screen 1106 functions as described with respect to user interface screen 606.

User interface screen 1108 illustrates artist selection affordances for accessing music of various artists. Activating an artist selection affordance causes the device to display user interface screen 1110. User interface screen 1110 illustrates album selection affordances of the activated artist. Activating an album selection affordance causes the device to display user interface screen 1112, which includes song selection affordances of the selected album of the selected artist. Activating a song selection affordance causes the device to display user interface screen 1102, which includes an audio playback user interface, and to begin audio playback of the song corresponding to the activated song selection affordance. A song selection affordance 1112A may also contain an indicator 1112C. In some embodiments, user interface screen 1110 functions as described with respect to user interface screen 610 and user interface screen 1112 functions as described with respect to user interface screen 612.

User interface screen 1114 includes song selection affordances. Activating a song selection affordance causes the device to display user interface screen 1102, which includes an audio playback user interface, and to begin audio playback of the song corresponding to the activated song selection affordance.

The audio playback user interface of user interface screen 1102 displays song information (e.g., the title and artist) of an activated (e.g., playing, paused) song. The audio playback user interface of user interface 1102 may contain affordances (e.g., 1102A-1102F) that, when selected, cause the device to play/pause, skip forward/backward, scrub to within a time in the song, and adjust the volume, among others. Similarly, user interface screen 1116 illustrates an audio playback user interface with affordances 1116A-1116F wherein the interface has been updated, for example, to reflect a newly selected or different song.

In some embodiments, as shown in FIG. 11B, the device displays a first audio playback user interface (e.g., 1102). The device receives user input representing movement (e.g., rotation) of the rotatable input mechanism.

In response to receiving the user input representing the movement (e.g., rotation) of the rotatable input mechanism, the device ceases display of the first audio playback user interface (e.g., 1102) and displays a first user interface (e.g., 1104) of a first set of user interfaces (e.g., 1104, 1106). For example, in response to rotation of the rotatable input mechanism, the device displays a list of playlists as illustrated by user interface 1104. Alternatively, another user interface for interacting with a music application may be displayed in response to receiving the movement, such as, for example, user interfaces 1106, 1108, 1110, 1112, and 1114. Generally, a set of user interfaces represents one or more user interfaces grouped hierarchically together based on organization or attribute. For example, a set of user interfaces may comprise two user interfaces, one representing a list of playlists (e.g., 1104) and the other representing the songs contained in a playlist selected from this list (e.g., 1106).

The device receives a first user input representing a directional swipe on the touch-sensitive surface (e.g., a swipe). The device determines whether the first user input represents a swipe in a first direction or a second direction (e.g., different than the first direction).

In response to receiving the first user input and in accordance with a determination that the first user input represents a swipe in the first direction, the device ceases display of the first user interface (e.g., 1104) of the first set of user interfaces (e.g., 1104, 1106) and displays a first user interface (e.g., 1108) of a second set of user interfaces (e.g., 1108, 1110, 1112). For example, the device receives a swipe from right to left at the display of a playlist user interface (e.g., 1104), and in response displays an artist list user interface, illustrated by user interface 1108.

In response to receiving the first user input and in accordance with a determination that the first user input represents a swipe in the second direction (e.g., different than the first direction), the device ceases display of the first user interface (e.g., 1104) of the first set of user interfaces (e.g., 1104, 1106) and displays a first user interface (e.g., 1114) of a third set of user interfaces (e.g., 1114). For example, if the device instead receives a swipe from left to right at the display of a playlist user interface (e.g., 1104), the device displays a song list user interface, illustrated by user interface 1114.

In accordance with some embodiments, the device receives a second user input representing a directional swipe on the touch-sensitive surface. In accordance with the determination that the first user input represents a swipe in the first direction, in response to receiving the second user input and in accordance with a determination that the second user input represents a swipe in the first direction, the device ceases display of the second set of user interfaces (e.g., 1108, 1110, or 1112) and displays the first user interface (e.g., 1114) of the third set of user interfaces (e.g., 1114). In accordance with the determination that the first user input represents a swipe in the second direction, in response to receiving the second user input and in accordance with a determination that the second user input represents a swipe in the second direction, the device ceases display of the third set of user interfaces (e.g., 1114) and displays the first user interface (e.g., 1108) of the second set of user interfaces (e.g., 1108, 1110, or 1112). For example, a second consecutive swipe from right to left results in the display of one of the third set of user interfaces, which may be a list of songs as illustrated by user interface 1114. In contrast, a second consecutive swipe from left to right swipe results in the display of one of the second set of user interfaces, which may be any one of user interfaces 1108, 1110, and 1112, which collectively represent an artist set of user interfaces. In this manner, the device allows swipe navigation in either direction for access to multiple sets of user interfaces.

In accordance with some embodiments, the first user interface (e.g., 1114) of the third set of user interfaces (e.g., 1114) comprises a selection affordance (e.g., 1114C). The device receives a third user input (e.g., a touch) associated with the selection affordance (e.g., 1114C) of the first user interface (e.g., 1114) of the third set of user interfaces (e.g., 1114). In response to receiving the third user input (e.g., touch), the device ceases display of the first user interface (e.g., 1114) of the third set of user interfaces (e.g., 1114) and displays a second audio playback user interface (e.g., 1116). For example, at a songs list illustrated by user interface 1114, the device receives a touch associated with affordance 1114C, associated with the song "Approve My Eye" by Atom Band. As a result of receiving the selection, the device displays a "now playing" screen, illustrated by user interface 1116, updated to reflect the newly selected song playing.

In accordance with some embodiments, the selection affordance (e.g., 1114C) of the first user interface (e.g., 1114) of the third set of user interfaces (e.g., 1114) is a song selection affordance. In response to receiving the third user input, the device plays a song associated with the selection affordance (e.g., 1114C).

In accordance with some embodiments, the selection affordance (e.g., 1114A) of the first user interface (e.g., 1114) of the third set of user interfaces (e.g., 1114) is a shuffle all affordance. In response to receiving the third user input, the device plays a song selected at random from a set of songs associated with the selection affordance (e.g., 1114A). For example, playing a song entails initiating audio playback of the song; playing a song (or songs) selected at random entails initiating audio playback of the song(s) in a random or pseudo-random order.

In accordance with some embodiments, prior to receiving the first user input representing a directional swipe, the device receives user input (e.g., a touch) associated with a selection affordance (e.g., 1104B) of the first user interface (e.g., 1104) of the first set of user interfaces (e.g., 1104, 1106). In response to receiving the user input (e.g., touch) associated with the selection affordance (e.g., 1104B) of the first user interface (e.g., 1104) of the first set of user interfaces (e.g., 1104, 1106), the device ceases display of the first user interface (e.g., 1104) of the first set of user interfaces (e.g., 1104, 1106) and displays a second user interface (e.g., 1106) of the first set of user interfaces (e.g., 1104, 1106). For example, prior to receiving a user swipe navigating away from the playlist set of user interfaces, illustrated by user interfaces 1104 and 1106, the device allows navigation among the playlist set of user interfaces. The device receives user selection of a playlist "Relax", represented by affordance 1104B, and in response displays a list of songs associated with the playlist "Relax", as illustrated by user interface 1106.

In accordance with some embodiments, the first set of user interfaces, the second set of user interfaces, and the third set of user interfaces are each independently selected from the group consisting of: a playlist set of user interfaces, an artist set of user interfaces, and a songs set of user interfaces. The playlist set of user interfaces comprises: a playlist user interface (e.g., 1104), and a list of songs (e.g., 1106) associated with a playlist of the playlist user interface (e.g., 1104). The artist set of user interfaces comprises: an artist user interface (e.g., 1108), a list of albums (e.g., 1110) associated with an artist of the artist user interface (e.g., 1108), and a list of songs (e.g., 1112) associated with an album of the list of albums (e.g., 1110). The songs set of user interfaces comprises: a song user interface (e.g., 1114).

Figure 12:
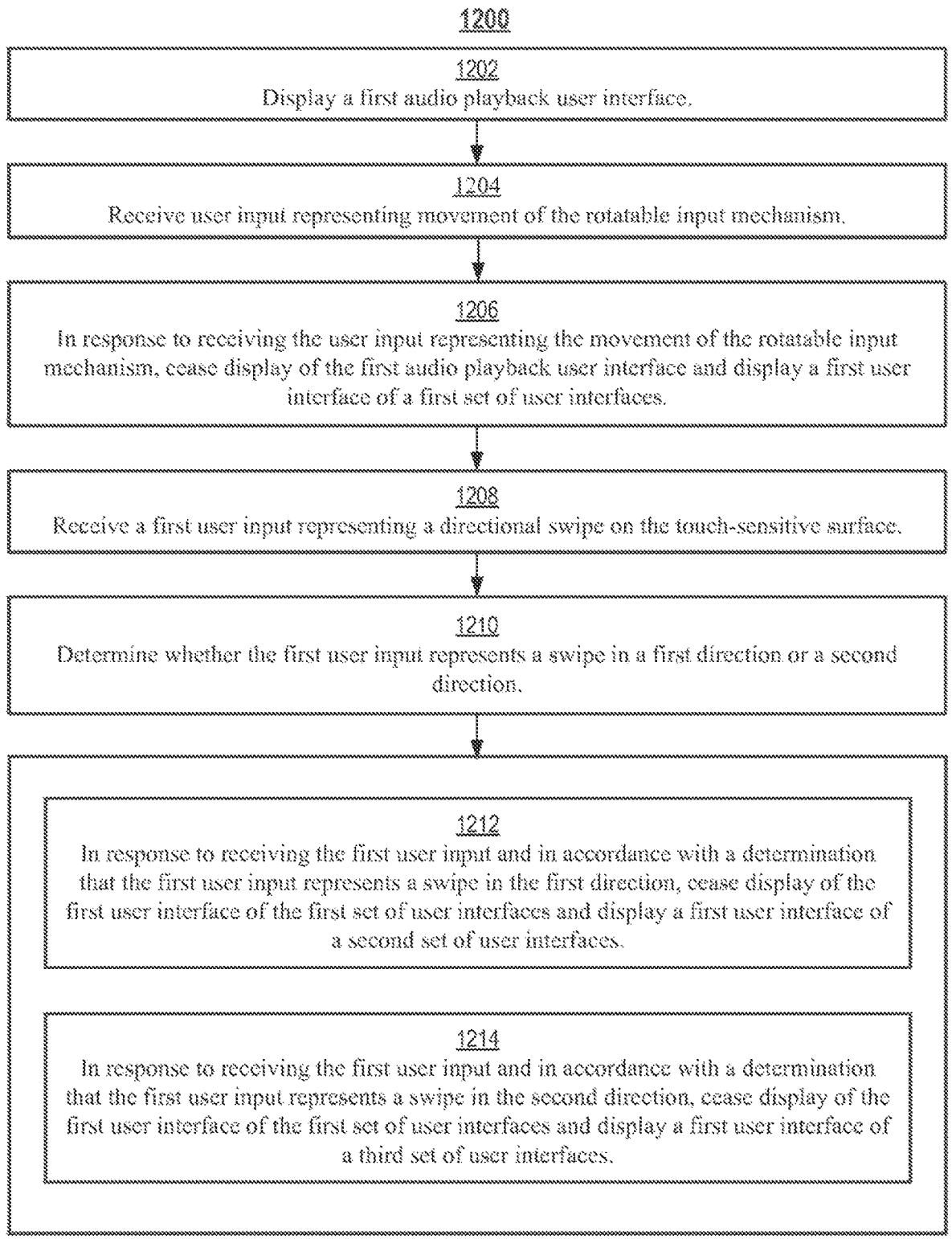
FIG. 12 is a flow diagram illustrating an exemplary process for accessing and playing music.

FIG. 12 is a flow diagram illustrating an exemplary process for accessing and playing music in accordance with some embodiments. In some embodiments, method 1200 may be performed at an electronic device with a display (e.g., 112, 340, 504), a rotatable input mechanism (e.g., 506), and a touch-sensitive surface (e.g., 112, 355, 504). Some operations in method 1200 may be combined, the order of some operations may be changed, and some operations may be omitted.

In some embodiments, the touch-sensitive surface (e.g., 112, 355, 504) is capable of detecting intensity of touch contacts. Exemplary devices that may perform method 1200 include devices 100, 300, and 500 (FIGS. 1A, 3, and 5A).

Method 1200 provides an intuitive way to access and play music. The method reduces the cognitive burden on a user when using a device to access and play music, thereby creating a more efficient human-machine interface. For battery-operated computing devices, enabling a user to access and play music more quickly and more efficiently conserves power and increases the time between battery charges.

At block 1202, a first audio playback user interface (e.g., 1102) is displayed.

At block 1204, user input representing movement (e.g., rotation) of the rotatable input mechanism is received.

At block 1206, in response to receiving the user input representing the movement (e.g., rotation) of the rotatable input mechanism, display of the first audio playback user interface (e.g., 1102) is ceased and a first user interface (e.g., 1104) of a first set of user interfaces (e.g., 1104, 1106) is displayed.

At block 1208, a first user input representing a directional swipe on the touch-sensitive surface (e.g., a swipe) is received.

At block 1210, it is determined whether the first user input represents a swipe in a first direction or a second direction (e.g., different than the first direction).

At block 1212, in response to receiving the first user input and in accordance with a determination that the first user input represents a swipe in the first direction, display of the first user interface (e.g., 1104) of the first set of user interfaces (e.g., 1104, 1106) is ceased and a first user interface (e.g., 1108) of a second set of user interfaces (e.g., 1108, 1110, 1112) is displayed.

At block 1214, in response to receiving the first user input and in accordance with a determination that the first user input represents a swipe in the second (e.g., different than the first direction) direction, display of the first user interface (e.g., 1104) of the first set of user interfaces (e.g., 1104, 1106) is ceased and a first user interface (e.g., 1114) of a third set of user interfaces (e.g., 1114) is displayed.

In accordance with some embodiments, a second user input representing a directional swipe on the touch-sensitive surface is received. In accordance with the determination that the first user input represents a swipe in the first direction, in response to receiving the second user input, and in accordance with a determination that the second user input represents a swipe in the first direction, display of the second set of user interfaces (e.g., 1108, 1110, or 1112) is ceased and the first user interface (e.g., 1114) of the third set of user interfaces (e.g., 1114) is displayed. In accordance with the determination that the first user input represents a swipe in the second direction, in response to receiving the second user input, and in accordance with a determination that the second user input represents a swipe in the second direction, display of the third set of user interfaces (e.g., 1114) is ceased and the first user interface (e.g., 1108) of the second set of user interfaces (e.g., 1108, 1110, or 1112) is displayed.

In accordance with some embodiments, the first user interface (e.g., 1114) of the third set of user interfaces (e.g., 1114) comprises a selection affordance (e.g., 1114C). A third user input associated with the selection affordance (e.g., 1114C) of the first user interface (e.g., 1114) of the third set of user interfaces (e.g., 1114) is received. In response to receiving the third user input, display of the first user interface (e.g., 1114) of the third set of user interfaces (e.g., 1114) is ceased and a second audio playback user interface (e.g., 1116) is displayed.

In accordance with some embodiments, the selection affordance (e.g., 1114C) of the first user interface (e.g., 1114) of the third set of user interfaces (e.g., 1114) is a song selection affordance. In response to receiving the third user input, a song associated with the selection affordance (e.g., 1114C) is played.

In accordance with some embodiments, the selection affordance (e.g., 1114A) of the first user interface (e.g., 1114) of the third set of user interfaces (e.g., 1114) is a shuffle all affordance. In response to receiving the third user input, a song selected at random from a set of songs associated with the selection affordance (e.g., 1114A) is played.

In accordance with some embodiments, prior to receiving the first user input representing a directional swipe, user input associated with a selection affordance (e.g., 1104B) of the first user interface (e.g., 1104) of the first set of user interfaces (e.g., 1104, 1106) is received. In response to receiving the user input associated with the selection affordance (e.g., 1104B) of the first user interface (e.g., 1104) of the first set of user interfaces (e.g., 1104, 1106), display of the first user interface (e.g., 1104) of the first set of user interfaces (e.g., 1104, 1106) is ceased and a second user interface (e.g., 1106) of the first set of user interfaces (e.g., 1104, 1106) is displayed.

In accordance with some embodiments, the first set of user interfaces, the second set of user interfaces, and the third set of user interfaces are each independently selected from the group consisting of: a playlist set of user interfaces, an artist set of user interfaces, and a songs set of user interfaces. The playlist set of user interfaces comprises: a playlist user interface (e.g., 1104), and a list of songs (e.g., 1106) associated with a playlist of the playlist user interface (e.g., 1104). The artist set of user interfaces comprises: an artist user interface (e.g., 1108), a list of albums (e.g., 1110) associated with an artist of the artist user interface (e.g., 1108), and a list of songs (e.g., 1112) associated with an album of the list of albums (e.g., 1110). The songs set of user interfaces comprise: a song user interface (e.g., 1114).

Figure 13A:
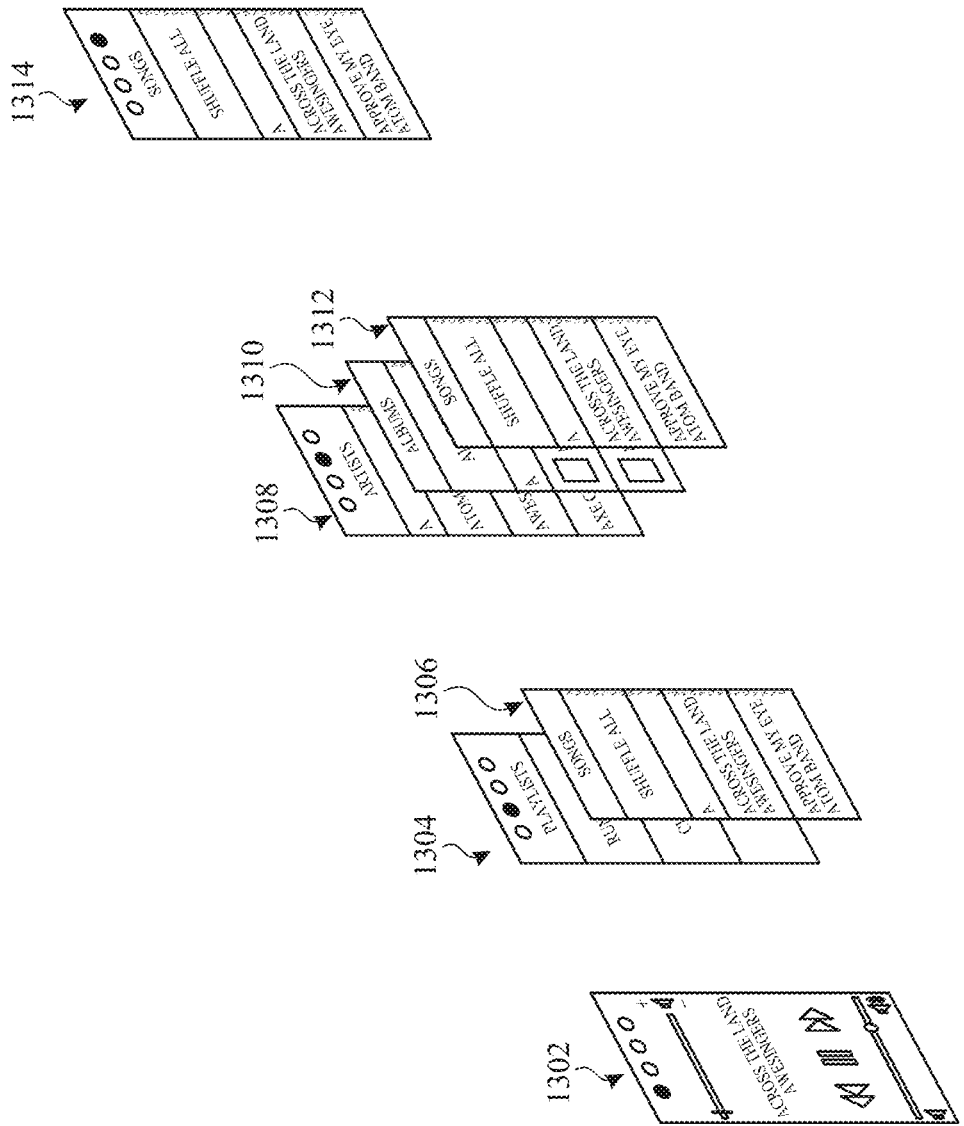
FIGS. 13A-13C illustrate exemplary user interfaces in accordance with some embodiments.
Figure 13B:
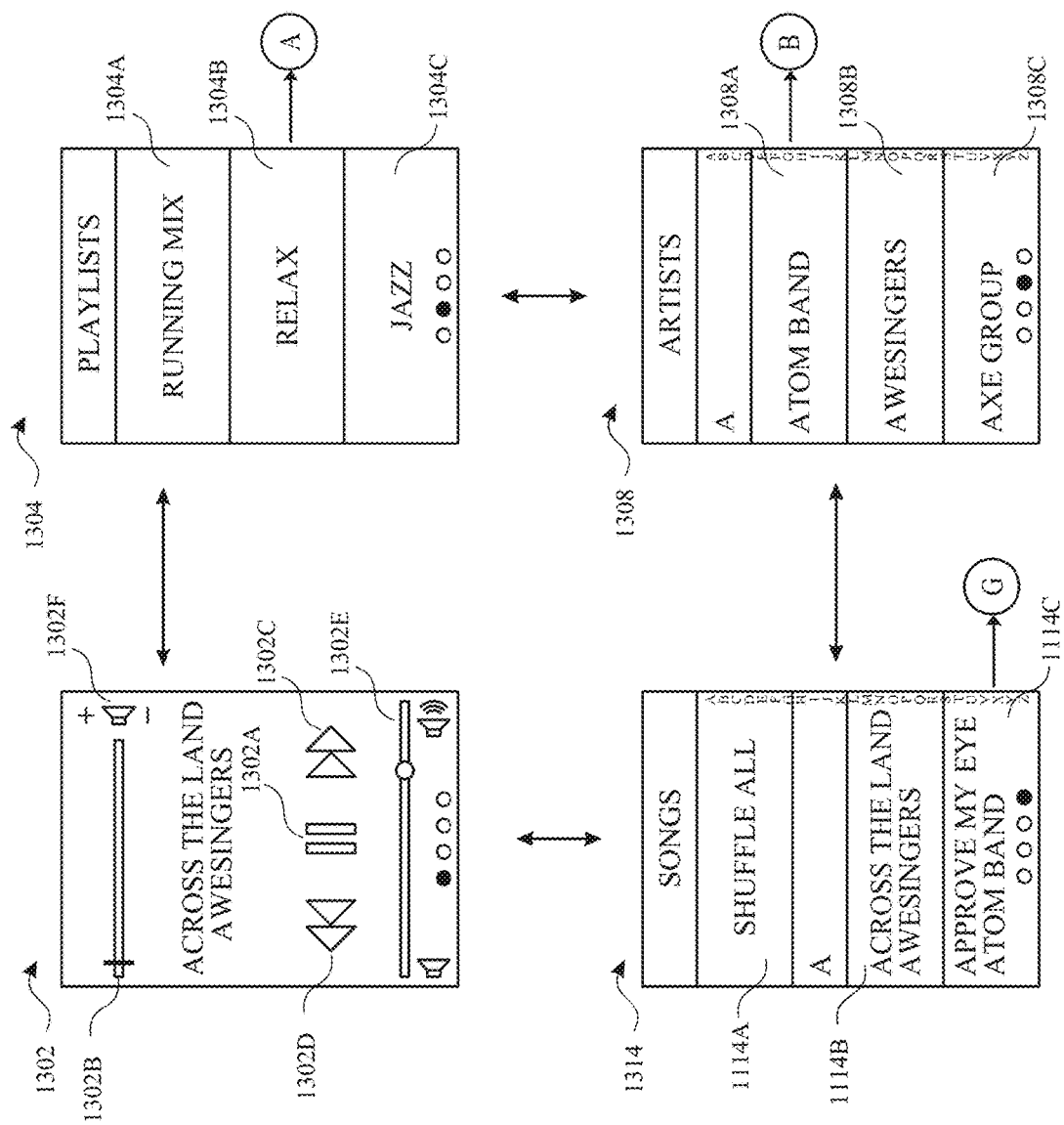
Figure 13C:
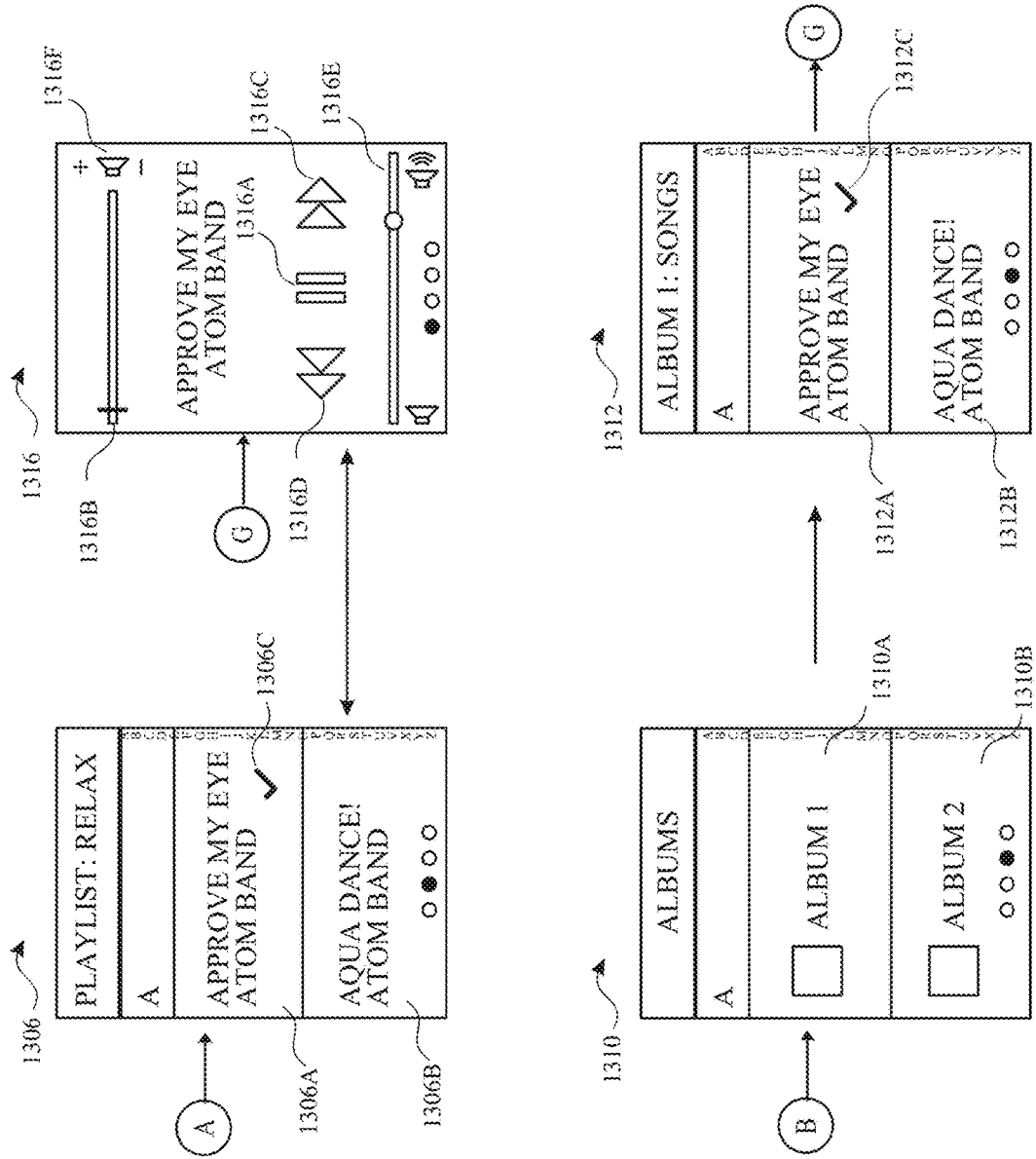

FIGS. 13A-13C illustrate exemplary user interfaces for accessing music using an electronic device, in accordance with some embodiments. In some embodiments, the electronic device is device 500. The electronic device has a display (e.g., 112, 340, 504) and a rotatable input mechanism (e.g., 506).

FIG. 13A illustrates a high-level view of the organization of various user interface screens. These and additional user interface screens will be described in further detail with respect to FIGS. 13B-13C. User interface 1302, includes an audio playback user interface of a music application (e.g., a digital music player application). Upon receiving one or more user inputs, the device may provide access from user interface 1302 to user interface 1304, user interface 1308, and user interface 1314. In some embodiments, user interface screen 1302 functions as described with respect to user interface screen 604, user interface screen 1314 functions as described with respect to user interface screen 614, and user interface screen 1308 functions as described with respect to user interface screen 608.

User interface screen 1304 illustrates playlist selection affordances (1304A-1304C) for accessing various music playlists. Activating a playlist selection affordance causes the device to display user interface screen 1306. User interface screen 1306 illustrates song selection affordances (1306A-1306B) of the activated playlist. Activating a song selection affordance causes the device to display user interface screen 1302, which includes an audio playback user interface, and to begin audio playback of the song corresponding to the activated song selection affordance. A song selection affordance of user interface 1306 (or other user interfaces with one or more song selection affordances) may also contain an indicator (1306C), which may provide an indication of being stored locally on the electronic device (e.g., the song is available for playback from local memory). In accordance with some embodiments, an indicator (1306C) provides an indication of not being stored locally on the electronic device (e.g., the song is not stored locally, but is available for playback through download or stream from an external electronic device, such as a phone or server). In accordance with some embodiments an indicator (1306C) may provide an indication of not being available for playback (e.g., not stored locally on the electronic and not stored on an external electronic and available for playback through download or stream). In some embodiments, user interface screen 1306 functions as described with respect to user interface screen 606, user interface screen 1310 functions as described with respect to user interface screen 610, user interface screen 1312 functions as described with respect to user interface screen 612, and user interface screen 1316 functions as described with respect to user interface screen 616.

User interface screen 1308 illustrates artist selection affordances (1308A-1308C) for accessing music of various artists. Activating an artist selection affordance causes the device to display user interface screen 1310. User interface screen 1310 illustrates album selection affordances (1310A-1310B) of the activated artist. Activating an album selection affordance causes the device to display user interface screen 1312, which includes song selection affordances of the selected album of the selected artist. Activating a song selection affordance causes the device to display user interface screen 1302, which includes an audio playback user interface, and to begin audio playback of the song corresponding to the activated song selection affordance.

User interface screen 1314 illustrates song selection affordances (1314A-1314C). Activating a song selection affordance causes the device to display user interface screen 1302, which includes an audio playback user interface, and to begin audio playback of the song corresponding to the activated song selection affordance.

The audio playback user interface of user interface screen 1302 displays song information (e.g., the title and artist) of an activated (e.g., playing, paused) song. The audio playback user interface of user interface 1302 may contain affordances (e.g., 1302A-1302F) that, when selected, cause the device to play/pause, skip forward/backward, scrub to within a time in the song, and adjust the volume, among others. Similarly, user interface screen 1316 illustrates an audio playback user interface with affordances 1316A-1316F wherein the interface has been updated, for example, to reflect a newly selected or different song.

In some embodiments, as shown in FIG. 13B, the device displays an audio playback user interface (e.g., 1302). The device receives a first user input representing a directional swipe in a first direction (e.g., a swipe from right to left).

In response to receiving the first user input, the device ceases display of the audio playback user interface (e.g., 1302) and displays a first user interface (e.g., 1304) of a first set of user interfaces (e.g., 1304, 1306), the first user interface (e.g., 1304) of the first set of user interfaces (e.g., 1304, 1306) comprising a selection affordance (e.g., 1304B). For example, the device may cease display of a "now playing" screen in response to a swipe (from right to left) and display a list of playlists, illustrated by user interface 1304, which may contain affordances 1304A-1304C for selection of one or more playlists.

While displaying a user interface (e.g., 1304 or 1306) of the first set of user interfaces (e.g., 1304, 1306), the device receives a second user input representing a directional swipe in a second direction (e.g., different than the first direction) (e.g., a swipe from left to right).

In response to receiving the second user input, the device ceases display of the user interface (e.g., 1304 or 1306) of a first set of user interfaces (e.g., 1304, 1306) and displays the audio playback user interface (e.g., 1302). For example, the device allows navigation from a "now playing" screen, as illustrated by user interface 1302, to a playlist set of user interfaces (1304 and 1306), and back again, using directional swipe inputs received.

In accordance with some embodiments, while displaying the first user interface (e.g., 1304) of the first set of user interfaces (e.g., 1304 or 1306), and prior to receiving the second user input (e.g., swipe), the device receives a third user input (e.g., a touch) associated with the selection affordance (e.g., 1304B) of the first user interface (e.g., 1304) of the first set of user interfaces (e.g., 1304, 1306). In response to receiving the third user input (e.g., touch), the device ceases display of the first user interface (e.g., 1304) of the first set of user interfaces (e.g., 1304, 1306) and displays a second user interface (e.g., 1306) of the first set of user interfaces (e.g., 1304 or 1306), the second user interface (e.g., 1306) of the first set of user interfaces (e.g., 1304, 1306) comprising a selection affordance (e.g., 1306A). For example, the device allows navigation between user interfaces of a set of user interfaces, while maintaining the navigational relationship that the set of affordance has with other sets of affordances or the audio playback user interface. As an example, the device allows selection of a playlist via selection affordance 1304B, which causes user interface 1306 to be displayed. From user interface 1306, a list of songs within the playlist associated with selection affordance 1304B, navigation back to the audio playback user interface is still possible upon receiving the appropriate directional swipe, for example, from left to right.

In accordance with some embodiments, the device receives a plurality of directional user inputs (e.g., multiple swipes), wherein the plurality of directional user inputs comprises: a plurality of user inputs representing directional swipes in the first direction (e.g., right to left), and a plurality of user inputs representing directional swipes in the second direction (e.g., left to right). In response to receiving a final user input of the plurality of directional user inputs, the device displays the audio playback user interface (e.g., 1302). For example, regardless of the number and direction of navigation swipes that the device receives for navigation between sets of user interfaces, the audio playback user interface may be accessed. In one example, beginning at user interface 1302, four directional swipes from right to left may cause the device to display, sequentially in response to each swipe, user interface 1304, user interface 1308, user interface 1314, and then user interface 1302. Four consecutive swipes in the opposite direction (left to right) would result in the opposite sequence of user interfaces. Any combination of directional swipes may be combined.

In accordance with some embodiments, in response to receiving one of the plurality of directional user inputs, the device displays a first user interface (e.g., 1308) of a second set of user interfaces (e.g., 1308, 1310, 1312), the first user interface (e.g., 1308) of the second set of user interfaces (e.g., 1308, 1310, 1312) comprising a selection affordance (e.g., 1308A). User interface 1308, which illustrates an artists list, may contain affordances 1308A, 1308B, and 1308C for selection of one or more artists.

In accordance with some embodiments, the device receives a fourth user input associated with the selection affordance (e.g., 1308A) of the first user interface (e.g., 1308) of the second set of user interfaces (e.g., 1308, 1310, 1312). In response to receiving the fourth user input, the device ceases display of the first user interface (e.g., 1308) of the second set of user interfaces (e.g., 1308, 1310, 1312) and displays a second user interface (e.g., 1310) of the second set of user interfaces (e.g., 1308, 1310, 1312) comprising a selection affordance (e.g., 1310A). User interface 1310, which illustrates an albums list associated with an artist, may contain selection affordances 1310A-1310B for selection of one or more albums associated with an artist.

In accordance with some embodiments, the device receives a fifth user input associated with the selection affordance (e.g., 1310A) of the second user interface (e.g., 1310) of the second set of user interfaces (e.g., 1308, 1310, 1312). In response to receiving the fifth user input, the device ceases display of the second user interface (e.g., 1310) of the second set of user interfaces (e.g., 1308, 1310, 1312) and displays the audio playback user interface (e.g., 1302), wherein the audio playback user interface is updated based on the selection affordance associated with the fifth user input (e.g., 1310A). In one example, the device receives user input associated with an album selection affordance 1310A, and playback of the album is initiated and the audio playback user interface is displayed, updated to reflect this. In another example, the selection affordance associated with the fifth is associated with a song, such as selection affordance 1312C (associated with "Approve My Eye" by Atom Band), and playback of that song is initiated and user interface 1316 is displayed, illustrating a "now playing" screen.

In accordance with some embodiments, the first set of user interfaces, the second set of user interfaces, and the third set of user interfaces are selected from the group comprising: a playlist set of user interfaces (e.g., 1304, 1306), an artist set of user interfaces (e.g., 1308, 1310, 1312), and a songs set of user interfaces (e.g., 1314); the playlist set of user interfaces comprises: a playlist user interface (e.g., 1304), and a list of songs (e.g., 1306) associated with a playlist of the playlist user interface; the artist set of user interfaces comprises: an artist user interface (e.g., 1308), a list of albums (e.g., 1310) associated with an artist of the artist user interface (e.g., 1308), and a list of songs (e.g., 1312) associated with an album of the list of albums (e.g., 1310); and the songs set of user interfaces comprises: a song user interface (e.g., 1314).

Figure 14:
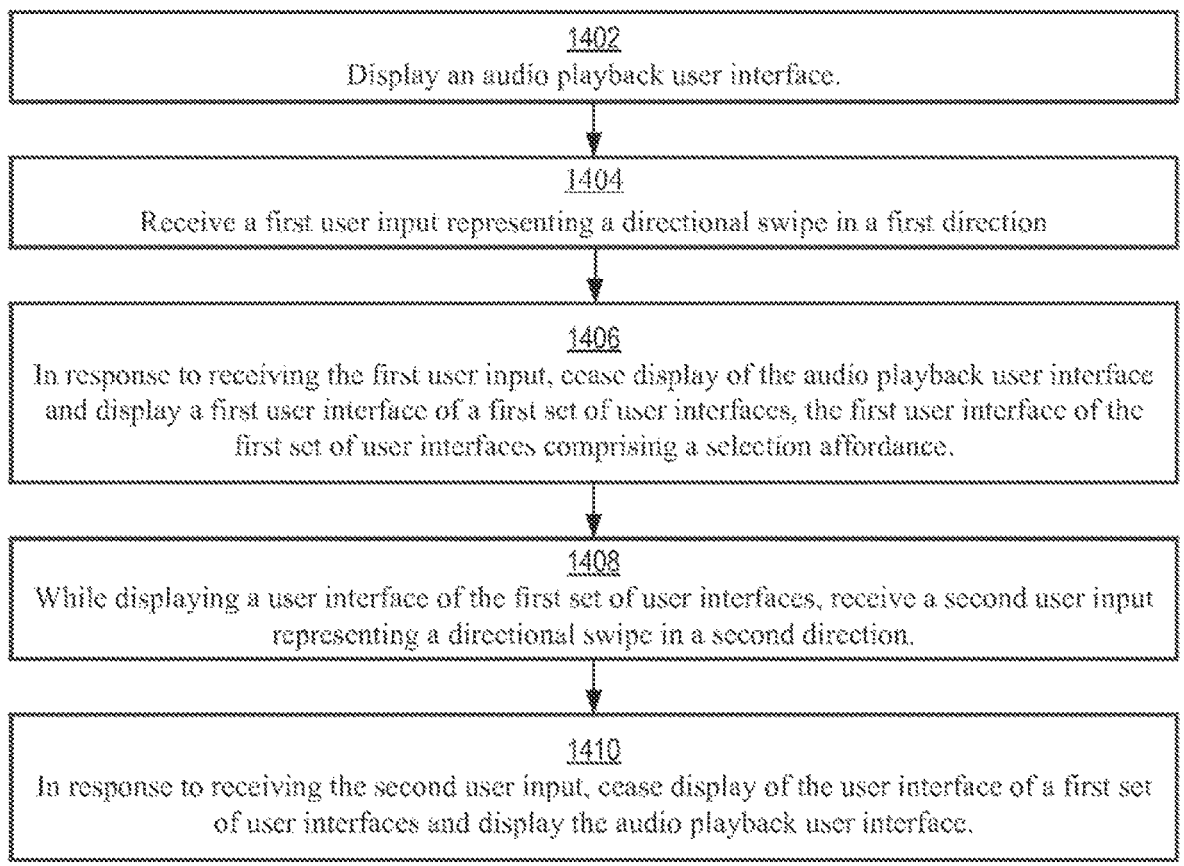
FIG. 14 is a flow diagram illustrating an exemplary process for accessing and playing music.

FIG. 14 is a flow diagram illustrating an exemplary process for accessing and playing music in accordance with some embodiments. In some embodiments, method 1400 may be performed at an electronic device with a display (e.g., 112, 340, 504) and a rotatable input mechanism (e.g., 506). In some embodiments, the electronic device also includes a touch-sensitive surface (e.g., 112, 355, 504). Some operations in method 1400 may be combined, the order of some operations may be changed, and some operations may be omitted.

In some embodiments, the touch-sensitive surface (e.g., 112, 355, 504) is capable of detecting intensity of touch contacts. Exemplary devices that may perform method 1400 include devices 100, 300, and 500 (FIGS. 1A, 3, and 5A).

Method 1400 provides an intuitive way to access and play music. The method reduces the cognitive burden on a user when using a device to access and play music, thereby creating a more efficient human-machine interface. For battery-operated computing devices, enabling a user to access and play music more quickly and more efficiently conserves power and increases the time between battery charges.

At block 1402, an audio playback user interface (e.g., 1302) is displayed.

At block 1404, a first user input representing a directional swipe in a first direction is received.

At block 1406, in response to receiving the first user input, the display of the audio playback user interface (e.g., 1302) is ceased and a first user interface (e.g., 1304) of a first set of user interfaces (e.g, 1304, 1306), the first user interface (e.g., 1304) of the first set of user interfaces (e.g, 1304, 1306) comprising a selection affordance (e.g., 1304B) is displayed.

At block 1408, while displaying a user interface (e.g., 1304 or 1306) of the first set of user interfaces (e.g., 1304, 1306), a second user input representing a directional swipe in a second direction (e.g., different than the first direction) is received.

At block 1410, in response to receiving the second user input, the display of the user interface (e.g., 1304 or 1306) of a first set of user interfaces (e.g., 1304, 1306) is ceased and the audio playback user interface (e.g., 1302) is displayed.

In accordance with some embodiments, while displaying the first user interface (e.g., 1304) of the first set of user interfaces (e.g., 1304 or 1306), and prior to receiving the second user input, a third user input associated with the selection affordance (e.g., 1304B) of the first user interface (e.g., 1304) of the first set of user interfaces (e.g., 1304, 1306) is received. In response to receiving the third user input, the display of the first user interface (e.g., 1304) of the first set of user interfaces (e.g., 1304, 1306) is ceased and a second user interface (e.g., 1306) of the first set of user interfaces (e.g., 1304 or 1306) is displayed, the second user interface (e.g., 1306) of the first set of user interfaces (e.g., 1304, 1306) comprising a selection affordance (e.g., 1306A).

In accordance with some embodiments, a plurality of directional user inputs is received, wherein the plurality of directional user inputs comprises: a plurality of user inputs representing directional swipes in the first direction, and a plurality of user inputs representing directional swipes in the second direction. In response to receiving a final user input of the plurality of directional user inputs, the audio playback user interface (e.g., 1302) is displayed.

In accordance with some embodiments, in response to receiving one of the plurality of directional user inputs, a first user interface (e.g., 1308) of a second set of user interfaces (e.g., 1308, 1310, 1312) is displayed, the first user interface (e.g., 1308) of the second set of user interfaces (e.g., 1308, 1310, 1312) comprising a selection affordance (e.g., 1308A). User interface 1308, which illustrates an artists list, may contain affordances 1308A, 1308B, and 1308C for selection of one or more artists.

In accordance with some embodiments, a fourth user input associated with the selection affordance (e.g., 1308A) of the first user interface (e.g., 1308) of the second set of user interfaces (e.g., 1308, 1310, 1312) is received. In response to receiving the fourth user input, the display of the first user interface (e.g., 1308) of the second set of user interfaces (e.g., 1308, 1310, 1312) is ceased and a second user interface (e.g., 1310) of the second set of user interfaces (e.g., 1308, 1310, 1312) is displayed, comprising a selection affordance (e.g., 1310A). User interface 1310, which illustrates an albums list associated with an artist, may contain selection affordances 1310A-1310B for selection of one or more albums associated with an artist.

In accordance with some embodiments, a fifth user input associated with the selection affordance (e.g., 1310A) of the second user interface (e.g., 1310) of the second set of user interfaces (e.g., 1308, 1310, 1312) is received. In response to receiving the fifth user input, the display of the second user interface (e.g., 1310) of the second set of user interfaces (e.g., 1308, 1310, 1312) is ceased and the audio playback user interface (e.g., 1302) is displayed, wherein the audio playback user interface is updated based on the selection affordance associated with the fifth user input (e.g., 1310A). In one example, the device receives user input associated with an album selection affordance 1310A, and playback of the album is initiated and the audio playback user interface is displayed, updated to reflect this. In another example, the selection affordance associated with the fifth is associated with a song, such as selection affordance 1312C (associated with "Approve My Eye" by Atom Band), and playback of that song is initiated.

In accordance with some embodiments, the first set of user interfaces (e.g., 1304, 1306), the second set of user interfaces (e.g., 1308, 1310, 1312), and the third set of user interfaces (e.g., 1314) are selected from the group comprising: a playlist set of user interfaces, an artist set of user interfaces, and a songs set of user interfaces; the playlist set of user interfaces comprises: a playlist user interface, and a list of songs associated with a playlist of the playlist user interface; the artist set of user interfaces comprises: an artist user interface, a list of albums associated with an artist of the artist user interface, and a list of songs associated with an album of the list of albums; and the songs set of user interfaces comprises: a song user interface.

Figure 15A:
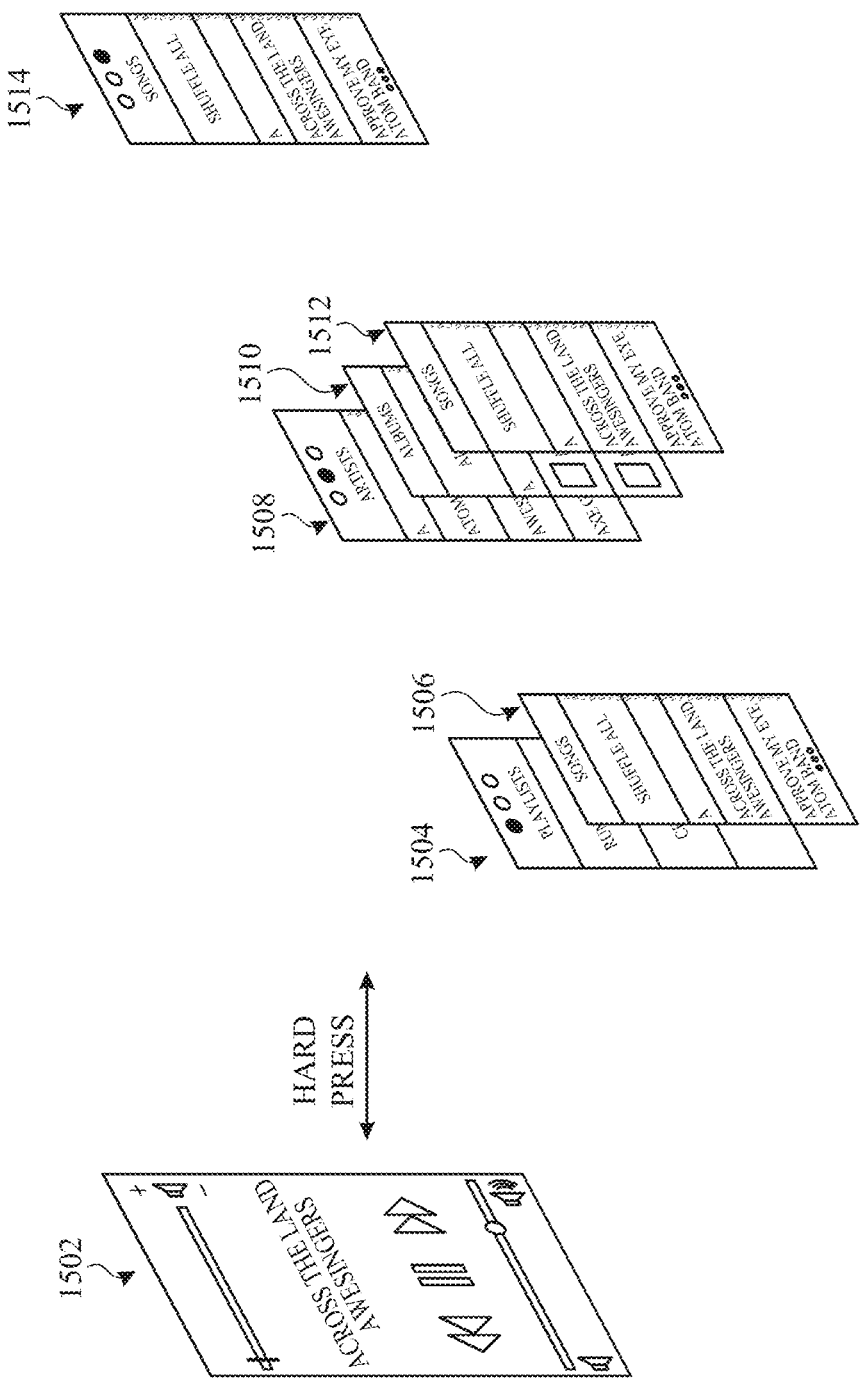
FIGS. 15A-15C illustrate exemplary user interfaces in accordance with some embodiments.
Figure 15B:
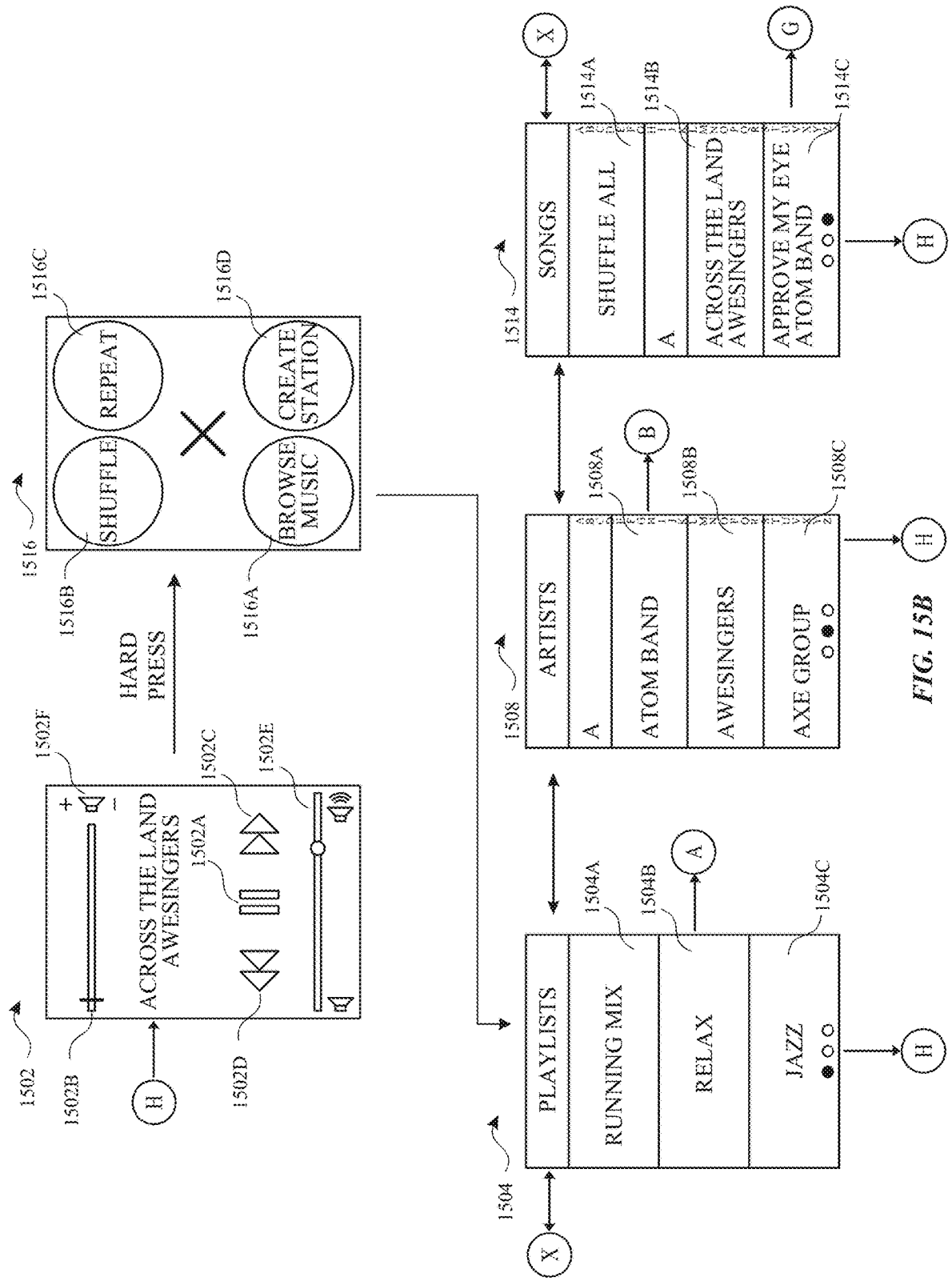
Figure 15C:
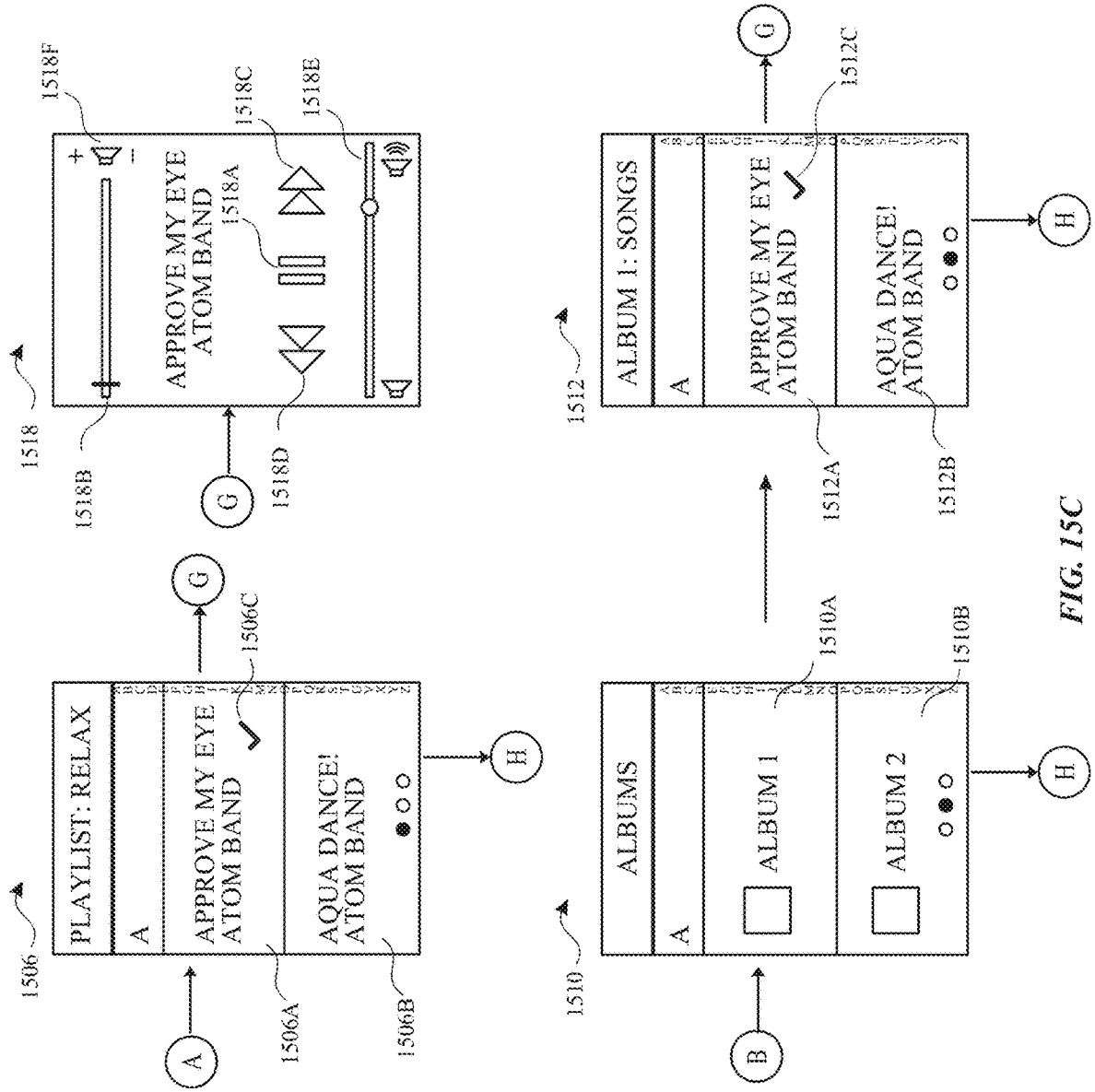

FIGS. 15A-15C illustrate exemplary user interfaces for accessing music using an electronic device, in accordance with some embodiments. In some embodiments, the electronic device is device 500. The electronic device has a display (e.g., 112, 340, 504), a touch-sensitive surface (e.g., 112, 355, 504), and may have a rotatable input mechanism (e.g., 506).

FIG. 15A illustrates a high-level view of the organization of various user interface screens. These and additional user interface screens will be described in further detail with respect to FIG. 15B. User interface screen 1502, includes an audio playback user interface of a music application (e.g., a digital music player application). Upon receiving one or more user inputs, the device may provide access from user interface 1502 to user interface 1504, user interface 1508, and user interface 1514. In some embodiments, user interface screen 1502 functions as described with respect to user interface screen 616, user interface screen 1504 functions as described with respect to user interface screen 604, user interface screen 1508 functions as described with respect to user interface screen 608, and user interface screen 1514 functions as described with respect to user interface screen 614.

User interface screen 1504 illustrates playlist selection affordances (1504A-1504C) for accessing various music playlists. Activating a playlist selection affordance causes the device to display user interface screen 1506. User interface screen 1506 illustrates song selection affordances (1506A-1506B) of the activated playlist. Activating a song selection affordance causes the device to display user interface screen 1502, which includes an audio playback user interface, and to begin audio playback of the song corresponding to the activated song selection affordance. A song selection affordance of user interface 1506 (or other user interfaces with one or more song selection affordances) may also contain an indicator (1506C), which may provide an indication of being stored locally on the electronic device (e.g., the song is available for playback from local memory). In accordance with some embodiments, an indicator (1506C) provides an indication of not being stored locally on the electronic device (e.g., the song is not stored locally, but is available for playback through download or stream from an external electronic device, such as a phone or server). In accordance with some embodiments an indicator (1506C) may provide an indication of not being available for playback (e.g., not stored locally on the electronic and not stored on an external electronic and available for playback through download or stream). In some embodiments, user interface screen 1506 functions as described with respect to user interface screen 606.

User interface screen 1508 illustrates artist selection affordances (1508A-1508C) for accessing music of various artists. Activating an artist selection affordance causes the device to display user interface screen 1510. User interface screen 1510 illustrates album selection affordances (1510A-1510B) of the activated artist. Activating an album selection affordance causes the device to display user interface screen 1512, which includes song selection affordances (1512A-1512B) of the selected album of the selected artist. Activating a song selection affordance causes the device to display user interface screen 1502, which includes an audio playback user interface, and to begin audio playback of the song corresponding to the activated song selection affordance. User interface 1512 may also contain indicator 1512C, which may indicate whether an audio file is available locally for playback. In some embodiments, user interface screen 1510 functions as described with respect to user interface screen 610 and user interface screen 1512 functions as described with respect to user interface screen 612.

User interface screen 1514 illustrates song selection affordances (1514A-1514C). Activating a song selection affordance causes the device to display user interface screen 1502, which includes an audio playback user interface, and to begin audio playback of the song corresponding to the activated song selection affordance.

The audio playback user interface of user interface screen 1502 displays song information (e.g., the title and artist) of an activated (e.g., playing, paused) song. The audio playback user interface of user interface 1502 may contain affordances (e.g., 1502A-1502F) that, when selected, cause the device to play/pause, skip forward/backward, scrub to within a time in the song, and adjust the volume, among others.

In some embodiments, as shown in FIG. 15B, the device displays an audio playback user interface (e.g., 1502). While displaying the audio playback user interface (e.g., 1502), the device receives user input representing a first contact (e.g., touch) on the touch-sensitive surface. Similarly, user interface screen 1518 illustrates an audio playback user interface with affordances 1518A-1518F wherein the interface has been updated, for example, to reflect a newly selected or different song.

The device determines whether a characteristic intensity of the first contact exceeds an intensity threshold.

In accordance with a determination that the characteristic intensity of the first contact exceeds the intensity threshold, the device ceases display of the audio playback user interface (e.g., 1502) and displays a first set of affordances (e.g., 1516A-1516D). For example, if the device receives a deep press at a "now playing" screen, the device displays user interface 1516. User interface 1516 may contain an affordance for browsing music (1516A), for shuffling (1516B), an affordance for repeating (1516C), an affordance for creating a station (1516D), and the like. If the device receives a light press, the device performs an action based on the location of the light press (e.g., by activating the appropriate affordance).

The device receives user input representing a second contact (e.g., touch) associated with an affordance (e.g., 1516A) of the first set of affordances (e.g., 1516A-1516D). For example, the device receives a touch associated with the "browse music" affordance represented by affordance 1516A.

In response to receiving the second contact, the device ceases display of the first set of affordances (e.g., 1516A-1516D) and displays a first user interface (e.g., 1504) of a first set of user interfaces (e.g., 1504, 1506). For example, in response to receiving selection of "browse music" affordance 1516A, the device displays a playlist selection user interface (e.g., list of playlists), illustrated by user interface 1504. Other user interfaces, such as 1508 or 1514, may be displayed upon selection of a "browse music" affordance, for example.

In accordance with a determination that the characteristic intensity of the first contact does not exceed the intensity threshold (e.g., not a deep press), the device forgoes display of the first set of affordances (e.g., 1516A-1516D).

In accordance with some embodiments, the determination that the characteristic intensity of the first contact exceeds the intensity threshold is independent of a location of the first contact on the touch-sensitive surface. For example, the determination that the user input represents a deep press may not require that the input be associated with any particular affordance or location on the touch-sensitive surface.

In accordance with some embodiments, while displaying the first user interface (e.g., 1504) of the first set of user interfaces (e.g., 1504, 1506), the device receives user input representing a first swipe in a first direction (e.g., a swipe from right to left). In response to receiving the first swipe in the first direction (e.g., a swipe from right to left), the device ceases display of the first user interface (e.g., 1504) of a first set of user interfaces (e.g., 1504, 1506) and displays a first user interface (e.g., 1508) of a second set of user interfaces (e.g., 1508, 1510, 1512). For example, the device receives a swipe from right to left and in response displays a list of artists, as illustrated by user interface 1508. In another example, the device may receive a swipe from left to right and instead display a list of songs, as illustrated by user interface 1514.

In accordance with some embodiments, while displaying the first user interface (e.g., 1508) of the second set of user interfaces (e.g., 1508, 1510, 1512), the device receives user input representing a second swipe in the first direction. In response to receiving the second swipe, the device ceases display of the first user interface (e.g., 1508) of a second set of user interfaces (e.g., 1508, 1510, 1512) and displays a first user interface (e.g., 1514) of a third set of user interfaces (e.g., 1514). For example, the device receives a swipe from right to left and in response displays a songs list, as illustrated by user interface 1514.

In accordance with some embodiments, while displaying the first user interface (e.g., 1504) of the first set of user interfaces (e.g., 1504, 1506), the device receives user input representing a third contact (e.g., a touch) associated with an affordance (e.g., 1504B) of the first user interface (e.g., 1504) of the first set of user interfaces (e.g., 1504, 1506). In response to receiving the third contact (e.g., a touch), the device ceases display of the first user interface (e.g., 1504) of a first set of user interfaces (e.g., 1504, 1506) and displays a second user interface (e.g., 1506) of the first set of user interfaces (e.g., 1504, 1506). For example, the device receives user selection (e.g., by a touch) of an affordance associated with the playlist "Relax", represented by affordance 1504B, at a playlist user interface, illustrated by user interface 1504. Upon receiving selection, the device displays the songs associated with the playlist "Relax", illustrated by affordances 1506A-1506B of user interface 1506.

In accordance with some embodiments, while displaying a user interface (e.g., 1504 or 1506) of a set of user interfaces (e.g., 1504, 1506), the device receives user input representing a fourth contact on the touch-sensitive surface. The device determines whether a characteristic intensity of the fourth contact exceeds a second intensity threshold. In accordance with a determination that the characteristic intensity of the fourth contact exceeds the second intensity threshold (e.g., a deep press), the device displays a second set of affordances (e.g., 1536A-1536C). The device receives user input representing a fifth contact (e.g., a touch) associated with an affordance (e.g., 1536A) of the second set of affordances (e.g., 1536A-1536D). In response to receiving the fifth contact (e.g., a touch), the device ceases display of the second set of affordances (e.g., 1536A-1536D) and displays the audio playback user interface (e.g., 1502). In accordance with a determination that the characteristic intensity of the first contact does not exceed the intensity threshold (e.g., not a deep press), the device forgoes displaying the second set of affordances (e.g., 1536A-1536D).

In accordance with some embodiments, the first set of user interfaces, the second set of user interfaces, and the third set of user interfaces are each independently selected from the group consisting of: a playlist set of user interfaces, an artist set of user interfaces, and a songs set of user interfaces; the playlist set of user interfaces comprises: a playlist user interface (e.g., 1504), and a list of songs (e.g., 1506) associated with a playlist of the playlist user interface (e.g., 1504); wherein the artist set of user interfaces comprises: an artist user interface (e.g., 1508), a list of albums (e.g., 1510) associated with an artist of the artist user interface (e.g., 1508), and a list of songs (e.g., 1512) associated with an album of the list of albums (e.g., 1510); and wherein the songs set of user interfaces comprises: a song user interface.

Figure 16:
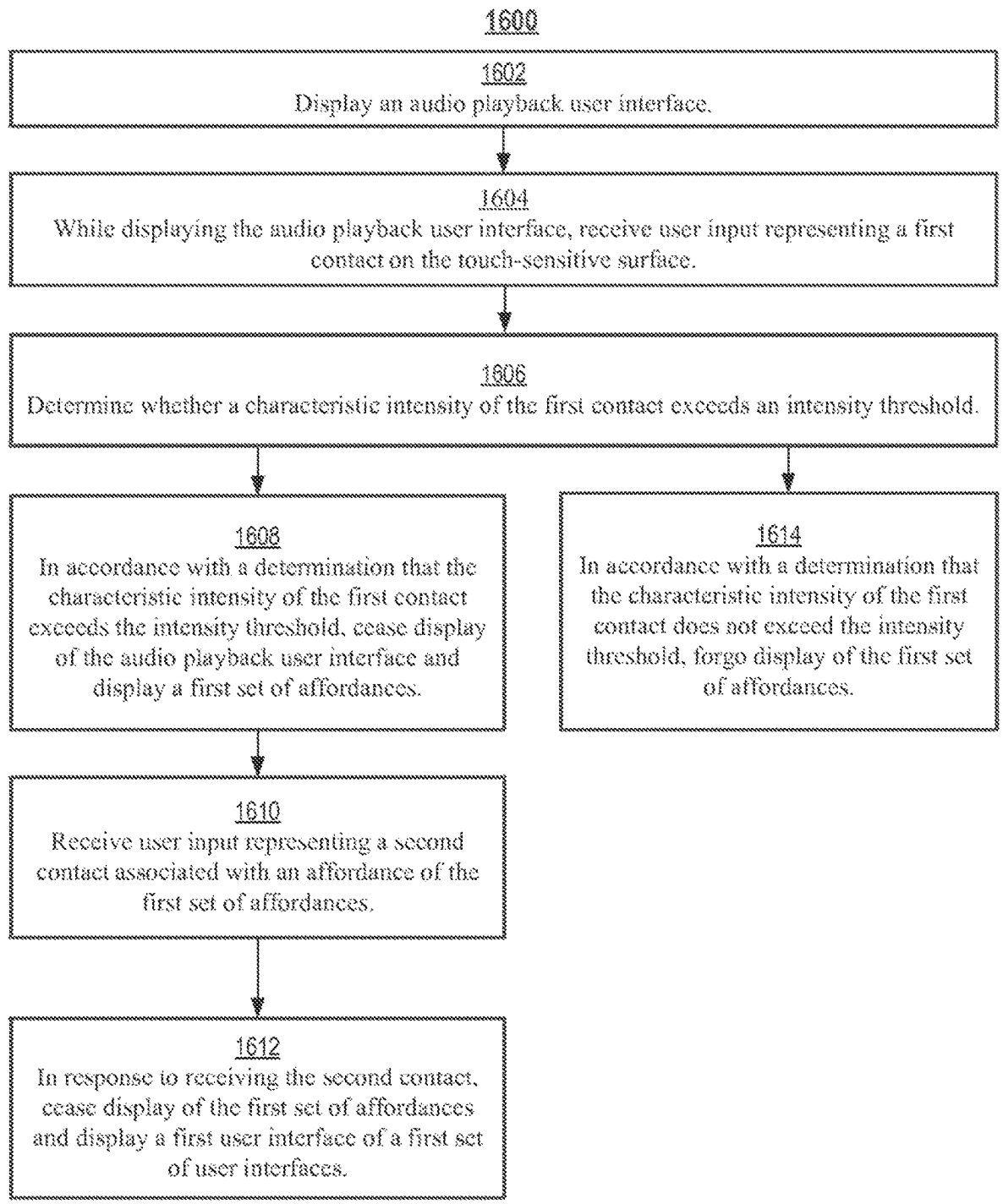
FIG. 16 is a flow diagram illustrating an exemplary process for accessing and playing music.

FIG. 16 is a flow diagram illustrating an exemplary process for accessing and playing music in accordance with some embodiments. In some embodiments, method 1600 may be performed at an electronic device with a display (e.g., 112, 340, 504) and a touch-sensitive surface (e.g., 112, 355, 504). In some embodiments, the electronic device also includes a rotatable input mechanism (e.g., 506). Some operations in method 1600 may be combined, the order of some operations may be changed, and some operations may be omitted.

In some embodiments, the touch-sensitive surface (e.g., 112, 355, 504) is capable of detecting intensity of touch contacts. Exemplary devices that may perform method 1600 include devices 100, 300, and 500 (FIGS. 1A, 3, and 5A).

Method 1600 provides an intuitive way to access and play music. The method reduces the cognitive burden on a user when using a device to access and play music, thereby creating a more efficient human-machine interface. For battery-operated computing devices, enabling a user to access and play music more quickly and more efficiently conserves power and increases the time between battery charges.

At block 1602, an audio playback user interface (e.g., 1502) is displayed.

At block 1604, while displaying the audio playback user interface (e.g., 1502), user input representing a first contact (e.g., touch) on the touch-sensitive surface is received.

At block 1606, it is determined whether a characteristic intensity of the first contact exceeds an intensity threshold.

At block 1608, in accordance with a determination that the characteristic intensity of the first contact exceeds the intensity threshold (e.g., a deep press), display of the audio playback user interface (e.g., 1502) is ceased and a first set of affordances (e.g., 1516A-1516D) is displayed.

At block 1610, user input representing a second contact (e.g., touch on a touch-sensitive surface) associated with an affordance (e.g., 1516A) of the first set of affordances (e.g., 1516A-1516D) is received.

At block 1612, in response to receiving the second contact, display of the first set of affordances (e.g., 1516A-1516D) is ceased and a first user interface (e.g., 1504) of a first set of user interfaces (e.g., 1504, 1506) is displayed.

At block 1614, in accordance with a determination that the characteristic intensity of the first contact does not exceed the intensity threshold (e.g., not a deep press), display of the first set of affordances (e.g., 1516A-1516D) is forgone.

In accordance with some embodiments, the determination that the characteristic intensity of the first contact exceeds the intensity threshold is independent of a location of the first contact on the touch-sensitive surface.

In accordance with some embodiments, while displaying the first user interface (e.g., 1504) of the first set of user interfaces (e.g., 1504, 1506), user input representing a first swipe in a first direction is received. In response to receiving the first swipe in the first direction (e.g., a swipe to the left or the right), display of the first user interface (e.g., 1504) of a first set of user interfaces (e.g., 1504, 1506) is ceased and a first user interface (e.g., 1508) of a second set of user interfaces (e.g., 1508, 1510, 1512) is displayed.

In accordance with some embodiments, while displaying the first user interface (e.g., 1508) of the second set of user interfaces (e.g., 1508, 1510, 1512), user input representing a second swipe in the first direction is received. In response to receiving the second swipe, display of the first user interface (e.g., 1508) of a second set of user interfaces (e.g., 1508, 1510, 1512) is ceased and a first user interface (e.g., 1514) of a third set of user interfaces (e.g., 1514) is displayed.

In accordance with some embodiments, while displaying the first user interface (e.g., 1504) of the first set of user interfaces (e.g., 1504, 1506), user input representing a third contact associated with an affordance (e.g., 1504B) of the first user interface (e.g., 1504) of the first set of user interfaces (e.g., 1504, 1506) is received. In response to receiving the third contact, display of the first user interface (e.g., 1504) of a first set of user interfaces (e.g., 1504, 1506) is ceased and a second user interface (e.g., 1506) of the first set of user interfaces (e.g., 1504, 1506) is displayed.

In accordance with some embodiments, while displaying a user interface (e.g., 1504 or 1506) of a set of user interfaces (e.g., 1504, 1506), user input representing a fourth contact on the touch-sensitive surface is received. It is determined whether a characteristic intensity of the fourth contact exceeds a second intensity threshold. In accordance with a determination that the characteristic intensity of the fourth contact exceeds the second intensity threshold (e.g., a deep press), a second set of affordances (e.g., 1536A-1536D) is displayed. User input representing a fifth contact associated with an affordance (e.g., 1536A) of the second set of affordances (e.g., 1536A-1536D) is received. In response to receiving the fifth contact, display of the second set of affordances (e.g., 1536A-1536D) is ceased and the audio playback user interface (e.g., 1502) is displayed. In accordance with a determination that the characteristic intensity of the first contact does not exceed the intensity threshold (e.g., not a deep press), display of the second set of affordances (e.g., 1536A-1536D) is forgone.

Figure 17A:
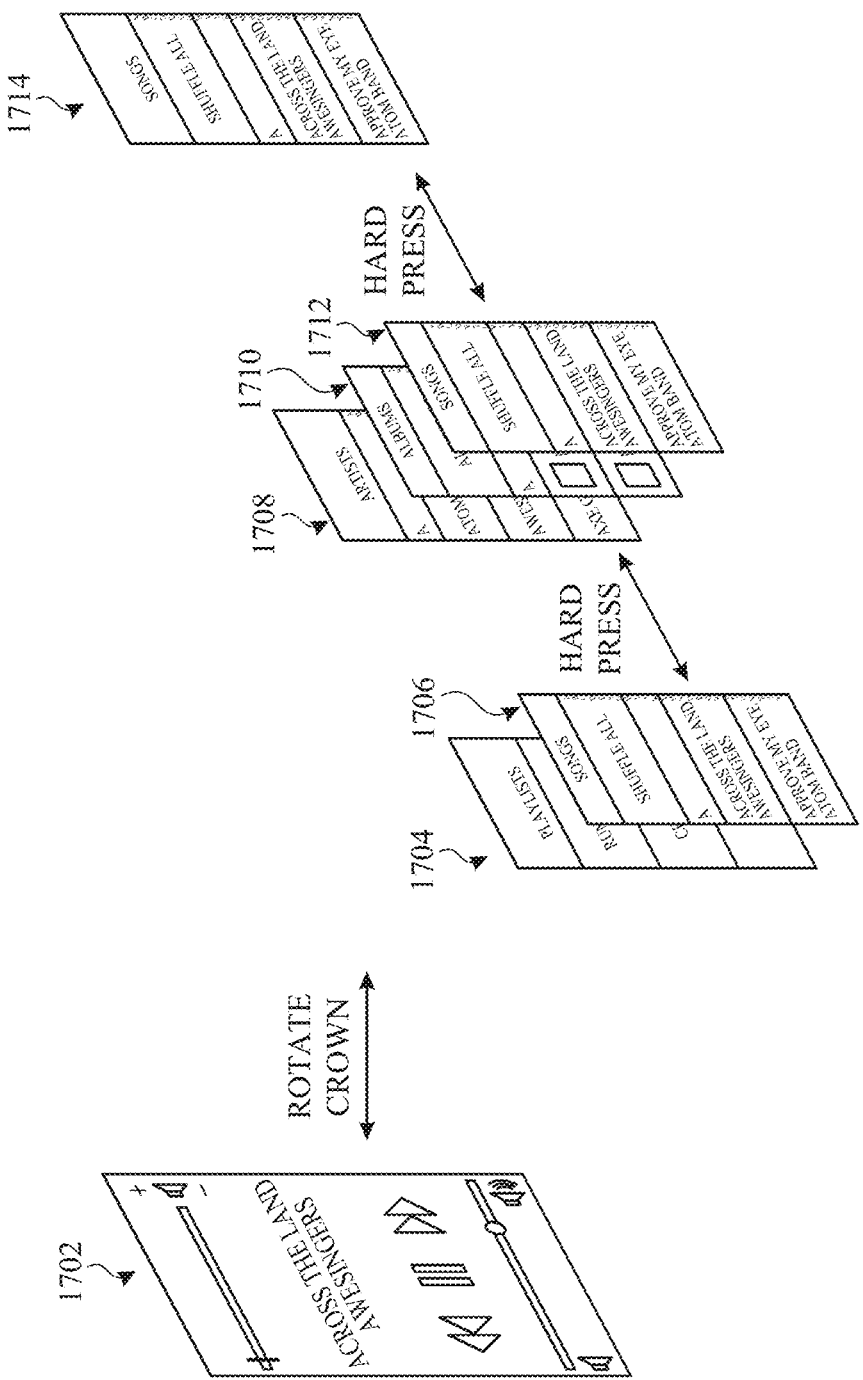
Figure 17B:
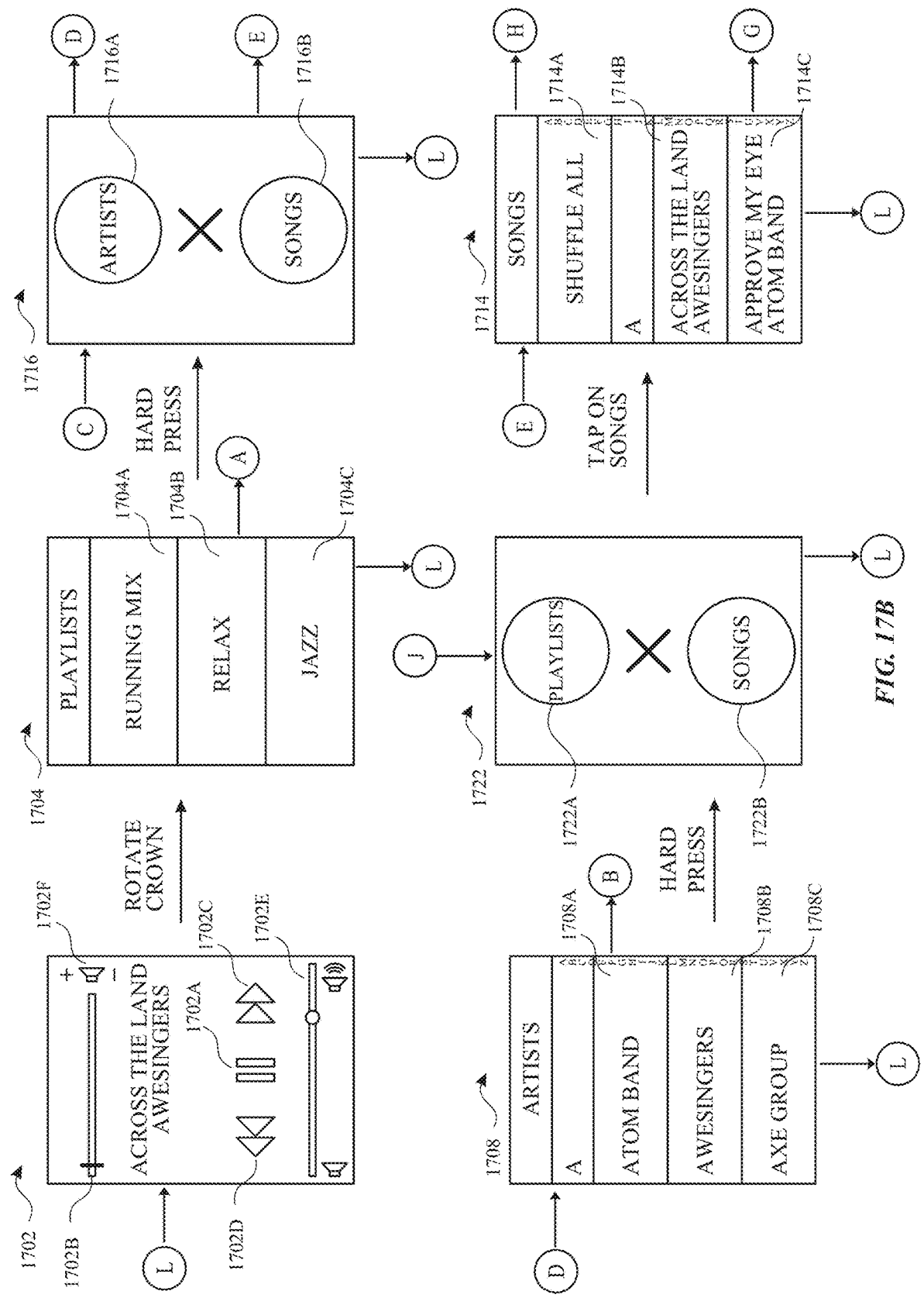

FIGS. 17A-17C illustrate exemplary user interfaces for accessing music using an electronic device, in accordance with some embodiments. In some embodiments, the electronic device is device 500. The electronic device has a display (e.g., 112, 340, 504), a touch-sensitive surface (e.g., 112, 355, 504), and a rotatable input mechanism (e.g., 506).

FIG. 17A illustrates a high-level view of the organization of various user interface screens. These and additional user interface screens will be described in further detail with respect to FIGS. 17B-17C. User interface screen 1702 illustrates an audio playback user interface (e.g., a screen displayed when audio playback is initiated) of a music application (e.g., a digital music player application). Upon receiving one or more user inputs, the device may provide access from user interface screen 1702 to user interface screen 1704, user interface screen 1708, and user interface screen 1714. In some embodiments, user interface screen 1702 functions as described with respect to user interface screen 616, user interface screen 1704 functions as described with respect to user interface screen 604, user interface screen 1708 functions as described with respect to user interface screen 608, and user interface screen 1714 functions as described with respect to user interface screen 614.

User interface screen 1704 illustrates playlist selection affordances (1704A-1704C) for accessing various music playlists. Activating a playlist selection affordance causes the device to display user interface screen 1706. User interface screen 1706 illustrates song selection affordances (1706A-1706B) of the activated playlist. At user interface screen 1706, activating a song selection affordance causes the device to display user interface screen 1702, which includes an audio playback user interface, and to begin audio playback of the song corresponding to the activated song selection affordance. A song selection affordance of user interface 1706 (or other user interfaces with one or more song selection affordances) may also contain an indicator (1706C), which may provide an indication of being stored locally on the electronic device (e.g., the song is available for playback from local memory). In accordance with some embodiments, an indicator (1706C) provides an indication of not being stored locally on the electronic device (e.g., the song is not stored locally, but is available for playback through download or stream from an external electronic device, such as a phone or server). In accordance with some embodiments an indicator (1706C) may provide an indication of not being available for playback (e.g., not stored locally on the electronic and not stored on an external electronic and available for playback through download or stream). In some embodiments, user interface screen 1706 functions as described with respect to user interface screen 606.

User interface screen 1708 illustrates artist selection affordances (1708A-1708C) for accessing music of various artists. Activating an artist selection affordance causes the device to display user interface screen 1710. User interface screen 1710 illustrates album selection affordances (1710A-1710B) of the activated artist. Activating an album selection affordance causes the device to display user interface screen 1712, which includes song selection affordances (1712A-1712B) of the selected album of the selected artist. Activating a song selection affordance causes the device to display user interface screen 1702, which includes an audio playback user interface, and to begin audio playback of the song corresponding to the activated song selection affordance. In some embodiments, user interface screen 1710 functions as described with respect to user interface screen 610 and user interface screen 1712 functions as described with respect to user interface screen 612.

User interface screen 1714 illustrates song selection affordances (1714A-1714C). Activating a song selection affordance causes the device to display user interface screen 1702, which includes an audio playback user interface, and to begin audio playback of the song corresponding to the activated song selection affordance.

The audio playback user interface of user interface screen 1702 displays song information (e.g., the title and artist) of an activated (e.g., playing, paused) song. The audio playback user interface of user interface 1702 may contain affordances (e.g., 1702A-1702F) that, when selected, cause the device to play/pause, skip forward/backward, scrub to within a time in the song, and adjust the volume, among others. Similarly, user interface screen 1718 illustrates an audio playback user interface with affordances 1718A-1718F wherein the interface has been updated, for example, to reflect a newly selected or different song.

In some embodiments, as shown in FIG. 17B, the device displays a first audio playback user interface (e.g., 1702). For example, the device displays user interface 1702, which illustrates an audio playback user interface, or "now playing" screen, which provides an indication of the currently playing audio file (e.g., the currently playing audio file is the song "Across the Land" by artist Awesingers).

The device receives user input representing a first movement (e.g., rotation) of the rotatable input mechanism (e.g., the user rotates the rotatable input mechanism). In response to receiving the user input representing the first movement (e.g., rotation) of the rotatable input mechanism, the device ceases display of the first audio playback user interface (e.g., 1702) and displays a first user interface (e.g., 1704) of a first set of user interfaces (e.g., 1704, 1706). For example, the device may display user interface 1704, which illustrates a list of playlists and contains selection affordances 1704A-1704C representing playlists. Generally, a set of user interfaces represents one or more user interfaces grouped hierarchically together based on organization or attribute. For example, a set of user interfaces may comprise two user interfaces, one representing a list of playlists and the other representing the songs contained in a playlist selected from this list.

While displaying a user interface (e.g., 1704 or 1706) of the first set of user interfaces (e.g., 1704, 1706), the device receives user input representing a first contact (e.g., a touch) on the touch-sensitive surface.

The device determines whether a characteristic intensity of the first contact exceeds an intensity threshold.

In accordance with a determination that the characteristic intensity of the first contact exceeds the intensity threshold (e.g., a deep press), the device ceases display of the first set of user interfaces (e.g., 1704 or 1706) and displays a first set of affordances (e.g., 1716A and 1716B of user interface 1716).

The device receives user input (e.g., a touch) associated with a first affordance (e.g., 1716A) of the first set of affordances (e.g., 1716A-1716B). Generally, displayed items (e.g., affordances) are associated with user inputs in a contextual manner, such that the user input being received at a location on the touch-sensitive surface corresponding to that of the displayed item causes activation of the displayed item and/or a function associated with it.

In response to receiving the user input (e.g., touch) associated with the first affordance (e.g., 1716A) of the first set of affordances (e.g., 1716A-1716B), the device ceases display of the first set of affordances (e.g., 1716A-1716B) and displays a first user interface (e.g., 1708) of a second set of user interfaces (e.g., 1708, 1710, 1712). In one example, if the device receives user input associated with affordance 1716A, which reads "artists", an artists list is displayed, illustrated by user interface 1708. If instead, for example, the device receives user input associated with affordance 1716B, which reads "songs", a songs list is displayed, illustrated by user interface 1708.

In accordance with a determination that the characteristic intensity of the first contact does not exceed the intensity threshold (e.g., not a deep press), the device forgoes display of the first set of affordances (e.g., 1716A-1716B). Generally, however, the function associated with the location of contact may be activated (e.g., "shuffle all"). For example, if the device receives a contact (not a deep press) on user interface 1704 at a location corresponding to affordance 1704B, which corresponds to the playlist titled "Relax", the device may display a list of songs in the playlist "Relax".

In accordance with some embodiments, while displaying a user interface (e.g., 1708, 1710, or 1712) of the second set of user interfaces (e.g., 1708, 1710, 1712), the device receives user input representing a second contact (e.g., a touch) on the touch-sensitive surface. The device determines whether a characteristic intensity of the second contact exceeds a second intensity threshold. In accordance with a determination that the characteristic intensity of the second contact exceeds the second intensity threshold (e.g., a deep press), the device ceases display of the second set of user interfaces (e.g., 1708, 1710, or 1712) and displays a second set of affordances (e.g., affordances 1722A-1722B of user interface 1722). The device receives user input associated with a first affordance (e.g., 1722B) of the second set of affordances (e.g., 1722A-1722B). In response to receiving the user input associated with the first affordance (e.g., 1722B) of the second set of affordances (e.g., 1722A-1722B), the device ceases display of the second set of affordances (e.g., 1722A-1722B) and displays a first user interface (e.g., 1714) of a third set of user interfaces (e.g., 1714). In accordance with a determination that the characteristic intensity of the second contact does not exceed the second intensity threshold (e.g., not a deep press), the device forgoes displaying the second set of affordances. For example, the device receives a deep press, and displays a set of affordances (for navigating a music application); selection of one of the affordances 1722B, which reads "songs", causes a songs list, as illustrated by user interface 1714, to be displayed.

In accordance with some embodiments, the first user interface (e.g., 1714) of the third set of user interfaces (e.g., 1714) comprises a selection affordance (e.g., 1714C). The device receives user input associated with the selection affordance (e.g., 1714C) of the first user interface (e.g., 1714) of the third set of user interfaces (e.g., 1714). In response to receiving the user input associated with the selection affordance (e.g., 1714C) of the first user interface (e.g., 1714) of the third set of user interfaces (e.g., 1714), the device ceases display of the third set of affordances (e.g., 1714) and displays a second audio playback user interface (e.g., 1718). For example, the first user interface of the third set of user interfaces is a songs list, as illustrated by user interface 1714, and contains a song selection affordance corresponding to the song "Approve My Eye" by the artist Atom Band, represented by selection affordance 1714C. In this example, the device receives a user input touch on the song "Approve My Eye" represented by selection affordance 1714C of user interface 1714. As a result, the "now playing" screen, illustrated by user interface 1718 of FIG. 17C, is displayed and reflects the song associated with song selection affordance 1714C, "Approve My Eye" by Atom Band.

In accordance with some embodiments, while displaying a user interface (e.g., 1714) of the third set of user interfaces (e.g., 1714), the device receives user input representing a third contact on the touch-sensitive surface. The device determines whether a characteristic intensity of the third contact exceeds the intensity threshold. For example, while displaying a songs list as illustrated by user interface 1714 a user contacts the touch-sensitive surface.

In accordance with a determination that the characteristic intensity of the third contact exceeds the intensity threshold (e.g., a deep press), the device ceases display of the third set of user interfaces (e.g., 1714) and displays a third set of affordances (e.g., affordances 1720A-1720B of user interface 1720 in FIG. 17C). The device receives user input associated with a first affordance (e.g., 1720A) of the third set of affordances. In response to receiving the user input associated with the first affordance (e.g., 1720A) of the third set of affordances (e.g., 1720A-1720B), the device ceases display of the third set of affordances (e.g., 1720A-1720B) and displays a most-recently-displayed user interface (e.g., 1704 or 1706) of the first set of user interfaces (e.g., 1704, 1706). For example, the device receives a touch on affordance 1720A, which reads "playlists", and in response the most-recently-displayed user interface of the first set of user interfaces is displayed; the most-recently-displayed user interface of the first set (e.g., 1704 and 1706) may be either user interface 1704, illustrating a list of playlists, or user interface 1706, illustrating a list of songs in a playlist.

In accordance with a determination that the characteristic intensity of the third contact does not exceed the intensity threshold (e.g., not a deep press), the device forgoes displaying the third set of affordances. Generally, however, the function associated with the location of contact may be activated (e.g., "shuffle all"). For example, if the device receives a contact on user interface 1714 at a location corresponding to affordance 1714C, which corresponds to the song "Approve My Eye" by artist Atom Band, the device may display an updated audio playback user interface and begin song playback.

In accordance with some embodiments, the device receives user input representing a second movement of the rotatable input mechanism (e.g., a rotation in a direction opposite of the first movement). In response to receiving the user input representing the second movement of the rotatable input mechanism, the device displays the first audio playback user interface (e.g., 1702). For example, in response to the second movement, user interface 1702 illustrating a "now playing" screen is displayed. The first movement may be in first direction and the second movement may be in a second direction, which may be different from the first.

In accordance with some embodiments, the first set of user interfaces, the second set of user interfaces, and the third set of user interfaces are each independently selected from the group consisting of: a playlist set of user interfaces (e.g., 1704, 1706), an artist set of user interfaces (e.g., 1708, 1710, 1712), and a songs set of user interfaces (e.g., 1714); the playlist set of user interfaces (e.g., 1704, 1706) comprises: a playlist user interface (e.g., 1704) and a list of songs (e.g., illustrated by user interface 1706) associated with a playlist of the playlist user interface (e.g., 1704); the artist set of user interfaces comprises: an artist user interface (e.g., 1708), a list of albums (e.g., illustrated by user interface 1710) associated with an artist of the artist user interface, and a list of songs (e.g., illustrated by user interface 1712) associated with an album of the list of albums (e.g., of user interface 1710); the songs set of user interfaces comprises a song user interface (e.g., illustrated by user interface 1714).

Figure 18:
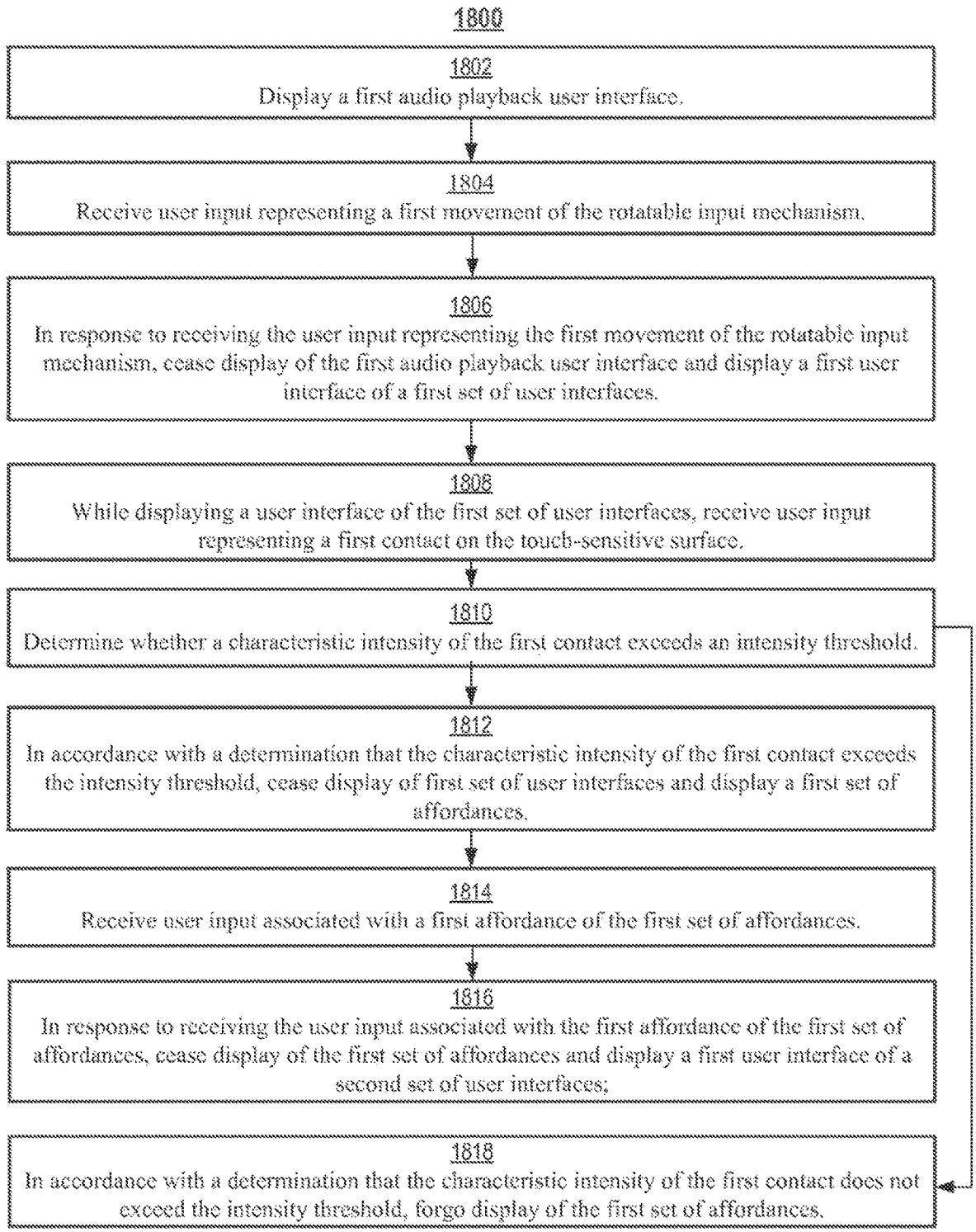
FIG. 18 is a flow diagram illustrating an exemplary process for accessing and playing music.

FIG. 18 is a flow diagram illustrating an exemplary process for accessing and playing music in accordance with some embodiments. In some embodiments, method 1800 may be performed at an electronic device with a display (e.g., 112, 340, 504), a rotatable input mechanism (e.g., 506), and a touch-sensitive surface (e.g., 112, 355, 504). Some operations in method 1800 may be combined, the order of some operations may be changed, and some operations may be omitted.

In some embodiments, the touch-sensitive surface (e.g., 112, 355, 504) is capable of detecting intensity of touch contacts. Exemplary devices that may perform method 1800 include devices 100, 300, and 500 (FIGS. 1A, 3, and 5A).

Method 1800 provides an intuitive way to access and play music. The method reduces the cognitive burden on a user when using a device to access and play music, thereby creating a more efficient human-machine interface. For battery-operated computing devices, enabling a user to access and play music more quickly and more efficiently conserves power and increases the time between battery charges.

At block 1802, a first audio playback user interface (e.g., user interface 1702) is displayed.

At block 1804, user input representing a first movement of the rotatable input mechanism is received (e.g., the user rotates the rotatable input mechanism).

At block 1806, in response to receiving the user input representing the first movement of the rotatable input mechanism, the display of the first audio playback user interface (e.g., 1702) is ceased and a first user interface (e.g., user interface 1704) of a first set of user interfaces (e.g., 1704, 1706) is displayed.

At block 1808, while displaying a user interface (e.g., 1704 or 1706) of the first set of user interfaces (e.g., 1704, 1706), user input representing a first contact (e.g., touch) on the touch-sensitive surface is received.

At block 1810, it is determined whether a characteristic intensity of the first contact exceeds an intensity threshold.

At block 1812, in accordance with a determination that the characteristic intensity of the first contact exceeds the intensity threshold (e.g., a deep press), display of the first set of user interfaces (e.g., 1704 or 1706) is ceased and a first set of affordances is displayed (e.g., affordances 1716A and 1716B of user interface 1716).

At block 1814, user input associated with a first affordance (e.g., 1716A) of the first set of affordances (e.g., 1716A-1716B as illustrated by user interface 1716) is received.

At block 1816, in response to receiving the user input associated with the first affordance (e.g., 1716A) of the first set of affordances (e.g., 1716A-1716B), display of the first set of affordances (e.g., 1716A-1716B) is ceased and a first user interface (e.g., user interface 1708) of a second set of user interfaces (e.g., 1708, 1710, 1712) is displayed.

At block 1818, in accordance with a determination that the characteristic intensity of the first contact does not exceed the intensity threshold (e.g., not a deep press), the display of the first set of affordances (e.g., 1716A-1716B) is forgone.

In accordance with some embodiments, while displaying a user interface (e.g., 1708, 1710, or 1712) of the second set of user interfaces (e.g., 1708, 1710, 1712), user input representing a second contact (e.g., touch) on the touch-sensitive surface is received. It is determined whether a characteristic intensity of the second contact exceeds a second intensity threshold. In accordance with a determination that the characteristic intensity of the second contact exceeds the second intensity threshold (e.g., a deep press), the display of the second set of user interfaces (e.g., 1708, 1710, or 1712) is ceased and a second set of affordances (e.g., affordances 1722A-1722B of user interface 1722) is displayed. User input associated with a first affordance (e.g., 1722A or 1722B) of the second set of affordances (e.g., 1722A-1722B) is received. In response to receiving the user input associated with the first affordance (e.g., 1722B) of the second set of affordances (e.g., 1722A-1722B), the display of the second set of affordances (e.g., 1722A-1722B) is ceased and a first user interface (e.g., 1714) of a third set of user interfaces (e.g., 1714) is displayed. In accordance with a determination that the characteristic intensity of the second contact does not exceed the second intensity threshold (e.g., not a deep press), the display of the second set of affordances is forgone.

In accordance with some embodiments, the first user interface (e.g., 1714) of the third set of user interfaces (e.g., 1714) comprises a selection affordance (e.g., 1714C). User input associated with the selection affordance (e.g., 1714C) of the first user interface (e.g., 1714) of the third set of user interfaces (e.g., 1714) is received. In response to receiving the user input associated with the selection affordance (e.g., 1714C) of the first user interface (e.g., 1714) of the third set of user interfaces (e.g., 1714), the display of the third set of affordances (e.g., 1714) is ceased and a second audio playback user interface (e.g., 1718) is displayed.

In accordance with some embodiments, while displaying a user interface (e.g., 1714) of the third set of user interfaces (e.g., 1714), user input representing a third contact on the touch-sensitive surface is received. It is determined whether a characteristic intensity of the third contact exceeds the intensity threshold. In accordance with a determination that the characteristic intensity of the third contact exceeds the intensity threshold (e.g., a deep press), the display of the third set of user interfaces (e.g., 1714) is ceased and a third set of affordances (e.g., affordances 1720A-1720B of user interface 1720 in FIG. 17C) is displayed. User input associated with a first affordance (e.g., 1720A) of the third set of affordances is received. In response to receiving the user input associated with the first affordance (e.g., 1720A) of the third set of affordances (e.g., 1720A-1720B), the display of the third set of affordances (e.g., 1720A-1720B) is ceased and a most-recently-displayed user interface (e.g., 1704 or

1706) of the first set of user interfaces (e.g., 1704, 1706) is displayed. In accordance with a determination that the characteristic intensity of the third contact does not exceed the intensity threshold (e.g., not a deep press), the display of the third set of affordances is forgone.

In accordance with some embodiments, user input representing a second movement of the rotatable input mechanism (e.g., a rotation in a direction opposite of the first movement) is received. In response to receiving the user input representing the second movement of the rotatable input mechanism, the first audio playback user interface (e.g., 1702) is displayed.

In accordance with some embodiments, the first set of user interfaces, the second set of user interfaces, and the third set of user interfaces are each independently selected from the group consisting of: a playlist set of user interfaces (e.g., 1704, 1706), an artist set of user interfaces (e.g., 1708, 1710, 1712), and a songs set of user interfaces (e.g., 1714).

In accordance with some embodiments, the playlist set of user interfaces (e.g., 1704, 1706) comprises: a playlist user interface (e.g., 1704) and a list of songs (e.g., illustrated by user interface 1706) associated with a playlist of the playlist user interface (e.g., 1704).

In accordance with some embodiments, the artist set of user interfaces comprises: an artist user interface (e.g., 1708), a list of albums (e.g., illustrated by user interface 1710) associated with an artist of the artist user interface, and a list of songs (e.g., illustrated by user interface 1712) associated with an album of the list of albums (e.g., of user interface 1710).

In accordance with some embodiments, the songs set of user interfaces comprises a song user interface (e.g., illustrated by user interface 1714).

Figure 19A:
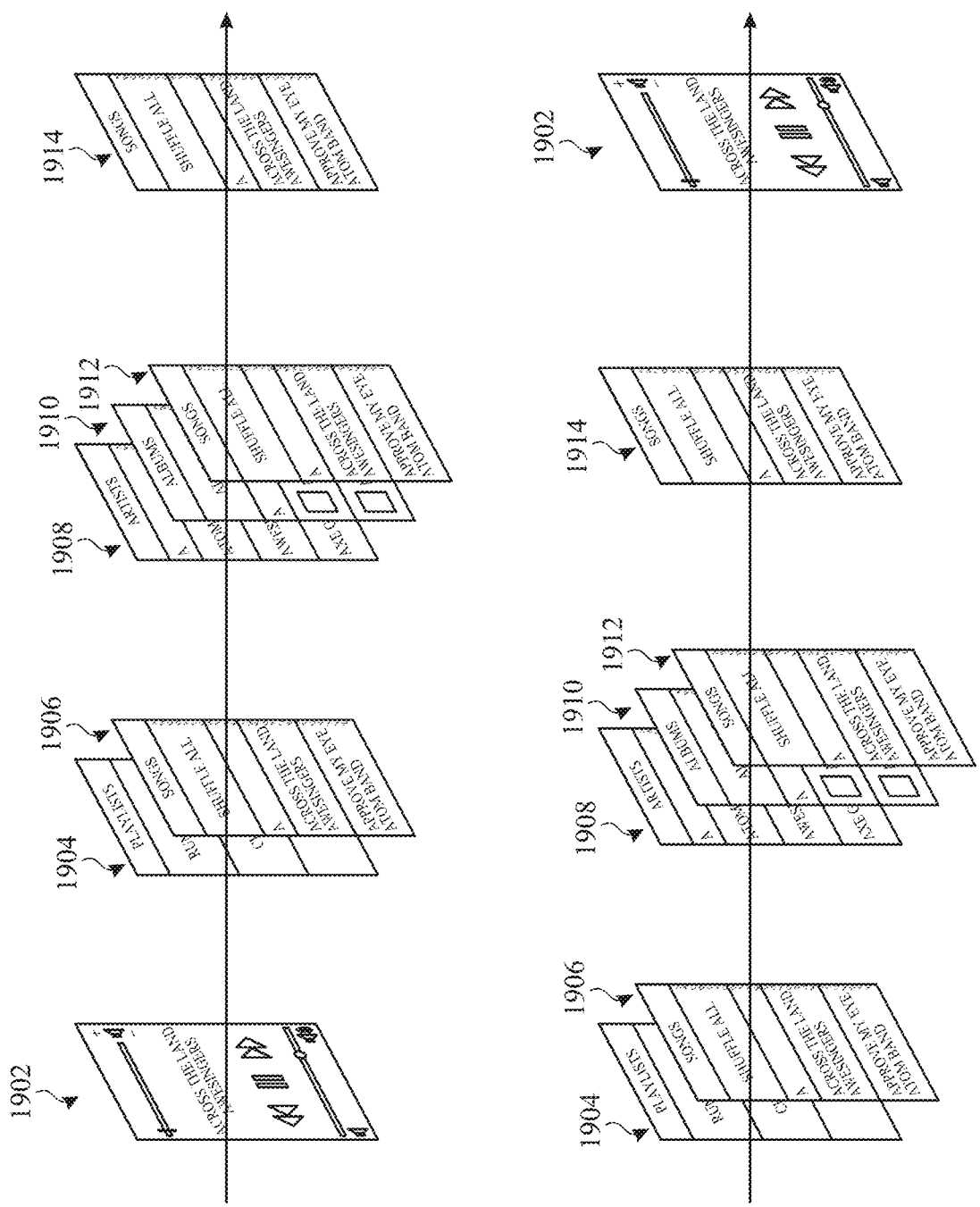
FIGS. 19A-19C illustrate exemplary user interfaces in accordance with some embodiments.
Figure 19B:
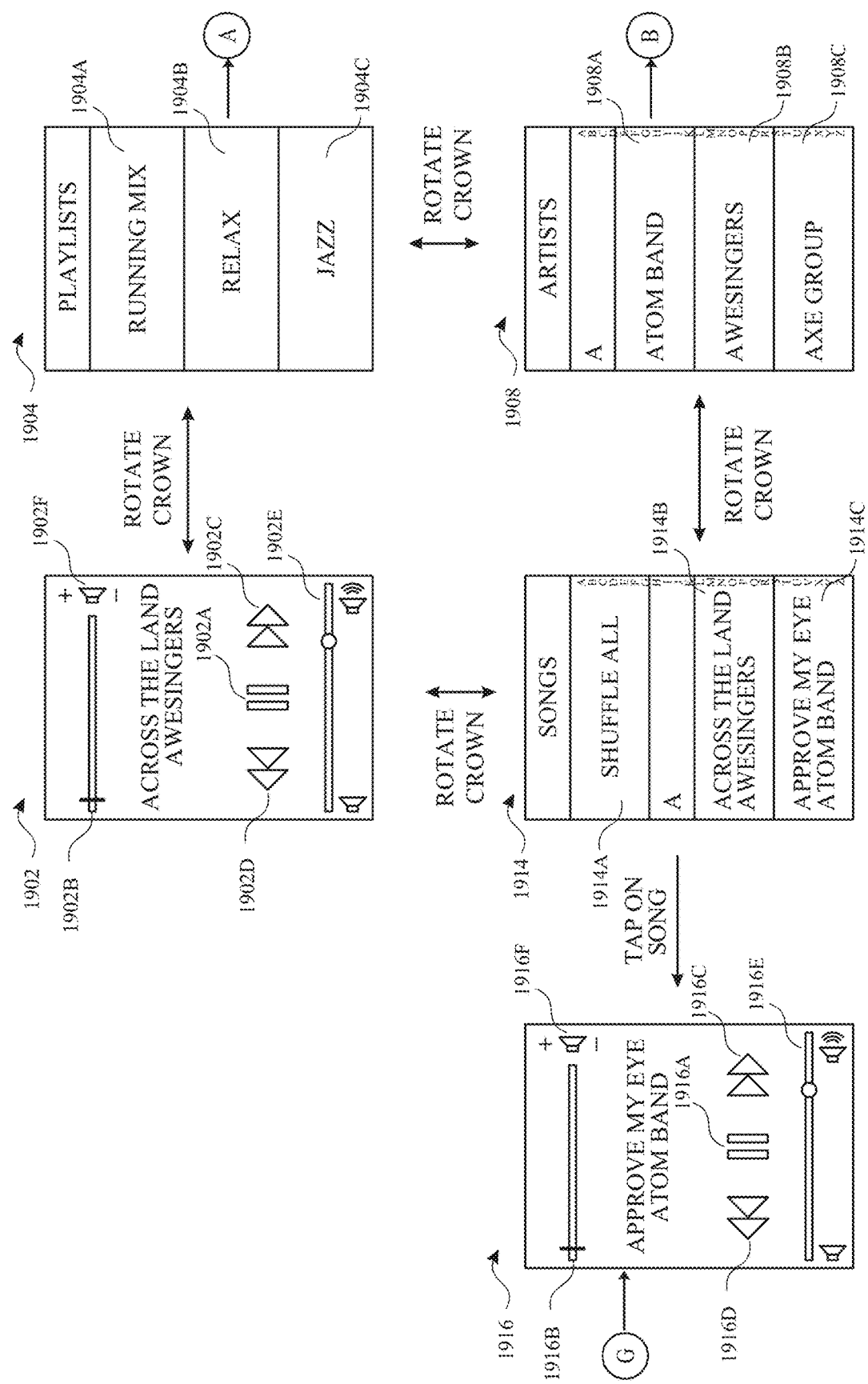
Figure 19C:
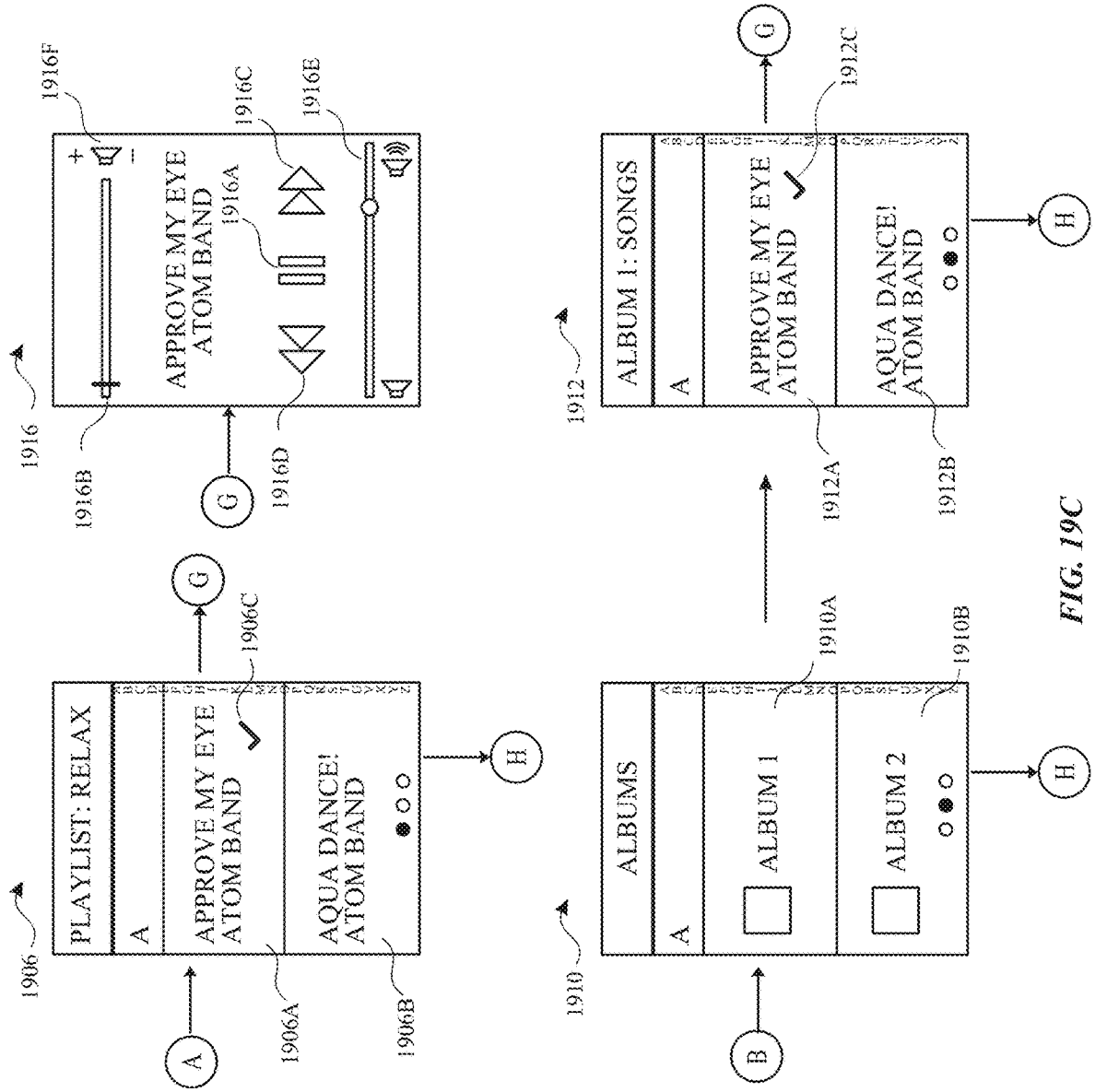

FIGS. 19A-19C illustrate exemplary user interfaces for accessing music using an electronic device, in accordance with some embodiments. In some embodiments, the electronic device is device 500. The electronic device has a display (e.g., 112, 340, 504), a rotatable input mechanism (e.g., 506), and optionally may have a touch-sensitive surface (e.g., 112, 355, 504).

FIG. 19A illustrates a high-level view of the organization of various user interface screens. These and additional user interface screens will be described in further detail with respect to FIG. 19B. User interface screen 1902 includes an audio playback user interface of a music application (e.g., a digital music player application). Upon receiving one or more user inputs, the device may provide access from user interface 1902 to user interface 1904, user interface 1908, and user interface 1914. In some embodiments, user interface screen 1902 functions as described with respect to user interface screen 616, user interface screen 1904 functions as described with respect to user interface screen 604, user interface screen 1908 functions as described with respect to user interface screen 608, and user interface screen 1914 functions as described with respect to user interface screen 614.

User interface screen 1904 illustrates playlist selection affordances (1904A-1904C) for accessing various music playlists. Activating a playlist selection affordance causes the device to display user interface screen 1906. User interface screen 1906 illustrates song selection affordances (1906A-1906B) of the activated playlist. Activating a song selection affordance causes the device to display user interface screen 1902, which includes an audio playback user interface, and to begin audio playback of the song corresponding to the activated song selection affordance. A song selection affordance of user interface 1906 (or other user interfaces with one or more song selection affordances) may also contain an indicator (1906C), which may provide an indication of being stored locally on the electronic device (e.g., the song is available for playback from local memory). In accordance with some embodiments, an indicator (1906C) provides an indication of not being stored locally on the electronic device (e.g., the song is not stored locally, but is available for playback through download or stream from an external electronic device, such as a phone or server). In accordance with some embodiments an indicator (1906C) may provide an indication of not being available for playback (e.g., not stored locally on the electronic and not stored on an external electronic and available for playback through download or stream). In some embodiments, user interface screen 1906 functions as described with respect to user interface screen 606.

User interface screen 1908 illustrates artist selection affordances (1908A-1908C) for accessing music of various artists. Activating an artist selection affordance causes the device to display user interface screen 1910. User interface screen 1910 illustrates album selection affordances (1910A-1910B) of the activated artist. Activating an album selection affordance causes the device to display user interface screen 1912, which includes song selection affordances (1912A-1912B) of the selected album of the selected artist. Activating a song selection affordance causes the device to display user interface screen 1902, which includes an audio playback user interface, and to begin audio playback of the song corresponding to the activated song selection affordance. User interface 1912 may also contain indicator 1912C, which may indicate whether an audio file is available locally for playback. In some embodiments, user interface screen 1910 functions as described with respect to user interface screen 610 and user interface screen 1912 functions as described with respect to user interface screen 612.

User interface screen 1914 illustrates song selection affordances (1914A-1914C). Activating a song selection affordance causes the device to display user interface screen 1902, which includes an audio playback user interface, and to begin audio playback of the song corresponding to the activated song selection affordance.

The audio playback user interface of user interface screen 1902 displays song information (e.g., the title and artist) of an activated (e.g., playing, paused) song. The audio playback user interface of user interface 1902 may contain affordances (e.g., 1902A-1902F) that, when selected, cause the device to play/pause, skip forward/backward, scrub to within a time in the song, and adjust the volume, among others. Similarly, user interface screen 1918 illustrates an audio playback user interface with affordances 1918A-1918F wherein the interface has been updated, for example, to reflect a newly selected or different song.

In some embodiments, as shown in FIG. 19B, the device displays a first audio application user interface (e.g., 1902). In one example, the first audio application user interface is user interface 1902, which illustrates a "now playing" screen. Alternatively, for example, the first audio application user interface may be selected from the group of user interfaces comprised of user interfaces 1904, 1908, and 1914. As one skilled in the art would appreciate, and consistent with FIGS. 19A, the example user interfaces referenced may represent the first through fifth audio application user interfaces herein discussed, and may be positioned in any order. Additionally, for example, the first through fifth audio application user interface may be selected from the group of user interfaces consisting of user interfaces 1904, 1908, 1910, 1914 and 1902.

While displaying the first audio application user interface (e.g., 1902), the device receives a first user input representing movement (e.g., rotation) of the rotatable input mechanism in a rotation direction. For example, the movement is in a first rotation direction, (e.g., clockwise), as opposed to a second direction (e.g., counter-clockwise).

In response to receiving the first user input, the device ceases display of the first audio application user interface (e.g., 1902) and displays a second audio application user interface (e.g., 1904). In one example, the device displays a playlist user interface 1904 in response to receiving rotation of the rotatable input mechanism.

While displaying the second audio application user interface (e.g., 1904), the device receives a second user input representing movement (e.g., rotation) of the rotatable input mechanism in the rotation direction. For example, the movement is in the first rotation direction (e.g., clockwise).

In response to receiving the second user input, the device ceases display of the second audio application user interface (e.g., 1904) and displays a third audio application user interface (e.g., 1908). In one example, the device displays an artist list user interface 1908 in response to receiving user input. For example, the movement is in the first rotation direction (e.g., clockwise).

In accordance with some embodiments, while displaying the third audio application user interface (e.g., 1908), the device receives a third user input (e.g., rotation) representing movement of the rotatable input mechanism in the rotation direction. In response to receiving the third user input, the device ceases display of the third audio application user interface (e.g., 1908) and displays a fourth audio application user interface (e.g., 1914). In one example, the device displays a song selection user interface 1914 in response to receiving user input. For example, the movement is in the first rotation direction (e.g., clockwise).

In accordance with some embodiments, while displaying the fourth audio application user interface, the device receives a fourth user input (e.g., rotation) representing movement of the rotatable input mechanism in the rotation direction. In response to receiving the fourth user input, the device ceases display of the fourth audio application user interface (e.g., 1914) and displays a fifth audio application user interface (e.g., 2106). In one example, the device displays an albums list user interface 2106 in response to receiving user input in the first rotation direction.

In accordance with some embodiments, one of the first, second, or third audio application user interfaces is an audio playback user interface (e.g., 1902) comprising an affordance (e.g., 1902A) for initiating audio playback.

In accordance with some embodiments, one of the first, second, or third audio application user interfaces is an albums list user interface (e.g., 2106).

In accordance with some embodiments, while displaying one of the first, second, or third audio application user interfaces (e.g., 1904), the device receives user input (e.g., a touch) representing a first selection of an affordance (e.g., 1904B) of the displayed audio application user interface (e.g., 1904). In response to receiving the user input representing the first selection (e.g., touch), the device ceases display of one of the first, second, or third audio application user interfaces (e.g., 1904) and displays a detail user interface (e.g., 1906). The detail user interface comprises content based on the affordance selected by the first selection. For example, the device receives selection of an affordance 1904B, representing the playlist named "Relax", and in response displays a detail user interface, illustrated by user interface 1906, which displays the songs contained in "Relax". The songs are represented by affordances 1906A-1906B.

In accordance with some embodiments, while displaying one of the first, second, or third audio application user interfaces (e.g., 1904), the device receives user input (e.g., a touch) representing a second selection of a playlist affordance (e.g., 1904B) associated with a playlist. In response to receiving the user input representing the second selection (e.g., touch), the device ceases display of one of the first, second, or third audio application user interfaces (e.g., 1904) and displays a list of songs (e.g., 1906), wherein the list of songs is based on the playlist (e.g., 1904B). For example, the device receives selection of a playlist at user interface 1904 and displays of a list of songs contained in that playlist.

In accordance with some embodiments, while displaying one of the first, second, or third audio application user interfaces (e.g., 1908), the device receives user input (e.g., a touch) representing a third selection of an artist affordance (e.g., 1908A) associated with an artist. In response to receiving the user input (e.g., touch) representing the third selection, the device ceases display of one of the first, second, or third audio application user interfaces (e.g., 1908) and displays a list of albums (e.g., 1910), wherein the list of albums is based on the artist. For example, the device receives selection of an artist at user interface 1908 and displays of a list of albums associated with that artist.

In accordance with some embodiments, the first audio application user interface, the second audio application user interface, the third audio application user interface, the fourth audio application user interface, and the fifth audio application user interface are each independently selected from the group consisting of: a playlists user interface (e.g., 1904), an artist user interface (e.g., 1908), a song user interface (e.g., 1914), an albums user interface (e.g., 1912, 2106), and an audio playback user interface (e.g., 1902).

In accordance with some embodiments, the playlists user interface comprises: a list of songs associated with a playlist of the playlist list user interface. The artist user interface comprises: an artist list user interface, a list of albums associated with an artist of the artist list user interface, and a list of songs associated with an album of the list of albums.

In accordance with some embodiments, the first, second, and third audio application user interfaces are each different.

Figure 20:
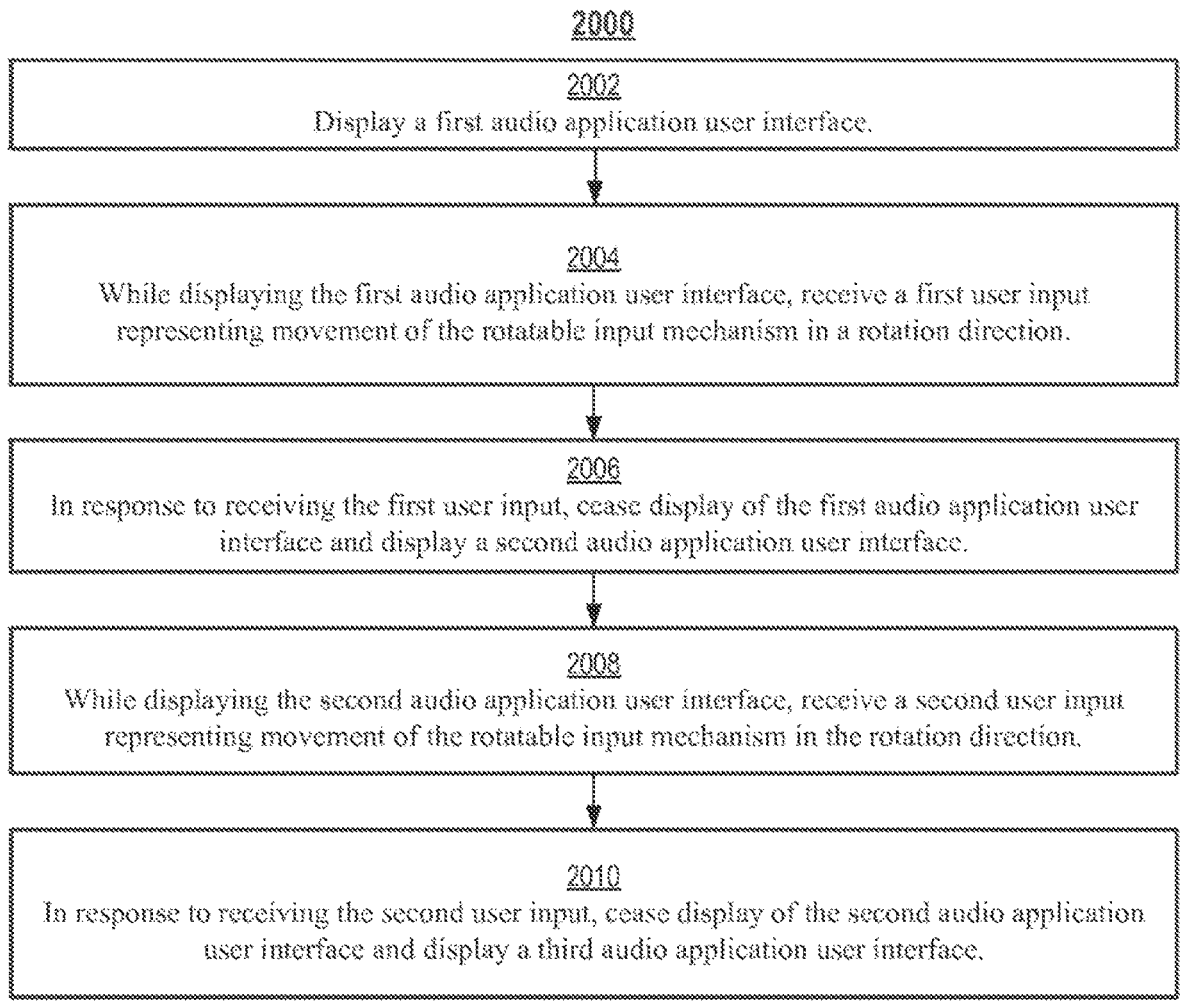
FIG. 20 is a flow diagram illustrating an exemplary process for accessing and playing music.

FIG. 20 is a flow diagram illustrating an exemplary process for accessing and playing music in accordance with some embodiments. In some embodiments, method 2000 may be performed at an electronic device with a display (e.g., 112, 340, 504) and a rotatable input mechanism (e.g., 506). In some embodiments, the electronic device also includes a touch-sensitive surface (e.g., 112, 355, 504). Some operations in method 2000 may be combined, the order of some operations may be changed, and some operations may be omitted.

In some embodiments, the touch-sensitive surface (e.g., 112, 355, 504) is capable of detecting intensity of touch contacts. Exemplary devices that may perform method 2000 include devices 100, 300, and 500 (FIGS. 1A, 3, and 5A).

Method 2000 provides an intuitive way to access and play music. The method reduces the cognitive burden on a user when using a device to access and play music, thereby creating a more efficient human-machine interface. For battery-operated computing devices, enabling a user to access and play music more quickly and more efficiently conserves power and increases the time between battery charges.

At block 2002, a first audio application user interface (e.g., 1902) is displayed.

At block 2004, while displaying the first audio application user interface (e.g., 1902), a first user input representing movement of the rotatable input mechanism in a rotation direction is received.

At block 2006, in response to receiving the first user input, display of the first audio application user interface (e.g., 1902) is ceased and a second audio application user interface (e.g., 1904) is displayed.

At block 2008, while displaying the second audio application user interface (e.g., 1904), a second user input representing movement of the rotatable input mechanism in the rotation direction is received.

At block 2010, in response to receiving the second user input, display of the second audio application user interface (e.g., 1904) is ceased and a third audio application user interface (e.g., 1908) is displayed.

In accordance with some embodiments, while displaying the third audio application user interface (e.g., 1908), a third user input representing movement of the rotatable input mechanism in the rotation direction is received. In response to receiving the third user input, display of the third audio application user interface (e.g., 1908) is ceased and a fourth audio application user interface (e.g., 1914) is displayed.

In accordance with some embodiments, while displaying the fourth audio application user interface, a fourth user input representing movement of the rotatable input mechanism in the rotation direction is received. In response to receiving the fourth user input, display of the fourth audio application user interface (e.g., 1914) is ceased and a fifth audio application user interface (e.g., 2106) is displayed.

In accordance with some embodiments, one of the first, second, or third audio application user interfaces is an audio playback user interface (e.g., 1902) comprising an affordance (e.g., 1902A) for initiating audio playback.

In accordance with some embodiments, one of the first, second, or third audio application user interfaces is an albums list user interface (e.g., 2106).

In accordance with some embodiments, while displaying one of the first, second, or third audio application user interfaces (e.g., 1904), user input representing a first selection of an affordance (e.g., 1904B) of the displayed audio application user interface (e.g., 1904) is received. In response to receiving the user input representing the first selection, display of one of the first, second, or third audio application user interfaces (e.g., 1904) is ceased and a detail user interface (e.g., 1906) is displayed. The detail user interface comprises content based on the affordance selected by the first selection.

In accordance with some embodiments, while displaying one of the first, second, or third audio application user interfaces (e.g., 1904), user input representing a second selection of a playlist affordance (e.g., 1904B) associated with a playlist is received. In response to receiving the user input representing the second selection, display of one of the first, second, or third audio application user interfaces (e.g., 1904) is ceased and a list of songs (e.g., 1906) is displayed, wherein the list of songs is based on the playlist (e.g., 1904B).

In accordance with some embodiments, while displaying one of the first, second, or third audio application user interfaces (e.g., 1908), user input representing a third selection of an artist affordance (e.g., 1908A) associated with an artist is received. In response to receiving the user input representing the third selection, display of one of the first, second, or third audio application user interfaces (e.g., 1908) is ceased and a list of albums (e.g., 1910) is displayed, wherein the list of albums is based on the artist.

In accordance with some embodiments, the first audio application user interface, the second audio application user interface, the third audio application user interface, the fourth audio application user interface, and the fifth audio application user interface are each independently selected from the group consisting of: a playlists user interface (e.g., 1904), an artist user interface (e.g., 1908), a songs user interface (e.g., 1914), an albums user interface (e.g., 1912, 2106), and an audio playback user interface (e.g., 1902).

In accordance with some embodiments, the playlists user interface comprises: a list of songs associated with a playlist of the playlist list user interface. The artist user interface comprises: an artist list user interface, a list of albums associated with an artist of the artist list user interface, and a list of songs associated with an album of the list of albums.

In accordance with some embodiments, the first, second, and third audio application user interfaces are each different.

Figure 21A:
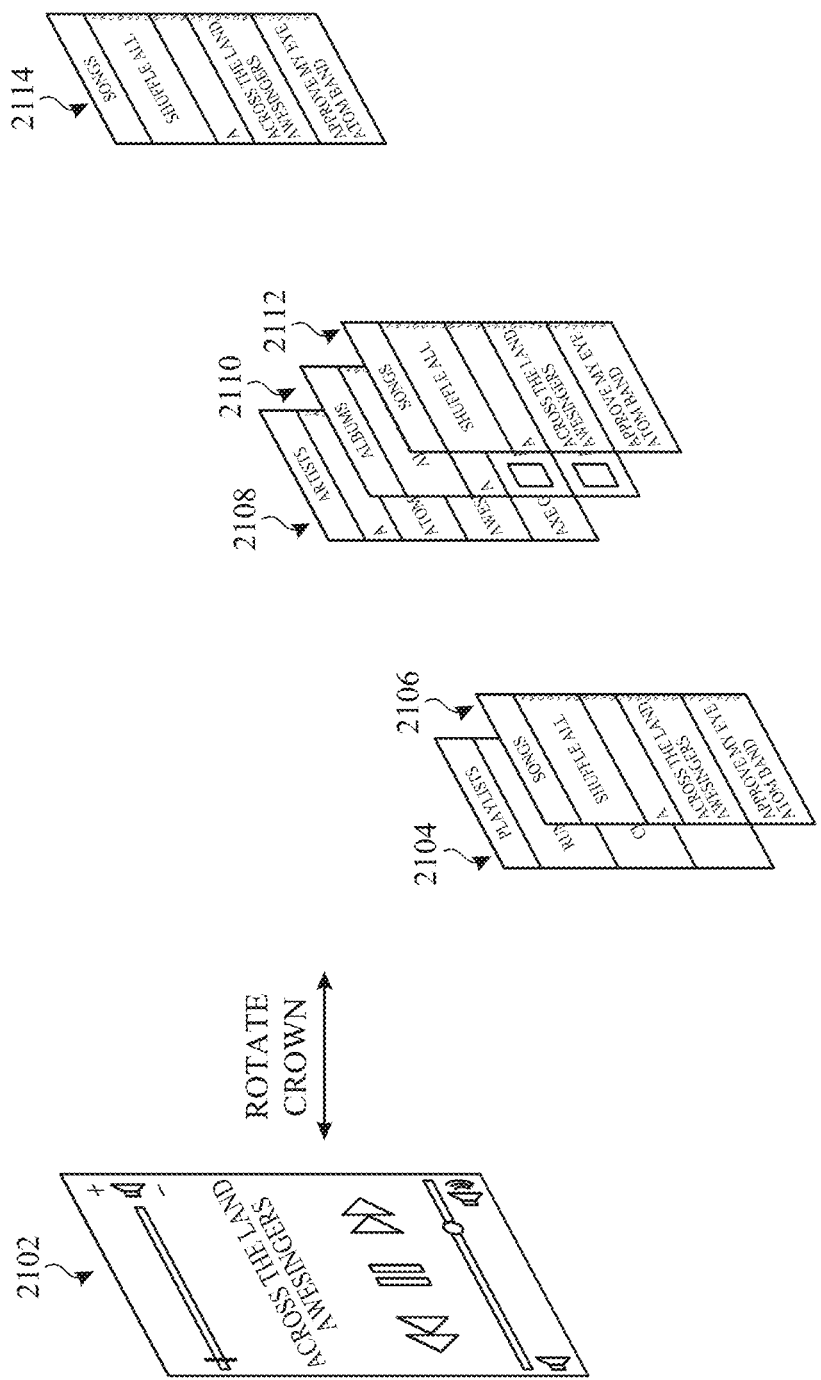
FIG. 21A-21C illustrate exemplary user interfaces in accordance with some embodiments.
Figure 21B:
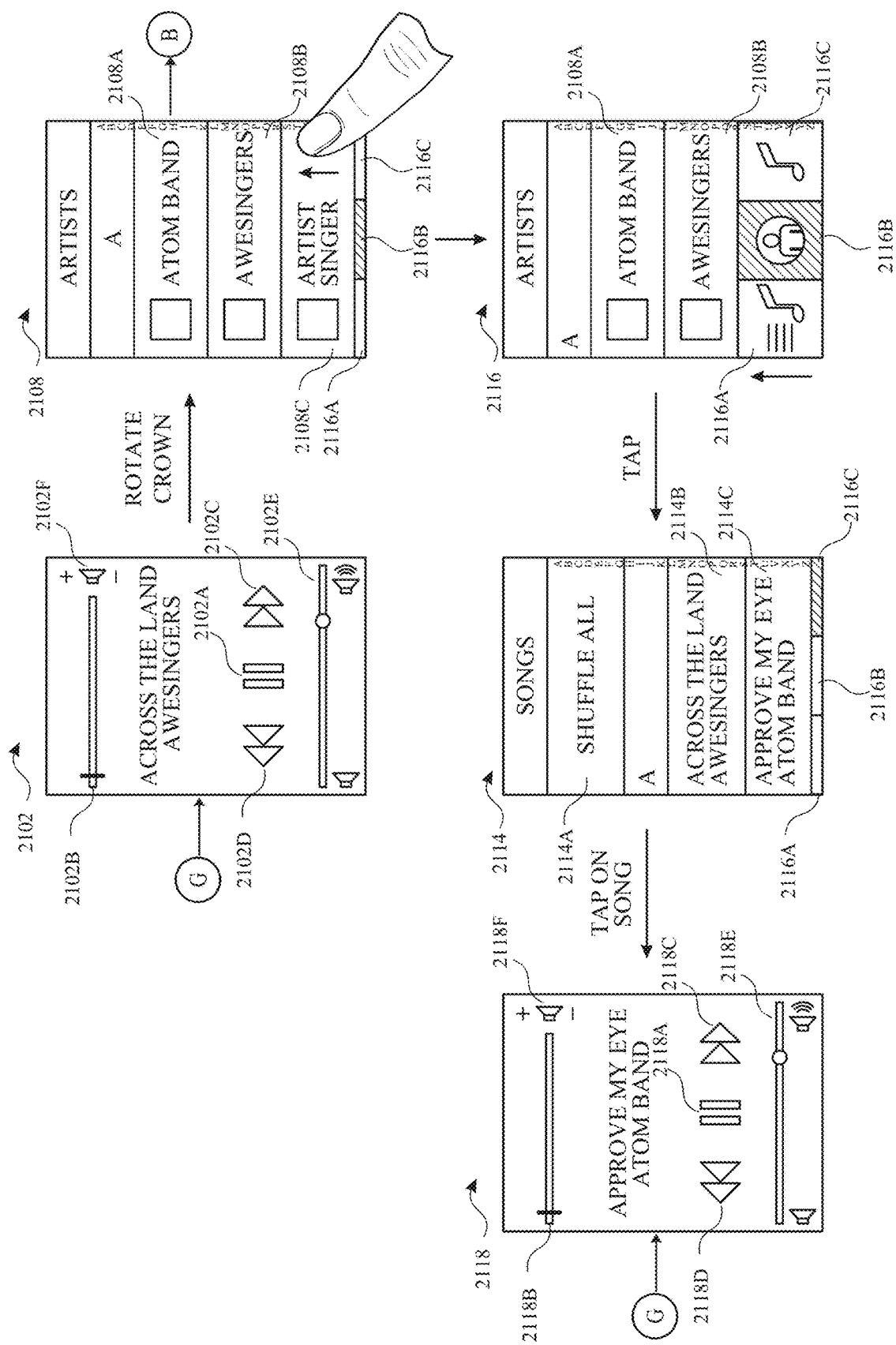
Figure 21C:
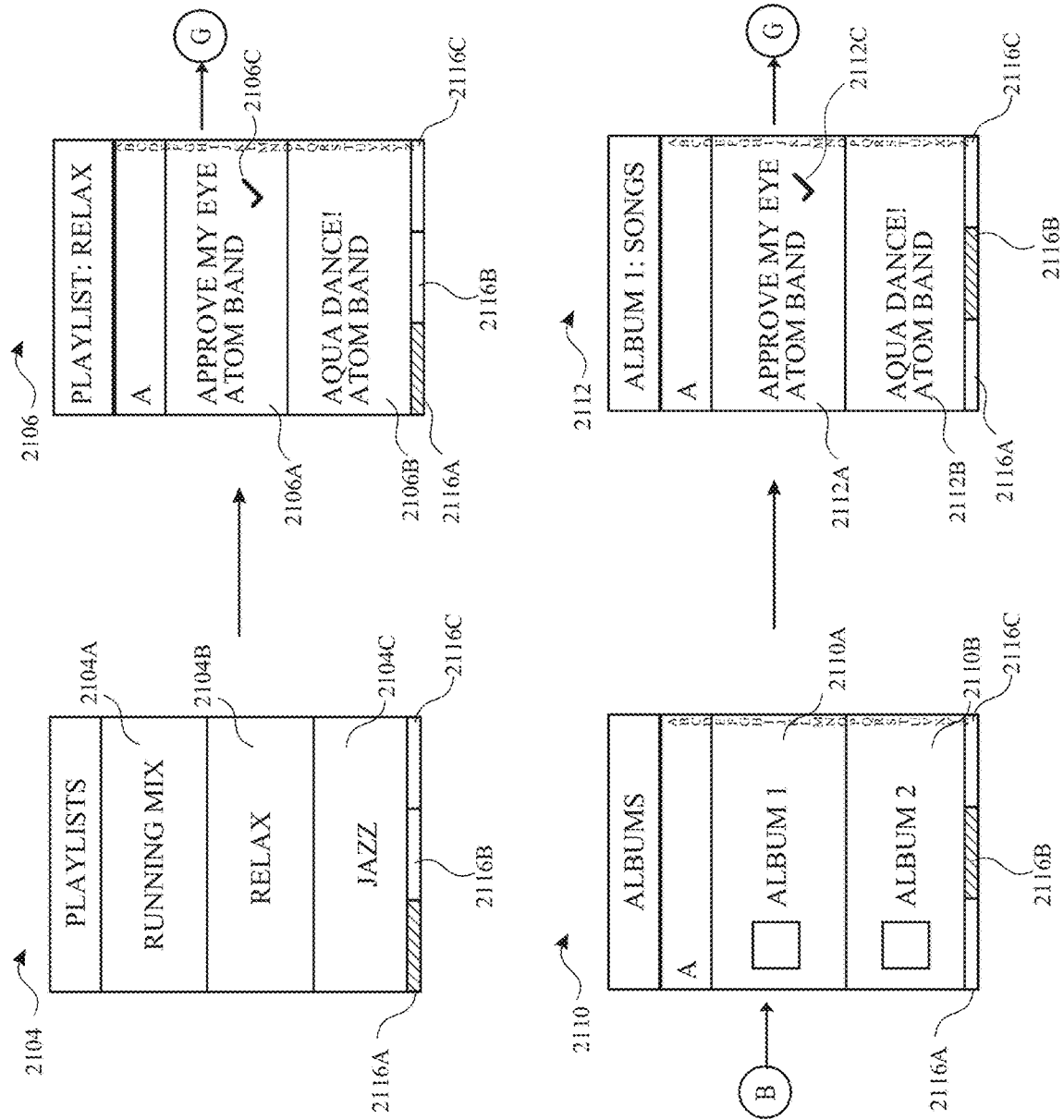

FIGS. 21A-21C illustrate exemplary user interfaces for accessing music using an electronic device, in accordance with some embodiments. In some embodiments, the electronic device is device 500. The electronic device has a display (e.g., 112, 340, 504), a touch-sensitive surface (e.g., 112, 355, 504), and a rotatable input mechanism (e.g., 506).

FIG. 21A illustrates a high-level view of the organization of various user interface screens. These and additional user interface screens will be described in further detail with respect to FIGS. 21B-21C. User interface screen 2102, includes an audio playback user interface of a music application (e.g., a digital music player application). Upon receiving one or more user inputs, the device may provide access from user interface 2102 to user interface 2104, user interface 2108, and user interface 2114. In some embodiments, user interface screen 2102 and 2118 function as described with respect to user interface screen 616.

User interface screen 2104 illustrates playlist selection affordances (2104A-2104C) for accessing various music playlists. Activating a playlist selection affordance causes the device to display user interface screen 2106. User interface screen 2106 illustrates song selection affordances (2106A-2106B) of the activated playlist. Activating a song selection affordance causes the device to display user interface screen 2102, which includes an audio playback user interface, and to begin audio playback of the song corresponding to the activated song selection affordance. A song selection affordance of user interface 2106 (or other user interfaces with one or more song selection affordances) may also contain an indicator (2106C), which may provide an indication of being stored locally on the electronic device (e.g., the song is available for playback from local memory). In accordance with some embodiments, an indicator (2106C) provides an indication of not being stored locally on the electronic device (e.g., the song is not stored locally, but is available for playback through download or stream from an external electronic device, such as a phone or server). In accordance with some embodiments an indicator (2106C) may provide an indication of not being available for playback (e.g., not stored locally on the electronic and not stored on an external electronic and available for playback through download or stream).

User interface screen 2108 illustrates artist selection affordances (2108A-2108C) for accessing music of various artists. Activating an artist selection affordance causes the device to display user interface screen 2110. User interface screen 2110 illustrates album selection affordances (2110A-2110B) of the activated artist. Activating an album selection affordance causes the device to display user interface screen 2112, which includes song selection affordances (2112A-2112B) of the selected album of the selected artist. Activating a song selection affordance causes the device to display user interface screen 2102, which includes an audio playback user interface, and to begin audio playback of the song corresponding to the activated song selection affordance. User interface 2112 may also contain indicator 2112C, which may indicate whether an audio file is available locally for playback.

User interface screen 2114 illustrates song selection affordances (2114A-2114C). Activating a song selection affordance causes the device to display user interface screen 2102, which includes an audio playback user interface, and to begin audio playback of the song corresponding to the activated song selection affordance.

The audio playback user interface of user interface screen 2102 displays song information (e.g., the title and artist) of an activated (e.g., playing, paused) song. The audio playback user interface of user interface 2102 may contain affordances (e.g., 2102A-2102F) that, when selected, cause the device to play/pause, skip forward/backward, scrub to within a time in the song, and adjust the volume, among others. Similarly, user interface screen 2118 illustrates an audio playback user interface with affordances 2118A-2118F wherein the interface has been updated, for example, to reflect a newly selected or different song.

A navigation interface 2116A-2116C may replace all or a portion of another user interface. The navigation interface includes navigation affordances (2116A-2116C). A navigation affordance may be associated with a particular set of user interfaces, such as a playlist set of user interfaces (e.g., 2104, 2106), an artist set of user interfaces (e.g., 2108, 2110, 2112), and/or a songs set of user interfaces (e.g., 2114). Upon receiving user input such as a swipe from the bottom of a touch-sensitive surface, for example, the navigation interface is displayed. Receiving user selection of a navigation affordance causes a user interface of the associated set of user interfaces to be displayed (or another interface associated with the navigation affordance), for example.

In some embodiments, as shown in FIG. 21B, the device displays a first audio playback user interface (e.g., 2102). While displaying the first audio playback user interface (e.g., 2102), the device receives a first user input (e.g., rotation) representing movement of the rotatable input mechanism. In response to receiving the first user input (e.g., rotation), the device ceases display of the first audio playback user interface (e.g., 2102) and displays a first user interface (e.g., 2108) of a first set of user interfaces (e.g., 2108, 2110, 2112). For example, at a "now playing" screen, the device receives movement of the rotatable input mechanism, and in response displays a list of artists as illustrated by user interface 2108.

While displaying a user interface (e.g., any of 2108, 2110, or 2112) of the first set of user interfaces (e.g., 2108, 2110, 2112), the device receives a second user input representing a swipe in a first direction. In response to receiving the second user input (e.g., a swipe), the device replaces display of a portion of the user interface (e.g., 2108) of the first set of user interfaces (e.g., 2108, 2110, 2112) with display of a navigation interface (e.g., 2116A-2116C). For example, upon receiving a swipe from bottom of the touch-sensitive surface, navigation interface (e.g., a menu ribbon) appears at the bottom of the screen. The second user input (e.g., swipe) may originate in any particular region of the touch-sensitive surface, for example at or near the bottom edge of the touch-sensitive surface. The navigation interface may occupy less than the entire display.

The navigation interface (e.g., 2116A-2116C) comprises a first navigation affordance (e.g., 2116B) associated with the first set of user interfaces (e.g., 2108, 2110, 2112) and a second navigation affordance (e.g., 2116C) associated with a second set of user interfaces (e.g., 2114). In one example, the navigation interface (e.g., 2116A-2116C) comprises three affordances 2116A-2116C. The navigation affordance 2116B associated with the set of user interfaces (e.g., 2108, 2110, 2112) of the partially-displayed user interface 2108 may be highlighted (or the like) to aid user navigation. In some examples, a compact navigation affordance is displayed at the bottom of the display of a user interface (e.g., 2114) of a set of user interfaces (e.g., 2114).

The device receives a third user input associated with the second navigation affordance (e.g., 2116C) of the navigation interface (e.g., 2116A-2116C). In response to receiving the third user input, the device ceases display of the first set of user interfaces (e.g., 2108, 2110, 2112) and the navigation interface (e.g., 2116A-2116C) and displays a first user interface (e.g., 2114) of the second set of user interfaces (e.g., 2114). For example, the device receives a touch on affordance 2116C, which is associated with the songs set of user interfaces 2114, and displays a list of songs, illustrated by user interface 2114. In some examples, navigation affordances 2116A-2116C are still visible, in a compact state, upon the display of the second set of user interfaces.

In accordance with some embodiments, while displaying a user interface (e.g., 2114) of the second set of user interfaces (e.g., 2114), the device receives a fourth input representing a swipe in the first direction. In response to receiving the fourth user input (e.g., a swipe), the device displays the navigation interface (e.g., 2116A-2116C), wherein the navigation interface further comprises a third navigation affordance (e.g., 2116A) associated with a third set of user interfaces (e.g., 2104, 2106). The device receives a fifth user input (e.g., a touch) associated with the third navigation affordance (e.g., 2116A) of the navigation interface (e.g., 2116A-2116C). In response to receiving the fifth user input (e.g., touch), the device ceases display of the second set of user interfaces (e.g., 2114) and the navigation interface (e.g., 2116A-2116C), and displays a first user interface (e.g., 2104) of the third set of user interfaces (e.g., 2104, 2106). For example, the device receives a touch on affordance 2116A, which is associated with the playlist set of user interfaces 2104 and 2106, and displays a list of playlists, illustrated by user interface 2114.

In accordance with some embodiments, the device receives a sixth user input (e.g., rotation) representing movement of the rotatable input mechanism. In response to receiving the sixth user input, the device displays the first audio playback user interface (e.g., 2102).

In accordance with some embodiments, while displaying a user interface (e.g., 2104, 2106, 2108, 2110, 2112, or 2114) of any of the first set of user interfaces (e.g., 2108, 2110, 2112), the second set of user interfaces (e.g., 2114), or the third set of user interfaces (e.g., 2104, 2106), the device receives a seventh user input (e.g., a touch) associated with a selection affordance (e.g., 2114C) of the user interface (e.g., 2114) of any of the first set of user interfaces (e.g., 2108, 2110, 2112), the second set of user interfaces (e.g., 2114), or the third set of user interfaces (e.g., 2104, 2106). In response to receiving the seventh user input (e.g., touch), the device displays a second audio playback user interface (e.g., 2118). For example, the device receives a touch associated with affordance 2114C, representing the song "Approve My Eye" by Atom Band, and in response the device displays a "now playing" screen updated to reflect the selected song. The seventh user input may be associated with a selection affordance representing a song.

In accordance with some embodiments, the first set of user interfaces, the second set of user interfaces, and the third set of user interfaces are each independently selected from the group consisting of: a playlist set of user interfaces (e.g., 2104, 2106), an artist set of user interfaces (e.g., 2108, 2110, 2112), and a songs set of user interfaces (e.g., 2114). The playlist set of user interfaces comprises: a playlist user interface (e.g., 2104), and a list of songs (e.g., 2106) associated with a playlist of the playlist user interface. The artist set of user interfaces comprises: an artist user interface (e.g., 2108), a list of albums (e.g., 2110) associated with an artist of the artist user interface, and a list of songs (e.g., 2112) associated with an album of the list of albums (e.g., 2110). The songs set of user interfaces comprises: a song user interface (e.g., 2114).

FIG. 22 is a flow diagram illustrating an exemplary process for accessing and playing music in accordance with some embodiments. In some embodiments, method 2200 may be performed at an electronic device with a display (e.g., 112, 340, 504) a rotatable input mechanism (e.g., 506), and a touch-sensitive surface (e.g., 112, 355, 504). Some operations in method 2200 may be combined, the order of some operations may be changed, and some operations may be omitted.

In some embodiments, the touch-sensitive surface (e.g., 112, 355, 504) is capable of detecting intensity of touch contacts. Exemplary devices that may perform method 2200 include devices 100, 300, and 500 (FIGS. 1A, 3, and 5A).

Method 2200 provides an intuitive way to access and play music. The method reduces the cognitive burden on a user when using a device to access and play music, thereby creating a more efficient human-machine interface. For battery-operated computing devices, enabling a user to access and play music more quickly and more efficiently conserves power and increases the time between battery charges.

At block 2202, a first audio playback user interface (e.g., 2102) is displayed.

At block 2204, while displaying the first audio playback user interface (e.g., 2102), a first user input representing movement of the rotatable input mechanism is received.

At block 2206, in response to receiving the first user input, display of the first audio playback user interface (e.g., 2102) is ceased and a first user interface (e.g., 2104) of a first set of user interfaces (e.g., 2104, 2106) is displayed.

At block 2208, while displaying a user interface (e.g., 2108) of the first set of user interfaces (e.g., 2108, 2110, 2112), a second user input representing a swipe in a first direction is received.

At block 2210, in response to receiving the second user input, display of a portion of the user interface (e.g., 2108) of the first set of user interfaces (e.g., 2108, 2110, 2112) is replaced with display of a navigation interface (e.g., 2116A-2116C). The navigation interface (e.g., 2116A-2116C) comprises a first navigation affordance (e.g., 2116B) associated with the first set of user interfaces (e.g., 2108, 2110, 2112) and a second navigation affordance (e.g., 2116C) associated with a second set of user interfaces (e.g., 2114).

At block 2212, a third user input associated with the second navigation affordance (e.g., 2116C) of the navigation interface (e.g., 2116A-2116C) is received.

At block 2214, in response to receiving the third user input, display of the first set of user interfaces (e.g., 2108, 2110, 2112) and the navigation interface (e.g., 2116A-2116C) is ceased and a first user interface (e.g., 2114) of the second set of user interfaces (e.g., 2114) is displayed.

In accordance with some embodiments, while displaying a user interface (e.g., 2114) of the second set of user interfaces (e.g., 2114), a fourth input representing a swipe in the first direction is received. In response to receiving the fourth user input, the navigation interface (e.g., 2116A-2116C) is displayed, wherein the navigation interface further comprises a third navigation affordance (e.g., 2116A) associated with a third set of user interfaces (e.g., 2104, 2106). A fifth user input associated with the third navigation affordance (e.g., 2116A) of the navigation interface (e.g., 2116A-2116C) is received. In response to receiving the fifth user input, display of the second set of user interfaces (e.g., 2114) and the navigation interface (e.g., 2116A-2116C) is ceased and a first user interface (e.g., 2104) of the third set of user interfaces (e.g., 2104, 2106) is displayed.

In accordance with some embodiments, a sixth user input representing movement of the rotatable input mechanism is received. In response to receiving the sixth user input, the first audio playback user interface (e.g., 2102) is displayed.

In accordance with some embodiments, while displaying a user interface (e.g., 2104, 2106, 2108, 2110, 2112, or 2114) of any of the first set of user interfaces (e.g., 2108, 2110, 2112), the second set of user interfaces (e.g., 2114), or the third set of user interfaces (e.g., 2104, 2106), a seventh user input is received associated with a selection affordance (e.g., 2114C) of the user interface (e.g., 2114) of any of the first set of user interfaces (e.g., 2108, 2110, 2112), the second set of user interfaces (e.g., 2114), or the third set of user interfaces (e.g., 2104, 2106). In response to receiving the seventh user input, a second audio playback user interface (e.g., 2118) is displayed.

In accordance with some embodiments, the first set of user interfaces, the second set of user interfaces, and the third set of user interfaces are each independently selected from the group consisting of: a playlist set of user interfaces (e.g., 2104, 2106), an artist set of user interfaces (e.g., 2108, 2110, 2112), and a songs set of user interfaces (e.g., 2114). The playlist set of user interfaces comprises: a playlist user interface (e.g., 2104), and a list of songs (e.g., 2106) associated with a playlist of the playlist user interface. The artist set of user interfaces comprises: an artist user interface (e.g., 2108), a list of albums (e.g., 2110) associated with an artist of the artist user interface, and a list of songs (e.g., 2112) associated with an album of the list of albums (e.g., 2110). The songs set of user interfaces comprises: a song user interface.

Figure 23:
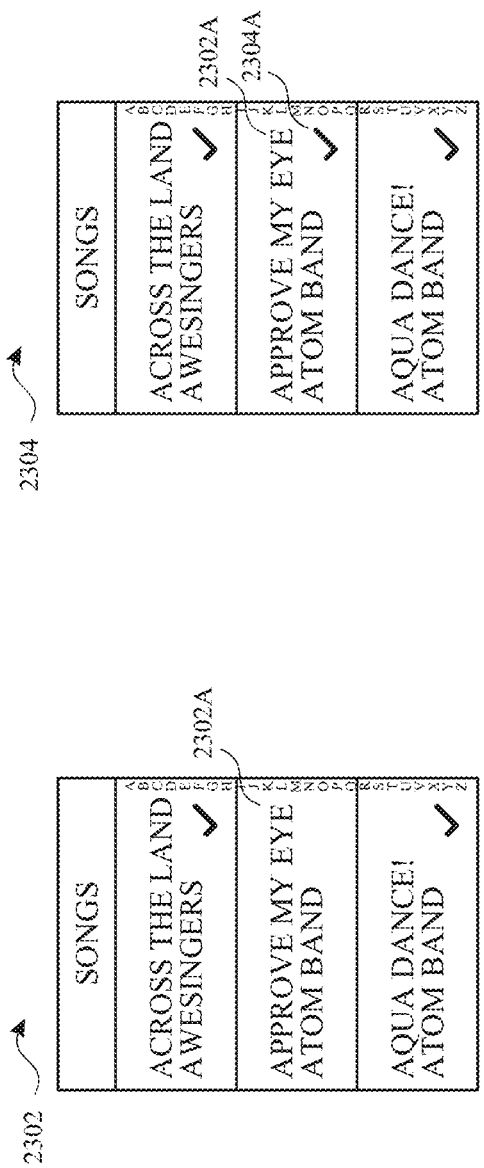
FIG. 23 illustrates an exemplary user interface in accordance with some embodiments.

FIG. 23 illustrates two user interfaces, 2302 and 2304, each illustrating a list of songs. Affordance 2302A, associated with a song, is displayed without an indicator in user interface 2302. In user interface 2304, affordance 2302A is displayed along with an associated indicator 2304A. Indicator 2304A may provide an indication of being stored locally on the electronic device (e.g., the song is available for playback from local memory). In accordance with some embodiments, an indicator (2304A) provides an indication of not being stored locally on the electronic device (e.g., the song is not stored locally, but is available for playback through download or stream from an external electronic device, such as a phone or server). In accordance with some embodiments an indicator (2304A) may provide an indication of not being available for playback (e.g., not stored locally on the electronic and not stored on an external electronic and available for playback through download or stream).

Figure 24:
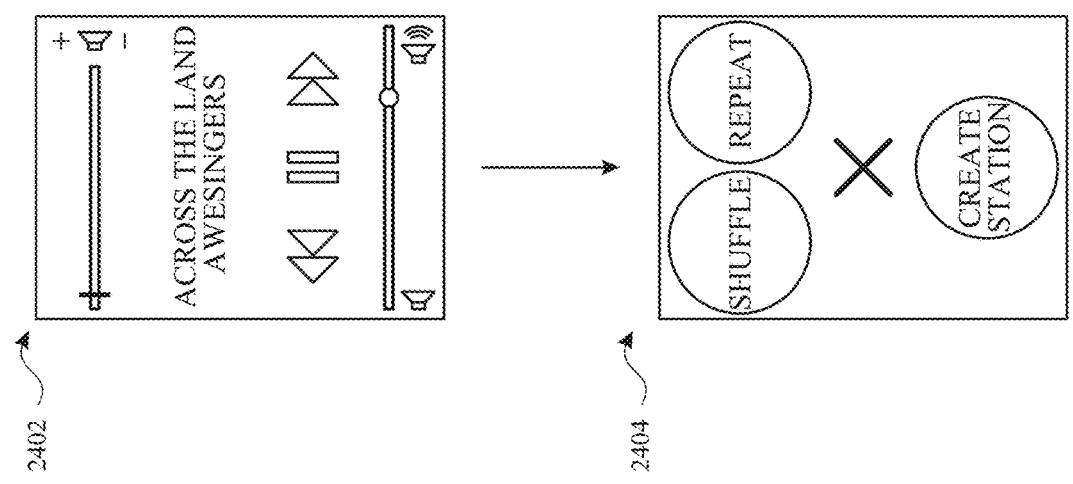
FIG. 24 illustrate an exemplary user interface in accordance with some embodiments.

FIG. 24 illustrates user interfaces for accessing a contextual menu in accordance with some embodiments. In accordance with some embodiments, a first user interface 2402 is displayed. While displaying the first user interface 2402, the device receives a user input (e.g., a touch user input on a touch-sensitive surface or a touch-sensitive display). The device determines whether a characteristic intensity of the user input exceeds an intensity threshold. In accordance with a determination that the user input exceeds the intensity threshold, the device displays a second user interface 2404. The second user interface includes a contextual menu (e.g., one or more affordances, which, when activated, perform a function). In some examples, the location of the user input on the touch-sensitive display is irrelevant when the characteristic intensity of the user input exceeds the intensity threshold. Thus, it doesn't matter where on the touch-sensitive surface the user provides a touch input exceeding the intensity threshold. In accordance with a determination that the user input does not exceed the intensity threshold, the device forgoes displaying the second user interface 2404. Instead, when the characteristic intensity of the user input does not exceed the intensity threshold, the device may perform an action based on the location of the user input.

Figure 25:
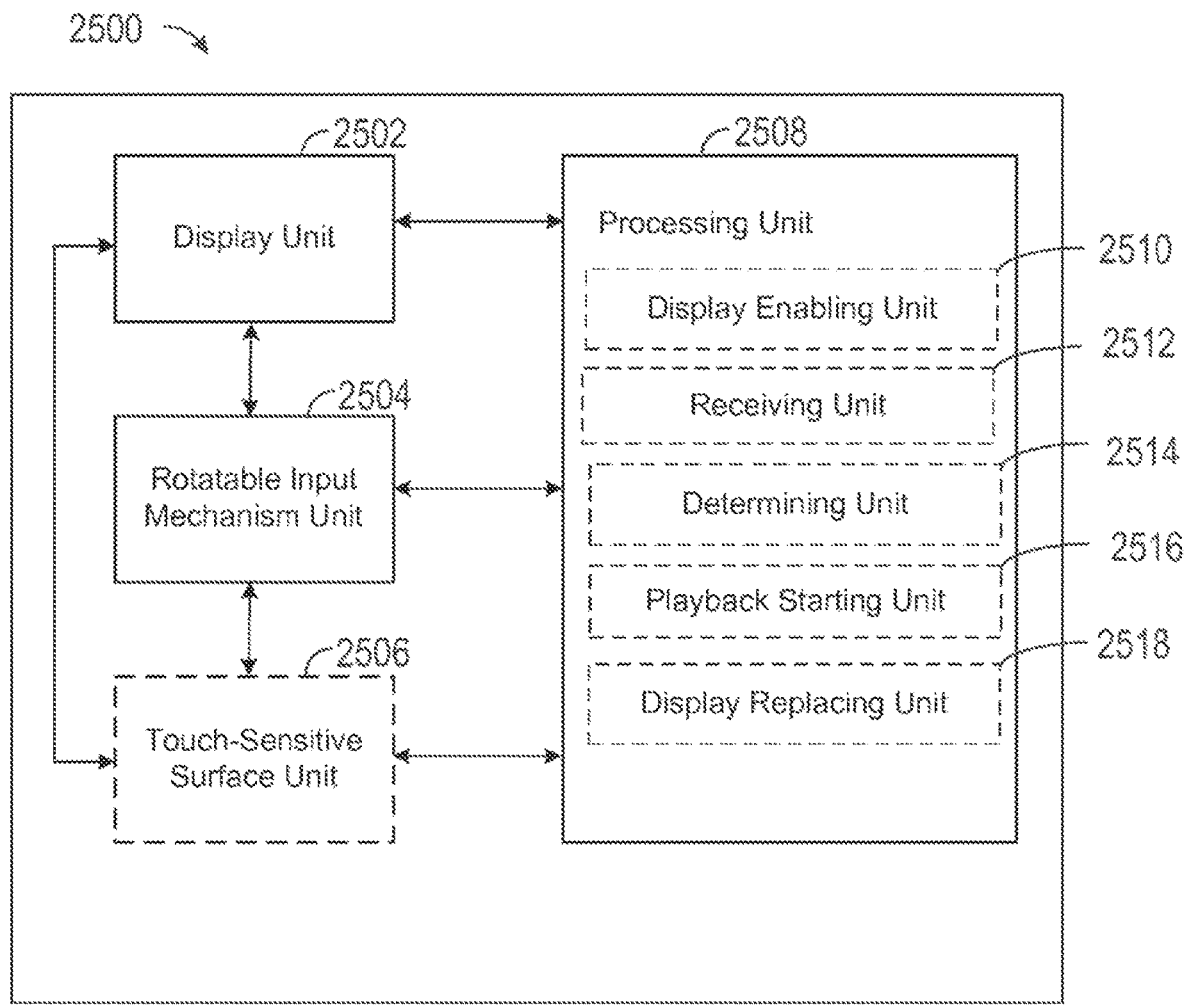
FIG. 25 illustrates a function block diagram of an electronic device in accordance with some embodiments.

In accordance with some embodiments, FIG. 25 shows a functional block diagram of an electronic device 2500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, an electronic device 2500 includes a display unit 2502 configured to display a graphic user interface, a rotatable input mechanism unit 2504 configured to receive movements, an optional touch-sensitive surface unit 2506 configured to receive touches and detect intensity of touches, and a processing unit 2508 coupled to the display unit 2502, the rotatable input mechanism unit 2504, and the optional touch-sensitive surface unit 2506. In some embodiments, the processing unit 2508 includes a display enabling unit 2510, a receiving unit 2512, a determining unit 2514, a playback starting unit 2516, and a display replacing unit 2518.

The processing unit 2508 is configured to: enable display (e.g., with display enabling unit 2510) of, on the display, an affordance representing a music application; receive (e.g., with receiving unit 2512) user input representing movement of the rotatable input mechanism; in response to receiving the user input representing the movement of the rotatable input mechanism, enable display (e.g., with display enabling unit 2510) of a landing screen of the music application, wherein the landing screen includes display of a playlist affordance, an artist list affordance, and a song list affordance. The processing unit 2508 is further configured to receive (e.g., with receiving unit 2512) user input associated with the landing screen; determine (e.g., with determining unit 2514) whether the user input associated with the landing screen represents a touch associated with the playlist affordance, the artist affordance, or the song affordance; in response to receiving the user input associated with the landing screen and in accordance with a determination that the user input associated with the landing screen represents a touch associated with the playlist affordance, enable display (e.g., with display enabling unit 2510) of, on the display, one or more playlist selection affordances; in response to receiving the user input associated with the landing screen and in accordance with a determination that the user input associated with the landing screen represents a touch associated with the artist list affordance, enable display (e.g., with display enabling unit 2510) of, on the display, one or more artist selection affordances; and in response to receiving the user input associated with the landing screen and in accordance with a determination that the user input associated with the landing screen represents a touch associated with the song list affordance, enable display (e.g., with display enabling unit 2510) of, on the display, one or more song selection affordances.

In some embodiments, the electronic device includes a touch-sensitive surface configured to receive touches and detect intensity of touches, and the processing unit 2508 is further configured to: while displaying the one or more playlist selection affordances, receive (e.g., with receiving unit 2512) user input representing a touch on a playlist selection affordance of the one or more playlist selection affordances; determine (e.g., with determining unit 2514) whether a characteristic intensity of the touch on the playlist selection affordance exceeds an intensity threshold; and in accordance with a determination that the characteristic intensity of the touch on the playlist selection affordance exceeds the intensity threshold, enable display (e.g., with display enabling unit 2510) of, on the display, a first set of affordances.

In some embodiments, the first set of affordances includes a source affordance.

In some embodiments, the processing unit 2508 is further configured to: in response to receiving the user input representing the touch on the playlist selection affordance and in accordance with a determination that the characteristic intensity of the touch on the playlist selection affordance does not exceed the intensity threshold, enable display (e.g., with display enabling unit 2510) of, on the display, one or more song selection affordances of a playlist associated with the playlist selection affordance.

In some embodiments, the processing unit 2508 is further configured to: while displaying the one or more song selection affordances of the playlist, receive (e.g., with receiving unit 2512) user input representing a touch on a song selection affordance of the one or more song selection affordances of the playlist; determine (e.g., with determining unit 2514) whether a characteristic intensity of the touch on the song selection affordance exceeds an intensity threshold; and in accordance with a determination that the characteristic intensity of the touch on the song selection affordance exceeds the intensity threshold, enable display (e.g., with display enabling unit 2510) of, on the display, a second set of affordances.

In some embodiments, the second set of affordances includes one or more of a shuffle affordance and a source affordance.

In some embodiments, the processing unit 2508 is further configured to: in response to receiving the user input representing the touch on the song selection affordance and in accordance with a determination that the characteristic intensity of the touch on the song selection affordance does not exceed the intensity threshold: enable display (e.g., with display enabling unit 2510) of, on the display, an audio playback user interface, and start audio playback (e.g., with playback starting unit 2516) of an audio file associated with the song selection affordance.

In some embodiments, the electronic device includes a touch-sensitive surface unit configured to receive touches and detect intensity of touches and coupled to the processing unit 2508, and the processing unit 2508 is further configured to: while displaying the one or more artist selection affordances, receive (e.g., with receiving unit 2512) user input representing a touch on an artist selection affordance of the one or more artist selection affordances; determine (e.g., with determining unit 2514) whether a characteristic intensity of the touch on the artist selection affordance exceeds an intensity threshold; and in accordance with a determination that the characteristic intensity of the touch on the artist selection affordance exceeds the intensity threshold, enable display (e.g., with display enabling unit 2510) of, on the display, a third set of affordances.

In some embodiments, the third set of affordances includes a source affordance.

In some embodiments, the processing unit 2508 is further configured to: in response to receiving the user input representing the touch on the artist selection affordance and in accordance with a determination that the characteristic intensity of the touch on the artist selection affordance does not exceed the intensity threshold, enable display (e.g., with display enabling unit 2510) of, on the display, one or more album selection affordances of an artist associated with the artist selection affordance.

In some embodiments, the processing unit 2508 is further configured to: while displaying the one or more album selection affordances of the artist, receive (e.g., with receiving unit 2512) user input representing a touch on an album selection affordance of the one or more album selection affordances of the artist; determine (e.g., with determining unit 2514) whether a characteristic intensity of the touch on the album selection affordance exceeds an intensity threshold; and in accordance with a determination that the characteristic intensity of the touch on the album selection affordance exceeds the intensity threshold, enable display (e.g., with display enabling unit 2510) of, on the display, a fourth set of affordances.

In some embodiments, the fourth set of affordances includes a source affordance.

In some embodiments, the processing unit 2508 is further configured to: in response to receiving the user input representing the touch on the album selection affordance and in accordance with a determination that the characteristic intensity of the touch on the album selection affordance does not exceed the intensity threshold, enable display (e.g., with display enabling unit 2510) of, on the display, one or more song selection affordances of an album associated with the album selection affordance.

In some embodiments, the processing unit 2508 is further configured to: while displaying the one or more song selection affordances of the album associated with the album selection affordance, receive (e.g., with receiving unit 2512) user input representing a touch on a song selection affordance of the one or more song selection affordances of the album associated with the album selection affordance; determine (e.g., with determining unit 2514) whether a characteristic intensity of the touch on the song selection affordance exceeds an intensity threshold; and in accordance with a determination that the characteristic intensity of the touch on the song selection affordance exceeds the intensity threshold, enable display (e.g., with display enabling unit 2510) of, on the display, a fifth set of affordances.

In some embodiments, the fifth set of affordances includes one or more of a shuffle affordance and a source affordance.

In some embodiments, the processing unit 2508 is further configured to: in response to receiving the user input representing the touch on the song selection affordance and in accordance with a determination that the characteristic intensity of the touch on the song selection affordance does not exceed the intensity threshold: enable display (e.g., with display enabling unit 2510) of, on the display, an audio playback user interface, and start audio playback (e.g., with playback starting unit 2516) of an audio file associated with the song selection affordance.

In some embodiments, the electronic device includes a touch-sensitive surface unit configured to receive touches and detect intensity of touches and coupled to the processing unit 2508, and the processing unit 2508 is further configured to: while displaying the one or more song selection affordances, receive (e.g., with receiving unit 2512) user input representing a touch on a song selection affordance of the one or more song selection affordances; determine (e.g., with determining unit 2514) whether a characteristic intensity of the touch on the song selection affordance exceeds an intensity threshold; and in accordance with a determination that the characteristic intensity of the touch on the song selection affordance exceeds the intensity threshold, enable display (e.g., with display enabling unit 2510) of, on the display, a sixth set of affordances.

In some embodiments, the sixth set of affordances includes one or more of a shuffle affordance and a source affordance.

In some embodiments, the processing unit 2508 is further configured to: in response to receiving the user input representing the touch on the song selection affordance and in accordance with a determination that the characteristic intensity of the touch on the song selection affordance does not exceed the intensity threshold: enable display (e.g., with display enabling unit 2510) of, on the display, an audio playback user interface, and start audio playback (e.g., with playback starting unit 2516) of an audio file associated with the song selection affordance.

In some embodiments, the processing unit 2508 is further configured to: while displaying the audio playback user interface, receive (e.g., with receiving unit 2512) user input representing a touch on the audio playback user interface; determine (e.g., with determining unit 2514) whether a characteristic intensity of the touch on the audio playback user interface exceeds an intensity threshold; and in accordance with a determination that the characteristic intensity of the touch on the audio playback user interface exceeds the intensity threshold, enable display (e.g., with display enabling unit 2510) of, on the display, a seventh set of affordances.

In some embodiments, the seventh set of affordances includes one or more of a shuffle affordance, a repeat affordance, and a source affordance.

In some embodiments, the processing unit 2508 is further configured to: receive (e.g., with receiving unit 2512) user input; in response to receiving the user input, enable display (e.g., with display enabling unit 2510) of, on the display the affordance representing the music application; determine (e.g., with determining unit 2514) whether the music application is currently playing an audio file; and in accordance with a determination that the music application is currently playing an audio file, enable display (e.g., with display enabling unit 2510) of an affordance representing the audio playback user interface; receive (e.g., with receiving unit 2512) user input representing a touch on the affordance representing the audio playback user interface; and in response to receiving the user input representing the touch on the affordance representing the audio playback user interface, enable display (e.g., with display enabling unit 2510) of, on the display, the audio playback user interface.

In some embodiments, the processing unit 2508 is further configured to: receive (e.g., with receiving unit 2512) user input; in response to receiving the user input, enable display (e.g., with display enabling unit 2510) of, a user interface for an application, wherein the application and the music application are different applications; determine (e.g., with determining unit 2514) whether the music application is currently playing an audio file; in accordance with a determination that the music application is currently playing an audio file, enable display (e.g., with display enabling unit 2510) of an affordance representing the audio playback user interface; and wherein the affordance representing the audio playback user interface and the user interface for the application are displayed concurrently.

In some embodiments, the processing unit 2508 is further configured to: receive (e.g., with receiving unit 2512) user input representing a touch on the affordance representing the audio playback user interface; and in response to receiving the user input representing the touch on the affordance representing the audio playback user interface, replace display (e.g., with display replacing unit 2518) of the user interface for the application with display of a user interface for the music application.

In some embodiments, the user interface for the music application comprises the audio playback user interface.

In some embodiments, the processing unit 2508 is further configured to: determine (e.g., with determining unit 2514) whether the music application is currently playing an audio file; in accordance with a determination that the music application is currently playing an audio file, enable display (e.g., with display enabling unit 2510) of an affordance representing the audio playback user interface; receive (e.g., with receiving unit 2512) user input representing a touch on the affordance representing the audio playback user interface; and in response to receiving the user input representing the touch on the affordance representing the audio playback user interface, enable display (e.g., with display enabling unit 2510) of, on the display, the audio playback user interface.

In some embodiments, the processing unit 2508 is further configured to: determine (e.g., with determining unit 2514) whether a phone call is currently active, the currently active phone call associated with a phone application; in accordance with a determination that a phone call is currently active, enable display (e.g., with display enabling unit 2510) of an affordance representing the phone application, wherein the affordance representing the phone application and the affordance representing the audio playback user interface are displayed concurrently; receive (e.g., with receiving unit 2512) user input representing a touch on the affordance representing the phone application; and in response to receiving the user input representing the touch on the affordance representing the phone application, enable display (e.g., with display enabling unit 2510) of, on the display, a user interface of the phone application.

In some embodiments, the song selection affordance of the one or more song selection affordances includes an indication of being stored locally on the electronic device.

In some embodiments, the song selection affordance of the one or more song selection affordances includes an indication of not being stored locally on the electronic device.

In some embodiments, the song selection affordance of the one or more song selection affordances includes an indication of being stored on an external electronic device.

The operations described above with reference to FIG. 7 are, optionally, implemented by components depicted in FIGS. 1A-1B or FIG. 25. For example, display operation at block 702, receive operation at block 704, display operation at block 706, receive operation at block 708, determine operation at block 710, display operation at block 712, display operation at block 714, and display operation at block 716 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26:
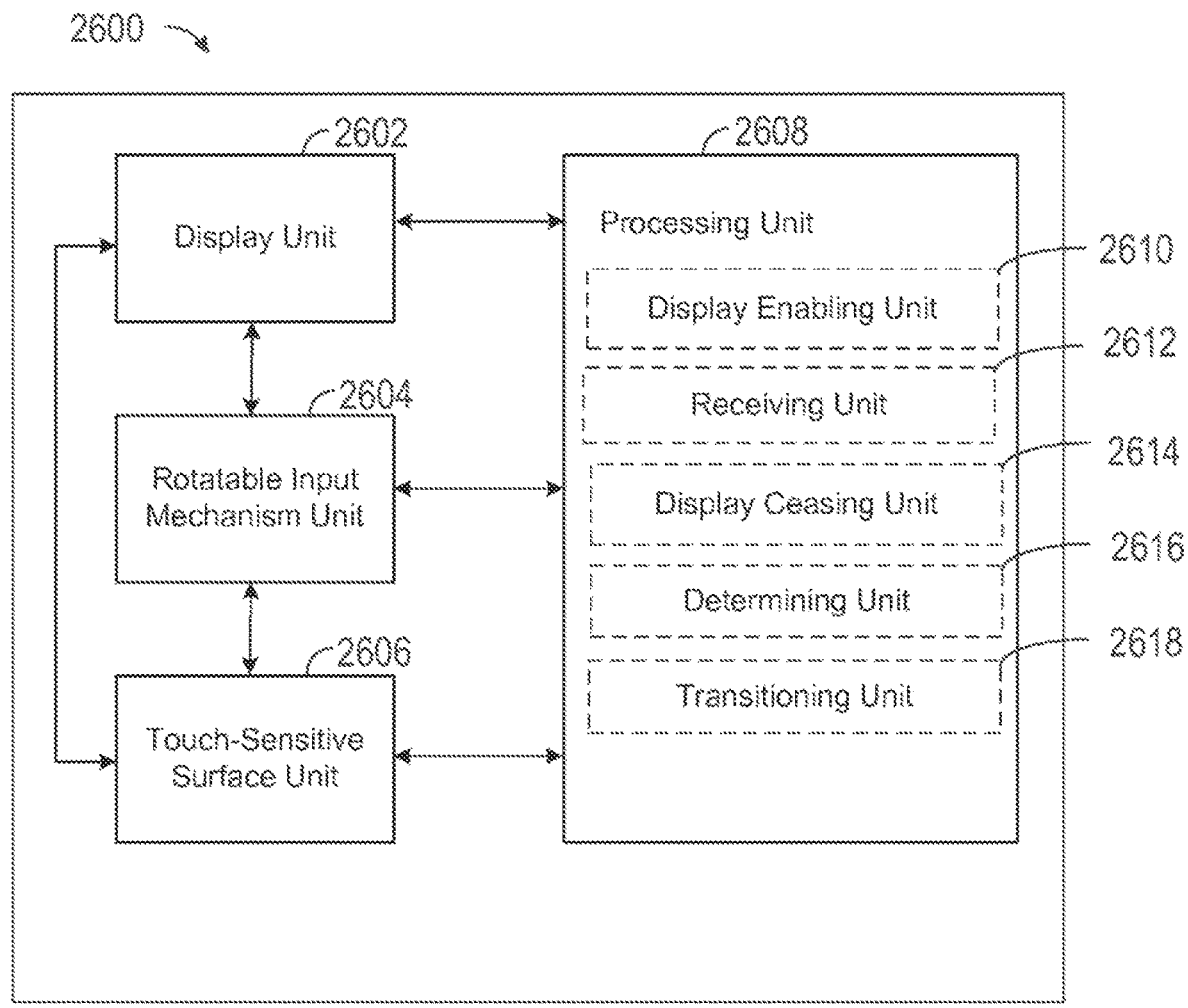
FIG. 26 illustrates a function block diagram of an electronic device in accordance with some embodiments.

In accordance with some embodiments, FIG. 26 shows a functional block diagram of an electronic device 2600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 26 are, optionally, combined or separated into sub-blocks to implement the principles of the various described embodiments. Therefore, the description herein optionally supports any possible combination or separation or further definition of the functional blocks described herein.

As shown in FIG. 26, an electronic device 2600 includes a display unit 2602 configured to display a graphic user interface, a rotatable input mechanism unit 2604 configured to receive movements, a touch-sensitive surface unit 2606 configured to receive contacts, and a processing unit 2608 coupled to the display unit 2602, the rotatable input mechanism unit 2604, and the touch-sensitive surface unit 2606. In some embodiments, the processing unit 2608 includes a display enabling unit 2610, a receiving unit 2612, a display ceasing unit 2614, a determining unit 2616, and a transitioning unit 2618.

The processing unit 2608 is configured to: enable display (e.g., with display enabling unit 2610) of an audio playback user interface; receive (e.g., with receiving unit 2612) a first user input representing movement of the rotatable input mechanism in a rotation direction; in response to receiving the first user input representing the movement of the rotatable input mechanism in the rotation direction, cease display (e.g., with display ceasing unit 2614) of the audio playback user interface and enable display (e.g., with display enabling unit 2610) of a navigation screen of a music application, wherein the navigation screen includes a playlist affordance, an artist list affordance, and a song list affordance; receive (e.g., with receiving unit 2612) a second user input associated with the navigation screen; determine (e.g., with determining unit 2616) whether the second user input represents a contact on the touch-sensitive surface associated with the playlist affordance, the artist list affordance, or the song list affordance; in response to receiving the second user input and in accordance with a determination that the second user input represents a contact associated with the playlist affordance, cease display (e.g., with display ceasing unit 2614) of the navigation screen and enable display (e.g., with display enabling unit 2610) of a first playlist user interface of two or more playlist user interfaces; in response to receiving the second user input and in accordance with a determination that the second user input represents a contact associated with the artist list affordance, cease display (e.g., with display ceasing unit 2614) of the navigation screen and enable display (e.g., with display enabling unit 2610) of an artist user interface of two or more artist user interfaces; and in response to receiving the second user input and in accordance with a determination that the second user input represents a contact associated with the song list affordance, cease display (e.g., with display ceasing unit 2614) of the navigation screen and enable display (e.g., with display enabling unit 2610) of a song user interface of one or more song user interfaces.

In some embodiments, the processing unit 2608 is further configured to: while displaying one of the two or more playlist user interfaces, receive (e.g., with receiving unit 2612) one or more playlist navigation inputs; in response to receiving the one or more playlist navigation inputs, transition (e.g., with transitioning unit 2618) one or more times among each of the two or more playlist user interfaces to display a last-displayed playlist user interface of the two or more playlist user interfaces; while displaying the last-displayed playlist user interface, receive (e.g., with receiving unit 2612) a first directional swipe; in response to receiving the first directional swipe and in accordance with a determination that the first directional swipe represents a swipe in a first direction, cease display (e.g., with display ceasing unit 2614) of the last-displayed playlist user interface and enable display (e.g., with display enabling unit 2610) of the artist user interface of the two or more artist user interfaces; while displaying the artist user interface of the two or more artist user interfaces, receive (e.g., with receiving unit 2612) a second directional swipe; in response to receiving the second directional swipe, cease display (e.g., with display ceasing unit 2614) of the artist user interface of the two or more artist user interfaces and enable display (e.g., with display enabling unit 2610) of the last-displayed playlist user interface of the two or more playlist user interfaces.

The some embodiments, the processing unit 2608 is further configured to: while displaying one of the two or more playlist user interfaces, receive (e.g., with receiving unit 2612) one or more playlist navigation inputs; in response to receiving the one or more playlist navigation inputs, transition (e.g., with transitioning unit 2618) one or more times among each of the two or more playlist user interfaces to display a last-displayed playlist user interface of the two or more playlist user interfaces; while displaying the last-displayed playlist user interface, receive (e.g., with receiving unit 2612) a third directional swipe; in response to receiving the third directional swipe and in accordance with a determination that the third directional swipe represents a swipe in a second direction, cease display (e.g., with display ceasing unit 2614) of the last-displayed playlist user interface and enable display (e.g., with display enabling unit 2610) of the song user interface of the one or more song user interfaces; while displaying the song user interface of the one or more song user interfaces, receive (e.g., with receiving unit 2612) a fourth directional swipe; and in response to receiving the fourth directional swipe, cease display (e.g., with display ceasing unit 2614) of the song user interface of the one or more song user interfaces and enable display (e.g., with display enabling unit 2610) of the last-displayed playlist user interface of the two or more playlist user interfaces.

In some embodiments, the processing unit 2608 is further configured to: receive (e.g., with receiving unit 2612) a third user input representing movement of the rotatable input mechanism in a second rotation direction; and in response to receiving the third user input, enable display (e.g., with display enabling unit 2610) of the audio playback user interface.

In some embodiments, the audio playback user interface comprises an affordance for initiating audio playback.

In some embodiments, one playlist user interface of the two or more playlist user interfaces comprises an affordance which, when selected, causes the audio playback user interface to be displayed; one artist user interface of the two or more artist user interfaces comprises an affordance which, when selected, causes the audio playback user interface to be displayed; and one song user interface of the one or more song user interfaces comprises an affordance which, when selected, causes the audio playback user interface to be displayed.

The operations described above with reference to FIG. 10 are, optionally, implemented by components depicted in FIGS. 1A-1B or FIG. 26. For example, display operation at block 1002, receive operation at block 1004, cease display and display operation at block 1006, receive operation at block 1008, determine operation at block 1010, cease display and display operation at block 1012, cease display and display operation at block 1014, and cease display and display operation at block 1016 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 27:
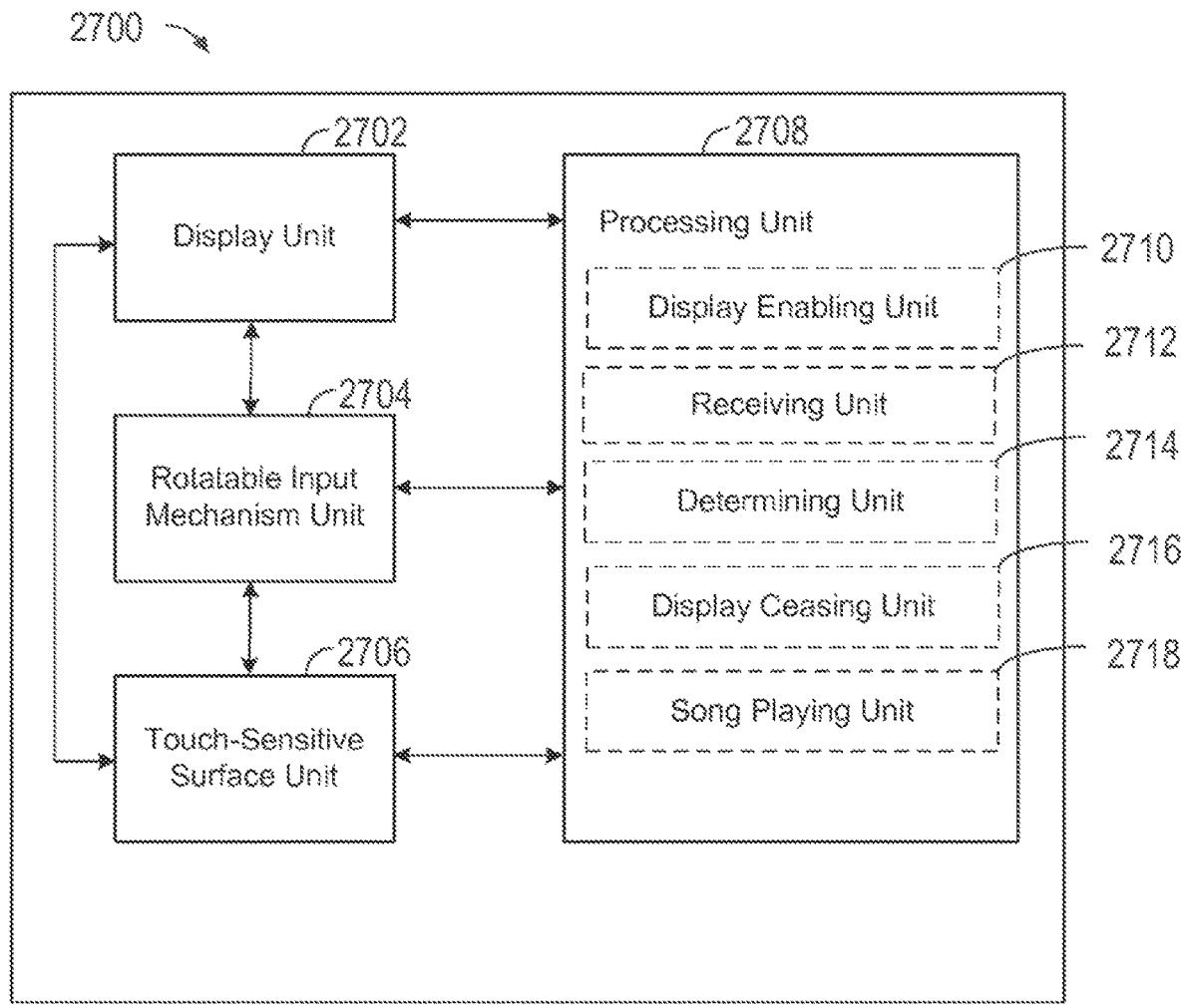
FIG. 27 illustrates a function block diagram of an electronic device in accordance with some embodiments.

In accordance with some embodiments, FIG. 27 shows a functional block diagram of an electronic device 2700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 27 are, optionally, combined or separated into sub-blocks to implement the principles of the various described embodiments. Therefore, the description herein optionally supports any possible combination or separation or further definition of the functional blocks described herein.

As shown in FIG. 27, an electronic device 2700 includes a display unit 2702 configured to display a graphic user interface, a rotatable input mechanism unit 2704 configured to receive movements, a touch-sensitive surface unit 2706 configured to receive contacts, and a processing unit 2708 coupled to the display unit 2702, the rotatable input mechanism unit 2704, and the touch-sensitive surface unit 2706. In some embodiments, the processing unit 2708 includes a display enabling unit 2710, a receiving unit 2712, a determining unit 2714, a display ceasing unit 2716, and a song playing unit 2718.

The processing unit 2708 is configured to: enable display (e.g., with display enabling unit 2710) of a first audio playback user interface; receive (e.g., with receiving unit 2712) user input representing movement of the rotatable input mechanism; in response to receiving the user input representing the movement of the rotatable input mechanism, cease display (e.g., with display ceasing unit 2716) of the first audio playback user interface and enable display (e.g., with display enabling unit 2710) of a first user interface of a first set of user interfaces; receive (e.g., with receiving unit 2712) a first user input representing a directional swipe on the touch-sensitive surface; determine (e.g., with determining unit 2714) whether the first user input represents a swipe in a first direction or a second direction; in response to receiving the first user input and in accordance with a determination that the first user input represents a swipe in the first direction, cease display (e.g., with display ceasing unit 2716) of the first user interface of the first set of user interfaces and enable display (e.g., with display enabling unit 2710) of a first user interface of a second set of user interfaces; and in response to receiving the first user input and in accordance with a determination that the first user input represents a swipe in the second direction, cease display (e.g., with display ceasing unit 2716) of the first user interface of the first set of user interfaces and enable display (e.g., with display enabling unit 2710) of a first user interface of a third set of user interfaces.

In some embodiments, the processing unit 2708 is further configured to: receive (e.g., with receiving unit 2712) a second user input representing a directional swipe on the touch-sensitive surface; in accordance with the determination that the first user input represents a swipe in the first direction, in response to receiving the second user input and, in accordance with a determination that the second user input represents a swipe in the first direction, cease display (e.g., with display ceasing unit 2716) of the second set of user interfaces and enable display (e.g., with display enabling unit 2710) of the first user interface of the third set of user interfaces; and in accordance with the determination that the first user input represents a swipe in the second direction, in response to receiving the second user input, and in accordance with a determination that the second user input represents a swipe in the second direction, cease display (e.g., with display ceasing unit 2716) of the third set of user interfaces and enable display (e.g., with display enabling unit 2710) of the first user interface of the second set of user interfaces.

In some embodiments, the first user interface of the third set of user interfaces comprises a selection affordance; and the processing unit 2708 is further configured to: receive (e.g., with receiving unit 2712) a third user input associated with the selection affordance of the first user interface of the third set of user interfaces; and in response to receiving the third user input, cease display (e.g., with display ceasing unit 2716) of the first user interface of the third set of user interfaces and enable display (e.g., with display enabling unit 2710) of a second audio playback user interface.

In some embodiments, the selection affordance of the first user interface of the third set of user interfaces is a song selection affordance; and the processing unit 2708 is further configured to: in response to receiving the third user input, play a song (e.g., with song playing unit 2718) associated with the selection affordance.

In some embodiments, the selection affordance of the first user interface of the third set of user interfaces is a shuffle all affordance; and the processing unit 2708 is further configured to: in response to receiving the third user input, play a song (e.g., with song playing unit 2718) selected at random from a set of songs associated with the selection affordance.

In some embodiments, the processing unit 2708 is further configured to: prior to receiving the first user input representing a directional swipe, receive (e.g., with receiving unit 2712) user input associated with a selection affordance of the first user interface of the first set of user interfaces; and in response to receiving the user input associated with the selection affordance of the first user interface of the first set of user interfaces, cease display (e.g., with display ceasing unit 2716) of the first user interface of the first set of user interfaces and enable display (e.g., with display enabling unit 2710) of a second user interface of the first set of user interfaces.

In some embodiments, the first set of user interfaces, the second set of user interfaces, and the third set of user interfaces are each independently selected from the group consisting of: a playlist set of user interfaces, an artist set of user interfaces, and a songs set of user interfaces; the playlist set of user interfaces comprises: a playlist user interface, and a list of songs associated with a playlist of the playlist user interface; the artist set of user interfaces comprises: an artist user interface, a list of albums associated with an artist of the artist user interface, and a list of songs associated with an album of the list of albums; and the songs set of user interfaces comprises: a song user interface.

The operations described above with reference to FIG. 12 are, optionally, implemented by components depicted in FIGS. 1A-1B or FIG. 27. For example, display operation at block 1202, receive operation at block 1204, cease display and display operation at block 1206, receive operation at block 1208, determine operation at block 1210, cease display and display operation at block 1212, and cease display and display operation at block 1214 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 28:
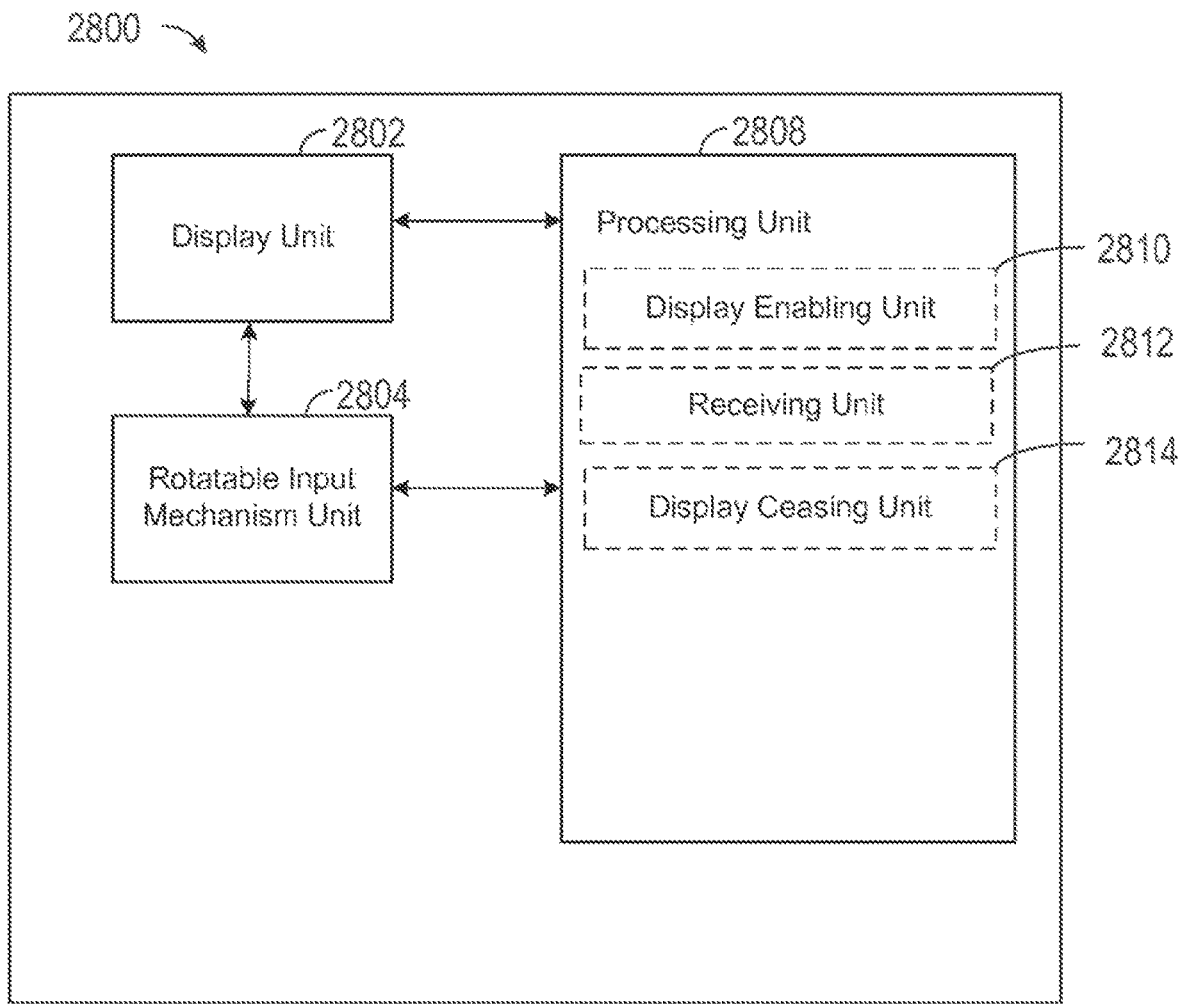
FIG. 28 illustrates a function block diagram of an electronic device in accordance with some embodiments.

In accordance with some embodiments, FIG. 28 shows a functional block diagram of an electronic device 2800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 28 are, optionally, combined or separated into sub-blocks to implement the principles of the various described embodiments. Therefore, the description herein optionally supports any possible combination or separation or further definition of the functional blocks described herein.

As shown in FIG. 28, an electronic device 2800 includes a display unit 2802 configured to display a graphic user interface, a rotatable input mechanism unit 2804 configured to receive movements, and a processing unit 2808 coupled to the display unit 2802 and the rotatable input mechanism unit 2804. In some embodiments, the processing unit 2808 includes a display enabling unit 2810, a receiving unit 2812, and a display ceasing unit 2814.

The processing unit 2808 is configured to: enable display (e.g., with display enabling unit 2810) of an audio playback user interface; receive (e.g., with receiving unit 2812) a first user input representing a directional swipe in a first direction; in response to receiving the first user input, cease display (e.g., with display ceasing unit 2814) of the audio playback user interface and enable display (e.g., with display enabling unit 2810) of a first user interface of a first set of user interfaces, the first user interface of the first set of user interfaces comprising a selection affordance. The processing unit 2808 is further configured to, while displaying a user interface of the first set of user interfaces, receive (e.g., with receiving unit 2812) a second user input representing a directional swipe in a second direction; and in response to receiving the second user input, cease display (e.g., with display ceasing unit 2814) of the first user interface of a first set of user interfaces and enable display (e.g., with display enabling unit 2810) of the audio playback user interface.

In some embodiments, the processing unit 2808 is further configured to: while displaying the first user interface of the first set of user interfaces (e.g., list of playlists), and prior to receiving the second user input, receive (e.g., with receiving unit 2812) a third user input associated with the selection affordance of the first user interface of the first set of user interfaces; and in response to receiving the third user input, cease display (e.g., with display ceasing unit 2814) of the first user interface of a first set of user interfaces and enable display (e.g., with display enabling unit 2810) of a second user interface of the first set of user interfaces, the second user interface of the first set of user interfaces comprising a selection affordance.

In some embodiments, the processing unit 2808 is further configured to: receive (e.g., with receiving unit 2812) a plurality of directional user inputs, wherein the plurality of directional user inputs comprises: a plurality of user inputs representing directional swipes in the first direction, and a plurality of user inputs representing directional swipes in the second direction; and in response to receiving a final user input of the plurality of directional user inputs, enable display (e.g., with display enabling unit 2810) of the audio playback user interface.

In some embodiments, the processing unit 2808 is further configured to: in response to receiving one of the plurality of directional user inputs, enable display (e.g., with display enabling unit 2810) of a first user interface of a second set of user interfaces, the first user interface of the second set of user interfaces comprising a selection affordance.

In some embodiments, the processing unit 2808 is further configured to: receive (e.g., with receiving unit 2812) a fourth user input associated with the selection affordance of the first user interface of the second set of user interfaces; and in response to receiving the fourth user input, cease display (e.g., with display ceasing unit 2814) of the first user interface of the second set of user interfaces and enable display (e.g., with display enabling unit 2810) of a second user interface of the second set of user interfaces comprising a selection affordance.

In some embodiments, the processing unit 2808 is further configured to: receive (e.g., with receiving unit 2812) a fifth user input associated with the selection affordance of the second user interface of the second set of user interfaces; and in response to receiving the fifth user input, cease display (e.g., with display ceasing unit 2814) of the second user interface of the second set of user interfaces and enable display (e.g., with display enabling unit 2810) of the audio playback user interface, wherein the audio playback user interface is updated based on the selection affordance associated with the fifth user input.

In some embodiments, the first set of user interfaces, the second set of user interfaces, and the third set of user interfaces are selected from the group comprising: a playlist set of user interfaces, an artist set of user interfaces, and a songs set of user interfaces; wherein the playlist set of user interfaces comprises: a playlist user interface, and a list of songs associated with a playlist of the playlist user interface; the artist set of user interfaces comprises: an artist user interface, a list of albums associated with an artist of the artist user interface, and a list of songs associated with an album of the list of albums; and the songs set of user interfaces comprises: a song user interface.

The operations described above with reference to FIG. 14 are, optionally, implemented by components depicted in FIGS. 1A-1B or FIG. 28. For example, display operation at block 1402, receive operation at block 1404, cease display and display operation at block 1406, receive operation at block 1408, and cease display and display operation at block 1410 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 29:
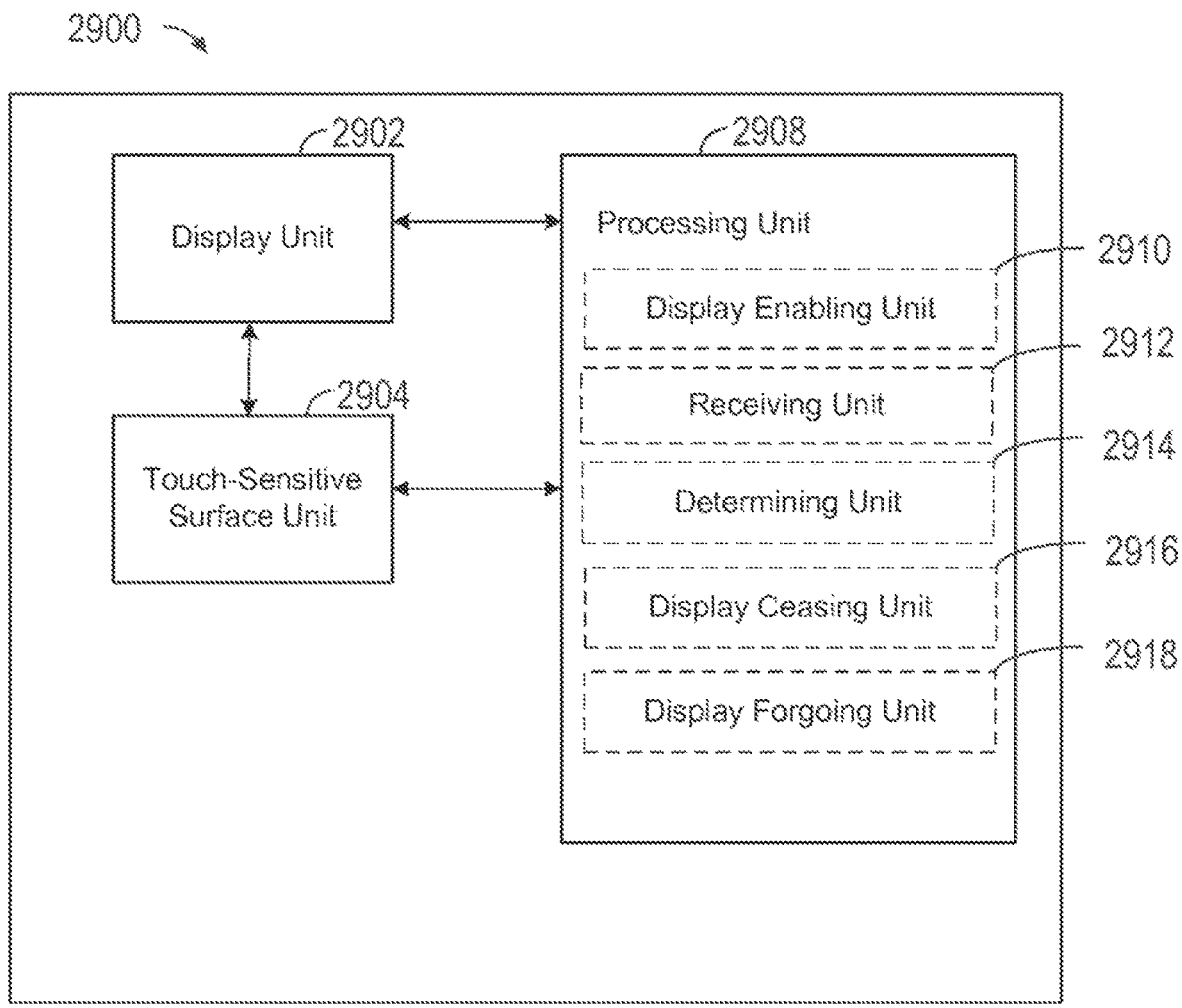
FIG. 29 illustrates a function block diagram of an electronic device in accordance with some embodiments.

In accordance with some embodiments, FIG. 29 shows a functional block diagram of an electronic device 2900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 29 are, optionally, combined or separated into sub-blocks to implement the principles of the various described embodiments. Therefore, the description herein optionally supports any possible combination or separation or further definition of the functional blocks described herein.

As shown in FIG. 29, an electronic device 2900 includes a display unit 2902 configured to display a graphic user interface, a touch-sensitive surface unit 2904 configured to receive contacts, and a processing unit 2908 coupled to the display unit 2902 and the touch-sensitive surface unit 2904. In some embodiments, the processing unit 2908 includes a display enabling unit 2910, a receiving unit 2912, a determining unit 2914, a display ceasing unit 2916, and a display forgoing unit 2918.

The processing unit 2908 is configured to: enable display (e.g., with display enabling unit 2910) of an audio playback user interface; while displaying the audio playback user interface, receive (e.g., with receiving unit 2912) user input representing a first contact on the touch-sensitive surface; determine (e.g., with determining unit 2914) whether a characteristic intensity of the first contact exceeds an intensity threshold; in accordance with a determination that the characteristic intensity of the first contact exceeds the intensity threshold, cease display (e.g., with display ceasing unit 2916) of the audio playback user interface and enable display (e.g., with display enabling unit 2910) of a first set of affordances; receive (e.g., with receiving unit 2912) user input representing a second contact associated with an affordance of the first set of affordances; in response to receiving the second contact, cease display (e.g., with display ceasing unit 2916) of the first set of affordances and enable display (e.g., with display enabling unit 2910) of a first user interface of a first set of user interfaces; and in accordance with a determination that the characteristic intensity of the first contact does not exceed the intensity threshold, forgo display (e.g., with display forgoing unit 2918) of the first set of affordances.

In some embodiments, the determination that the characteristic intensity of the first contact exceeds the intensity threshold is independent of a location of the first contact on the touch-sensitive surface.

In some embodiments, the processing unit 2908 is further configured to: while displaying the first user interface of the first set of user interfaces, receive (e.g., with receiving unit 2912) user input representing a first swipe in a first direction; and in response to receiving the first swipe in the first direction, cease display (e.g., with display ceasing unit 2916) of the first user interface of a first set of user interfaces and enable display (e.g., with display enabling unit 2910) of a first user interface of a second set of user interfaces.

In some embodiments, the processing unit 2908 is further configured to: while displaying the first user interface of the second set of user interfaces, receive (e.g., with receiving unit 2912) user input representing a second swipe in the first direction; and in response to receiving the second swipe, cease display (e.g., with display ceasing unit 2916) of the first user interface of a second set of user interfaces and enable display (e.g., with display enabling unit 2910) of a first user interface of a third set of user interfaces.

In some embodiments, the processing unit 2908 is further configured to: while displaying the first user interface of the first set of user interfaces, receive (e.g., with receiving unit 2912) user input representing a third contact associated with an affordance of the first user interface of the first set of user interfaces; and in response to receiving the third contact, cease display (e.g., with display ceasing unit 2916) of the first user interface of a first set of user interfaces and enable display (e.g., with display enabling unit 2910) of a second user interface of the first set of user interfaces.

In some embodiments, the processing unit 2908 is further configured to: while displaying a user interface of a set of user interfaces, receive (e.g., with receiving unit 2912) user input representing a fourth contact on the touch-sensitive surface; determine (e.g., with determining unit 2914) whether a characteristic intensity of the fourth contact exceeds a second intensity threshold; in accordance with a determination that the characteristic intensity of the fourth contact exceeds the second intensity threshold, enable display (e.g., with display enabling unit 2910) of a second set of affordances; receive (e.g., with receiving unit 2912) user input representing a fifth contact associated with an affordance of the second set of affordances; in response to receiving the fifth contact, cease display (e.g., with display ceasing unit 2916) of the second set of affordances and enable display (e.g., with display enabling unit 2910) of the audio playback user interface; and in accordance with a determination that the characteristic intensity of the first contact does not exceed the intensity threshold, forgo display (e.g., with display forgoing unit 2918) of the second set of affordances.

In some embodiments, the first set of user interfaces, the second set of user interfaces, and the third set of user interfaces are each independently selected from the group consisting of: a playlist set of user interfaces, an artist set of user interfaces, and a songs set of user interfaces; the playlist set of user interfaces comprises: a playlist user interface, and a list of songs associated with a playlist of the playlist user interface; the artist set of user interfaces comprises: an artist user interface, a list of albums associated with an artist of the artist user interface, and a list of songs associated with an album of the list of albums; and the songs set of user interfaces comprises: a song user interface.

The operations described above with reference to FIG. 16 are, optionally, implemented by components depicted in FIGS. 1A-1B or FIG. 29. For example, display operation at block 1602, receive operation at block 1604, determine operation at block 1606, cease display and display operation at block 1608, receive operation at block 1610, cease display and display operation at block 1612, and forgo display operation at block 1614 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 30:
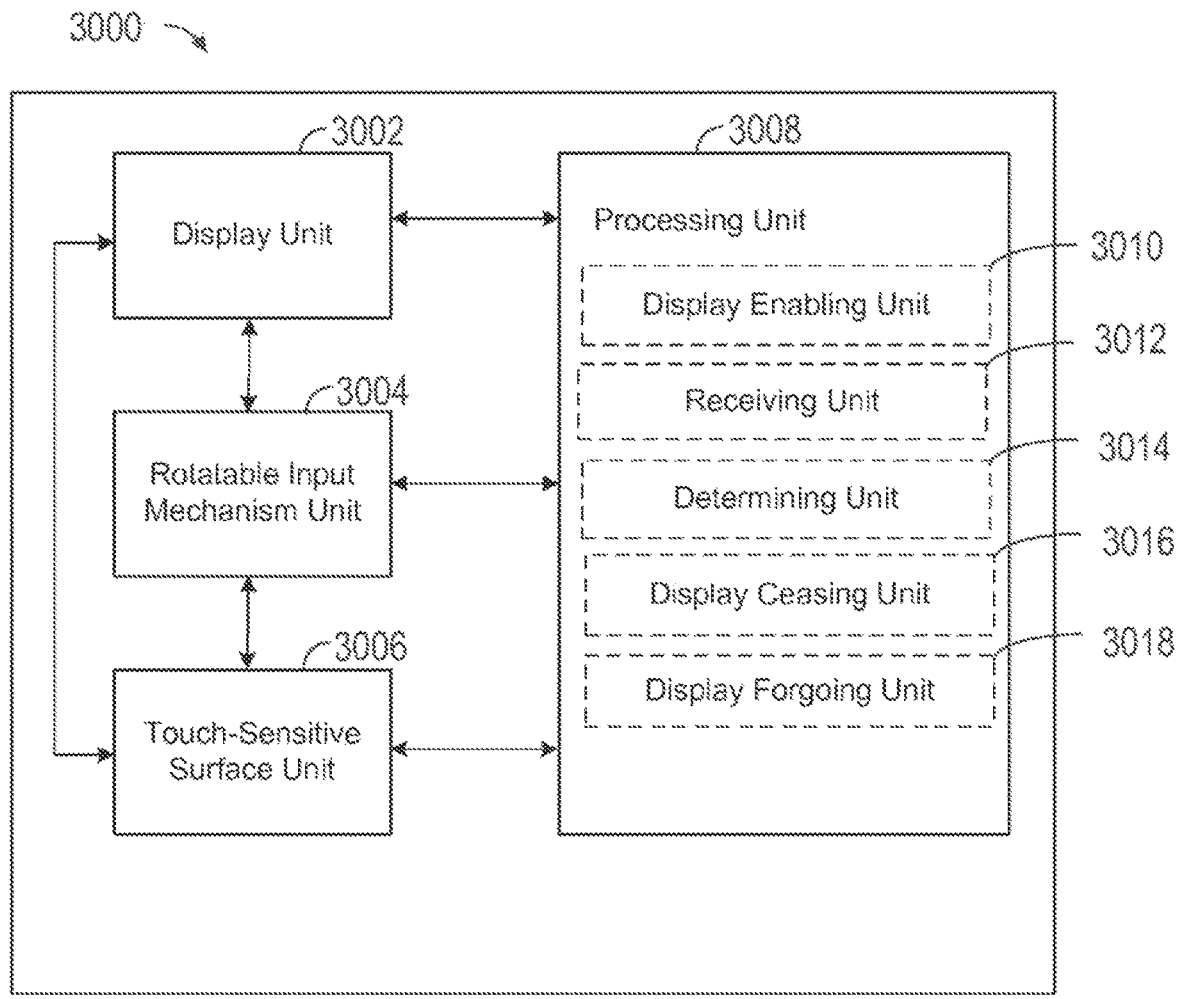
FIG. 30 illustrates a function block diagram of an electronic device in accordance with some embodiments.

In accordance with some embodiments, FIG. 30 shows a functional block diagram of an electronic device 3000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 30 are, optionally, combined or separated into sub-blocks to implement the principles of the various described embodiments. Therefore, the description herein optionally supports any possible combination or separation or further definition of the functional blocks described herein.

As shown in FIG. 30, an electronic device 3000 includes a display unit 3002 configured to display a graphic user interface, a rotatable input mechanism unit 3004 configured to receive movements, a touch-sensitive surface unit 3006 configured to receive contacts, and a processing unit 3008 coupled to the display unit 3002, the rotatable input mechanism unit 3004, and the touch-sensitive surface unit 3006. In some embodiments, the processing unit 3008 includes a display enabling unit 3010, a receiving unit 3012, a determining unit 3014, a display ceasing unit 3016, and a display forgoing unit 3018.

The processing unit 3008 is configured to: enable display (e.g., with display enabling unit 3010) of a first audio playback user interface; receive (e.g., with receiving unit 3012) user input representing a first movement of the rotatable input mechanism; in response to receiving the user input representing the first movement of the rotatable input mechanism, cease display (e.g., with display ceasing unit 3016) of the first audio playback user interface and enable display (e.g., with display enabling unit 3010) of a first user interface of a first set of user interfaces; while displaying a user interface of the first set of user interfaces, receive (e.g., with receiving unit 3012) user input representing a first contact on the touch-sensitive surface. The processing unit 3008 is further configured to determine (e.g., with determining unit 3014) whether a characteristic intensity of the first contact exceeds an intensity threshold; in accordance with a determination that the characteristic intensity of the first contact exceeds the intensity threshold, cease display (e.g., with display ceasing unit 3016) of first set of user interfaces and enable display (e.g., with display enabling unit 3010) of a first set of affordances; receive (e.g., with receiving unit 3012) user input associated with a first affordance of the first set of affordances; in response to receiving the user input associated with the first affordance of the first set of affordances, cease display (e.g., with display ceasing unit 3016) of the first set of affordances and enable display (e.g., with display enabling unit 3010) of a first user interface of a second set of user interfaces; and in accordance with a determination that the characteristic intensity of the first contact does not exceed the intensity threshold, forgo display (e.g., with display forgoing unit 3018) of the first set of affordances.

In some embodiments, the processing unit 3008 is further configured to: while displaying a user interface of the second set of user interfaces, receive (e.g., with receiving unit 3012) user input representing a second contact on the touch-sensitive surface; determine (e.g., with determining unit 3014) whether a characteristic intensity of the second contact exceeds a second intensity threshold; in accordance with a determination that the characteristic intensity of the second contact exceeds the second intensity threshold, cease display (e.g., with display ceasing unit 3016) of the second set of user interfaces and enable display (e.g., with display enabling unit 3010) of a second set of affordances; receive (e.g., with receiving unit 3012) user input associated with a first affordance of the second set of affordances; in response to receiving the user input associated with the first affordance of the second set of affordances, cease display (e.g., with display ceasing unit 3016) of the second set of affordances and enable display (e.g., with display enabling unit 3010) of a first user interface of a third set of user interfaces; and in accordance with a determination that the characteristic intensity of the second contact does not exceed the second intensity threshold, forgo displaying (e.g., with display forgoing unit 3018) the second set of affordances.

In some embodiments, the first user interface of the third set of user interfaces comprises a selection affordance, and the processing unit 3008 is further configured to: receive (e.g., with receiving unit 3012) user input associated with the selection affordance of the first user interface of the third set of user interfaces; and in response to receiving the user input associated with the selection affordance of the first user interface of the third set of user interfaces, cease display (e.g., with display ceasing unit 3016) of the third set of affordances and enable display (e.g., with display enabling unit 3010) of a second audio playback user interface.

In some embodiments, the processing unit 3008 is further configured to: while displaying a user interface of the third set of user interfaces, receive (e.g., with receiving unit 3012) user input representing a third contact on the touch-sensitive surface; determine (e.g., with determining unit 3014) whether a characteristic intensity of the third contact exceeds the intensity threshold; in accordance with a determination that the characteristic intensity of the third contact exceeds the intensity threshold, cease display (e.g., with display ceasing unit 3016) of the third set of user interfaces and enabling display (e.g., with display enabling unit 3010) of a third set of affordances. The processing unit 3008 is further configured to receive (e.g., with receiving unit 3012) user input associated with a first affordance of the third set of affordances; in response to receiving the user input associated with the first affordance of the third set of affordances, cease display (e.g., with display ceasing unit 3016) of the third set of affordances and enable display (e.g., with display enabling unit 3010) of a most-recently-displayed user interface of the first set of user interfaces; and in accordance with a determination that the characteristic intensity of the third contact does not exceed the intensity threshold, forgo (e.g., with display forgoing unit 3016) displaying the third set of affordances.

In some embodiments, the processing unit 3008 is further configured to: receive (e.g., with receiving unit 3012) user input representing a second movement of the rotatable input mechanism; and in response to receiving the user input representing the second movement of the rotatable input mechanism, enable display (e.g., with display enabling unit 3010) of the first audio playback user interface.

In some embodiments, the first set of user interfaces, the second set of user interfaces, and the third set of user interfaces are each independently selected from the group consisting of: a playlist set of user interfaces, an artist set of user interfaces, and a songs set of user interfaces; the playlist set of user interfaces comprises: a playlist user interface, and a list of songs associated with a playlist of the playlist user interface; the artist set of user interfaces comprises: an artist user interface, a list of albums associated with an artist of the artist user interface, and a list of songs associated with an album of the list of albums; and the songs set of user interfaces comprises: a song user interface.

The operations described above with reference to FIG. 18 are, optionally, implemented by components depicted in FIGS. 1A-1B or FIG. 30. For example, display operation at block 1802, receive operation at block 1804, cease display and display operation at block 1806, receive operation at block 1808, determine operation at block 1810, cease display and display operation at block 1812, receive operation at block 1814, cease display and display operation at block 1816, and forgo display operation at block 1818 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 31:
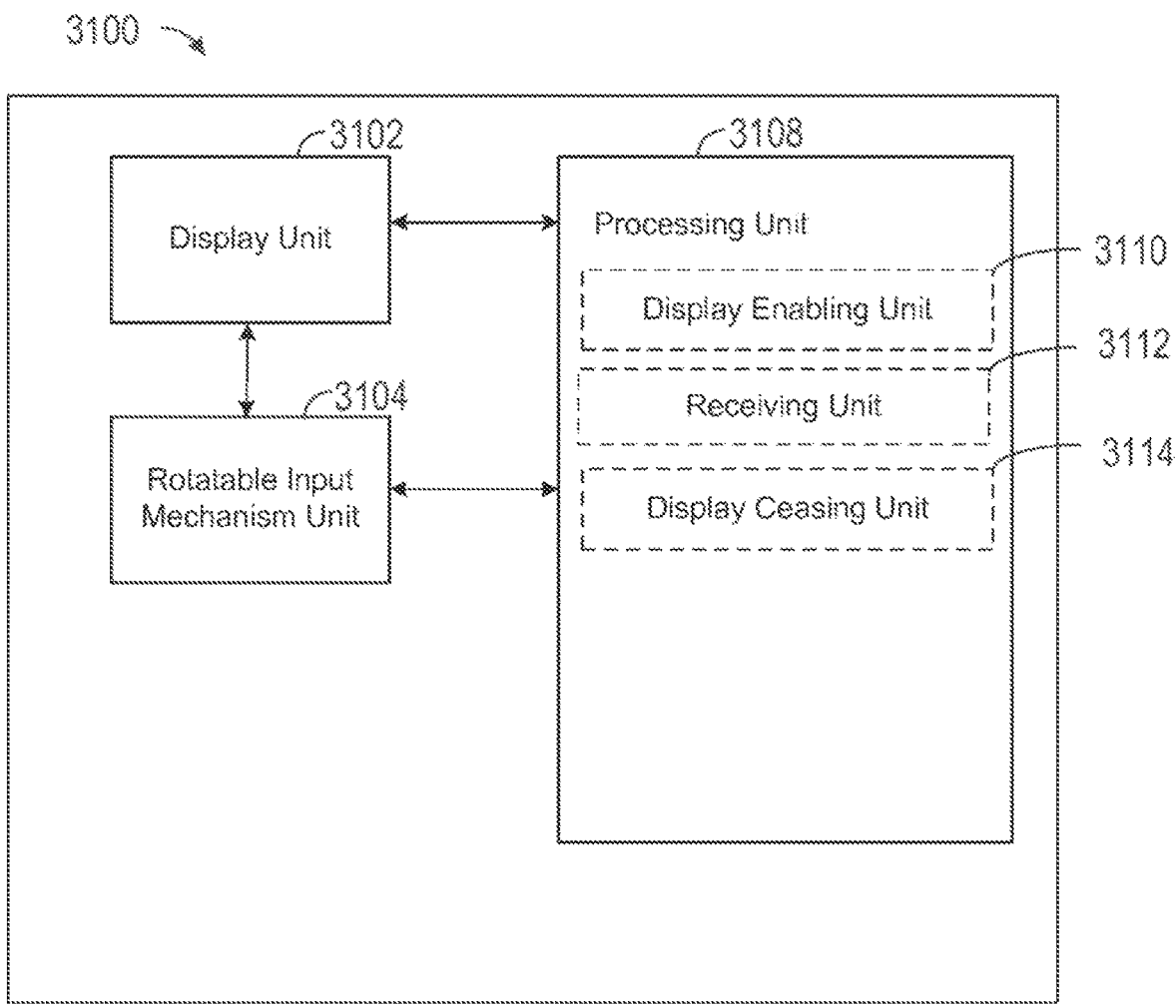
FIG. 31 illustrates a function block diagram of an electronic device in accordance with some embodiments.

In accordance with some embodiments, FIG. 31 shows a functional block diagram of an electronic device 3100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 31 are, optionally, combined or separated into sub-blocks to implement the principles of the various described embodiments. Therefore, the description herein optionally supports any possible combination or separation or further definition of the functional blocks described herein.

As shown in FIG. 31, an electronic device 3100 includes a display unit 3102 configured to display a graphic user interface, a rotatable input mechanism unit 3104 configured to receive movements (e.g., rotations), and a processing unit 3108 coupled to the display unit 3102 and the rotatable input mechanism unit 3104. In some embodiments, the processing unit 3108 includes a display enabling unit 3110, a receiving unit 3112, and a display ceasing unit 3114.

The processing unit 3108 is configured to: enable display (e.g., with display enabling unit 3110) of a first audio application user interface; while displaying the first audio application user interface, receive (e.g., with receiving unit 3112) a first user input representing movement of the rotatable input mechanism in a rotation direction; in response to receiving the first user input, cease display (e.g., with display ceasing unit 3114) of the first audio application user interface and enable display (e.g., with display enabling unit 3110) of a second audio application user interface; while displaying the second audio application user interface, receive (e.g., with receiving unit 3112) a second user input representing movement of the rotatable input mechanism in the rotation direction; and in response to receiving the second user input, cease display (e.g., with display ceasing unit 3114) of the second audio application user interface and enable display (e.g., with display enabling unit 3110) of a third audio application user interface.

In some embodiments, the processing unit 3108 is further configured to: while displaying the third audio application user interface, receive (e.g., with receiving unit 3112) a third user input representing movement of the rotatable input mechanism in the rotation direction; and in response to receiving the third user input, cease display (e.g., with display ceasing unit 3114) of the third audio application user interface and enable display (e.g., with display enabling unit 3110) of a fourth audio application user interface.

In some embodiments, the processing unit 3108 is further configured to: while displaying the fourth audio application user interface, receive (e.g., with receiving unit 3112) a fourth user input representing movement of the rotatable input mechanism in the rotation direction; and in response to receiving the fourth user input, cease display (e.g., with display ceasing unit 3114) of the fourth audio application user interface and enable display (e.g., with display enabling unit 3110) of a fifth audio application user interface.

In some embodiments, one of the first, second, or third audio application user interfaces is an audio playback user interface comprising an affordance for initiating audio playback.

In some embodiments, one of the first, second, or third audio application user interfaces is an albums list user interface.

In some embodiments, the processing unit 3108 is further configured to: while displaying one of the first, second, or third audio application user interfaces, receive (e.g., with receiving unit 3112) user input representing a first selection of an affordance of the displayed audio application user interface; and in response to receiving the user input representing the first selection, cease display (e.g., with display ceasing unit 3114) of one of the first, second, or third audio application user interfaces and enable display (e.g., with display enabling unit 3110) of a detail user interface, wherein the detail user interface comprises content based on the affordance selected by the first selection.

In some embodiments, the processing unit 3108 is further configured to: while displaying one of the first, second, or third audio application user interfaces, receive (e.g., with receiving unit 3112) user input representing a second selection of a playlist affordance associated with a playlist; and in response to receiving the user input representing the second selection, cease display (e.g., with display ceasing unit 3114) of one of the first, second, or third audio application user interfaces and enable display (e.g., with display enabling unit 3110) of a list of songs, wherein the list of songs is based on the playlist.

In some embodiments, the processing unit 3108 is further configured to: while displaying one of the first, second, or third audio application user interfaces, receive (e.g., with receiving unit 3112) user input representing a third selection of an artist affordance associated with an artist; and in response to receiving the user input representing the third selection, cease display (e.g., with display ceasing unit 3114) of one of the first, second, or third audio application user interfaces and enable display (e.g., with display enabling unit 3110) of a list of albums, wherein the list of albums is based on the artist.

In some embodiments, the first audio application user interface, the second audio application user interface, the third audio application user interface, the fourth audio application user interface, and the fifth audio application user interface are each independently selected from the group consisting of: a playlists user interface, an artist user interface, a song user interface, an albums user interface, and an audio playback user interface.

In some embodiments, the playlists user interface comprises: a list of songs associated with a playlist of the playlist list user interface; and the artist user interface comprises: an artist list user interface, a list of albums associated with an artist of the artist list user interface, and a list of songs associated with an album of the list of albums.

In some embodiments, the first, second, and third audio application user interfaces are each different.

The operations described above with reference to FIG. 20 are, optionally, implemented by components depicted in FIGS. 1A-1B or FIG. 31. For example, display operation at block 2002, receive operation at block 2004, cease display and display operation at block 2006, receive operation at block 2008, and cease display and display operation at block 2010 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 32:
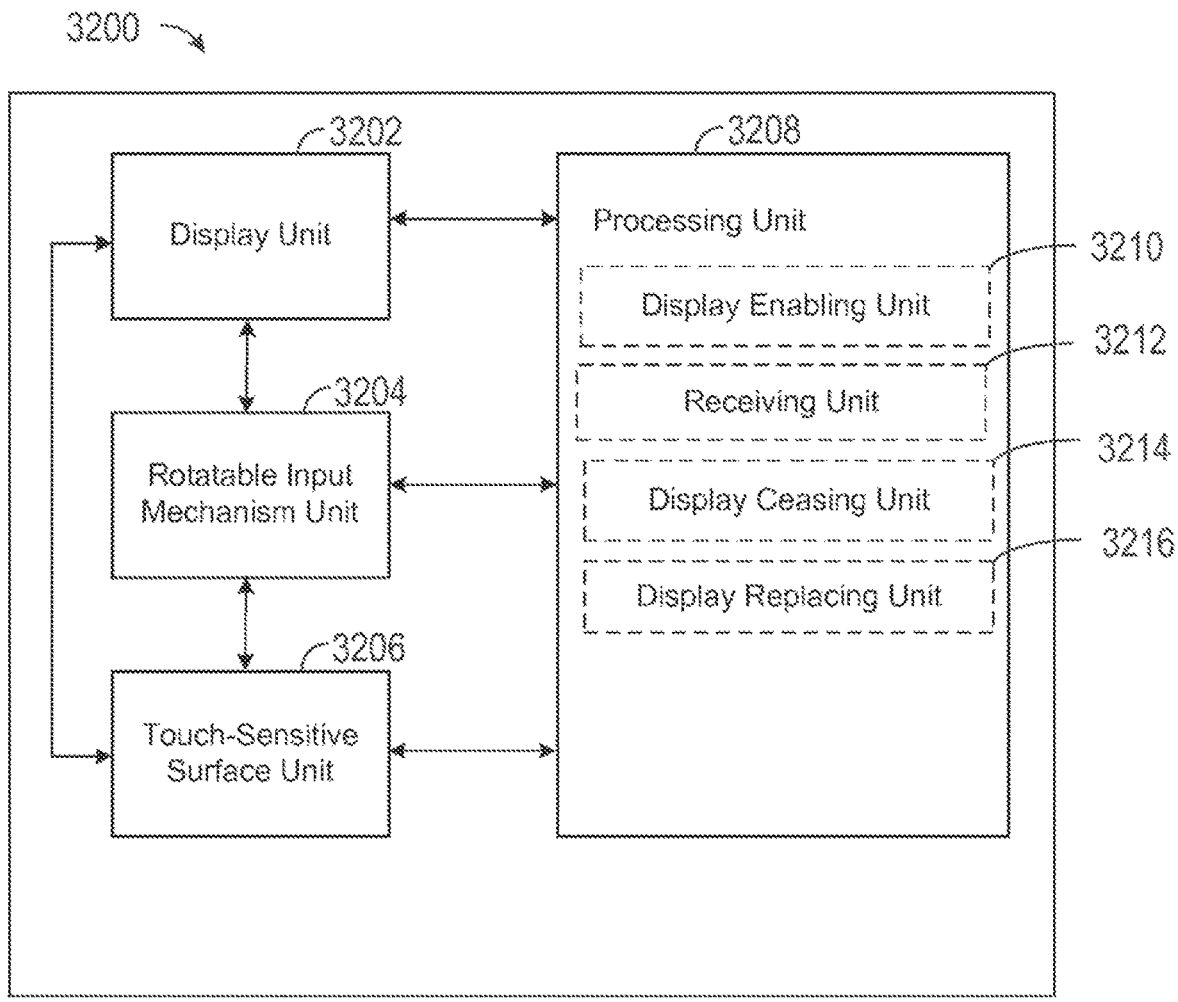
FIG. 32 illustrates a function block diagram of an electronic device in accordance with some embodiments.

In accordance with some embodiments, FIG. 32 shows a functional block diagram of an electronic device 3200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 32 are, optionally, combined or separated into sub-blocks to implement the principles of the various described embodiments. Therefore, the description herein optionally supports any possible combination or separation or further definition of the functional blocks described herein.

As shown in FIG. 32, an electronic device 3200 includes a display unit 3202 configured to display a graphic user interface, a rotatable input mechanism unit 3204 configured to receive movements, a touch-sensitive surface unit 3206 configured to receive contacts, and a processing unit 3208 coupled to the display unit 3202, the rotatable input mechanism unit 3204, and the touch-sensitive surface unit 3206. In some embodiments, the processing unit 3208 includes a display enabling unit 3210, a receiving unit 3212, a display ceasing unit 3214, and a display replacing unit 3216.

The processing unit 3208 is configured to: enable display (e.g., with display enabling unit 3210) of a first audio playback user interface; while displaying the first audio playback user interface, receive (e.g., with receiving unit 3212) a first user input representing movement of the rotatable input mechanism; in response to receiving the first user input, cease display (e.g., with display ceasing unit 3214) of the first audio playback user interface and enable display (e.g., with display enabling unit 3210) of a first user interface of a first set of user interfaces; while displaying a user interface of the first set of user interfaces, receive (e.g., with receiving unit 3212) a second user input representing a swipe in a first direction; in response to receiving the second user input, replace display (e.g., with display replacing unit 3216) of a portion of the user interface of the first set of user interfaces with display of a navigation interface, wherein the navigation interface comprises a first navigation affordance associated with the first set of user interfaces and a second navigation affordance associated with a second set of user interfaces. The processing unit 3208 is further configured to: receive (e.g., with receiving unit 3212) a third user input associated with the second navigation affordance of the navigation interface; and in response to receiving the third user input, cease display (e.g., with display ceasing unit 3214) of the first set of user interfaces and the navigation interface and enable display (e.g., with display enabling unit 3210) of a first user interface of the second set of user interfaces.

In some embodiments, the processing unit 3208 is further configured to: while displaying a user interface of the second set of user interfaces, receive (e.g., with receiving unit 3212) a fourth input representing a swipe in the first direction; in response to receiving the fourth user input, enable display (e.g., with display enabling unit 3210) of the navigation interface, wherein the navigation interface further comprises a third navigation affordance associated with a third set of user interfaces. The processing unit 3208 is further configured to: receive (e.g., with receiving unit 3212) a fifth user input associated with the third navigation affordance of the navigation interface; and in response to receiving the fifth user input, cease display (e.g., with display ceasing unit 3214) of the second set of user interfaces and the navigation interface and enable display (e.g., with display enabling unit 3210) of a first user interface of the third set of user interfaces.

In some embodiments, the processing unit 3208 is further configured to: receive (e.g., with receiving unit 3212) a sixth user input representing movement of the rotatable input mechanism; and in response to receiving the sixth user input, enable display (e.g., with display enabling unit 3210) of the first audio playback user interface.

In some embodiments, the processing unit 3208 is further configured to: while displaying a user interface of any of the first set of user interfaces, the second set of user interfaces, or the third set of user interfaces, receive (e.g., with receiving unit 3212) a seventh user input associated with a selection affordance of the user interface of any of the first set of user interfaces, the second set of user interfaces, or the third set of user interfaces; and in response to receiving the seventh user input, enable display (e.g., with display enabling unit 3210) of a second audio playback user interface.

In some embodiments, the first set of user interfaces, the second set of user interfaces, and the third set of user interfaces are each independently selected from the group consisting of: a playlist set of user interfaces, an artist set of user interfaces, and a songs set of user interfaces; the playlist set of user interfaces comprises: a playlist user interface, and a list of songs associated with a playlist of the playlist user interface; the artist set of user interfaces comprises: an artist user interface, a list of albums associated with an artist of the artist user interface, and a list of songs associated with an album of the list of albums; and the songs set of user interfaces comprises: a song user interface.

The operations described above with reference to FIG. 22 are, optionally, implemented by components depicted in FIGS. 1A-1B or FIG. 32. For example, display operation at block 2202, receive operation at block 2204, cease display and display operation at block 2206, receive operation at block 2208, replace display operation at block 2210, receive operation at block 2212, and cease display and display operation at block 2214 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
   a display;
   a rotatable input mechanism;
   one or more processors;
   memory; and
   one or more programs, wherein the one or more programs are stored in the memory and configured to be executed by the one or more processors, the one or more programs including instructions for:
      displaying, on the display, an application user interface that corresponds to an audio application for playing audio content;
      while displaying the application user interface and playing the audio content at a volume level, receiving, via the rotatable input mechanism, a user input;
      in response to receiving the user input:
         in accordance with a determination that the application user interface corresponds to a first user interface in the audio application, changing the volume level of the audio content; and
         in accordance with a determination that the application user interface corresponds to a second user interface in the audio application, different from the first user interface in the audio application:
            ceasing to display a first set of one or more affordances in the application user interface and displaying a second set of one or more affordances in the application user interface; and
            maintaining the volume level of the audio content.

2. The electronic device of claim 1, wherein the first user interface in the audio application includes an audio playback user interface.

3. The electronic device of claim 1, wherein the first set of one or more affordances are organized categorically.

4. The electronic device of claim 1, the one or more programs further including instructions for:
   further in accordance with a determination that the application user interface corresponds to the first user interface in the audio application and in accordance with a determination that the user input includes a rotation of the rotatable input mechanism in a first direction, increasing the volume level of the audio content; and
   further in accordance with a determination that the application user interface corresponds to the first user interface in the audio application and in accordance with a determination that the user input includes a rotation of the rotatable input mechanism in a second direction, decreasing the volume level of the audio content.

5. The electronic device of claim 1, the one or more programs further including instructions for:
   further in accordance with a determination that the application user interface corresponds to the second user interface in the audio application and in accordance with a determination that the user input includes a rotation of the rotatable input mechanism in a first direction, ceasing to display the first set of one or more affordances in the application user interface and displaying the second set of one or more affordances in the application user interface; and
   further in accordance with a determination that the application user interface corresponds to the second user interface in the audio application and in accordance with a determination that the user input includes a rotation of the rotatable input mechanism in a second direction, ceasing to display the first set of one or more affordances in the application user interface and displaying a third set of one or more affordances in the application user interface.

6. The electronic device of claim 1, wherein the first user interface in the audio application includes an affordance for pausing the audio content, an affordance for scrubbing within the audio content, and an affordance for skipping to next audio content.

7. A non-transitory computer-readable storage medium storing one or more programs configured to be executed by one or more processors of an electronic device with a display and a rotatable input mechanism, the one or more programs including instructions for:
   displaying, on the display, an application user interface that corresponds to an audio application for playing audio content;

while displaying the application user interface and playing the audio content at a volume level, receiving, via the rotatable input mechanism, a user input;
in response to receiving the user input:
in accordance with a determination that the application user interface corresponds to a first user interface in the audio application, changing the volume level of the audio content; and
in accordance with a determination that the application user interface corresponds to a second user interface in the audio application, different from the first user interface in the audio application:
ceasing to display a first set of one or more affordances in the application user interface and displaying a second set of one or more affordances in the application user interface; and
maintaining the volume level of the audio content.

8. A method, comprising:
at an electronic device with a display and a rotatable input mechanism:
displaying, on the display, an application user interface that corresponds to an audio application for playing audio content;
while displaying the application user interface and playing the audio content at a volume level, receiving, via the rotatable input mechanism, a user input;
in response to receiving the user input:
in accordance with a determination that the application user interface corresponds to a first user interface in the audio application, changing the volume level of the audio content; and
in accordance with a determination that the application user interface corresponds to a second user interface in the audio application, different from the first user interface in the audio application:
ceasing to display a first set of one or more affordances in the application user interface and displaying a second set of one or more affordances in the application user interface; and
maintaining the volume level of the audio content.

9. The non-transitory computer-readable storage medium of claim 7, wherein the first user interface in the audio application includes an audio playback user interface.

10. The non-transitory computer-readable storage medium of claim 7, wherein the first set of one or more affordances are organized categorically.

11. The non-transitory computer-readable storage medium of claim 7, the one or more programs further including instructions for:
further in accordance with a determination that the application user interface is in the first user interface in the audio application and in accordance with a determination that the user input includes a rotation of the rotatable input mechanism in a first direction, increasing the volume level of the audio content; and
further in accordance with a determination that the application user interface is in the first user interface in the audio application and in accordance with a determination that the user input includes a rotation of the rotatable input mechanism in a second direction, decreasing the volume level of the audio content.

12. The non-transitory computer-readable storage medium of claim 7, the one or more programs further including instructions for:
further in accordance with a determination that the application user interface corresponds to the second user interface in the audio application and in accordance with a determination that the user input includes a rotation of the rotatable input mechanism in a first direction, ceasing to display the first set of one or more affordances in the application user interface and displaying the second set of one or more affordances in the application user interface; and
further in accordance with a determination that the application user interface corresponds to the second user interface in the audio application and in accordance with a determination that the user input includes a rotation of the rotatable input mechanism in a second direction, ceasing to display the first set of one or more affordances in the application user interface and displaying a third set of one or more affordances in the application user interface.

13. The non-transitory computer-readable storage medium of claim 7, wherein the first user interface in the audio application includes an affordance for pausing the audio content, an affordance for scrubbing within the audio content, and an affordance for skipping to next audio content.

14. The method of claim 8, wherein the first user interface in the audio application includes an audio playback user interface.

15. The method of claim 8, wherein the first set of one or more affordances are organized categorically.

16. The method of claim 8, further comprising:
further in accordance with a determination that the application user interface is in the first user interface in the audio application and in accordance with a determination that the user input includes a rotation of the rotatable input mechanism in a first direction, increasing the volume level of the audio content; and
further in accordance with a determination that the application user interface is the first user interface in the audio application and in accordance with a determination that the user input includes a rotation of the rotatable input mechanism in a second direction, decreasing the volume level of the audio content.

17. The method of claim 8, further comprising:
further in accordance with a determination that the application user interface corresponds to the second user interface in the audio application and in accordance with a determination that the user input includes a rotation of the rotatable input mechanism in a first direction, ceasing to display the first set of one or more affordances in the application user interface and displaying the second set of one or more affordances in the application user interface; and
further in accordance with a determination that the application user interface corresponds to the second user interface in the audio application and in accordance with a determination that the user input includes a rotation of the rotatable input mechanism in a second direction, ceasing to display the first set of one or more affordances in the application user interface and displaying a third set of one or more affordances in the application user interface.

18. The method of claim 8, wherein the first user interface in the audio application includes an affordance for pausing the audio content, an affordance for scrubbing within the audio content, and an affordance for skipping to next audio content.

* * * * *